(12) United States Patent
Iwamoto et al.

(10) Patent No.: US 7,843,636 B2
(45) Date of Patent: Nov. 30, 2010

(54) IMAGE DISPLAY METHOD FOR A STEREOSCOPIC IMAGE

(75) Inventors: Kyohei Iwamoto, Tokyo (JP); Xueming Yu, Kanagawa (JP); Yoshio Suzuki, Kanagawa (JP); Qingyu Lu, Kanagawa (JP)

(73) Assignee: Sony Corporation, Tokyo (JP)

( * ) Notice: Subject to any disclaimer, the term of this patent is extended or adjusted under 35 U.S.C. 154(b) by 113 days.

(21) Appl. No.: 12/039,088

(22) Filed: Feb. 28, 2008

(65) Prior Publication Data

US 2008/0252977 A1 Oct. 16, 2008

(30) Foreign Application Priority Data

Mar. 2, 2007 (JP) ............................. 2007-053043

(51) Int. Cl.
*G02B 27/22* (2006.01)
(52) U.S. Cl. ....................................... 359/462; 382/255
(58) Field of Classification Search ........................ None
See application file for complete search history.

(56) References Cited

U.S. PATENT DOCUMENTS

2006/0050374 A1* 3/2006 Slinger ........................ 359/385

2006/0290777 A1* 12/2006 Iwamoto et al. .............. 348/49
2008/0192343 A1* 8/2008 Miyawaki et al. ............ 359/462
2009/0015917 A1* 1/2009 Iwamoto et al. .............. 359/462

FOREIGN PATENT DOCUMENTS

| JP | 2001-056450 | 2/2001 |
| JP | 2002-072135 | 3/2002 |
| JP | 2003-075771 | 3/2003 |
| JP | 2003-161912 | 6/2003 |
| JP | 2003-173128 | 6/2003 |
| JP | 2003-295114 | 10/2003 |
| JP | 3523605 | 2/2004 |

* cited by examiner

*Primary Examiner*—Lee Fineman
(74) *Attorney, Agent, or Firm*—SNR Denton US LLP

(57) ABSTRACT

Disclosed herein is an image display method wherein an image display apparatus which includes a light source and an optical system is used, the optical system including, an optical modulation section, a Fourier transform image forming section, a Fourier transform image selection section, and a conjugate image forming section, the image forming method including, a step, carried out by the optical modulation section, of producing a two-dimensional image based on two-dimensional image data whose aberrations caused by the optical system are corrected.

1 Claim, 49 Drawing Sheets

| | SF | | 50 | | 51 | | | | | |
|---|---|---|---|---|---|---|---|---|---|---|
| (-5,5) | (-4,5) | (-3,5) | (-2,5) | (-1,5) | (0,5) | (1,5) | (2,5) | (3,5) | (4,5) | (5,5) |
| (-5,4) | (-4,4) | (-3,4) | (-2,4) | (-1,4) | (0,4) | (1,4) | (2,4) | (3,4) | (4,4) | (5,4) |
| (-5,3) | (-4,3) | (-3,3) | (-2,3) | (-1,3) | (0,3) | (1,3) | (2,3) | (3,3) | (4,3) | (5,3) |
| (-5,2) | (-4,2) | (-3,2) | (-2,2) | (-1,2) | (0,2) | (1,2) | (2,2) | (3,2) | (4,2) | (5,2) |
| (-5,1) | (-4,1) | (-3,1) | (-2,1) | (-1,1) | (0,1) | (1,1) | (2,1) | (3,1) | (4,1) | (5,1) |
| (-5,0) | (-4,0) | (-3,0) | (-2,0) | (-1,0) | (0,0) | (1,0) | (2,0) | (3,0) | (4,0) | (5,0) |
| (-5,-1) | (-4,-1) | (-3,-1) | (-2,-1) | (-1,-1) | (0,-1) | (1,-1) | (2,-1) | (3,-1) | (4,-1) | (5,-1) |
| (-5,-2) | (-4,-2) | (-3,-2) | (-2,-2) | (-1,-2) | (0,-2) | (1,-2) | (2,-2) | (3,-2) | (4,-2) | (5,-2) |
| (-5,-3) | (-4,-3) | (-3,-3) | (-2,-3) | (-1,-3) | (0,-3) | (1,-3) | (2,-3) | (3,-3) | (4,-3) | (5,-3) |
| (-5,-4) | (-4,-4) | (-3,-4) | (-2,-4) | (-1,-4) | (0,-4) | (1,-4) | (2,-4) | (3,-4) | (4,-4) | (5,-4) |
| (-5,-5) | (-4,-5) | (-3,-5) | (-2,-5) | (-1,-5) | (0,-5) | (1,-5) | (2,-5) | (3,-5) | (4,-5) | (5,-5) |

$Y_1$ $Y_1$

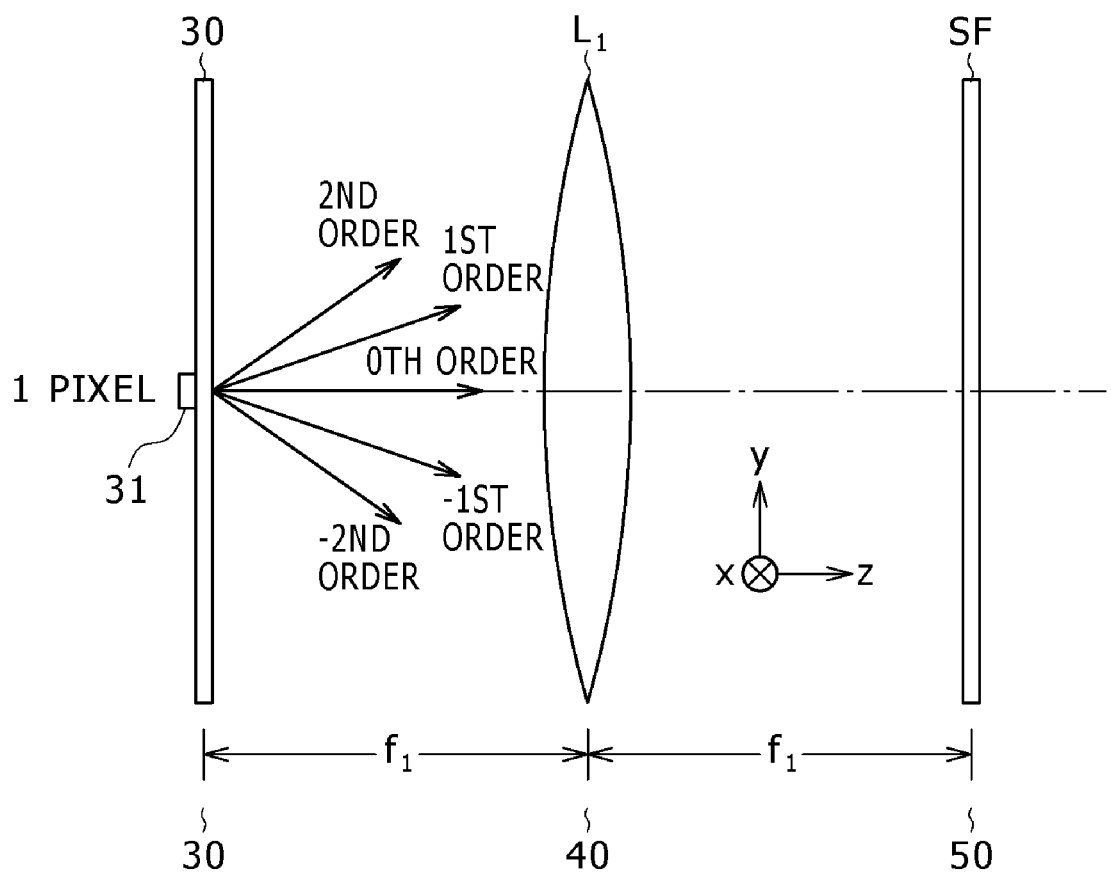
F I G . 5

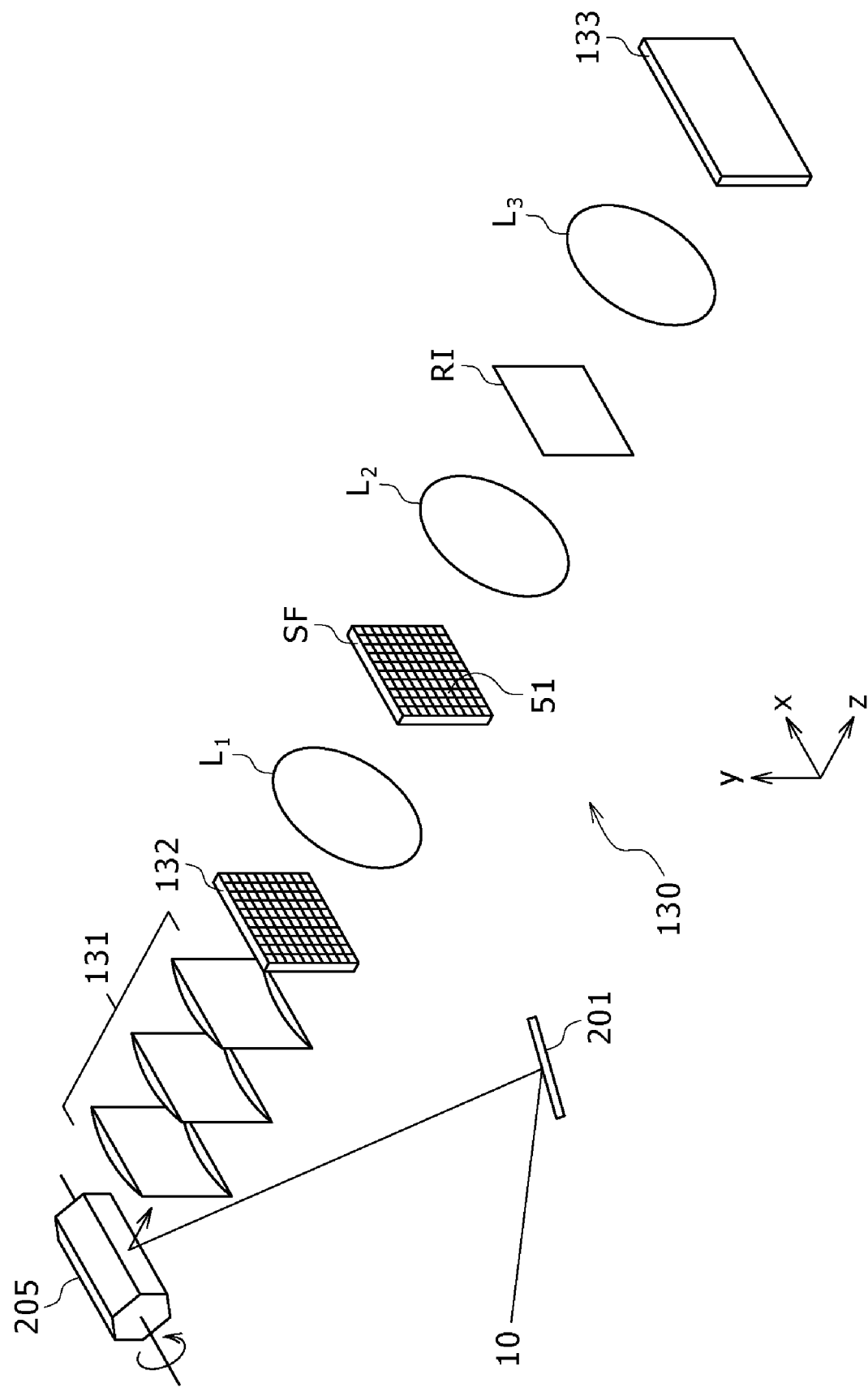

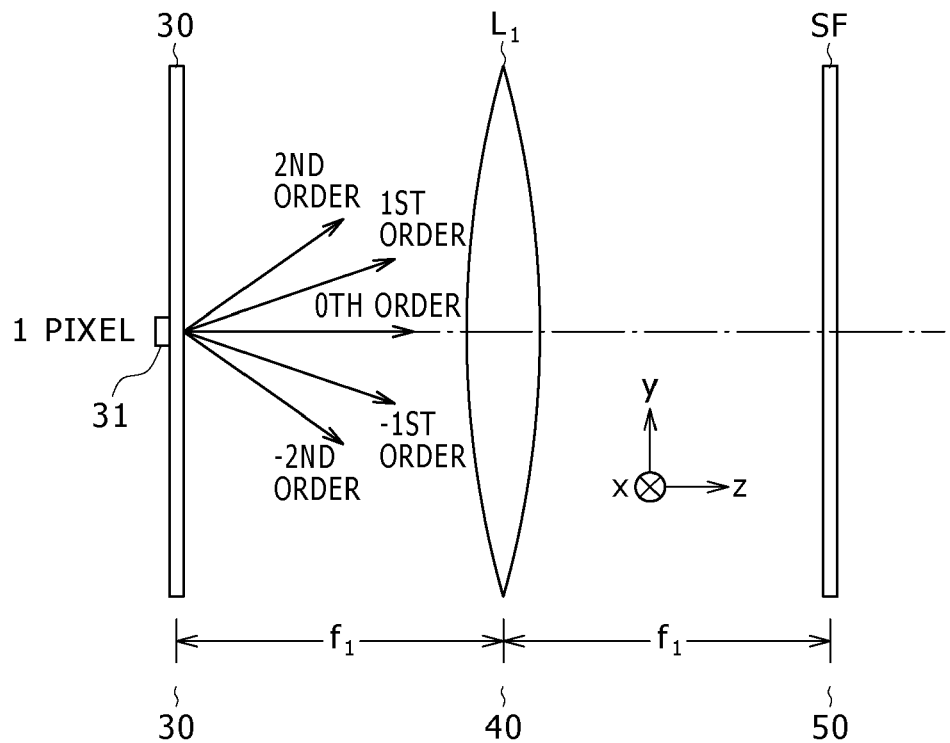
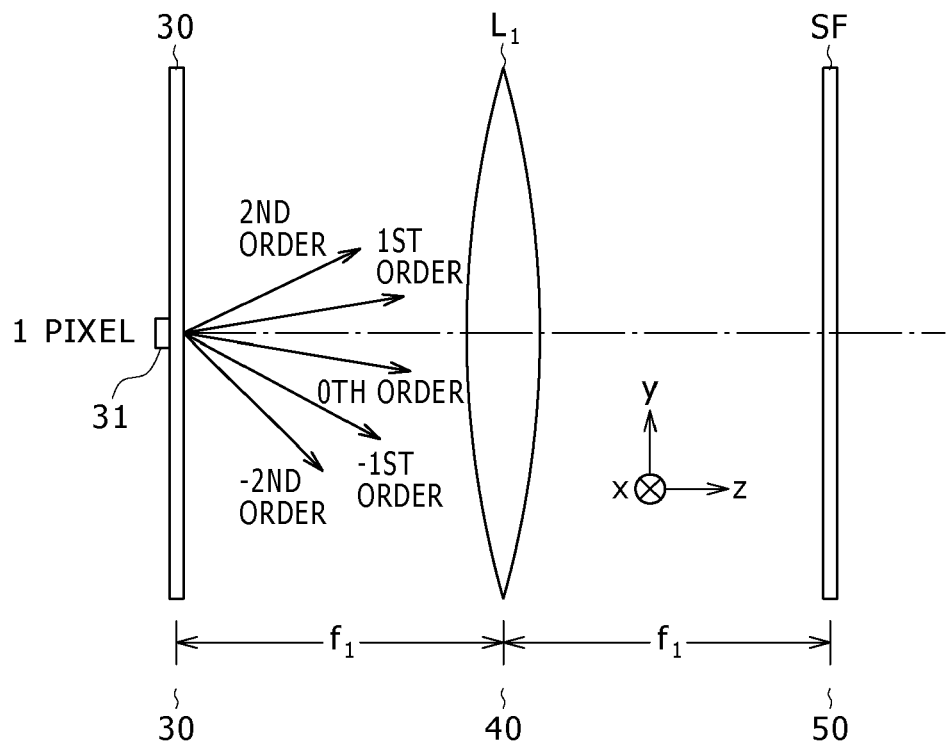

| (-5,5) | (-3,5) | (-1,5) | (1,5) | (3,5) | (5,5) |
| (-4,5) | (-2,5) | (0,5) | (2,5) | (4,5) | |
| (-5,4) | (-3,4) | (-1,4) | (1,4) | (3,4) | (5,4) |
| (-4,4) | (-2,4) | (0,4) | (2,4) | (4,4) | |
| (-5,3) | (-3,3) | (-1,3) | (1,3) | (3,3) | (5,3) |
| (-4,3) | (-2,3) | (0,3) | (2,3) | (4,3) | |
| (-5,2) | (-3,2) | (-1,2) | (1,2) | (3,2) | (5,2) |
| (-4,2) | (-2,2) | (0,2) | (2,2) | (4,2) | |
| (-5,1) | (-3,1) | (-1,1) | (1,1) | (3,1) | (5,1) |
| (-4,1) | (-2,1) | (0,1) | (2,1) | (4,1) | |
| (-5,0) | (-3,0) | (-1,0) | (1,0) | (3,0) | (5,0) |
| (-4,0) | (-2,0) | (0,0) | (2,0) | (4,0) | |
| (-5,-1) | (-3,-1) | (-1,-1) | (1,-1) | (3,-1) | (5,-1) |
| (-4,-1) | (-2,-1) | (0,-1) | (2,-1) | (4,-1) | |
| (-5,-2) | (-3,-2) | (-1,-2) | (1,-2) | (3,-2) | (5,-2) |
| (-4,-2) | (-2,-2) | (0,-2) | (2,-2) | (4,-2) | |
| (-5,-3) | (-3,-3) | (-1,-3) | (1,-3) | (3,-3) | (5,-3) |
| (-4,-3) | (-2,-3) | (0,-3) | (2,-3) | (4,-3) | |
| (-5,-4) | (-3,-4) | (-1,-4) | (1,-4) | (3,-4) | (5,-4) |
| (-4,-4) | (-2,-4) | (0,-4) | (2,-4) | (4,-4) | |
| (-5,-5) | (-3,-5) | (-1,-5) | (1,-5) | (3,-5) | (5,-5) |
| (-4,-5) | (-2,-5) | (0,-5) | (2,-5) | (4,-5) | |

FIG.32

| (5,-5) | (4,-5) | (3,-5) | (2,-5) | (1,-5) | (0,-5) | (1,-5) | (2,-5) | (3,-5) | (4,-5) | (5,-5) |
|---|---|---|---|---|---|---|---|---|---|---|
| (5,-4) | (4,-4) | (3,-4) | (2,-4) | (1,-4) | (0,-4) | (1,-4) | (2,-4) | (3,-4) | (4,-4) | (5,-4) |
| (5,-3) | (4,-3) | (3,-3) | (2,-3) | (1,-3) | (0,-3) | (1,-3) | (2,-3) | (3,-3) | (4,-3) | (5,-3) |
| (5,-2) | (4,-2) | (3,-2) | (2,-2) | (1,-2) | (0,-2) | (1,-2) | (2,-2) | (3,-2) | (4,-2) | (5,-2) |
| (5,-1) | (4,-1) | (3,-1) | (2,-1) | (1,-1) | (0,-1) | (1,-1) | (2,-1) | (3,-1) | (4,-1) | (5,-1) |
| (5,0) | (4,0) | (3,0) | (2,0) | (1,0) | (0,0) | (1,0) | (2,0) | (3,0) | (4,0) | (5,0) |
| (5,1) | (4,1) | (3,1) | (2,1) | (1,1) | (0,1) | (1,1) | (2,1) | (3,1) | (4,1) | (5,1) |
| (5,2) | (4,2) | (3,2) | (2,2) | (1,2) | (0,2) | (1,2) | (2,2) | (3,2) | (4,2) | (5,2) |
| (5,3) | (4,3) | (3,3) | (2,3) | (1,3) | (0,3) | (1,3) | (2,3) | (3,3) | (4,3) | (5,3) |
| (5,4) | (4,4) | (3,4) | (2,4) | (1,4) | (0,4) | (1,4) | (2,4) | (3,4) | (4,4) | (5,4) |
| (5,5) | (4,5) | (3,5) | (2,5) | (1,5) | (0,5) | (1,5) | (2,5) | (3,5) | (4,5) | (5,5) |

SF  50  51

IMAGE DISPLAY METHOD FOR A STEREOSCOPIC IMAGE

CROSS REFERENCES TO RELATED APPLICATIONS

The present invention contains subject matter related to Japanese Patent Application JP 2007-053043, filed in the Japan Patent Office on Mar. 2, 2007, the entire contents of which being incorporated herein by reference.

BACKGROUND OF THE INVENTION

1. Field of the Invention

This invention relates to an image display method for displaying an image such as a three-dimensional image or stereoscopic image.

2. Description of the Related Art

A two-eye type stereoscopic image technique wherein both eyes of an observer observe images different from each other called parallax images to obtain a stereoscopic image and a multi-eye type stereoscopic image technique wherein a plurality of sets of parallax images are prepared to obtain a plurality of stereoscopic images from different viewpoints have already known, and various techniques relating to such techniques have been and are being developed very much. However, according to the two-eye type stereoscopic image technique or the multi-eye type stereoscopic image technique, a stereoscopic image is positioned not as a stereoscopic image in an intended space, but exists, for example, on a two-dimensional display plane and always exists at a fixed position. Accordingly, particularly convergence and adjustment which are physiologic reactions of the ophthalmencephalon do not interlink with each other, and visual fatigue caused by this makes a problem.

Meanwhile, in the real world, information of the surface of a physical solid propagates to the eyeballs of the observer through a light wave serving as a medium. As a technique by which a light wave from the surface of a physical solid physically existing in the real world can be reproduced artificially, a holography technique is available. In a stereoscopic image which uses a holography technique, interference fringes generated by interference of light are used, and a diffracted light wave front itself which is generated when light is illuminated on the interference fringes is used as an image information medium. Therefore, an image with which such physiologic reactions of the ophthalmencephalon as convergence and adjustment similar to those when the observer observes a physical solid in the real world occurs and the visual fatigue is reduced can be provided. Further, that the light wave front from the physical solid is reproduced signifies that the continuity is assured in a direction in which image information is transmitted. Accordingly, even if the viewpoint of the observer moves, it is possible to successively present an appropriate image from the different angle according to the movement, and motion parallaxes are provided successively.

However, according to the holography technique, three-dimensional spatial information of a physical solid is recorded as interference fringes in a two-dimensional space, and the amount of information is very great when compared with that of information of a two-dimensional space on a picked up photograph of the same physical solid or the like. It can be considered that this arises from the fact that, when information of a three-dimensional space is converted into information of a two-dimensional space, the information is converted into density in the two-dimensional space. Therefore, the spatial resolution required for a display device which displays interference fringes by CGH (Computer Generated Hologram) is very high, and a very great amount of information is required. Therefore, in the existing condition, it is technically difficult to implement a stereoscopic image based on a real time hologram.

In the holography technique, light waves which can be regarded as continuous information are used as an information medium to transmit information from a physical solid. Meanwhile, as a technique of discretizing light waves and using light beams to reproduce a situation theoretically substantially equivalent to a field formed from light waves in the real world to produce a stereoscopic image, a light beam reproduction method or integral photography method is known. In the light beam reproduction technique, a light beam group composed of a large number of light beams propagating in many directions is scattered into a space by optical means in advance. Then, those light beams which are to be propagated from a virtual physical solid surface disposed at an arbitrary position are selected from the light beam group, and modulation of the intensity or phase of the selected light beams is carried out to generate an image formed from the light beams in the space. An observer can observe the image as a stereoscopic image. The stereoscopic image by the light beam reproduction method is formed at an arbitrary point from multiple images from a plurality of directions and can be observed in a different manner depending upon the position from which the stereoscopic image is observed similarly as in the case wherein a three-dimensional physical solid in the real world is observed.

As an apparatus for implementing the light beam reproduction method described above, an apparatus has been proposed which utilizes a combination of a flat display apparatus such as a liquid crystal display apparatus or a plasma display apparatus and a microlens array or a pin-hole array. An apparatus of the type described is disclosed, for example, In Japanese Patent Laid-open Nos. 2003-173128, 2003-161912, 2003-295114, 2003-75771, 2002-72135 and 2001-56450 and Japanese Patent No. 3,523,605. Also an apparatus is applicable which includes a large number of projector units juxtaposed to each other. FIG. 49 shows an example of a configuration of a three-dimensional display apparatus which implements a light beam reproduction method using projector units. Referring to FIG. 49, the apparatus shown includes a large number of projector units 301 disposed in a juxtaposed relationship in a horizontal direction and a vertical direction. Light beams are emitted at different angles from the projector units 301. With the apparatus, images of multiple visual angles are multiple reproduced at an arbitrary point in a certain sectional plane 302 thereby to implement a stereoscopic image.

SUMMARY OF THE INVENTION

According to the light beam reproduction method described above, since images are generated from light beams of an intensity with which they act effectively upon focal adjustment and binocular convergence angle adjustment as visual sensation functions, which have been impossible with two-eye and multi-eye type stereoscopic image techniques, a stereoscopic image which provides very little fatigue to an observer can be provided. Besides, since light beams are continuously emitted in a plurality of directions from the same element on a virtual physical solid, the variation of the image upon movement of the viewpoint position can be provided continuously.

However, the image generated by the light beam reproduction technique at present lacks a sense of reality when compared with a physical solid in the real world. It is considered that this arises from the fact that the stereoscopic image by the light beam reproduction technique at present is generated from a much smaller amount of information, that is, from a much smaller amount of light beams, than the amount of information which the observer obtains from the physical solid in the real world. Generally, it is considered that the limit to visual observation of a human being is approximately one minute in angular resolution, and a stereoscopic image by the light beam reproduction method at present is produced from an amount of light beams insufficient to the visual sensation. Accordingly, in order to generate a stereoscopic image which provides such a high sense of reality or such reality as is provided by a physical solid in the real world, it is regarded as a subject at least to generate an image from a large amount of light beams.

In order to implement this, a technique is required first which can generate a light beam group in a spatially high density. It is regarded as one of resolutions to raise the display density of a display apparatus such as a liquid crystal display apparatus. On the other hand, in such an apparatus as shown in FIG. 49 wherein a large number of projector units 301 are disposed, it is a possible idea to miniaturize the projector units 301 such that they are juxtaposed in a spatially high density. However, tremendous enhancement of the display density of display apparatus at present is difficult from the problem of the light utilization efficiency or the diffraction limit. In the case of the apparatus of FIG. 49, since there is a limit to miniaturization of the projector units 301, it is considered difficult to juxtapose the projector units 301 in a spatially high density. In any case, in order to generate a high density light beam group, a plurality of devices are required, and increase in size of the entire apparatus cannot be avoided.

Further, in a display apparatus at present, particularly in a projection optical system, light incoming at an angle to a peripheral portion of a lens system makes a cause of occurrence of various aberrations with a stereoscopic image, and it is difficult to obtain a desired stereoscopic image free from aberrations. In order to correct such aberrations with an optical system of a display apparatus, or in other words, in order to carry out appropriate aberration correction, it is necessary to furnish the lens system with a complicated mechanism. This gives rise to such problems as increase of the fabrication cost, increase of the space and increase of the weight of the display apparatus.

Therefore, it is demanded to provide an image display method of displaying an original image having no or little aberrations using an image display apparatus which can generate and scatter a group of light beams necessary for display of an image such as, for example, a stereoscopic image in a spatially high density without increasing the overall size of the image display apparatus and can provide a stereoscopic image formed from light beams having quality proximate to that of a physical solid in the real world.

According to a first embodiment of the present invention, there is provided an image display method wherein an image display apparatus which includes a light source and an optical system is used;

the optical system including:

(A) an optical modulation section having a plurality of pixels and configured to modulate light from the light source by means of the pixels to produce a two-dimensional image and emit spatial frequencies of the produced two-dimensional image along a plurality of diffraction angles corresponding to different diffraction orders produced from each of the pixels;

(B) a Fourier transform image forming section configured to Fourier transform the spatial frequencies of a two-dimensional image emitted from the optical modulation section to produce a number of Fourier transform images corresponding to the number of diffraction orders;

(C) a Fourier transform image selection section configured to select a Fourier transform image corresponding to a desired diffraction order from among the Fourier transform images produced corresponding to the diffraction orders; and (D) a conjugate image forming section configured to form a conjugate image of the Fourier transform image selected by the Fourier transform image selection section;

the image forming method including:

a step, carried out by the optical modulation section, of producing a two-dimensional image based on two-dimensional image data whose aberrations caused by the optical system are corrected.

Preferably, the image forming apparatus in the first embodiment of the present invention is configured such that the conjugate image forming section includes an inverse Fourier transform section configured to inverse Fourier transform the Fourier transform image selected by the Fourier transform image selection section to form a real image of the two-dimensional image produced by the optical modulation section.

The image display apparatus in the first embodiment of the present invention including the preferred configuration described above may have such a form that the optical modulation section includes a two-dimensional spatial optical modulator having a plurality of pixels arrayed two-dimensionally, and each of the pixels has an aperture. In this instance, preferably the two-dimensional spatial optical modulator is configured such that it is composed of a liquid crystal display apparatus, more particularly, a liquid crystal display apparatus of the transmission type or the reflection type or such that a movable mirror is provided in each of the apertures of the two-dimensional spatial optical modulator or the two-dimensional spatial optical modulator is formed from a two-dimensional MEMS wherein movable mirrors are arrayed in a two-dimensional matrix. Here, preferably the apertures have a rectangular planar shape. Where the apertures have a rectangular planar shape, Fraunhofer diffraction occurs, and M×N diffraction light beams are produced as hereinafter described. In particular, such apertures form an amplitude grating which periodically modulates the amplitude or intensity of an incoming light wave so that a light amount distribution which coincides with the light transmission factor distribution of the grating is obtained.

The image display apparatus in the first embodiment of the present invention including the preferred configuration and the preferred form described above may be configured such that the optical modulation section includes:

(A-1) a one-dimensional spatial optical modulator configured to produce a one-dimensional image;

(A-2) a scanning optical system configured to two-dimensionally develop the one-dimensional image produced by the one-dimensional spatial optical modulator to produce a two-dimensional image; and (A-3) a grating filter disposed on a production plane of the two-dimensional image and configured to emit spatial frequencies of the produced two-dimensional image along a plurality of diffraction angles corresponding to different diffraction orders.

It is to be noted that the grating filter may be formed from an amplitude grating or else from a phase grating which modulates the phase of the transmission light amount, that is, modulates the phase while keeping the amplitude or intensity of the light as it is.

Further, the image display apparatus in the first embodiment of the present invention including the preferred configuration described above may have such a form that the Fourier transform image forming section is formed from a lens having a front side focal plane on which the optical modulation section is disposed while the Fourier transform image selection section is disposed on the rear side focal plane of the lens.

Further, the image display apparatus in the first embodiment of the present invention including the preferred configuration and form described above may have such a configuration that the Fourier transform image selection section has a number of apertures corresponding to the number of diffraction orders and controllable between open and closed states. In this instance, the image display apparatus may have such a form that the Fourier transform image selection section is formed from a liquid crystal display apparatus, more particularly from a liquid crystal display apparatus of the transmission type or the reflection type, or is formed from a two-dimensional MEMS wherein movable mirrors are arrayed in a two-dimensional matrix. Further, the Fourier transform image selection section may be configured such that it places a desired one of the apertures into an open state in synchronism with a production timing of a two-dimensional image by the optical modulation section to select a Fourier transform image corresponding to a desired diffraction order.

Further, the image display apparatus in the first embodiment of the present invention including the preferred configurations and forms described above may be configured such that the spatial frequency of the two-dimensional image corresponds to image information whose carrier frequency is the spatial frequency of the pixel structure.

According to a second embodiment of the present invention, there is provided an image display method wherein an image display apparatus which includes a light source and an optical system is used;

the optical system including:

(A) a two-dimensional image forming apparatus having P×Q apertures arrayed in a two-dimensional matrix along an X direction and a Y direction and configured to control, for each of the apertures, passage, reflection or diffraction of the light from the light source to form a two-dimensional image and produce, based on the two-dimensional image, totaling M×N diffraction light beams arranged such that M diffraction light beams from the mth to the m'th diffraction orders are arranged along the X direction and N diffraction light beams from the nth to the n'th diffraction orders are disposed along the Y direction, P and Q being arbitrary positive integers, m and m' being integers, M being a positive integer, n and n' being integers, N being a positive integer;

(B) a first lens having a front side focal plane on which the two-dimensional image forming apparatus is disposed;

(C) a spatial filter disposed on a rear side focal plane of the first lens and having totaling M×N apertures controllable between open and closed states and arranged such that M apertures are arranged along the X direction and N apertures are arranged along the Y direction;

(D) a second lens having a front side focal plane on which the spatial filter is disposed; and (E) a third lens having a front side focus positioned at a rear side focus of the second lens;

the image display method including:

a step, carried out by the two-dimensional image forming apparatus, of producing a two-dimensional image based on two-dimensional image data whose aberrations caused by the optical system are corrected.

The image display apparatus in the second embodiment of the present invention may have such a form that the two-dimensional image forming apparatus is formed from a liquid crystal display apparatus having P×Q pixels arrayed two-dimensionally, more particularly a liquid crystal display apparatus of the transmission type or the reflection type and a movable mirror is provided in each of the apertures. Or, preferably the image display apparatus is configured such that a movable mirror is provided in each of the apertures of the two-dimensional image forming apparatus, that is, the two-dimensional image forming apparatus is formed from a two-dimensional MEMS wherein a movable mirror is disposed in each of apertures arrayed in a two-dimensional matrix. Here, the apertures preferably have a rectangular planar shape. Where the apertures have a rectangular planar shape, Fraunhofer diffraction occurs, and M×N diffraction light beams are produced. In other words, an amplitude grating is formed from the apertures.

In the image display apparatus in the second embodiment of the present invention including the preferred configuration and form described above may have such a configuration that the spatial filter is formed from a liquid crystal display apparatus having M×N pixels, more particularly a liquid crystal display apparatus of the transmission type or the reflection type or is formed from a two-dimensional MEMS wherein movable mirrors are arrayed in a two-dimensional matrix. Further, the spatial filter may be configured such that a desired aperture thereof is placed into an open state in synchronism with a production timing of a two-dimensional image by the two-dimensional image forming apparatus.

According to a third embodiment of the present invention, there is provided an image display method wherein an image display apparatus which includes a light source and an optical system is used;

the optical system including:

(A) a two-dimensional image forming apparatus including a one-dimensional spatial optical modulator having P pixels along an X direction and configured to produce a one-dimensional image, a scanning optical system configured to two-dimensionally develop the one-dimensional image produced by the one-dimensional spatial optical modulator to produce a two-dimensional image, and a diffraction light production section disposed on a production plane of the two-dimensional image and configured to produce, for each of the pixels, M diffraction light beams including mth to m'th order diffraction light beams;

(B) a first lens having a front side focal plane on which the diffraction light production section is disposed;

(C) a spatial filter disposed on a rear side focal plane of the first lens and having M×N apertures controllable between open and closed states and arranged such that M apertures are arranged along the X direction and N apertures are arranged along a Y direction, N being a positive integer;

(D) a second lens having a front side focal plane on which the spatial filter is disposed; and (E) a third lens having a front side focus disposed at a rear side focus of the second lens;

the image display method including:

a step, carried out by the two-dimensional image forming apparatus, of producing a two-dimensional image based on two-dimensional image data whose aberrations caused by the optical system are corrected.

The image display apparatus in the third embodiment of the present invention may have such a configuration that the one-dimensional spatial optical modulator diffracts light from the light source to produce a one-dimensional image.

In the image display apparatus in the third embodiment of the present invention including the preferred configuration described above may have such a configuration that the spatial filter is formed from a liquid crystal display apparatus having M×N pixels, more particularly a liquid crystal display apparatus of the transmission type or the reflection type or is formed from a two-dimensional MEMS wherein movable mirrors are arrayed in a two-dimensional matrix. Further, the spatial filter may be configured such that a desired aperture thereof is placed into an open state in synchronism with a production timing of a two-dimensional image.

Further, the image display apparatus in the third embodiment of the present invention including the preferred configuration and form described above may have such a form that a member for causing anisotropic light diffusion to occur such as an anisotropic diffusion filter, an anisotropic diffusion sheet or an anisotropic diffusion film is disposed rearwardly of the third lens.

According to a fourth embodiment of the present invention, there is provided an image display method wherein an image display apparatus which includes a light source and an optical system is used;

the image display apparatus including:

(A) an optical modulation section having a plurality of pixels and configured to modulate light from the light source by means of the pixels to produce a two-dimensional image and emit spatial frequencies of the produced two-dimensional image along a plurality of diffraction angles corresponding to different diffraction orders produced from each of the pixels;

(B) an image limiting and production section configured to Fourier transform spatial frequencies of the two-dimensional image emitted from the optical modulation section to produce a number of Fourier transform images corresponding to the number of diffraction orders produced from each of the pixels, select only a predetermined Fourier transform image from among the produced Fourier transform images and inverse Fourier transform the selected Fourier transform image to form a conjugate image of the two-dimensional image produced by the optical modulation section;

(C) an oversampling filter having a plurality of aperture regions and configured to emit spatial frequencies of the conjugate image of the two-dimensional image along a plurality of diffraction angles corresponding to different diffraction orders produced from each of the aperture regions;

(D) a Fourier transform image forming apparatus configured to Fourier transform the spatial frequency of the conjugate image of the two-dimensional image emitted from the oversampling filter to produce a number of Fourier transform images corresponding to the number of the diffraction orders produced from each of the aperture regions;

(E) a Fourier transform image selection section configured to select a Fourier transform image corresponding to a desired diffraction order from among the number of Fourier transform images corresponding to the number of diffraction orders produced from each of the aperture regions; and (F) a conjugate image forming section configured to form a conjugate image of the Fourier transform image selected by the Fourier transform image selection section;

the image display method including:

a step, carried out by the optical modulation section, of producing a two-dimensional image based on two-dimensional image data whose aberrations caused by the optical system are corrected.

Preferably, the image forming apparatus in the fourth embodiment of the present invention has such a configuration that the conjugate image forming section includes an inverse Fourier transform section configured to inverse Fourier transform the Fourier transform image selected by the Fourier transform image selection section to form a real image of the two-dimensional image formed by the image limiting and production section.

The image display apparatus in the fourth embodiment of the present invention including the preferred configuration described above may have such a form that the optical modulation section includes a two-dimensional spatial optical modulator having a plurality of pixels arrayed two-dimensionally, and each of the pixels has an aperture. In this instance, preferably the two-dimensional spatial optical modulator is configured such that it is composed of a liquid crystal display apparatus, more particularly, a liquid crystal display apparatus of the transmission type or the reflection type or such that a movable mirror is provided in each of the apertures of the two-dimensional spatial optical modulator or the two-dimensional spatial optical modulator is formed from a two-dimensional MEMS wherein movable mirrors are arrayed in a two-dimensional matrix. Here, preferably the apertures have a rectangular planar shape. Where the apertures have a rectangular planar shape, Fraunhofer diffraction occurs, and $M_0 \times N_0$ diffraction light beams are produced. In particular, such apertures form an amplitude grating which periodically modulates the amplitude or intensity of an incoming light wave so that a light amount distribution which coincides with the light transmission factor distribution of the grating is obtained.

The image display apparatus in the fourth embodiment of the present invention including the preferred configurations and form described above may be configured such that the optical modulation section includes:

(A-1) a one-dimensional spatial optical modulator configured to produce a one-dimensional image;

(A-2) a scanning optical system configured to two-dimensionally develop the one-dimensional image produced by the one-dimensional spatial optical modulator to produce a two-dimensional image; and (A-3) a grating filter disposed on a production plane of the two-dimensional image and configured to emit spatial frequencies of the produced two-dimensional image along a plurality of diffraction angles corresponding to different diffraction orders. It is to be noted that the grating filter may be formed from an amplitude grating or else from a phase grating which modulates the phase of the transmission light amount, that is, modulates the phase while keeping the amplitude or intensity of the light as it is.

Further, the image display apparatus in the fourth embodiment of the present invention including the preferred configurations and forms described above may have such a configuration that the image limiting and production section includes:

(B-1) two lenses; and (B-2) a scattering diffraction limiting aperture section disposed between the two lenses and configured to pass only the predetermined Fourier transform image therethrough.

Further, the image display apparatus in the fourth embodiment of the present invention including the preferred configurations and forms described above may have such a form that the oversampling filter is formed from a diffraction light production member, more particularly, for example, from a grating filter. It is to be noted that the grating filter may be formed from an amplitude grating or a phase grating.

Further, the image display apparatus in the fourth embodiment of the present invention including the preferred configurations and forms described above may have such a configuration that the Fourier transform image forming section includes a lens having a front side focal plane on which the oversampling filter is disposed while the Fourier transform image selection section is disposed on the rear side focal plane of the lens.

Further, the image display apparatus in the fourth embodiment of the present invention including the preferred configurations and forms described above may have such a configuration that the Fourier transform image selection section has a number of aperture sections corresponding to the number of diffraction orders generated from each of the aperture regions and controllable between open and closed states. In this instance, the image display apparatus may have such a form that the Fourier transform image selection section is formed from a liquid crystal display apparatus, more particularly from a liquid crystal display apparatus of the transmission type or the reflection type, or is formed from a two-dimensional MEMS wherein movable mirrors are arrayed in a two-dimensional matrix. Further, the Fourier transform image selection section may be configured such that it places a desired one of the apertures into an open state in synchronism with a production timing of a two-dimensional image by the optical modulation section to select a Fourier transform image corresponding to a desired diffraction order.

Furthermore, the image display apparatus in the fourth embodiment of the present invention including the preferred configurations and forms described above may have such a configuration that the spatial frequencies of the two-dimensional image correspond to image information whose carrier frequency is the spatial frequency of the pixel structure. Further, the image display apparatus may have such a configuration that the spatial frequency of the conjugate image of the two-dimensional image is obtained by removing the spatial frequency of the pixel structure from the spatial frequency of the two-dimensional image. In other words, spatial frequencies obtained as the first order diffraction whose carrier frequency is the 0th order diffraction of the plane wave component and lower than one half the spatial frequency of the pixel structure or aperture structure of the optical modulation section, are selected by the image limiting and production section or pass through the scattering diffraction limiting aperture section. All of the spatial frequencies displayed on the optical modulation section or the two-dimensional image forming apparatus hereinafter described are transmitted.

According to a fifth embodiment of the present invention, there is provided an image display method wherein an image display apparatus which includes a light source and an optical system is used;

the optical system including:

(A) a two-dimensional image forming apparatus having a plurality of apertures arrayed in a two-dimensional matrix along an X direction and a Y direction and configured to control, for each of the apertures, passage, reflection or diffraction of light from the light source to produce a two-dimensional image and produce, for each of the apertures, a plurality of diffraction light beams of different diffraction orders based on the produced two-dimensional image;

(B) a first lens having a front side focal plane on which the two-dimensional image forming apparatus is disposed;

(C) a scattering diffraction limiting aperture section disposed on a rear side focal plane of the first lens and configured to pass only a diffraction light beam of a predetermined diffraction order therethrough;

(D) a second lens having a front side focal plane on which the scattering diffraction limiting aperture section is disposed;

(E) an oversampling filter disposed on a rear side focal plane of the second lens and having $P_{OSF} \times Q_{OSF}$ aperture regions arrayed in a two-dimensional matrix along an X direction and a Y direction, the oversampling filter being configured to produce, based on a conjugate image of the two-dimensional image produced by the second lens, for each of the aperture regions, totaling M×N diffraction light beams arranged such that M diffraction light beams from the mth to the m'th diffraction orders are arranged along the X direction and N diffraction light beams from the nth to the n'th diffraction orders are disposed along the Y direction, $P_{OSF} \times Q_{OSF}$ being arbitrary positive integers, m and m' being integers, M being a positive integer, n and n' being integers, N being a positive integer;

(F) a third lens having a front side focal plane on which the oversampling filter is disposed;

(G) a spatial filter disposed on a rear side focal plane of the third lens and having M×N spatial filters arranged such that M apertures are arranged along the X direction and N apertures are arranged along the Y direction and controllable between open and closed states;

(H) a fourth lens having a front side focal plane on which the spatial filter is disposed; and (I) a fifth lens having a front side focus positioned at a rear side focus of the fourth lens;

the image display method including:

a step, carried out by the optical modulation section, of producing a two-dimensional image based on two-dimensional image data whose aberrations caused by the optical system are corrected.

The image display apparatus in the fifth embodiment of the present invention may have such a form that the two-dimensional image forming apparatus is formed from a liquid crystal display apparatus having P×Q pixels arrayed two-dimensionally, more particularly a liquid crystal display apparatus of the transmission type or the reflection type and a movable mirror is provided in each of the apertures and besides $P_{OSF} > P$ and $Q_{OSF} > Q$ are satisfied. Or, preferably the image display apparatus is configured such that the two-dimensional image forming apparatus has P×Q apertures and a movable mirror is provided in each of the apertures, that is, the two-dimensional image forming apparatus is formed from a two-dimensional MEMS wherein a movable mirror is disposed in each of the apertures arrayed in a two-dimensional matrix and besides $P_{OSF} > P$ and $Q_{OSF} > Q$ are satisfied. Here, the apertures preferably have a rectangular planar shape. Where the apertures have a rectangular planar shape, Fraunhofer diffraction occurs, and $M_0 \times N_0$ diffraction light beams are produced. In other words, an amplitude grating is formed from the apertures. Further, the oversampling filter may be formed from a diffraction light production member, more particularly, for example, from a grating filter. It is to be noted that the grating filter may be formed from an amplitude grating or a phase grating.

In the image display apparatus in the fifth embodiment of the present invention including the preferred configuration and forms described above may have such a configuration that the spatial filter is formed from a liquid crystal display apparatus having M×N pixels, more particularly a liquid crystal display apparatus of the transmission type or the reflection type or is formed from a two-dimensional MEMS wherein movable mirrors are arrayed in a two-dimensional matrix. Further, the spatial filter may be configured such that a desired aperture thereof is placed into an open state in synchronism with a production timing of a two-dimensional image by the two-dimensional image forming apparatus.

According to a sixth embodiment of the present invention, there is provided an image display method wherein an image display apparatus which includes a light source and an optical system is used;

the optical system including:

(A) a two-dimensional image forming apparatus including a one-dimensional spatial optical modulator configured to produce a one-dimensional image, a scanning optical system configured to two-dimensionally develop the one-dimensional image produced by the one-dimensional spatial optical modulator to produce a two-dimensional image, and a diffraction light production section disposed on a production plane of the two-dimensional image and configured to produce a plurality of diffraction light beams of different diffraction orders for each of the pixels;

(B) a first lens having a front side focal plane on which the diffraction light production section is disposed;

(C) a scattering diffraction limiting aperture section disposed on a rear side focal plane of the first lens and configured to pass only a diffraction light beam of a predetermined diffraction order therethrough;

(D) a second lens having a front side focal plane on which the scattering diffraction limiting aperture section is disposed;

(E) an oversampling filter disposed on a rear side focal plane of the second lens and having $P_{OSF} \times Q_{OSF}$ aperture regions arrayed in a two-dimensional matrix along an X direction and a Y direction, the oversampling filter being configured to produce, based on a conjugate image of the two-dimensional image produced by the second lens, for each of the aperture regions, totaling M×N diffraction light beams arranged such that M diffraction light beams from the mth to the m'th diffraction orders are arranged along the X direction and N diffraction light beams from the nth to the n'th diffraction orders are disposed along the Y direction, $P_{OSF} \times Q_{OSF}$ being arbitrary positive integers, m and m' being integers, M being a positive integer, n and n' being integers, N being a positive integer;

(F) a third lens having a front side focal plane on which the oversampling filter is disposed;

(G) a spatial filter disposed on a rear side focal plane of the third lens and having M×N spatial filters arranged such that M apertures are arranged along the X direction and N apertures are arranged along the Y direction and controllable between open and closed states;

(H) a fourth lens having a front side focal plane on which the spatial filter is disposed; and (I) a fifth lens having a front side focus positioned at a rear side focus of the fourth lens;

the image display method including:

a step, carried out by the optical modulation section, of producing a two-dimensional image based on two-dimensional image data whose aberrations caused by the optical system are corrected.

The image display apparatus in the sixth embodiment of the present invention may have such a form that the one-dimensional spatial optical modulator has P pixels along the X direction and diffracts the light from the light source to produce a one-dimensional image while $P_{OSF} > P$ is satisfied. The oversampling filter may be formed from a diffraction light production member, more particularly, for example, from a grating filter. It is to be noted that the grating filter may be formed from an amplitude grating or from a phase grating.

In the image display apparatus in the sixth embodiment of the present invention including the preferred configuration and form described above may have such a configuration that the spatial filter is formed from a liquid crystal display apparatus having M×N pixels, more particularly a liquid crystal display apparatus of the transmission type or the reflection type or is formed from a two-dimensional MEMS wherein movable mirrors are arrayed in a two-dimensional matrix.

Further, the spatial filter may be configured such that a desired aperture thereof is placed into an open state in synchronism with a production timing of a two-dimensional image.

In the image display apparatus in the fourth to sixth embodiments of the present invention including the preferred configurations and forms described above, the grating filter which composes the oversampling filter may have such a structure or phase grating type that $P_{OSF} \times Q_{OSF}$ recesses are formed in a two-dimensional matrix on a flat glass plate. Here, the recesses correspond to the aperture regions. Where the aperture regions or recesses have, for example, a rectangular planar shape, Fraunhofer diffraction occurs and M×N diffraction beams are generated. Further, while preferably $P_{OSF} > P$ and $Q_{OSF} > Q$ are satisfied, $1 < P_{OSF}/P \leq 4$ and $1 < Q_{OSF}/Q \leq 4$ are satisfied more particularly.

According to a seventh embodiment of the present invention, there is provided an image display method wherein an image display apparatus which includes a light source and an optical system is used;

the optical system including:

(A) a two-dimensional image forming apparatus having a plurality of pixels and configured to produce a two-dimensional image based on light from the light source;

(B) an optical apparatus including a plurality of optical elements arrayed in a two-dimensional matrix and having optical power for refracting incoming light to condense the light to a substantially one point and having a function as a phase grating for modulating the phase of light to pass therethrough, the optical apparatus emitting spatial frequencies of the incoming two-dimensional image along a plurality of diffraction angles corresponding to different diffraction orders;

(C) a Fourier transform image forming section configured to Fourier transform spatial frequencies of the two-dimensional image emitted from the optical apparatus to produce a number of Fourier transform images corresponding to the number of diffraction orders;

(D) a Fourier transform image selection section configured to select a Fourier transform image corresponding to a desired diffraction order from among the number of Fourier transform images corresponding to the number of diffraction orders produced by the Fourier transform image forming section; and (E) a conjugate image forming section configured to form a conjugate image of the Fourier transform image selected by the Fourier transform image selection section;

the image display method including:

a step, carried out by the two-dimensional image forming apparatus, of producing a two-dimensional image based on two-dimensional image data whose aberrations caused by the optical system are corrected.

Preferably, the image forming apparatus in the seventh embodiment of the present invention have such a configuration that the conjugate image forming section includes an inverse Fourier transform section configured to inverse Fourier transform the Fourier transform image selected by the Fourier transform image selection section to form a real image of the two-dimensional image produced by the two-dimensional image forming apparatus.

The image display apparatus in the seventh embodiment of the present invention including the preferred configuration described above may have such a configuration that the two-dimensional image forming apparatus is formed from a liquid crystal display apparatus, more particularly from a liquid crystal display apparatus of the transmission type or the reflection type.

The image display apparatus in the seventh embodiment of the present invention including the preferred configurations described above may be configured such that the two-dimensional image forming apparatus includes:

(A-1) a one-dimensional spatial optical modulator configured to produce a one-dimensional image; and (A-2) a scanning optical system configured to two-dimensionally develop the one-dimensional image produced by the one-dimensional spatial optical modulator to produce a two-dimensional image.

Further, the image display apparatus in the fourth embodiment of the present invention including the preferred configurations and form described above may have such a configuration that the Fourier transform image forming section includes a lens having a front side focal plane on which a focus of the optical elements which compose the optical apparatus is disposed while the Fourier transform image selection section is disposed on the rear side focal plane of the lens.

Further, the image display apparatus in the seventh embodiment of the present invention including the preferred configurations and form described above may have such a configuration that the Fourier transform image selection section has a number of apertures corresponding to the number of diffraction orders and controllable between open and closed states. In this instance, the image display apparatus may have such a form that the Fourier transform image selection section is formed from a liquid crystal display apparatus, more particularly from a liquid crystal display apparatus of the transmission type or the reflection type, or is formed from a two-dimensional MEMS wherein movable mirrors are arrayed in a two-dimensional matrix. Further, the Fourier transform image selection section may be configured such that it places a desired one of the aperture sections into an open state in synchronism with a production timing of a two-dimensional image by the two-dimensional image forming apparatus to select a Fourier transform image corresponding to a desired diffraction order.

Further, the image display apparatus in the seventh embodiment of the present invention including the preferred configurations and form described above may be configured such that the spatial frequency of the two-dimensional image corresponds to image information whose carrier frequency is the spatial frequency of the pixel structure of the two-dimensional image forming apparatus.

According to an eighth embodiment of the present invention, there is provided an image display method wherein an image display apparatus which includes a light source and an optical system is used;

the optical system including:

(A) a two-dimensional image forming apparatus having a plurality of pixels and configured to produce a two-dimensional image based on light from the light source;

(B) an optical apparatus including $P_{OD} \times Q_{OD}$ optical elements arrayed in a two-dimensional matrix along an X direction and a Y direction and having optical power of refracting light incoming thereto to condense the light to a substantially one point and having a function as a phase grating for modulating the phase of light to pass therethrough, the optical apparatus outputting spatial frequencies of the incoming two-dimensional image along a plurality of diffraction angles corresponding to different diffraction orders;

(C) a first lens having a front side focal plane on which focuses of the optical elements of the optical apparatus are positioned;

(D) a spatial filter disposed on a front side focal plane of the first lens and having totaling M×N apertures arranged such that M apertures are arranged along the X direction and N apertures are arranged along the Y direction and controllable between open and closed states;

(E) a second lens having a front side focal plane on which the spatial filter is positioned; and (F) a third lens having a front side focus positioned at a rear side focus of the second lens;

the image display method comprising a step, carried out by the two-dimensional image forming apparatus, of producing a two-dimensional image based on two-dimensional image data whose aberrations caused by the optical system are corrected.

The image display apparatus in the eighth embodiment of the present invention may have such a configuration that the two-dimensional image forming apparatus is formed from a liquid crystal display apparatus having P×Q pixels arrayed two-dimensionally, more particularly a liquid crystal display apparatus of the transmission type or the reflection type where $P_{OD} \geq P$ and $Q_{OD} \geq Q$. It is to be noted that $P_{OD}$ and $Q_{OD}$ may have relationships of $1 < P_{OD}/P \leq 4$ and $1 \leq Q_{OD} \leq 4$ to P and Q, respectively.

Or, the image display apparatus in the eighth embodiment of the present invention including the preferred configurations described above may be configured such that the two-dimensional image forming apparatus includes:

(A-1) a one-dimensional spatial optical modulator configured to produce a one-dimensional image; and (A-2) a scanning optical system configured to two-dimensionally develop the one-dimensional image produced by the one-dimensional spatial optical modulator to produce a two-dimensional image.

In this instance, the one-dimensional image forming apparatus may have such a configuration that it diffracts the light from the light source to produce a one-dimensional image. Further, the image display apparatus in the eighth embodiment of the present invention may have such a form that a member for causing anisotropic light diffusion to occur such as an anisotropic diffusion filter, an anisotropic diffusion sheet or an anisotropic diffusion film is disposed rearwardly of the third lens.

In the image display apparatus in the eighth embodiment of the present invention including the preferred configurations and form described above may have such a configuration that the spatial filter is formed from a liquid crystal display apparatus having M×N pixels, more particularly a liquid crystal display apparatus of the transmission type or the reflection type or is formed from a two-dimensional MEMS wherein movable mirrors are arrayed in a two-dimensional matrix. Further, the spatial filter may be configured such that a desired aperture thereof is placed into an open state in synchronism with a production timing of a two-dimensional image by the two-dimensional image forming apparatus.

In the image display apparatus in the seventh and eighth embodiments of the present invention including the various preferred configurations and form described above, each of the pixels of the two-dimensional image forming apparatus has an aperture of a rectangular planar shape. Further, in the image display apparatus in the seventh and eighth embodiments of the present invention, the optical apparatus may have such a particular structure as described below. In particular, preferably the planar shape of each optical elements is same as or similar to the planar shape of a corresponding one of the pixels. Further, each of the optical elements is preferably formed from a convex lens having a positive optical power, a concave lens having a negative optical power, a Fresnel lens having a positive optical power or a Fresnel lens having a negative optical power. In other words, each optical element is formed from a refraction type grating-like element. Then, the optical apparatus is formed from a kind of microlens array, which is formed from the materials such as a glass material or plastics. The optical apparatus can be manufactured based on the existing method for producing a microlens array. It is to be noted that the optical apparatus is disposed rearwardly adjacent the two-dimensional image forming apparatus. Where the optical apparatus is disposed rearwardly adjacent the two-dimensional image forming apparatus in this manner, the influence of a diffraction phenomenon arising from the two-dimensional image forming apparatus can be ignored. Alternatively, such a configuration that, for example, two convex lenses are disposed between the two-dimensional image forming apparatus and the optical apparatus such that the two-dimensional image forming apparatus is disposed on the front side focal plane of a first one of the convex lenses and the front side focal plane of a second one of the convex lens is positioned at the rear side focal plane of the first convex lens while the optical apparatus is disposed on the rear side focal plane of the second convex lens. Generally where diffraction gratings are classified into two categories, they can be classified into an amplitude grating which periodically modulates the amplitude or intensity of an incoming optical wave to obtain a light amount distribution coincident with the light transmission factor distribution of the grating and a phase grating which modulates the phase of a transmission light beam therethrough, that is, modulates the phase of a transmission light beam while keeping the amplitude or intensity of the light. However, in the image display apparatus in the seventh and eighth embodiments of the present invention, the optical apparatus functions as the latter case, phase grating.

According to a ninth embodiment of the present invention, there is provided an image display method wherein an image display apparatus which includes a light source and an optical system is used;

the optical system including:

(A) an optical modulation section having a plurality of pixels and configured to modulate light from the light source by means of the pixels to produce a two-dimensional image and emit spatial frequencies of the produced two-dimensional image along a plurality of diffraction angles corresponding to different diffraction orders produced from each of the pixels;

(B) an image limiting and production section configured to Fourier transform spatial frequencies of the two-dimensional image emitted from the optical modulation section to produce a number of Fourier transform images corresponding to the number of diffraction orders produced from each of the pixels, select only a predetermined Fourier transform image from among the produced Fourier transform images and inverse Fourier transform the selected Fourier transform image to form a conjugate image of the two-dimensional image produced by the optical modulation section;

(C) a light advancing direction changing section configured to change the advancing direction of a beam of light emitted from the image limiting production section; and (D) an image forming section configured to form an image of the beam of light emitted from the light advancing direction changing section;

the image display method including:

a step, carried out by the optical modulation section, of producing a two-dimensional image based on two-dimensional image data whose aberrations caused by the optical system are corrected.

The image display apparatus in the ninth embodiment of the present invention may have such a form that the optical modulation section includes a two-dimensional spatial optical modulator having a plurality of pixels arrayed two-dimensionally, and each of the pixels has an aperture. In this instance, preferably the two-dimensional spatial optical modulator is configured such that it is composed of a liquid crystal display apparatus, more particularly, a liquid crystal display apparatus of the transmission type or the reflection type or such that a movable mirror is provided in each of the apertures of the two-dimensional spatial optical modulator or the two-dimensional spatial optical modulator is formed from a two-dimensional MEMS wherein movable mirrors are arrayed in a two-dimensional matrix. Here, preferably the apertures have a rectangular planar shape. Where the apertures have a rectangular planar shape, Fraunhofer diffraction occurs, and $M_0 \times N_0$ diffraction light beams are produced. In particular, such apertures form an amplitude grating which periodically modulates the amplitude or intensity of an incoming light wave so that a light amount distribution which coincides with the light transmission factor distribution of the grating is obtained.

The image display apparatus in the ninth embodiment of the present invention including the preferred configurations and form described above may be configured such that the optical modulation section includes:

(A-1) a one-dimensional spatial optical modulator configured to produce a one-dimensional image;

(A-2) a scanning optical system configured to two-dimensionally develop the one-dimensional image produced by the one-dimensional spatial optical modulator to produce a two-dimensional image; and (A-3) a grating filter disposed on a production plane of the two-dimensional image and configured to emit spatial frequencies of the produced two-dimensional image along a plurality of diffraction angles corresponding to different diffraction orders. It is to be noted that the grating filter may be formed from an amplitude grating or else from a phase grating which modulates the phase of the transmission light amount, that is, modulates the phase while keeping the amplitude or intensity of the light as it is.

The image display apparatus in the ninth embodiment of the present invention including the preferred configurations and form described above may have such a form that the image limiting and production section includes:

(B-1) a first lens configured to Fourier transform the spatial frequencies of the two-dimensional image emitted from the optical modulation section to produce a number of Fourier transform images corresponding to the number of diffraction orders produced from each of the pixels;

(B-2) a scattering diffraction limiting aperture section disposed on the light advancing direction changing section side with respect to the first lens and configured to select only a predetermined one of the Fourier transform images; and (B-3) a second lens disposed on the light advancing direction changing section side with respect to the scattering diffraction limiting aperture section and configured to inverse Fourier transform the selected Fourier transform image to form a conjugate image of the two-dimensional image produced by the optical modulation section;

the scattering diffraction limiting aperture section being disposed on the rear side focal plane of the first lens and the front side focal plane of the second lens.

Further, the image display apparatus in the ninth embodiment of the present invention including the preferred configurations and forms described above may have such a configuration that the light advancing direction changing section is formed from a reflection type optical section, particularly, for example, from a mirror, which can change or alter the angle of a light beam to be emitted therefrom with respect an incoming light beam. Alternatively, the image display apparatus may have such a configuration that the light advancing direction changing section is formed from a transmission type optical section, particularly, for example, from a prism, which can change or alter the angle of a light beam to be emitted therefrom with respect to an incoming light beam.

Furthermore, the image display apparatus in the ninth embodiment of the present invention including the preferred configurations and forms described above may have such a configuration that the spatial frequencies of the two-dimensional image correspond to image information whose carrier frequency is the spatial frequency of the pixel structure. Further, the image display apparatus may have such a configuration that the spatial frequency of the conjugate image of the two-dimensional image is obtained by removing the spatial frequency of the pixel structure from the spatial frequency of the two-dimensional image. In other words, spatial frequencies obtained as the first order diffraction whose carrier frequency is the 0th order diffraction of the plane wave component and lower than one half the spatial frequency of the pixel structure or aperture structure of the optical modulation section, are selected by the image limiting and production section or pass through the scattering diffraction limiting aperture section. All of the spatial frequencies displayed on the optical modulation section or the two-dimensional image forming apparatus hereinafter described are transmitted.

According to a tenth embodiment of the present invention, there is provided an image display method wherein an image display apparatus which includes a light source and an optical system is used;

the optical system including:

(A) a two-dimensional image forming apparatus having a plurality of apertures arrayed in a two-dimensional matrix along an X direction and a Y direction and configured to control, for each of the apertures, passage, reflection or diffraction of light from the light source to produce a two-dimensional image and produce, for each of the apertures, a plurality of diffraction light beams of different diffraction orders based on the produced two-dimensional image;

(B) a first lens having a front side focal plane on which the two-dimensional image forming apparatus is disposed;

(C) a scattering diffraction limiting aperture section disposed on a rear side focal plane of the first lens and configured to pass only a diffraction light beam of a predetermined diffraction order therethrough;

(D) a second lens having a front side focal plane on which the scattering diffraction limiting aperture section is disposed;

(E) a light advancing direction changing section disposed rearwardly of the second lens and configured to change the advancing direction of a beam of light emitted from the second lens; and (F) a third lens configured to form an image of the beam of light emitted from the light advancing direction changing section;

the image display method including:

a step, carried out by the optical modulation section, of producing a two-dimensional image based on two-dimensional image data whose aberrations caused by the optical system are corrected.

The image display apparatus in the tenth embodiment of the present invention may have such a form that the two-dimensional image forming apparatus is composed of a liquid crystal display apparatus having P×Q pixels arrayed two-dimensionally, more particularly a liquid crystal display apparatus of the transmission type or the reflection type, and each of the pixels has an aperture. Alternatively, the image display apparatus may have such a form that the two-dimensional image forming apparatus has P×Q apertures in each of which a movable mirror is provided, that is, the two-dimensional image forming apparatus is formed from a two-dimensional MEMS wherein a movable mirror is disposed in each of apertures arrayed in a two-dimensional matrix. Preferably, the apertures have a rectangular planar shape. Where the apertures have a rectangular planar shape, Fraunhofer diffraction occurs, and M×N diffraction light beams are produced. In other words, an amplitude grating is formed from the apertures.

According to an eleventh embodiment of the present invention, there is provided an image display method wherein an image display apparatus which includes a light source and an optical system is used;

the optical system including:

(A) a two-dimensional image forming apparatus including a one-dimensional spatial optical modulator configured to produce a one-dimensional image, a scanning optical system configured to two-dimensionally develop the one-dimensional image produced by the one-dimensional spatial optical modulator to produce a two-dimensional image, and a diffraction light production section disposed on a production plane of the two-dimensional image and configured to produce a plurality of diffraction light beams of different diffraction orders for each of the pixels;

(B) a first lens having a front side focal plane on which the diffraction light production section is disposed;

(C) a scattering diffraction limiting aperture section disposed on a rear side focal plane of the first lens and configured to pass only a diffraction light beam of a predetermined diffraction order therethrough;

(D) a second lens having a front side focal plane on which the scattering diffraction limiting aperture section is disposed;

(E) a light advancing direction changing section disposed rearwardly of the second lens and configured to change the advancing direction of a beam of light emitted from the second lens; and (F) a third lens configured to form an image of the beam of light emitted from the light advancing direction changing section;

the image display method including:

a step, carried out by the optical modulation section, of producing a two-dimensional image based on two-dimensional image data whose aberrations caused by the optical system are corrected.

The image display apparatus in the eleventh embodiment of the present invention may have such a form that the one-dimensional spatial optical modulator has P pixels along the X direction and diffracts the light from the light source to produce a one-dimensional image.

The image display apparatus in the tenth or eleventh embodiment of the present invention including the preferred configuration and form described above may have such a configuration that the light advancing direction changing section is formed from a reflection type optical section, particularly, for example, from a mirror, which can change or alter the angle of a light beam to be emitted therefrom with respect an incoming light beam. Alternatively, the image display apparatus may have such a configuration that the light advancing direction changing section is formed from a transmission type optical section, particularly, for example, from a prism, which can change or alter the angle of a light beam to be emitted therefrom with respect to an incoming light beam.

In the following description of the image display apparatus in the ninth to eleventh embodiments of the present invention, a portion of the optical axis up to the light advancing direction changing section is set to a z axis; the Cartesian coordinates within a plane perpendicular to the z axis are set to an x axis and a y axis; a direction parallel to the x axis is set to an X direction; and a direction parallel to the y axis is set to a Y direction. The X direction is set, for example, to a horizontal direction of the image display apparatus, and the Y direction is set, for example, to a vertical direction of the image display apparatus. Further, a portion of the x axis which extends farther than the light advancing direction changing section is set to a z' axis, and the Cartesian coordinates in a plane perpendicular to the z' axis are set to an x' axis and a y' axis, and a direction parallel to the x' axis is set to an X' direction and a direction parallel to the y' axis is set to the Y' direction. Further, the X' direction is set, for example, to the horizontal direction of the image display apparatus, and the Y' direction is set, for example, to the vertical direction of the image display apparatus.

In the image display apparatus in the ninth to eleventh embodiments of the present invention, it is necessary to synchronize changing of the advancing direction of light beams by the light advancing direction changing section with production of a two-dimensional image by the optical modulation section or two-dimensional image forming apparatus. Here, it is necessary to interrupt, within a period of time within which, after a certain image is formed on an image forming plane hereinafter described by the light advancing direction changing section, the position of the light advancing direction changing section is changed or altered until a next image is formed on the image forming plane by the light advancing direction changing section, the operation of the light source so that a two-dimensional image may not be produced by the optical modulation section or two-dimensional image forming apparatus.

In order to set the positions at which images are to be formed on the image forming plane to $S_0 \times T_0$ positions disposed in a two-dimensional matrix, where a mirror is adopted as the light advancing direction changing section, for example, the mirror may be configured such that it is formed from a polygon mirror and, while the polygon mirror is rotated around an axis of rotation thereof, the inclination angle of the axis of rotation thereof is controlled. On the other hand, where a prism is adopted as the light advancing direction changing section, for example, such a configuration that the direction of the prism is turned or changed to a desired direction around the z axis may be adopted. As the prism, not only a conventional prism but also a prism formed, for example, from a liquid crystal lens may be used. It is to be noted that, since the mirror wherein movable mirrors are arrayed in a two-dimensional matrix has a pixel structure, it cannot be used as the light advancing direction changing section because the pixel structure serves as a carrier to produce a new diffraction image.

Preferably, the image display apparatus in the ninth to eleventh embodiments of the present invention is configured such that, when images are formed from the light beams emitted from the light advancing direction changing section by the image forming section or third lens, the positions at which such images are formed, that is, the positions on the X'Y' plane, are set to $S_0$ to $T_0$ positions disposed in a two-dimensional matrix. Here, although the values of $S_0$ and $T_0$ are not limited particularly, the value of $S_0$ may be $4 \leq S_0 \leq 11$, and preferably, for example, $7 \leq S_0 \leq 9$, and the value of $T_0$ may be $4 \leq T_0 \leq 11$, and preferably, for example, $7 \leq T_0 \leq 9$. The values of $S_0$ and $T_0$ may be equal to each other or different from each other. It is to be noted that the X'Y' plane on which images are formed from the light beams emitted from the light advancing direction changing section by the image forming means or third lens is hereinafter referred to as image forming plane.

According to a twelfth embodiment of the present invention, there is provided an image display method wherein an image display apparatus which includes a light source configured to emit light from a plurality of light emitting positioned disposed discretely and an optical system is used;

the optical system including:

(A) an optical modulation section having a plurality of pixels and configured to modulate a plurality of light beams successively emitted from different ones of the light emitting positions of the light source and having different incoming directions by means of the pixels to produce a two-dimensional image and emit spatial frequencies of the produced two-dimensional image along a plurality of diffraction angles corresponding to different diffraction orders individually produced from the pixels; and (B) a Fourier transform image forming section configured to Fourier transform the spatial frequencies of the two-dimensional image emitted from the optical modulation section to produce a number of Fourier transform images corresponding to the number of diffraction orders and form the Fourier transform images;

the image display method including:

a step, carried out by the optical modulation section, of producing a two-dimensional image based on two-dimensional image data whose aberrations caused by the optical system are corrected.

Preferably, the image display apparatus in the twelfth embodiment of the present invention further includes:

(C) a conjugate image forming section configured to form a conjugate image of the Fourier transform image formed by the Fourier transform forming section.

According to a thirteenth embodiment of the present invention, there is provided an image display method wherein an image display apparatus which includes a light source configured to emit light from a plurality of light emitting positioned disposed discretely and an optical system is used;

the optical system including:

(A) a two-dimensional image forming apparatus having a plurality of apertures arrayed in a two-dimensional matrix along an X direction and a Y direction and configured to control, for each of the apertures, passage or reflection of one of a plurality of light beams successively emitted from different ones of the light emitting positions of the light source and having different incoming directions to form a two-dimensional image and produce, for each of the apertures, a plurality of diffraction light beams of different diffraction orders based on the two-dimensional image;

(B) a first lens having a front side focal plane on which the two-dimensional image forming apparatus is disposed;

(C) a second lens having a front side focal plane positioned on a rear side focal plane of the first lens; and (D) a third lens having a front side focal plane positioned on a rear side focal plane of the second lens;

the image display method including:

a step, carried out by the two-dimensional image forming apparatus, of producing a two-dimensional image based on two-dimensional image data whose aberrations caused by the optical system are corrected.

In the image display apparatus in the twelfth or thirteenth embodiment of the present invention, where the number of the light emitting positions disposed discretely is represented by $LEP_{Total}$, the number of Fourier transform images produced from beams of light, hereinafter referred to sometimes as illuminating light beams, individually emitted from the light emitting positions and having different incoming directions to the optical modulation section or two-dimensional image forming apparatus is given as the number of diffraction orders×$LEP_{Total}$. Further, the Fourier transform images obtained based on the illuminating light beams are formed as images each in the form of a spot at discrete positions corresponding to the light emitting positions by the Fourier transform image forming section or first lens. It is to be noted that, if a Fourier transform image selection section or spatial filter hereinafter described is disposed, then the number of Fourier transform images produced from the illuminating light beams finally becomes, for example, $LEP_{Total}$. It is to be noted that, where the light emitting positions disposed discretely are disposed discretely in a two-dimensional matrix, the number of such light emitting positions is represented by $U_0 \times V_0$. Here, $U_0 \times V_0 = LEP_{Total}$.

In the image display apparatus in the twelfth or thirteenth embodiment of the present invention, the light source may be configured such that it has a plurality of light emitting elements arrayed in a two-dimensional matrix. It is to be noted that, in this instance, where the number of light emitting elements arrayed in a two-dimensional matrix is represented by $U_0' \times V_0'$, depending upon the specifications of the light source, $U_0' = U_0$ and $V_0' = V_0$ may be satisfied, or for example, $U_0'/3 = U_0$ and $V_0'/3 = V_0$ may be satisfied. In this instance, a lens such as, for example, a collimator lens is disposed between the light source and the optical modulation section or two-dimensional image forming apparatus, and preferably the light source is positioned on or in the proximity of the front side focal plane of the lens because the light or illuminating light beam emitted from the lens is parallel light or substantially parallel light. Alternatively, the image display apparatus in the twelfth or thirteenth embodiment of the present invention may have such a configuration that the light source includes a light advancing direction changing section configured to change the incoming direction of light emitted from the light emitting elements to the optical modulation section or two-dimensional image forming section. In this instance, the light advancing direction changing section may be formed from a refractive optical section which can change or alter the angle of a light beam to be emitted with respect to an incoming light beam or a reflective optical section which can change or alter the position and the angle of a light beam to be emitted with respect to an incoming light beam. The refractive optical section may be, for example, a lens, more particularly, for example, a collimator lens or a microlens array. The reflective optical section may be, for example, a mirror, more particularly a polygon mirror, a combination of a polygon mirror and a mirror, a convex mirror having a curved face, a concave mirror having a curved face, a convex mirror formed from a polygon or a concave mirror formed from a polygon.

Where the image display apparatus in the twelfth or thirteenth embodiment of the present invention is configured such that the light source includes a plurality of light emitting elements arrayed in a two-dimensional matrix as described above, preferably the light emitting elements are disposed such that the emitting directions of the light beams to be emitted from the individual light emitting elements are different from each other and the incoming directions to the optical modulation section or two-dimensional image forming apparatus are different from each other. Further, where a refractive optical section is used as the light advancing direction changing section as described above, the light source preferably includes a plurality of light emitting elements disposed in a two-dimensional matrix. In this instance, since the emitting directions of the light beams successively emitted from the light emitting elements and incoming to the refractive optical section when the light beams are emitted from the refractive optical section can be changed by the refractive optical section, the incoming directions of the light beams incoming to the optical modulation section or two-dimensional image forming apparatus can be changed. It is to be noted that the emitting directions of the light beams emitted from the light emitting elements may be same as each other or different from each other. On the other hand, where the reflective optical section is adopted as the light advancing direction changing section as described above, the number of the light emitting elements may be one or, for example, $U_0$. Then, the number of light emitting positions upon emission from the reflective optical section may be set to $U_0 \times V_0 = LEP_{Total}$ by controlling the position or the like of the reflection optical section. More particularly, for example, a polygon mirror is rotated around an axis of rotation thereof while the inclination angle of the axis of rotation thereof is controlled, or the position of a light beam upon incoming to the mirror from a light emitting element may be controlled. Or else, the position of an illuminating light beam to be emitted from the mirror such as, for example, passage or interception of the illuminating light beam, may be controlled. Then, by such control, the incoming directions of the light beams to the optical modulation section or two-dimensional image forming apparatus can be changed.

The image display apparatus in the twelfth or thirteenth embodiment of the present invention including the preferred configurations described above may have such a configuration that the Fourier transform image forming section includes a lens or first lens having a front side focal plane on which the optical modulation section is disposed.

In the image display apparatus in the twelfth embodiment of the present invention, while the images produced and formed by the Fourier transform image forming section correspond to a plurality of diffraction orders, an image obtained based on a comparatively low diffraction order is comparatively bright while an image obtained based on a comparatively high diffraction order is comparatively dark. Therefore, an image, for example, a stereoscopic image, of sufficiently high picture quality can be obtained. However, in order to further improve the picture quality, preferably the image display apparatus has such a configuration that it further includes (D) a Fourier transform image selection section configured to select a Fourier transform image corresponding to a desired diffraction order from among the produced Fourier transform images whose number corresponds to the number of diffraction orders, and preferably the Fourier transform image selection section is disposed at a position at which the Fourier transform images are formed.

Alternatively, also in the image display apparatus in the thirteenth embodiment of the present invention, although images produced by the first lens and formed correspond to a plurality of diffraction orders, since an image obtained based on a comparatively low diffraction order is comparatively bright while an image obtained based on a comparatively high diffraction order is comparatively dark, an image, for example, a stereoscopic image, of sufficiently high picture quality can be obtained. However, in order to further improve the picture quality, preferably the image display apparatus has such a configuration that it further includes (E) a spatial filter having a number of aperture sections corresponding to the number of light emitting positions and controllable between open and closed states and positioned on the rear side focal plane of the first lens.

Also in this instance, preferably a desired one of the aperture sections is placed into an open state in synchronism with a production timing of a two-dimensional image by the two-dimensional image forming apparatus. Alternatively, preferably the image display apparatus has such a configuration that it further includes (E) a scattering diffraction limiting member having a number of aperture sections corresponding to the number of light emitting positions and positioned on the rear side focal plane of the first lens.

Where the spatial filter or scattering diffraction limiting member is disposed, it is possible to allow only a desired diffraction light beam from among the produced diffraction light beams of different diffraction orders to pass therethrough.

In those cases, the Fourier transform image selection section or spatial filter has a number of aperture sections corresponding to the number of light emitting positions, that is, $LEP_{Total}$ or corresponding to $U_0 \times V_0 = LEP_{Total}$, and, for example, has $U_0 \times V_0$ aperture sections. Or, the Fourier transform image selection section having an aperture section controllable between open and closed states may be a liquid crystal display apparatus, more particularly a liquid crystal display apparatus of the transmission type or the reflection type, or may be a two-dimensional MEMs wherein movable mirrors are arrayed in a two-dimensional matrix. The Fourier transform image selection section having an aperture section controllable between open and closed states may be configured such that it places a desired one of the aperture sections into an open state in synchronism with a production timing of a two-dimensional image by the optical modulation section or two-dimensional image forming apparatus to select a Fourier transform image corresponding to a desired diffraction order. The position of the aperture sections may be set to a position at which a desired Fourier transform image or diffraction light beam from among the Fourier transform images or diffraction light beams obtained by the Fourier transform image selection section or first lens is formed. Such positions of the aperture sections correspond to the light emitting positions disposed discretely.

Preferably, the image display apparatus in the twelfth embodiment of the present invention including the preferred configurations described above further includes an inverse Fourier transform section configured to inverse Fourier transform the Fourier transform images formed by the Fourier transform image forming section to form real images of the two-dimensional image produced by the optical modulation section.

Further, the image display apparatus in the twelfth embodiment of the present invention including the preferred configurations described above may have such a form that the optical modulation section is formed from a two-dimensional spatial optical modulator having a plurality of, P×Q, pixels arrayed two-dimensionally, and an aperture is provided in each of the pixels. In this instance, preferably the two-dimensional spatial optical modulator is formed from a liquid crystal display apparatus, or more particularly from a liquid crystal display apparatus of the transmission type or the reflection type, or is configured such that a movable mirror is provided in each of apertures of the two-dimensional spatial optical modulator or else is formed from a two-dimensional MEMS wherein movables mirror are arrayed in a two-dimensional matrix. Meanwhile, the image display apparatus in the thirteenth embodiment of the present invention including the preferred configurations described above may have such a form that the two-dimensional image forming apparatus is formed from a liquid crystal display apparatus having a plurality of, P×Q, pixels arrayed two-dimensionally, and an aperture is provided in each of the pixels, more particularly from a liquid crystal display apparatus of the transmission type or the reflection type. Or the image display apparatus may have such a form that the two-dimensional image forming apparatus has a plurality of, P×Q, apertures in each of which a movable mirror is provided, that is, the two-dimensional image forming apparatus is formed from a two-dimensional MEMS wherein a movable mirror is disposed in each of apertures arrayed in a two-dimensional matrix. Preferably, the apertures have a rectangular planar shape. Where the apertures have a rectangular planar shape, Fraunhofer diffraction occurs, and M×N diffraction light beams are produced. In other words, an amplitude grating which periodically modulates the amplitude or intensity of incoming light wave to provide a light amount distribution coincident with the light transmission factor distribution of the grating is formed from the apertures.

Furthermore, the image display apparatus in the twelfth embodiment of the present invention including the preferred configurations and forms described above may have such a configuration that the spatial frequencies of the two-dimensional image correspond to image information whose carrier frequency is the spatial frequency of the pixel structure. Further, the image display apparatus may have such a configuration that the spatial frequency of the conjugate image of the two-dimensional image is obtained by removing the spatial frequency of the pixel structure from the spatial frequency of the two-dimensional image. In other words, spatial frequencies obtained as the first order diffraction whose carrier frequency is the 0th order diffraction of the plane wave component and lower than one half the spatial frequency of the pixel structure or aperture structure of the optical modulation section, are selected by the Fourier transform image selection section or spatial filter or pass through the Fourier transform image selection section or spatial filter. All of the spatial frequencies displayed on the optical modulation section or the two-dimensional image forming apparatus hereinafter described are transmitted.

In the image display apparatus in the twelfth or thirteenth embodiment of the present invention including the preferred configurations and forms described above, although the values of $U_0$ and $V_0$ are not limited particularly, the value of $U_0$ may be $4 \leq U_0 \leq 12$, preferably $9 \leq U_0 \leq 11$, and the value of $V_0$ may be $4 \leq V_0 \leq 12$, preferably $9 \leq V_0 \leq 11$. The values of $U_0$ and $V_0$ may be equal to each other or may be different from each other. It is to be noted that a plane on which Fourier transform images are formed by the Fourier transform image forming section, that is, an XY plane, is hereinafter referred to sometimes as image forming plane.

While, in the image display apparatus in the twelfth or thirteenth embodiment of the present invention, a Fourier transform image corresponding to a desired diffraction order is selected by the Fourier transform image selection section or spatial filter or passes through the Fourier transform image selection section or spatial filter, the 0th order diffraction may be used as the desired diffraction order although the desired diffraction order is not limited to this.

In the image display apparatus in the twelfth or thirteenth embodiment of the present invention including the various preferred configurations and forms described above, the light source of the image display apparatus may be a laser, a light emitting diode (LED) or a white light source. An illuminating optical system for shaping the illuminating light may be disposed between the light source and the optical modulation section or two-dimensional image forming apparatus. Depending upon the specifications of the image display apparatus, monochromatic light or white light is emitted from the light source. Or the light source may include a red light emitting element, a green light emitting element and a blue light emitting element such that light beams, that is, a red light beam, a green light beam and a blue light beam, are successively emitted by successively driving the light emitting elements. Also by this, it is possible to obtain illuminating light beams emitted from a plurality of light emitting positions disposed discretely and having different incoming directions to the optical modulation section or two-dimensional image forming apparatus.

The image display apparatus in the twelfth or thirteenth embodiment of the present invention including the preferred configuration and form described above may further include an optical section configured to project a conjugate image formed by the conjugate image forming section or include an optical section disposed rearwardly of the third lens and configured to project an image formed by the third lens.

In the image display apparatus in the second and third and fifth and sixth embodiments of the present invention, while m and m' are integers and M is a positive integer, m, m' and M have relationships of m≦m' and M=m'−m+1. On the other hand, n and n' are integers and N is a positive integer, and n, n' and N have relationships of n≦n' and N=n'−n+1. Further, although M and N which correspond to the total number of diffraction orders are not limited particularly, M may be $$0 \leq M(=m'-m+1) \leq 21$$

preferably, for example, $$5 \leq M(=m'-m+1) \leq 21$$

while N may be $$0 \leq N(=n'-n+1) \leq 21$$

preferably, for example, $$5 \leq N(=n'-n+1) \leq 21$$

The values of M and N may be equal to each other or different from each other, or the values of |m'| and |m| may be equal to each other or different from each other while the values of |n'| and |n| may be equal to each other or different from each other.

Further, in the image display apparatus in the seventh and eighth embodiments of the present invention, while spatial frequencies of a two-dimensional image incoming to the optical apparatus are emitted along diffraction angles corresponding to a plurality of, totaling M×N, diffraction orders, where totaling M×N sets of diffraction light beams are produced such that M sets of diffraction light beams from the mth to m'th orders are produced along the X direction and N sets of diffraction light beams from the nth to n'th orders are produced along the Y direction where m and m' are integers and M is a positive integer while n and n' are integers and N is a positive inter, m, m' and M as well as n, n' and N have such relationships as described hereinabove.

In the image display apparatus in the first to eleventh embodiments of the present invention including the preferred configurations and forms described above, the light source may be formed from a laser, a light emitting diode (LED) or a white light source. An illuminating optical system for shaping the light emitted from the light source may be disposed between the light source and the optical modulation section or two-dimensional image forming apparatus.

In a liquid crystal display apparatus which forms a two-dimensional spatial optical modulator or a two-dimensional image forming apparatus, for example, a region within which a transparent first electrode and a transparent second electrode described below overlap with each other and which includes a liquid crystal cell corresponds to one pixel. Then, the liquid crystal cell is caused to operate as a kind of optical shutter or light valve, that is, the light transmission factor of each pixel is controlled to control the light transmission factor of the light or illuminating light emitted from the light source, and as a whole, a two-dimensional image can be obtained. Since a rectangular aperture is provided in each overlapping region of the transparent first and second electrodes, when the light or illuminating light emitted from the light source passes through the aperture, Fraunhofer diffraction occurs for each pixel. As a result, for example, M×N diffraction light beams are produced.

A liquid crystal display apparatus includes, for example, a front panel including a transparent first electrode, a rear panel including a transparent second electrode, and liquid crystal material disposed between the front and rear panels. The front panel is formed more particularly from a first substrate formed, for example, from a glass substrate or a silicon substrate, a transparent first electrode provided on an inner face of the first substrate, and a polarization film provided on an outer face of the first substrate. The transparent first electrode is also called common electrode and is made of, for example, ITO. Further, an orientation film is formed on the transparent first electrode. Meanwhile, the rear panel is formed more particularly from a second substrate formed, for example, from a glass substrate or a silicon substrate, a switching element formed on an inner face of the second substrate, a transparent second electrode controlled between conducting and non-conducting states by the switching element, and a polarization film provided on an outer face of the second substrate. The transparent second electrode is also called pixel electrode and made of, for example, ITO. An orientation film is formed over the overall area of the rear panel including the transparent second electrode. The various members and liquid crystal material used to configure the liquid crystal display apparatus of the transmission type can be formed using well-known members and materials. It is to be noted that the switching element may be a three-terminal element such as a MOS FET or a thin film transistor (TFT) or a two-terminal element such as a MIM element, a barrister element or a diode formed on a single crystal silicon semiconductor substrate. Or, the liquid crystal display apparatus may have a matrix electrode configuration wherein a plurality of scanning electrodes extend in a first direction and a plurality of data electrodes extend in a second direction. In a liquid crystal display apparatus of the transmission type, light or illuminating light from the light source enters from the second substrate and goes out from the first substrate. On the other hand, in a liquid crystal display apparatus of the reflection type, light or illuminating light from the light source enters from the first substrate and is reflected by the second electrode or pixel electrode formed on the inner face of the second substrate, whereafter it goes out from the first substrate. The apertures can be formed, for example, by forming an insulating material layer opaque to the light or illuminating light from the light source between the transparent second electrode and the orientation film and forming apertures in the insulating material layer. It is to be noted that the liquid crystal display apparatus of the reflection type may be formed from a liquid crystal display apparatus of the LCoS (Liquid Crystal on Silicon) type.

Where a liquid crystal display apparatus formed, for example, using ferroelectric liquid crystal is used as the optical modulation section or two-dimensional image forming apparatus, it is necessary to apply a driving voltage which is as near to ±0 volt in DC as possible. In particular, if a positive potential or a negative potential is applied for certain period of time, then where the applied voltage×time is represented as V×t, it is necessary to apply a voltage, which cancel the same magnitude of V×t, for a certain period of time. Where ferroelectric liquid crystal is used, if such operation as just described is not carried out, then current is accumulated in the ferroelectric liquid crystal, which gives rise to occurrence of a kind of seizure. Accordingly, where it is necessary to repeat such a sequence that a two-dimensional image is produced by means of the optical modulation section or two-dimensional image forming apparatus and then no two-dimensional image is produced or where such a sequence as just described can be adopted, it is preferable to use a liquid crystal display apparatus which is formed using ferroelectric liquid crystal which operates at a high speed.

Further, the one-dimensional spatial optical modulator or one-dimensional image forming apparatus may be formed more particularly from an apparatus wherein diffraction grating-optical modulation elements or grating light valves (GLV) are arrayed one-dimensionally. The apparatus described is hereinafter referred to sometimes as diffraction grating-optical modulation apparatus.

The image display apparatus in the first to eighth and twelfth and thirteenth embodiments of the present invention may include an optical section configured to project a conjugate image formed by the conjugate image forming section or may include an optical section disposed rearwardly of the third lens or the fifth lens and configured to project an image formed by the third lens or the fifth lens. Further, the image display apparatus in the ninth and tenth embodiments of the present invention may include an optical section configured to project an image formed by the image forming section or may include an optical section disposed rearwardly of the third lens and configured to project an image formed by the third lens.

In the image display apparatus in the first to thirteenth embodiments of the present invention, where the number P×Q of pixels of a two-dimensional image is represented by (P, Q), the value (P, Q) may be any of several resolutions for image display such as the VGA (640, 480), S-VGA (800, 600), XGA (1,024, 768), APRC (1,152, 900), S-XGA (1,280, 1,024), U-XGA (1,600, 1,200), HD-TV (1,920, 1,080), and Q-XGA (2,048, 1,536) and values (1,920, 1,035), (720, 480) and (1,280, 960). However, the value (P, Q) is not limited to any of the values specified above.

In the image display apparatus in the first to thirteenth embodiments of the present invention, control of operation of the optical modulation section or the two-dimensional image forming apparatus can be carried out by a well-known computer such as a personal computer or a work station, and a recording medium may be provided in the computer. Here, two-dimensional image data whose aberrations caused by an optical system used to form the image display apparatus are corrected may be recorded into the recording medium. The recording medium may be formed from any of a hard disk and various solid-state memories.

An image such as a three-dimensional image or stereoscopic image reproduced ideally based on two-dimensional image data Data(A) prior to aberration correction and free from aberrations is represented by "A"; and an image such as a three-dimensional image or stereoscopic image reproduced actually based on the two-dimensional image Data(A) is represented by "a" (the image includes various aberrations). In this instance, the original two-dimensional image data Data (A) are corrected, for example, based on a simulation or by trial and error so that the image upon actual reproduction becomes "A". Then, two-dimensional data obtained finally by correcting the original two-dimensional image data Data(A) so that the image upon actual reproduction becomes "A" are represented by Data (A'). Then, if, for example, the values of (m, n), (P, Q), (M, N), ($S_0$, $T_0$), ($U_0$, $V_0$) and so forth are determined, then a fixed relationship exists between the original two-dimensional image data Data(A) prior to aberration correction and the two-dimensional image data Data(A') whose aberrations are corrected finally. In other words, a kind of operator wherein the values of (m, n), (P, Q), (M, N), ($S_0$, $T_0$), ($U_0$, $V_0$) and so forth are used as parameters can be obtained. Accordingly, two-dimensional image data obtained by correcting aberrations of original two-dimensional image data prior to aberration correction based on the relationship mentioned above, for example, the operator, that is, two-dimensional image data whose aberrations caused by the optical system which composes the image display apparatus are corrected, may be recorded into the recording medium, whereafter an image is reproduced based on the two-dimensional image data after the aberration correction. Or, two-dimensional image data Data(A) sent from the outside to the image display apparatus may be subjected to aberration correction on the real time basis based on the operator, and an image may be reproduced by the image display apparatus based on the two-dimensional image data Data(A') whose aberrations are corrected. It is to be noted that, if the image display apparatus is driven, for example, field-sequentially, then correction of chromatic aberration as well as correction of the Seidel's five aberrations can be carried out.

In the image display methods according to the first to thirteenth embodiments of the present invention, the optical modulation section or two-dimensional image forming apparatus produces a two-dimensional image based on two-dimensional image data whose aberrations caused by the optical system which composes the image display apparatus are corrected. Accordingly, correction of aberrations which cannot be solved only by optical section can be carried out, and even where the optical system used is simple, an image such as a three-dimensional image or stereoscopic image which has no or minimized aberrations can be displayed. Besides, since, for example, the Fourier transform image selection section or spatial filter functions as a kind of iris, the depth of focus of the optical system can be increased and consequently, a clear-cut image can be obtained.

In the image display methods according to the first to third embodiments of the present invention, a two-dimensional image is produced by the optical modulation section or two-dimensional image forming apparatus or the like. The two-dimensional image is emitted along a plurality of diffraction angles corresponding to different diffraction orders produced by the pixels or diffraction light production section. Then, the spatial frequencies are Fourier transformed by the Fourier transform image forming section or first lens to produce a number of Fourier transform images corresponding to the number of diffraction orders. Then, a Fourier transform image corresponding to a desired diffraction order is selected from among the number of Fourier transform images corresponding to the number of diffraction orders is selected in synchronism with a formation timing of a two-dimensional image by the Fourier transform image selection section or spatial filter. Then, a conjugate image of the Fourier transform image selected by the Fourier transform image selection section or spatial filter is formed by the conjugate image forming section or second and third lenses and is observed finally by an observer. Such a sequence of operations as described above is successively repeated in a time series. Consequently, a group of light beams corresponding to the number of diffraction orders can be produced and scattered in a spatially high density and in a state distributed in a plurality of directions. As a result, a stereoscopic image which provides a sense of quality proximate to that of a physical solid in the real world can be obtained from such a group of light beams as described above based on a light beam reproduction method which efficiently makes use of a diffraction phenomenon of light and is not available in the past, without increasing the overall size of the image display apparatus.

Meanwhile, in the image display methods according to the fourth to sixth embodiments of the present invention, two-dimensional image is produced by the optical modulation section or two-dimensional image forming apparatus, and spatial frequencies of the produced two-dimensional image are emitted along a plurality of diffraction angles corresponding to different diffraction orders produced from the pixels or the like. The spatial frequencies are Fourier transformed by the image limiting and production section or first lens to produce a number of Fourier transform images corresponding to the number of diffraction orders. Then, only a predetermined Fourier transform image is selected from among the produced Fourier transform images by the image limiting and production section or scattering diffraction limiting aperture section, and a conjugate image of the two-dimensional image is produced by the image limiting and production section or second lens. Then, the spatial frequencies of the conjugate image of the two-dimensional image are emitted along a plurality of diffraction angles corresponding to different diffraction orders produced from each aperture region from the oversampling filter. The spatial frequencies are Fourier transformed by the Fourier transform image forming section or third lens to produce a number of Fourier transform images corresponding to the number of diffraction orders produced from each aperture region. Then, a Fourier transform image corresponding to a desired diffraction order from among a number of Fourier transform images corresponding to the number of diffraction orders produced from each aperture region is selected in synchronism with a formation timing of a two-dimensional image by the Fourier transform image selection section or spatial filter. Then, a conjugate image of the Fourier transform image selected by the Fourier transform image selection section or spatial filter is formed by the conjugate image forming section or second and third lenses, and finally comes to the observer. Then, such a sequence of operations as described above is successively repeated in a time series. Consequently, a set of light beams corresponding to the diffraction orders generated from each of the aperture regions of the oversampling filter can be produced and scattered in a spatially high density and besides in a state distributed in a plurality of directions. As a result, an image or stereoscopic image which provides a sense of quality proximate to that of a physical solid in the real world can be obtained from such a group of light beams as described above based on a light beam reproduction method which efficiently makes use of a diffraction phenomenon of light and is not available in the past, without increasing the overall size of the image display apparatus. Besides, with the image display methods in the fourth to sixth embodiments of the present invention, since a read out image, that is, a conjugate image of a two-dimensional image, is newly sampled spatially independently of the optical modulation section or two-dimensional image forming apparatus, the size and the viewing angle of an image obtained finally can be controlled independently of each other. Accordingly, it is possible to increase the scale or size of an image or stereoscopic image to be displayed while the region of the image or stereoscopic image to be observed is increased.

In the image display methods according to the seventh and eighth embodiments of the present invention, a two-dimensional image is produced by the two-dimensional image forming apparatus. Spatial frequencies of the produced two-dimensional image are emitted along a plurality of diffraction angles corresponding to different diffraction orders by the optical apparatus which is an aggregate of optical elements each formed from a grating-like element of the refraction type. The spatial frequencies are Fourier transformed by the Fourier transform image forming section or first lens to produce a number of Fourier transform images corresponding to the number of diffraction orders. Then, a Fourier transform image corresponding to a desired diffraction order is selected from among the number of Fourier transform images corresponding to the number of diffraction orders in synchronism with a forming timing of a two-dimensional image by the Fourier transform image selection section or spatial filter. Then, a conjugate image of the Fourier transform image selected by the Fourier transform image selection section or spatial filter is formed by the conjugate image forming section or second and third lenses, and finally comes to the observer. Then, such a sequence of operations as described above is successively repeated in a time series. Consequently, a set of light beams corresponding to the diffraction orders can be produced and scattered in a spatially high density and besides in a state distributed in a plurality of directions. As a result, an image or stereoscopic image which provides a sense of quality proximate to that of a physical solid in the real world can be obtained from such a group of light beams as described above based on a light beam reproduction method which efficiently makes use of a diffraction phenomenon of light and is not available in the past, without increasing the overall size of the image display apparatus.

Where spatial frequencies of a two-dimensional image produced by a two-dimensional image forming apparatus are emitted along a plurality of diffraction angles corresponding different diffraction orders by an amplitude grating which has a rectangular aperture and causes Fraunhofer diffraction by the rectangular aperture, it sometimes becomes difficult to produce an amplitude grating having a high numerical aperture. Further, since the light utilization efficiency depends upon the numerical aperture of the aperture, there is the possibility that it may become difficult to achieve a high light utilization efficiency. Meanwhile, when spatial frequencies of a two-dimensional image are Fourier transformed to produce Fourier transform images, the uniformity among the number of Fourier transform images corresponding to the number of diffraction orders, that is, the uniformity in light intensity among the diffraction orders, becomes better as the aperture size decreases. In the image display methods according to the seventh and eighth embodiments of the present invention, by adopting not an amplitude grating but the optical apparatus which is an aggregate of optical elements each formed from a grating-type element of the refraction type, a high numerical aperture can be provided to the optical elements themselves, and consequently, improvement of the light utilization efficiency can be implemented. Further, light beams incoming to the optical elements are condensed substantially at one point, and this is equivalent to formation of a small aperture. Consequently, a high degree of uniformity can be achieved among the Fourier transform images corresponding to the individual diffraction orders. Besides, by achieving optimization of the optical apparatus, much energy can be distributed to high order diffraction. It is to be noted that, for example, if a phase grating wherein a large number of recesses are formed on a glass substrate is adopted, then it is possible to raise the light utilization efficiency. However, in the case of pattern production by phase modulation, although an arbitrary pattern can be produced within a particular plane, depending upon a system wherein an image is produced from light beams within an arbitrary plane, it is very difficult to produce a particular pattern within an arbitrary plane. In the image display methods according to the seventh and eighth embodiments of the present invention, since an optical apparatus which is an aggregate of optical elements each formed from a grating-type element of the refraction type is adopted in place of the phase grating, such problems of a phase grating as described above can be eliminated.

In the image display methods according to the ninth to eleventh embodiments of the present invention, a two-dimensional image is produced by the optical modulation section or two-dimensional image forming apparatus, and spatial frequencies of the produced two-dimensional image are emitted along a plurality of diffraction angles corresponding to different diffraction orders generated from each pixel or the like. The spatial frequencies are Fourier transformed by the image limiting and production section or first lens to produce a number of Fourier transform images corresponding to the number of diffraction orders. Then, only a predetermined Fourier transform image is selected from among the produced Fourier transform images by the image limiting and production section or scattering diffraction limiting aperture section. Then, a conjugate image of the selected two-dimensional image is produced by the image limiting and production section or second lens. Then, the spatial frequency of the conjugate image of the two-dimensional image is emitted at a desired angle with respect to the z' axis which is the optical axis from the light advancing direction changing section. Further, the conjugate image of the Fourier transform image emitted from the light advancing direction changing section is formed on the image forming plane by the image forming section or third lens, and finally comes to the observer. Then, such a sequence of operations as described above is successively repeated in a time series. Consequently, a set of light beams emitted from the light advancing direction changing section can be produced and scattered in a spatially high density and besides in a state distributed in a plurality of directions. As a result, an image or stereoscopic image which provides a sense of quality proximate to that of a physical solid in the real world can be obtained from such a group of light beams as described above based on a light beam reproduction method which efficiently controls directional components of light beams for forming an image or stereoscopic image and is not available in the past, without increasing the overall size of the image display apparatus. Besides, with the image display methods according to the ninth to eleventh embodiments of the present invention, since the loss of the light amount by the light advancing direction changing section is so small that it can be ignored, the contrast of the image finally coming to the observer does not drop. Consequently, the observer can observe a clear image or stereoscopic image.

In the image display methods according to the twelfth and thirteenth embodiments of the present invention, a two-dimensional image is formed by the optical modulation section or two-dimensional image forming apparatus from light beams or illuminating light beams successively emitted from the different light emitting positions of the light source and having different incoming directions. Then, spatial frequencies of the produced two-dimensional image are emitted along a plurality of diffraction angles corresponding to different diffraction orders generated from each of the pixels or the like. The emitted spatial frequencies are Fourier transformed by the Fourier transform image forming section or first lens to produce a number of Fourier transform images or diffraction light beams corresponding to the number of diffraction orders, and images are formed from the Fourier transform images or diffraction light beams and finally come to the observer. The images coming to the observer include components of the incoming direction of the light beams or illuminating light beams to the optical modulation section or two-dimensional image forming apparatus. Then, such a sequence of operations as described above is successively repeated in a time series. Consequently, a set of, for example, $LEP_{Total}$, light beams emitted from the Fourier transform image forming section or first lens can be produced and scattered in a spatially high density and besides in a state distributed in a plurality of directions. As a result, an image or stereoscopic image which provides a sense of quality proximate to that of a physical solid in the real world can be obtained from such a group of light beams as described above based on a light beam reproduction method which efficiently controls directional components of light beams for forming an image or stereoscopic image and is not available in the past, without increasing the overall size of the image display apparatus. Besides, with the image display methods according to the twelfth and thirteenth embodiments of the present invention, if an image or stereoscopic image is formed, for example, based on the 0th order diffraction light beam, then a bright and clear image or stereoscopic image of high quality can be obtained.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 4 is a schematic front elevational view of an example of a Fourier transform image selection section or spatial filter in the image display apparatus of the example 1;

FIG. 5 is a schematic view illustrating a plurality of diffraction right beams of different diffraction orders produced by an optical modulation section or two-dimensional image forming apparatus in the image display apparatus of the example 1;

FIG. 10 is a schematic view of an image display apparatus according to an example 2;

FIGS. 30A and 30B are schematic views individually illustrating a plurality of diffraction right beams of different diffraction orders produced by an optical modulation section or two-dimensional image forming apparatus in the image display apparatus of the example 9;

FIG. 31 is a schematic front elevational view of a light source of the image display apparatus of the example 9;

FIG. 32 is a schematic front elevational view of an example of a spatial filter of the image display apparatus of the example 9;

DETAILED DESCRIPTION OF THE PREFERRED EMBODIMENTS

In the following, the present invention is described in connection with examples thereof shown in the accompanying drawings.

Example 1

Figure 1:
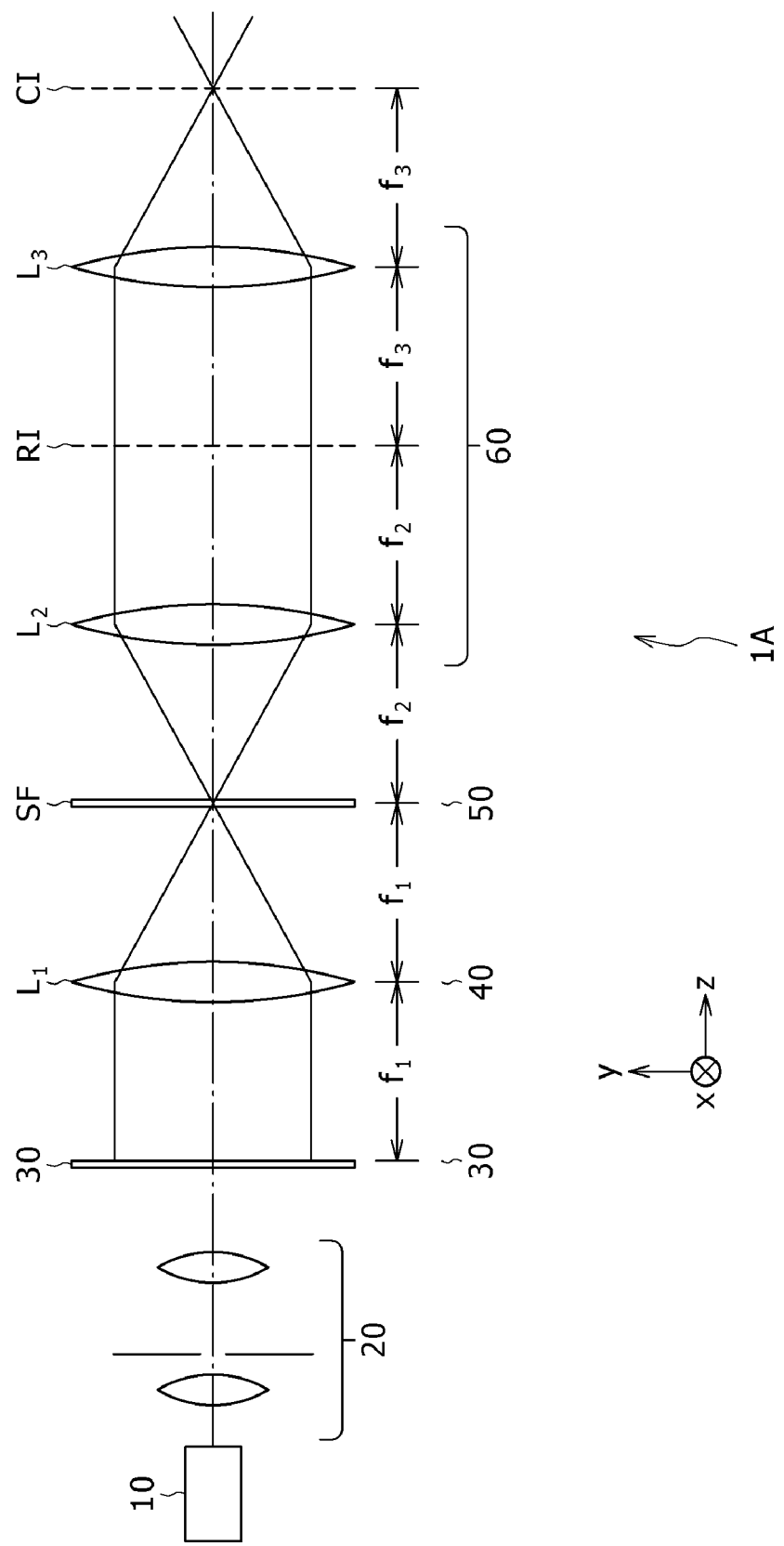
FIG. 1 is a schematic view showing an image display apparatus according to an example 1 of the present embodiment on a yz plane.
Figure 2:
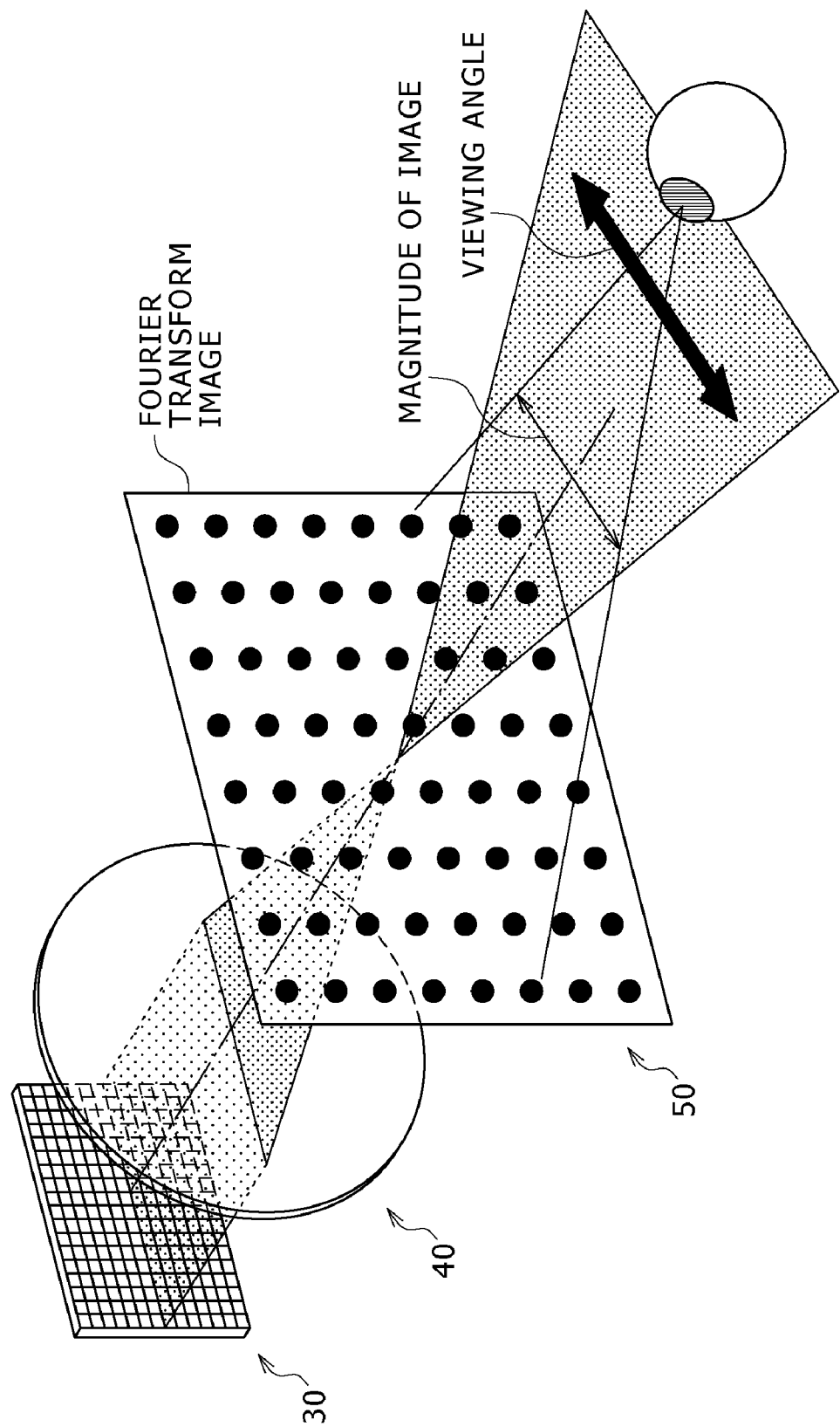
FIG. 2 is a schematic view showing the image display apparatus of the example 1 as viewed in an oblique direction.
Figure 3:
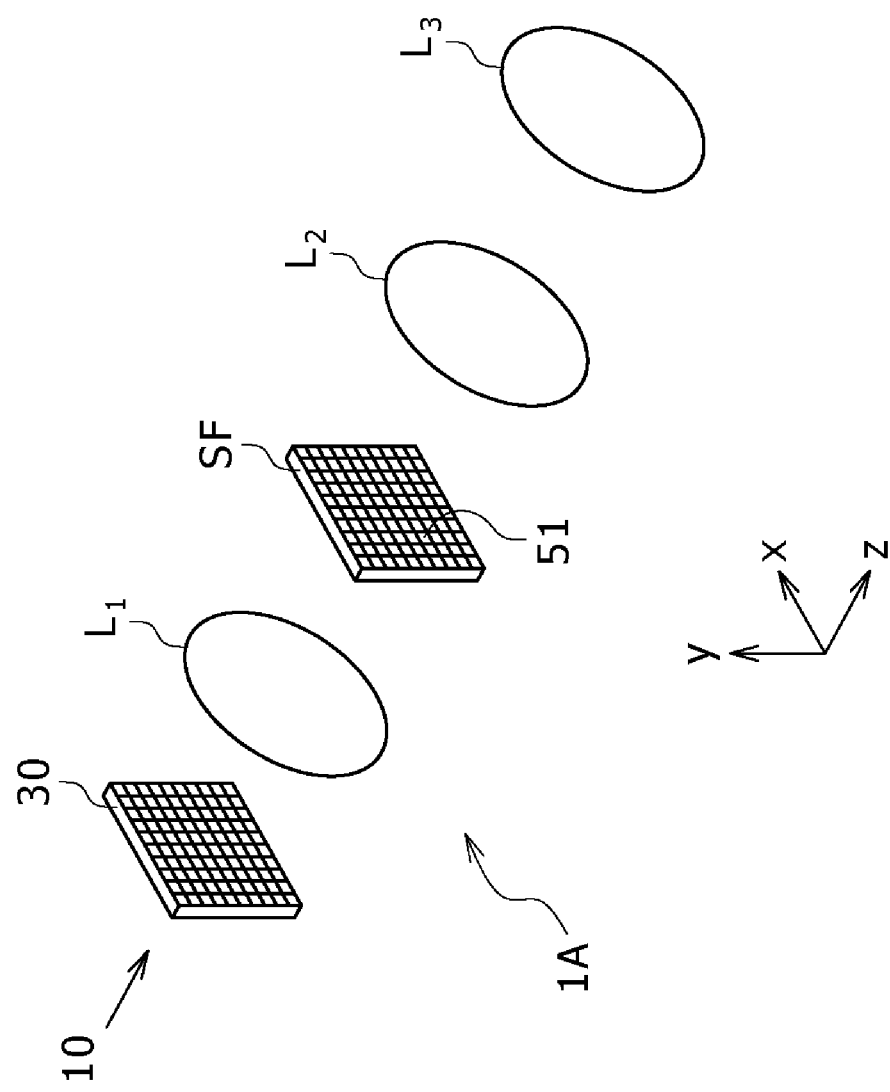
FIG. 3 is a schematic perspective view illustrating arrangement of components of the image display apparatus of the example 1.

The example 1 of the present invention is directed to image display methods, more specifically, display methods of a three-dimensional image, according to first and SECOND of the present invention and further to image display apparatus, more specifically, three-dimensional image display apparatus according to first and second of the present invention. FIGS. 1, 2 and 3 schematically show the image display apparatus according to the example 1 which displays a monochromatic display image. It is to be noted that, in FIG. 1, the optical axis is set to a z axis, and Cartesian coordinates in a plane perpendicular to the z axis are taken on an x axis and a y axis. Further, the direction parallel to the x axis is represented as X direction and the direction parallel to the y axis is represented as Y direction. The X direction is taken, for example, as a horizontal direction of the three-dimensional image display apparatus, and the Y direction is taken, for example, as a vertical direction of the three-dimensional image display apparatus. Here, FIG. 1 is a schematic view showing the image display apparatus of the example 1 on the yz plane. Also where the image display apparatus of the example 1 is viewed on the xz plane, it exhibits a schematic view substantially similar to that of FIG. 1. Meanwhile, FIG. 2 schematically shows the image display apparatus of the example 1 as viewed in an oblique direction, and FIG. 3 schematically illustrates an arrangement state of components of the image display apparatus of the example 1. It is to be noted that the z axis which corresponds to the optical axis passes the center of the components of the image display apparatus of the examples hereinafter described and besides intersects perpendicularly with the components of the image display apparatus.

In display of a stereoscopic image according to a light beam reproduction method in the past, in order to emit a plurality of light beams of light from a virtual origin on the surface of a virtual physical solid existing at an arbitrary position, it is necessary to prepare in advance an apparatus which can provide beams of light which are emitted at various angles. For example, in the apparatus shown in FIG. 49, a large number of, for example, M×N, projector units 301 must be disposed parallelly in a horizontal direction and a vertical direction.

Figure 48:
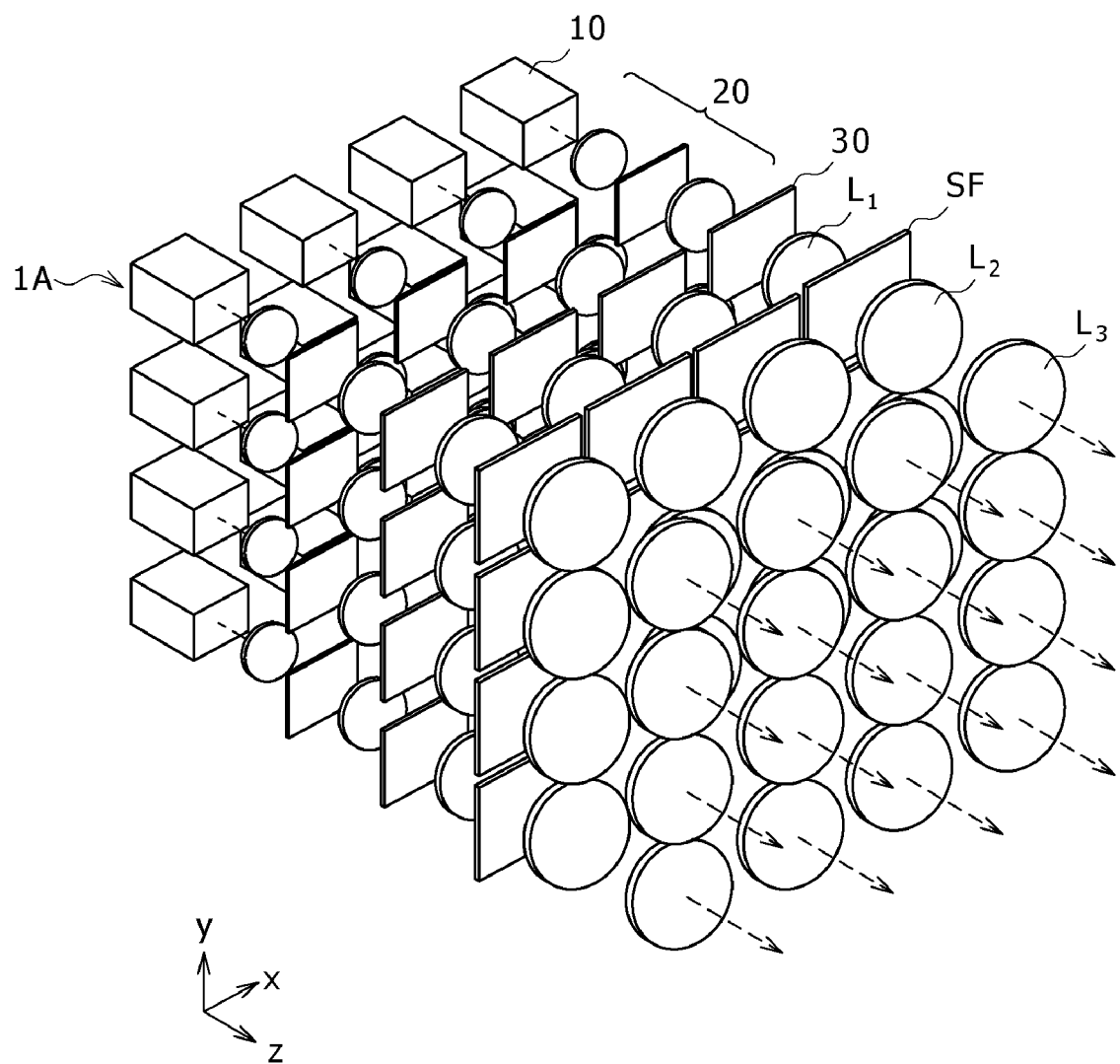
FIG. 48 is a schematic perspective view showing an image display apparatus of the multi-unit type wherein a plurality of image display apparatus of the example 1 are combined.

Meanwhile, in the image display apparatus 1A of the example 1, the image display apparatus itself which includes such components as seen in FIGS. 1, 2 and 3 can generate and form a greater amount of light beams having a higher spatial density when compared with the existing apparatus. The image display apparatus 1A of the example 1 by itself has functions equivalent to those of the apparatus shown in FIG. 49 which includes a large number of, M×N, projector units 301 disposed parallelly in a horizontal direction and a vertical direction. It is to be noted that, for example, where it is intended to employ a multi-unit system, only it is necessary to dispose a number of three-dimensional image display apparatus 1A of the example 1 equal to the number of divisional three-dimensional images as seen from FIG. 48. In FIG. 48, the image display apparatus shown includes 4×4=16 image display apparatus 1A of the example 1.

Where the image display apparatus 1A of the first embodiment of the present invention is described in connection with components of the image display apparatus according to the example 1 of the present invention, the image display apparatus 1A includes a light source 10 and an optical system. The optical system includes:

(A) an optical modulation section 30 having a plurality of pixels 31 and configured to modulate light from the light source by means of the pixels 31 to produce a two-dimensional image and emit spatial frequencies of the produced two-dimensional image along a plurality of, totaling M×N, diffraction angles corresponding to different diffraction orders produced from each of the pixels 31;

(B) a Fourier transform image forming section 40 configured to Fourier transform the spatial frequencies of the two-dimensional image emitted from the optical modulation section 30 to produce a number of Fourier transform images corresponding to the number of, totaling M×N, diffraction orders;

(C) a Fourier transform image selection section 50 configured to select a Fourier transform image corresponding to a desired diffraction order from among the Fourier transform images produced corresponding to the diffraction orders; and (D) a conjugate image forming section 60 configured to form a conjugate image of the Fourier transform image selected by the Fourier transform image selection section 50.

Further, the conjugate image forming section 60 includes an inverse Fourier transform section, particularly a second lens $L_2$ hereinafter described, configured to inverse Fourier transform the Fourier transform image selected by the Fourier transform image selection section 50 to form a real image of the two-dimensional image formed by the optical modulation section 30. Further, the Fourier transform image forming section 40 is formed from a lens, and the optical modulation section 30 is disposed on the front side focal plane of the lens while the Fourier transform image selection section 50 is disposed on the rear side focal plane of the lens. The Fourier transform image selection section 50 has a number of apertures 51 corresponding to a plurality of diffraction orders and controllable between open and closed states.

Here, the spatial frequency of the two-dimensional image corresponds to image information whose carrier frequency is the spatial frequency of the pixel structure.

Where the image display apparatus 1A of the example 1 of the present invention is described in connection with components of the image display apparatus according to the second embodiment of the present invention, the image display apparatus 1A includes a light source 10 and an optical system. The optical system includes:

(A) a two-dimensional image forming apparatus 30 having P×Q apertures arrayed in a two-dimensional matrix along an X direction and a Y direction and configured to control, for each of the apertures, passage, reflection or diffraction of the light from the light source to form a two-dimensional image and produce, based on the two-dimensional image, totaling M×N diffraction light beams arranged such that M diffraction light beams from the mth to the m'th diffraction orders are arranged along the X direction and N diffraction light beams from the nth to the n'th diffraction orders are disposed along the Y direction, P and Q being arbitrary positive integers, m and m' being integers, M being a positive integer, n and n' being integers, N being a positive integer;

(B) a first lens $L_1$, more particularly, in the example 1, a convex lens, having a front side focal plane on which the two-dimensional image forming apparatus 30 is disposed;

(C) a spatial filter SF disposed on a rear side focal plane of the first lens $L_1$ and having totaling M×N apertures 51 controllable between open and closed states and arranged such that M apertures are arranged along the X direction and N apertures are arranged along the Y direction;

(D) a second lens $L_2$, more particularly, in the example 1, a convex lens, having a front side focal plane on which the spatial filter SF is disposed; and (E) a third lens $L_3$, more particularly, in the example 1, a convex lens, having a front side focus positioned at a rear side focus of the second lens $L_2$-Here, in the example 1 or in the example 2 or 11 hereinafter described, P=1,024 and Q=768, and m=−5, m'=5, M=m'−m+1=11, n=−5, n'=5, and N=n'−n+1=11. It is to be noted that the values of P, Q, m, m', M, n, n' and N are not limited to the specific values given above. If the components of the image display apparatus of the first embodiment of the present invention and the components of the image display apparatus according to the second or third embodiment of the present invention are compared with each other, then the optical modulation section 30 corresponds to the two-dimensional image forming apparatus 30; the Fourier transform image forming section 40 corresponds to the first lens $L_1$; the Fourier transform image selection section 50 corresponds to the spatial filter SF; the inverse Fourier transform section corresponds to the second lens $L_2$; and the conjugate image forming section 60 corresponds to the second lens $L_2$ and the third lens $L_3$. Therefore, the following description is given based on the terms of the two-dimensional image forming apparatus 30, first lens $L_1$, spatial filter SF, second lens $L_2$ and third lens $L_3$ for the convenience of description.

An illuminating optical system 20 for shaping a beam of light emitted from the light source 10 is disposed between the light source 10 and the two-dimensional image forming apparatus 30. The two-dimensional image forming apparatus 30 is illuminated with the light emitted from the light source 10 and passing through the illuminating optical system 20, that is, with illuminating light. As the illuminating light, for example, light obtained by shaping the light from the light source 10 having a high spatial coherence into parallel light by means of the illuminating optical system 20 is used. It is to be noted that characteristics of the illuminating light and particular examples of a configuration for obtaining such illuminating light are hereinafter described.

The two-dimensional image forming apparatus 30 is formed from a two-dimensional spatial optical modulator having a plurality of pixels 31 arrayed two-dimensionally, and each of the pixels 31 has an aperture. In particular, the two-dimensional spatial optical modulator or two-dimensional spatial optical modulator 30 is particularly formed from a liquid crystal display apparatus of the transmission type having P×Q pixels 31 disposed two-dimensionally, that is, disposed in a two-dimensional matrix along the X direction and the Y direction, and each of the pixels 31 has an aperture.

One pixel 31 is formed from a region in which a transparent first electrode and a transparent second electrode overlap with each other and which includes a liquid crystal cell. Then, the liquid crystal cell operates as a kind of optical shutter or light valve, that is, the light transmission factor or numerical aperture of each pixel 31 is controlled, to control the light transmission factor of the light emitted from the light source 10, and as a whole, a two-dimensional image is obtained. A rectangular aperture is provided in the overlapping region of the transparent first and second electrodes, and when the light emitted from the light source 10 passes through the aperture, Fraunhofer diffraction occurs. As a result, M×N=121 diffraction light beams are generated from each of the pixels 31. In other words, since the number of pixels 31 is P×Q, it is considered that totaling P×Q×M×N diffraction light beams are generated. In the two-dimensional image forming apparatus 30, spatial frequencies of a two-dimensional image are emitted along diffraction angles corresponding to a plurality of diffraction orders, totaling M×N orders, generated from each pixel 31. It is to be noted that the diffraction angles differ also depending upon the spatial frequencies of the two-dimensional image.

The two-dimensional image forming apparatus 30 is disposed on the front side focal plane, that is, the focal plane on the light source side, of the first lens $L_1$ having the focal distance $f_1$, and the spatial filter SF is disposed on the rear side focal plane, that is, the focal plane on the observer side, of the first lens $L_1$. Then, M×N=121 Fourier transform images corresponding to a plural number of diffraction orders are produced by the first lens $L_1$, and the Fourier transform images are formed on the spatial filter SF. It is to be noted that, in FIG. 2, 64 Fourier transform images are shown in the form of a dot for the convenience of illustration.

The spatial filter SF particularly is of the type which can be temporally controlled between open and closed states for spatially and temporally filtering Fourier transform images. More particularly, the spatial filter SF has a number of apertures 51 equal to the number of diffraction orders, particularly M×N=121 apertures 51, which can be controlled between open and closed states. In the spatial filter SF, one Fourier transform image corresponding to a desired diffraction order is selected by placing a desired one aperture 51 into an open state in synchronism with a production timing of a two-dimensional image by the two-dimensional image forming apparatus 30. More particularly, the spatial filter SF can be formed from a liquid crystal display apparatus of the transmission type or the reflection type which uses ferroelectric liquid crystal having, for example, M×N pixels or from a two-dimensional type MEMS including an apparatus wherein movable mirrors are arrayed in a two-dimensional matrix. It is to be noted that a schematic front elevational view of the spatial filter SF formed from a liquid crystal display apparatus is shown in FIG. 4. In FIG. 4, numerals ($m_0$, $n_0$) denote the number of an aperture 51 and further denote a diffraction order number. In particular, to the (3, 2)th aperture 51, a Fourier transform image having the diffraction order number of $m_0$=3 and $n_0$=2 is introduced.

As described above, the conjugate image forming section 60 is particularly formed from the second lens $L_2$ and the third lens $L_3$. The second lens $L_2$ having the focal distance $f_2$ inverse Fourier transforms a Fourier transform image filtered by the spatial filter SF to form a real image RI of the two-dimensional image formed by the two-dimensional image forming apparatus 30. Further, the third lens $L_3$ having the focal distance $f_3$ forms a conjugate image CI of the Fourier transform image filtered by the spatial filter SF.

The second lens $L_2$ is disposed such that the spatial filter SF is positioned on the front side focal plane thereof and a real image RI of the two-dimensional image produced by the two-dimensional image forming apparatus 30 is disposed on the rear side focal plane thereof. The magnification of the real image RI obtained here with respect to the two-dimensional image forming apparatus 30 can be varied by arbitrarily selecting the focal distance $f_2$ of the second lens $L_2$.

Figure 49:
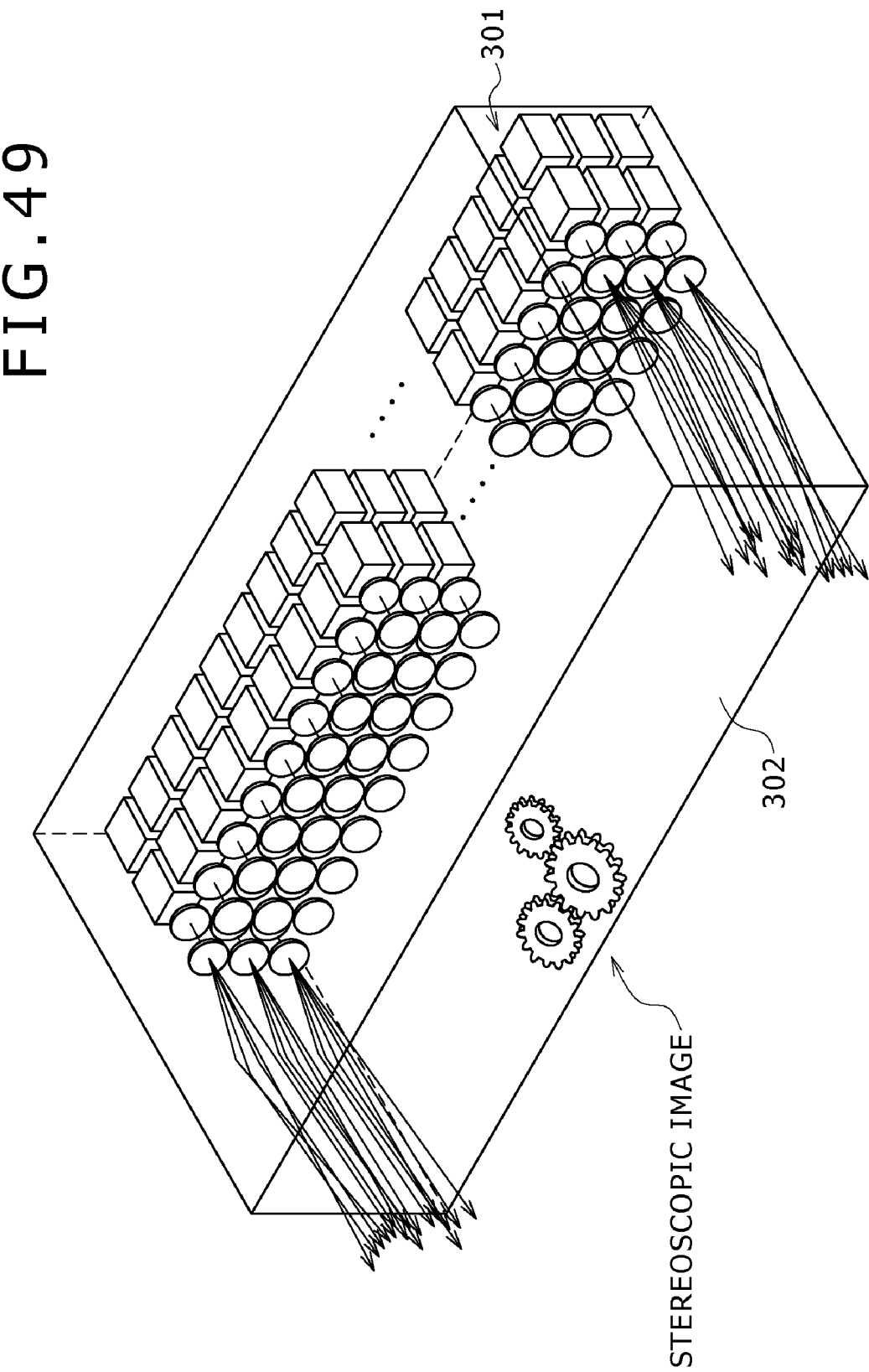
FIG. 49 is a schematic perspective view showing an example of an existing of a three-dimensional display apparatus of the past.

On the other hand, the third lens $L_3$ is disposed such that the front side focal plane thereof coincides with the rear side focal plane of the second lens $L_2$ and a conjugate image CI of the Fourier transform image is formed on the rear side focal plane thereof. Here, since the rear side focal plane of the third lens $L_3$ is a conjugate plane of the spatial filter SF, this is equivalent to that the two-dimensional image produced by the two-dimensional image forming apparatus 30 is outputted from a portion on the spatial filter SF corresponding to one of the apertures 51. Then, the amount of light beams to be produced finally and outputted corresponds to the number obtained by multiplying the number of light beams equal to the number of pixels (P×Q) by the number of diffraction orders, particularly M×N, which pass through the optical system. Further, although the conjugate image CI of the Fourier transform image is formed on the rear side focal plane of the third lens $L_3$, it can be regarded that the light beams are disposed regularly two-dimensionally on the rear side focal plane of the third lens $L_3$. In other words, this is generally equivalent to a state that a plurality of, particularly M×N, projector units 301 shown in FIG. 49 are disposed on the rear side focal plane of the third lens $L_3$.

As schematically shown in FIGS. 2 and 5, eleven diffraction light beams of the −5th to +5th orders along the X direction and eleven diffraction light beams of the −5th to +5th orders along the Y direction, totaling M×N=121 diffraction light beams, are produced by one pixel 31 of the two-dimensional image forming apparatus 30. It is to be noted that, while FIG. 5 schematically shows only the 0th order diffraction light beam ($n_0$=0), ±1st order diffraction light beams ($n_0$=±1) and ±2nd order diffraction light beams ($n_0$=±2) as representative diffraction light beams, actually higher order diffraction light beams are produced, and a stereoscopic image is finally formed based on the diffraction light beams. Here, each of the diffraction light beams or fluxes includes all image information of a two-dimensional image produced by the two-dimensional image forming apparatus 30, that is, information of all pixels. A plurality of light beams produced by diffraction from the same pixel on the two-dimensional image forming apparatus 30, that is, 11×11=121 light beams, all have the same image information at the same point of time. In other words, in the two-dimensional image forming apparatus 30 formed from a liquid crystal display apparatus of the transmission type having P×Q pixels 31, light from the light source 10 is modulated by each pixel 31 to produce a two-dimensional image, and spatial frequencies of the produced two-dimensional image are emitted along a plurality of diffraction angles corresponding to different diffraction orders, totaling M×N diffraction orders, produced from each pixel 31. In particular, M×N=121 copies of the two-dimensional image are emitted along a plurality of diffraction angles corresponding to different diffraction orders, totaling M×N diffraction orders, from the two-dimensional image forming apparatus 30.

Then, the spatial frequencies of the two-dimensional image produced by the two-dimensional image forming apparatus 30 which include all pixel information of the two-dimensional image are Fourier transformed by the first lens $L_1$ to produce a number of Fourier transform images corresponding to the number of diffraction orders, that is, totaling M×N diffraction orders. The Fourier transform images produced in this manner are formed on the spatial filter SF. Since the first lens $L_1$ produces Fourier transform images of spatial frequencies of the two-dimensional image emitted along the diffraction angles corresponding to the diffraction orders, the Fourier transform images can be obtained in a spatially high intensity.

Here, where the wavelength of light or illuminating light emitted from the light source 10 is represented by λ (mm), the spatial frequency of the two-dimensional image produced by the two-dimensional image forming apparatus 30 by ν (lp/mm) and the focal distance of the first lens $L_1$ by $f_1$ (mm), light (Fourier transform image) having the spatial frequency ν appears at a position of a distance $Y_1$ (mm) from the optical axis on the rear side focal plane of the first lens $L_1$.

$$Y_1 = f_1 \cdot \lambda \cdot \nu \quad (1)$$

Figure 6:
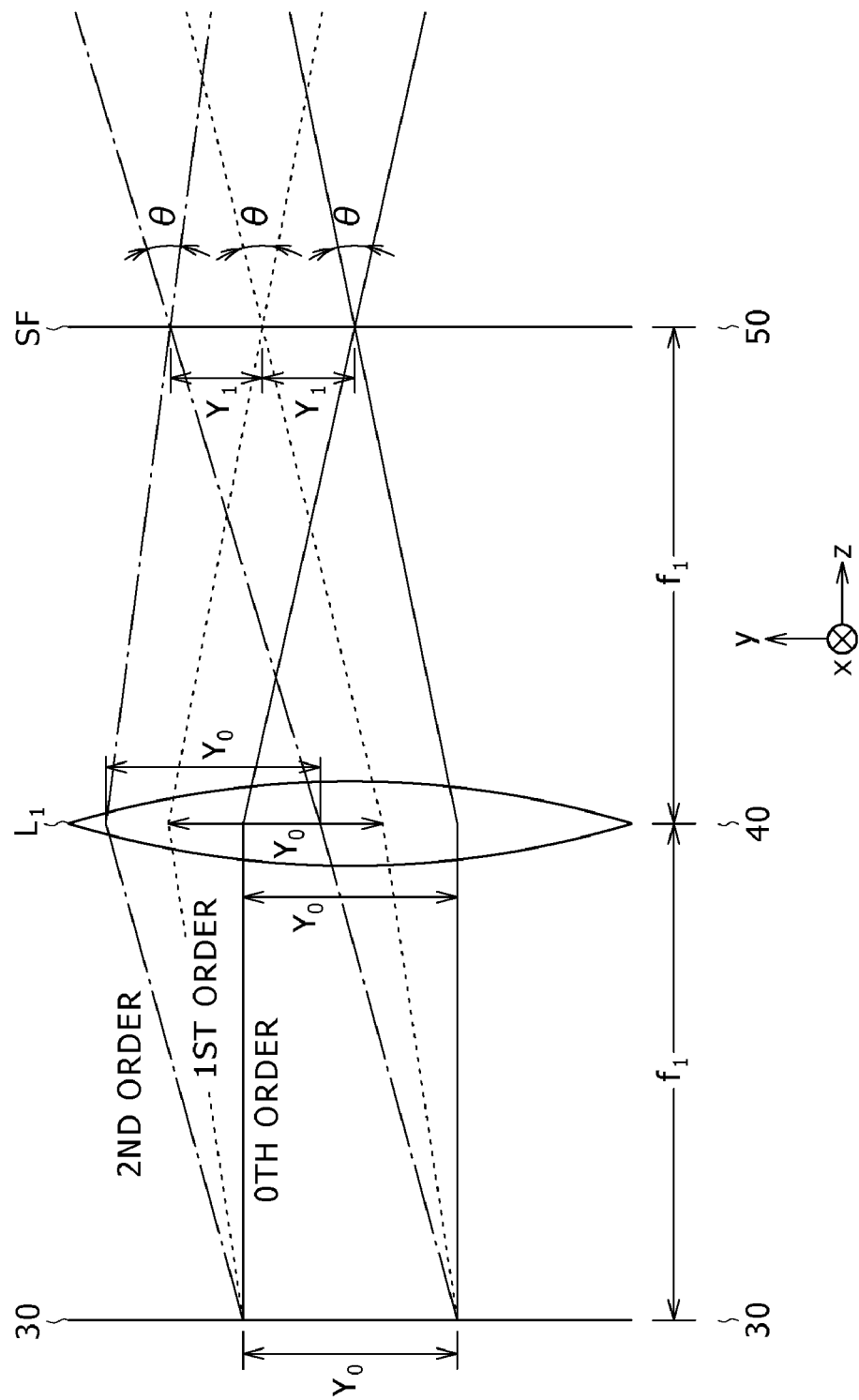
FIG. 6 is a schematic view illustrating condensation of light beams by a Fourier transform image forming section or first lens and image formation by the Fourier transform image selection section or spatial filter in the image display apparatus of the example 1.

The light condensing state of the first lens $L_1$ is schematically illustrated in FIG. 6. It is to be noted that, in FIG. 6, "$Y_0$" denotes the length in the y axis direction of the two-dimensional image produced by the two-dimensional image forming apparatus 30; and "$Y_1$" the distance in the y axis direction of a Fourier transform image on the spatial filter SF based on the two-dimensional image produced by the two-dimensional image forming apparatus 30. Further, the diffraction light beam of the 0th order is indicated by solid lines; the first order diffraction light beam by broken lines; and the second order diffraction light beam by alternate long and short dash lines. The diffraction light beams of the different diffraction orders, or in other words, a number of Fourier transform images corresponding to the number of diffraction orders, are condensed at different apertures 51 on the spatial filter SF by the first lens $L_1$ (refer also to FIG. 2). The number of apertures 51 is M×N=121 as described hereinabove. The condensed light angle θ on the spatial filter SF, that is, the diversion angle after emitted from the spatial filter SF, is equal among P×Q pixels 31 with regard to a Fourier transform image or diffraction light beam of the same diffraction order. On the spatial filter SF, the distance between Fourier transform images of adjacent diffraction order numbers can be determined from the expression (1) given hereinabove. From the expression (1), the position of a Fourier transform image, that is, the formation position on the spatial filter SF, can be varied by arbitrarily selecting the focal distance $f_1$ of the first lens $L_1$.

In order for the first lens $L_1$ to pass spatial frequencies of a two-dimensional image emitted along a plurality of diffraction angles corresponding to different diffraction orders therethrough, it is necessary to select the numerical aperture NA of the first lens $L_1$ in response to the diffraction order to be utilized, and it is requested for the numerical aperture of all lenses succeeding the first lens $L_1$ to be higher than the numerical aperture NA of the first lens $L_1$ irrespective of the focal distance.

The size of the apertures 51 may have a value equal to that of $Y_1$ in the expression (1). As an example, if the wavelength λ of the illuminating light is 532 nm, the focal distance $f_1$ of the first lens $L_1$ is 50 mm, and the size of one pixel 31 of the two-dimensional image forming apparatus 30 is approximately 13 to 14 μm, then the value of $Y_1$ becomes approximately 2 mm. This signifies that Fourier transform images corresponding to different diffraction orders can be obtained in a high density corresponding to the distance of approximately 2 mm on the spatial filter SF. In other words, 11×11=121 Fourier transform images can be obtained at distances of approximately 2 mm in both of the X and Y directions on the spatial filter SF.

Here, a spatial frequency ν of the two-dimensional image produced by the two-dimensional image forming apparatus 30 is a frequency having a period of two successive pixels 31 of the two-dimensional image forming apparatus 30 in the maximum because the two-dimensional image is formed by the two-dimensional image forming apparatus 30 which includes P×Q pixels 31.

Figure 7A:
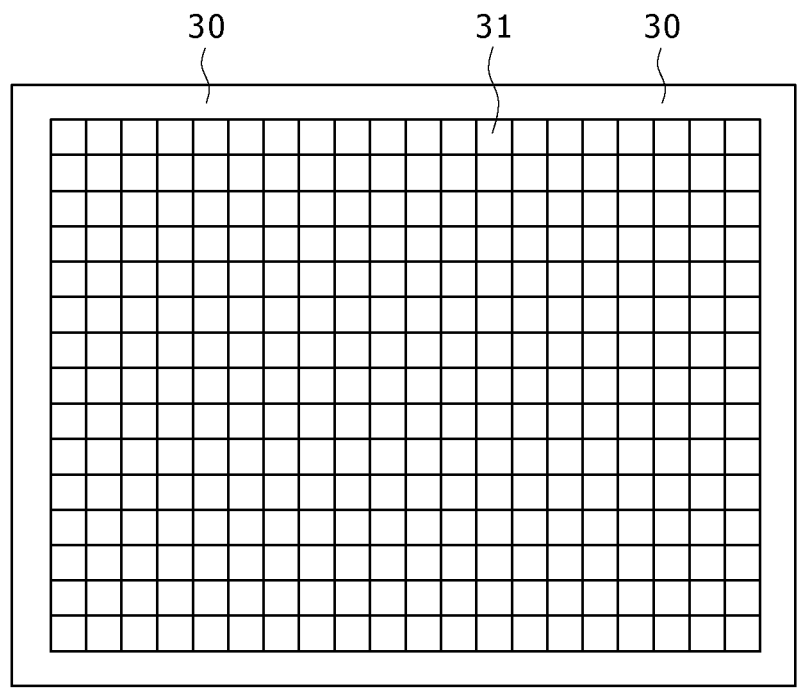
FIGS. 7A and 7B are schematic views showing the optical modulation section or two-dimensional image forming apparatus in the example 1 where the spatial frequency of a two-dimensional image produced by the optical modulation section or two-dimensional image forming apparatus is lowest and highest, respectively.

FIG. 7A shows a schematic front elevational view of the two-dimensional image forming apparatus 30 in a state wherein the spatial frequency of a two-dimensional image produced by the two-dimensional image forming apparatus 30 is lowest. Here, the state wherein the spatial frequency is lowest is a case wherein all pixels display black or display white, and the spatial frequency of the two-dimensional image in this instance has only a plane wave component, that is, a DC component. It is to be noted that FIG. 7A shows the two-dimensional image forming apparatus 30 where all pixels display white. While the frequency characteristic of the light intensity of a Fourier transform image formed by the first lens $L_1$ in this instance is schematically shown in FIG. 8A, peaks of the light intensity of Fourier transform images appear at distances of a frequency $v_1$.

Figure 7B:
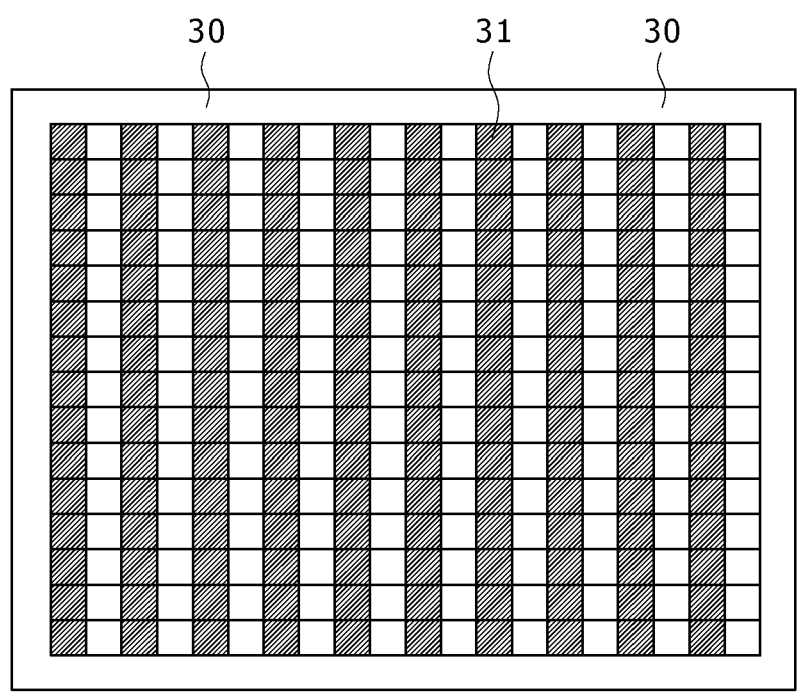
Figure 8B:
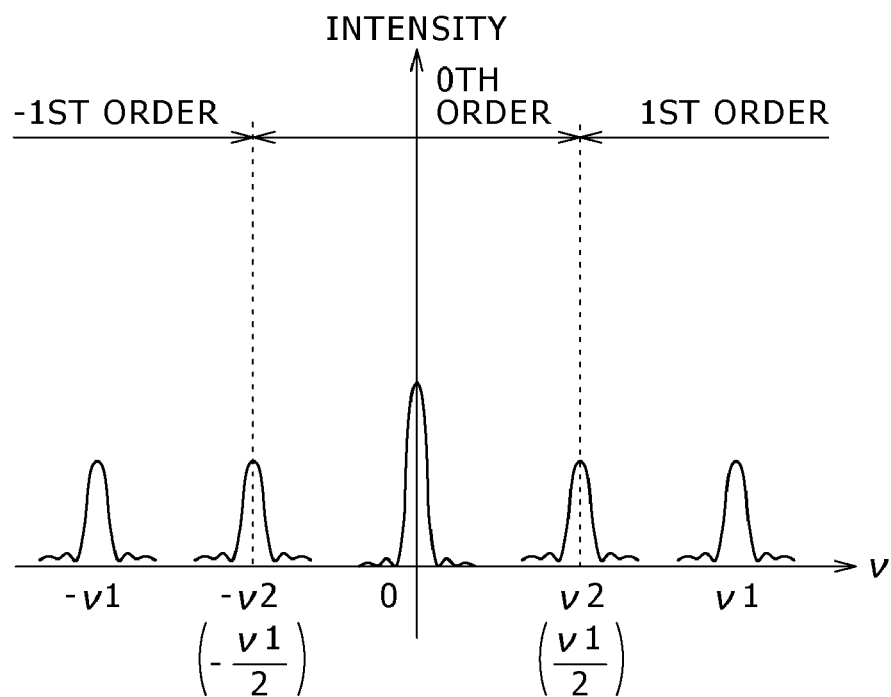
Figure 9A:
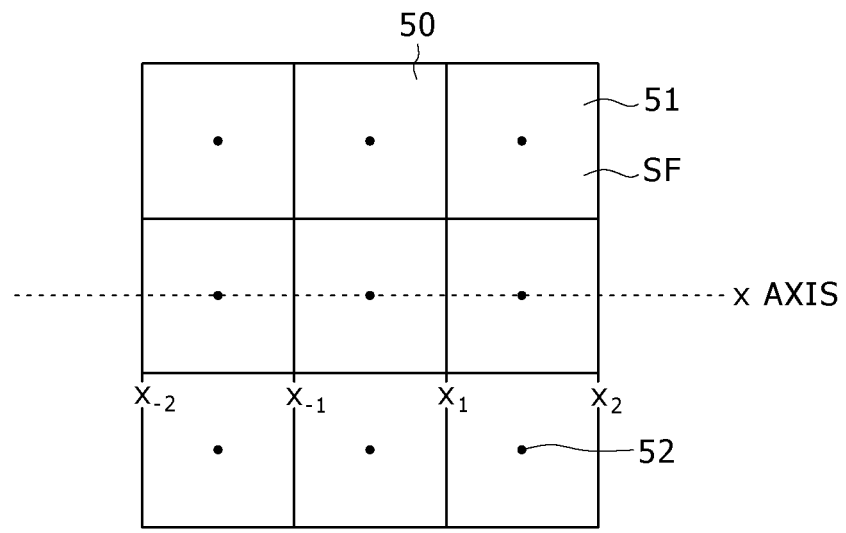
FIG. 9A is a schematic view illustrating a distribution of Fourier transform images on an xy plane of the Fourier transform image selection section or spatial filter in the example 1 and FIGS. 9B and 9C are diagrammatic views illustrating different light intensity distributions of Fourier transform images on an x axis shown in FIG. 9A.
Figure 9B:
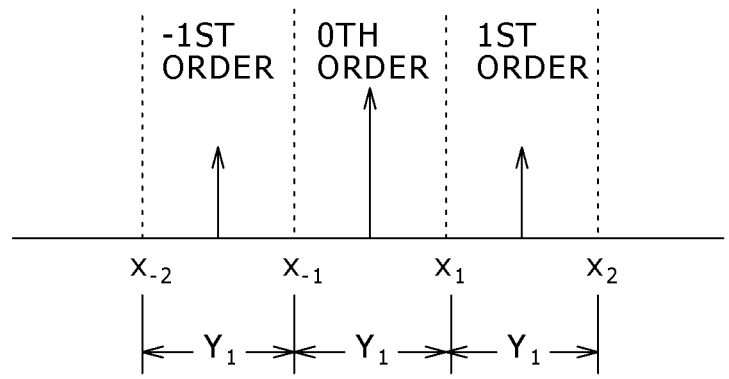
Figure 9C:
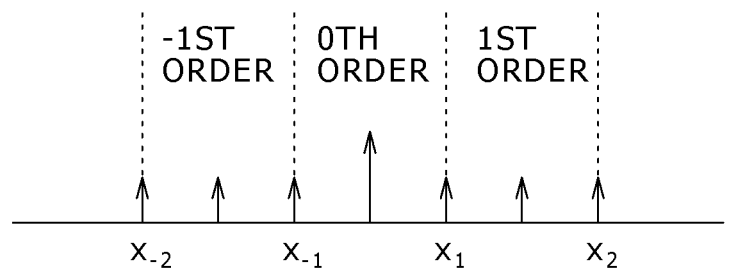

Meanwhile, FIG. 7B shows a schematic front elevational view of the two-dimensional image forming apparatus 30 in a state wherein the spatial frequency of the two-dimensional image produced by the two-dimensional image forming apparatus 30 is highest. Here, the state wherein the spatial frequency is highest is a case wherein all pixels display black and white alternately. While the frequency characteristic of the light intensity of the Fourier transform image formed by the first lens $L_1$ in this instance is schematically shown in FIG. 8B, peaks of the light intensity of the Fourier transform image appear at distances of a frequency $v_2$ which is equal to $v_1/2$. FIG. 9A schematically shows a distribution of Fourier transform images on the spatial filter SF, that is, on the xy plane, and FIGS. 9B and 9C schematically show light intensity distributions of Fourier transform images on the x axis indicated by a broken line in FIG. 9A. It is to be noted that FIG. 9B shows the lowest spatial frequency components or plane wave components, and FIG. 9C shows the highest spatial frequency components.

Figure 8A:
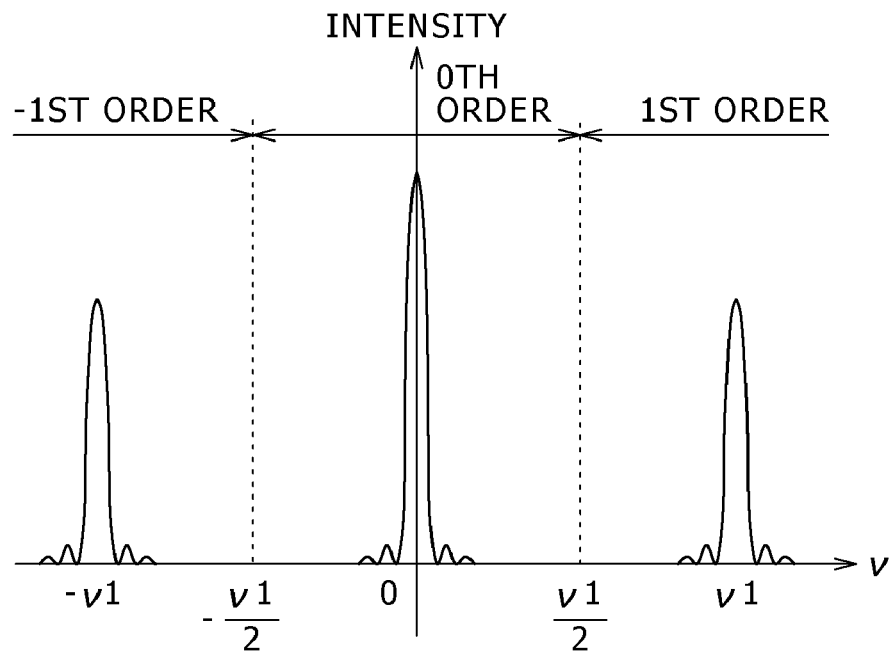
FIGS. 8A and 8B are schematic views illustrating the frequency characteristic of the light intensity of Fourier transform images where the spatial frequency of a two-dimensional image produced by the optical modulation section or two-dimensional image forming apparatus in the example 1 is lowest and highest, respectively.

It is to be noted that the above discussion regarding the state wherein the spatial frequency is lowest and the state wherein the spatial frequency is lowest illustrated in FIGS. 7A and 7B, the frequency characteristics of the light intensity of Fourier transform images illustrated in FIGS. 8A and 9B and the distribution of Fourier transform images and the light intensity distributions of Fourier transform images on the spatial filter SF illustrated in FIGS. 9A, 9B and 9C can similarly apply also to the example 2 hereinafter described.

The planar shape of the apertures 51 of the spatial filter SF may be determined based on the shape of Fourier transform images. Further, the apertures 51 may be provided individually for different diffraction orders so that the peak position of a planar wave component of a Fourier transform image may be the central position. By the provision of the apertures 51, a peak of the light intensity of a Fourier transform image is positioned at the central position 52 of each aperture 51. In other words, the apertures 51 may be formed such that they pass therethrough all positive and negative highest spatial frequencies of a two-dimensional image centering on a periodical pattern of the Fourier transform image where the spatial frequency of the two-dimensional image is the lowest frequency component or plane wave component.

Incidentally, the state wherein the spatial frequency is highest corresponds to a case wherein all pixels display black and white alternately as seen in FIG. 7B. Meanwhile, the spatial frequency of the pixel structure of the two-dimensional image forming apparatus 30 and the spatial frequency of the two-dimensional image have such a relationship as described below. In particular, if it is assumed that an aperture occupies an entire pixel, then the highest spatial frequency of the two-dimensional image is ½ the spatial frequency of the pixel structure. On the other hand, if an aperture occupies a certain rate of each pixel lower than 1, then the highest spatial frequency of the two-dimensional image is lower than ½ the spatial frequency of the pixel structure. Therefore, all spatial frequencies of the two-dimensional image appear within a region up to a position equal to one half the distance between periodical patterns originating from the pixel structure appearing on the spatial filter SF. From this, all apertures 51 can be disposed without causing spatial interference with each other. In particular, for example, to the (3, 2)th aperture 51, a Fourier transform image having a diffraction order number of $m_0=$ and $n_0=2$ comes in, but the Fourier transform image having the diffraction order number of $m_0=3$ and $n_0=2$ does not enter the other apertures 51. Consequently, while, on the spatial filter SF which has the apertures 51 which are independent of each other for each Fourier transform image, spatial frequencies of the two-dimensional image produced by the two-dimensional image forming apparatus 30 exist in a Fourier transform image positioned in one aperture 51, the spatial frequencies of the two-dimensional image produced by the two-dimensional image forming apparatus 30 do not become missing by a spatial restriction of the apertures 51. It is to be noted that the spatial frequency of the pixel structure can be regarded as a carrier frequency, and the spatial frequencies of a two-dimensional image correspond to image information whose carrier frequency is the spatial frequency of the pixel structure.

Then, on the spatial filter SF, opening and closing control of the aperture 51 is carried out in order to control individual passage/interception of M×N Fourier transform images. If the spatial filter SF is formed, for example, from a liquid crystal display apparatus, then by causing each liquid crystal cell to operate as a kind of an optical shutter or light value, opening and closing control of the aperture 51 can be carried out.

It is to be noted that, where the brightness of an image obtained differs depending upon the diffraction order, a light attenuating filter for attenuating a bright image with reference to the darkest image may be disposed on the rear side focal plane of the third lens $L_3$ or a lens positioned most rearwardly. This similarly applies also to the other examples hereinafter described.

Further, the opening and closing control of the apertures 51 provided on the spatial filter SF may not be carried out for all apertures 51. In particular, the opening and closing control of the apertures 51 may be carried out, for example, for every other one of the apertures 51 or for those of the apertures 51 which are positioned at desired positions. This similarly applies also to the other examples hereinafter described.

The timings of opening and closing control of the apertures 51 of the spatial filter SF are hereinafter described. Also examples of a configuration of the light source and the illuminating optical system are hereinafter described.

In the image display apparatus of the example 1 or in any of image display apparatus of the examples 2 to 11 hereinafter described, control of operation of the optical modulation section or two-dimensional image forming apparatus is carried out by a personal computer not shown. In particular, two-dimensional image data with which aberrations caused by an optical system which forms the image display apparatus such as, for example, Seidel's aberrations including a spherical aberration, comatic aberration, astigmatism, a curvature of field and distortion are corrected are recorded into a recording medium such as, for example, a hard disk provided in the personal computer. Or, operators to be used for correction of aberrations caused by an optical system which forms the image display apparatus where the values of, for example, (m, n), (P, Q), (M, N), $(S_0, T_0)$ and $(U_0, V_0)$ are used as parameters are recorded into a recording medium provided in the personal computer.

A three-dimensional image or stereoscopic image reproduced ideally based on two-dimensional image data Data(A), which correspond to a video signal, before aberration correction and having no aberration is represented by "A" and a three-dimensional image or stereoscopic image when it is reproduced actually based on the two-dimensional image data Data(A) is represented by "a" wherein various aberrations are included. Although the two-dimensional image data Data(A) are not restricted, for example, a test pattern may be used. In this instance, the original two-dimensional image data Data(A) are corrected, for example, based on a simulation or by trial and error such that the three-dimensional image or stereoscopic image when the two-dimensional image data Data(A) are actually reproduced becomes the three-dimensional image "A". More particularly, for example, an image of a test pattern is emitted from the two-dimensional image forming apparatus 30. Then, a reproduction three-dimensional image or stereoscopic image obtained by opening the (0, 0)th aperture 51 which exhibits the least aberrations and another reproduction three-dimensional image or stereoscopic image obtained by opening a predetermined (m, n)th aperture 51 are subjected to image processing and compared with each other. Then, for example, an operator corrects the data of the test pattern so that no difference may appear between the two reproduction three-dimensional images or the difference may be reduced. Then, by repetitively carrying out such operations, a kind of operators wherein, for example, the values of (m, n), (P, Q), (M, N), ($S_0$, $T_0$) and ($U_0$, $V_0$) are used as parameters can be obtained. Where two-dimensional image data obtained finally by correcting the original two-dimensional image data Data(A) so that the three-dimensional image or stereoscopic image when the two-dimensional image data Data(A) are actually reproduced may be the three-dimensional image "A", if the values of (m, n), (P, Q), (M, N), ($S_0$, $T_0$), ($U_0$, $V_0$) and so forth are determined, then a fixed relationship, that is, a kind of operators, between the original two-dimensional image data Data (A) before the aberration correction and the two-dimensional image data Data(A') whose aberrations are corrected finally can be obtained. In other words, such a fixed relationship or operator as described above is determined. Then, two-dimensional image data obtained by correcting aberrations of original two-dimensional image data, which correspond to a video signal, before aberration correction based on the relationship determined as above, that is, two-dimensional image data after aberrations caused by the optical system which forms the image display apparatus are corrected, are recorded on a recording medium. Then, a three-dimensional image or stereoscopic image is reproduced based on the two-dimensional image data after the aberration correction. Or, two-dimensional image data Data(A), which correspond to a video signal, sent from an external apparatus to the image display apparatus are subjected to aberration correction on the real time basis based on the operators determined as above, and then a three-dimensional image or stereoscopic image is reproduced by the image display apparatus based on the two-dimensional image data Data(A') after the aberration correction. Since a two-dimensional image is reproduced by the two-dimensional image forming apparatus 30 based on two-dimensional image data whose aberrations caused by the optical system which forms the image display apparatus such as, for example, the illuminating optical system 20, two-dimensional image forming apparatus 30, Fourier transform image forming section 40, Fourier transform image selection section 50 and conjugate image forming section 60 are corrected in advance in this manner, a three-dimensional image or stereoscopic image having no or little aberrations can be displayed. Further, if the image display apparatus is driven, for example, by field sequential driving, then not only correction of the Seidel's five aberrations but also correction of chromatic aberration can be carried out.

As described above, according to the image display apparatus 1A of the example 1, spatial frequencies of a two-dimensional image produced by the two-dimensional image forming apparatus 30 are emitted along a plurality of diffraction angles corresponding to different diffraction orders and are Fourier transformed by the Fourier transform image forming section 40 or first lens $L_1$ to obtain Fourier transform images. Then, the Fourier transform images obtained in this manner are spatially and temporally filtered by the Fourier transform image selection section 50 or spatial filter SF, and a conjugate image CI of the filtered Fourier transform image is formed. Therefore, a group of light beams can be produced and scattered in a spatially high density and in a state distributed in a plurality of directions without increasing the size of the entire image display apparatus. Further, the individual light beams which are components of the light beam group can be spatially and temporally controlled independently of each other. Consequently, a stereoscopic image based on light beams having quality proximate to that of a physical solid in the real world can be obtained.

Further, with the image display apparatus 1A of the example 1, since the light beam reproduction method is utilized, a stereoscopic image which satisfies such visual sensation functions as focal adjustment, convergence and motion parallax can be provided. Further, with the image display apparatus 1A of the example 1, since high order diffraction light beams are utilized effectively, a number of light beams, which can be controlled by a single image output device, that is, the two-dimensional image forming apparatus 30, and are a kind of copy of two-dimensional image, equal to the number of diffraction orders which is M×N, can be obtained, when compared with the existing image outputting technique. Besides, with the image display apparatus 1A of the example 1, since filtering is carried out spatially and temporally, a temporal characteristic of the image display apparatus can be converted into a spatial characteristic of the image display apparatus. Further, a stereoscopic image can be obtained without using a diffusion screen or the like. Furthermore, a stereoscopic image which looks appropriately from whichever direction it is observed can be provided. Further, since a group of light beams can be produced and scattered in a spatially high density, a spatial image of a high definition near to a visual confirmation limit can be provided.

It is to be noted that, since the image display method itself in the examples 2 to 11 hereinafter described is substantially same as that described hereinabove with reference to FIG. 1, detailed description of the same is omitted herein, and description only of image display apparatus of different embodiments of the present invention is given below.

Example 2

The example 2 relates to image display methods according to the first and third embodiments of the present invention and more particularly to display methods of a three-dimensional image. The example 2 further relates to image display apparatus according to the first and third embodiments of the present invention and more particularly to three-dimensional image display apparatus. The image display apparatus of the example 2 is schematically shown in FIG. 10.

The image display apparatus of the example 2 includes an optical modulation section 130 different from the optical modulation section 30 of the liquid crystal display apparatus of the example 1. In particular, the optical modulation section 130 includes a one-dimensional spatial optical modulator, which particularly is a diffraction grating-optical modulation apparatus 201, for producing a one-dimensional image divided into P image portions, for example, into 1,920 image portions. The optical modulation section 130 further includes a scanning optical system, which particularly is a scanning mirror 205, for two-dimensionally developing or scanning the one-dimensional image produced by the diffraction grating-optical modulation apparatus 201 and divided into P image portions to form a two-dimensional image divided into P×Q image portions. The optical modulation section 130 further includes a grating filter 132 disposed on a production plane of the two-dimensional image for emitting spatial frequencies of the produced two-dimensional image along a plurality of diffraction angles corresponding to different diffraction orders, particularly corresponding to totaling M×N diffraction orders. Here, M×N diffraction light beams are produced by the grating filter 132 for each of the image portions of the two-dimensional image produced by the scanning optical system or scanning mirror 205 and formed from P×Q image portions. It is to be noted that the grating filter 132 may be formed from an amplitude grating or a phase grating. Further, also in the examples 4, 6 and 8 hereinafter described, an optical modulation section 130 of a similar configuration and structure may be applied.

Where the image display apparatus of the example 2 of the present invention is described in connection with components of the image display apparatus according to the example 3 of the present embodiment, the image display apparatus includes a light source 10 and an optical system. The optical system includes:

(A) a two-dimensional image forming apparatus 130 including a one-dimensional spatial optical modulator, particularly a diffraction grating-optical modulation apparatus 201, having P pixels along an X direction and configured to produce a one-dimensional image, a scanning optical system, particularly a scanning mirror 205, configured to two-dimensionally develop the one-dimensional image produced by the one-dimensional spatial optical modulator to produce a two-dimensional image, and a diffraction light production section, particularly a grating filter 132, disposed on a production plane of the two-dimensional image and configured to produce, for each of the pixels, M diffraction light beams including mth to m'th order diffraction light beams, P being a positive integer, m and m' being an integer, M being a positive integer;

(B) a first lens $L_1$, particularly, in the example 2, a convex lens, having a front side focal plane on which the diffraction light production section is disposed;

(C) a spatial filter SF disposed on a rear side focal plane of the first lens $L_1$ and having M×N apertures 51 controllable between open and closed states and arranged such that M apertures are arranged along the X direction and N apertures are arranged along a Y direction, N being a positive integer;

(D) a second lens $L_2$, particularly, in the example 2, a convex lens, having a front side focal plane on which the spatial filter SF is disposed; and (E) a third lens $L_3$, particularly, in the example 2, a convex lens, having a front side focus disposed at a rear side focus of the second lens $L_2$.

Figure 16:
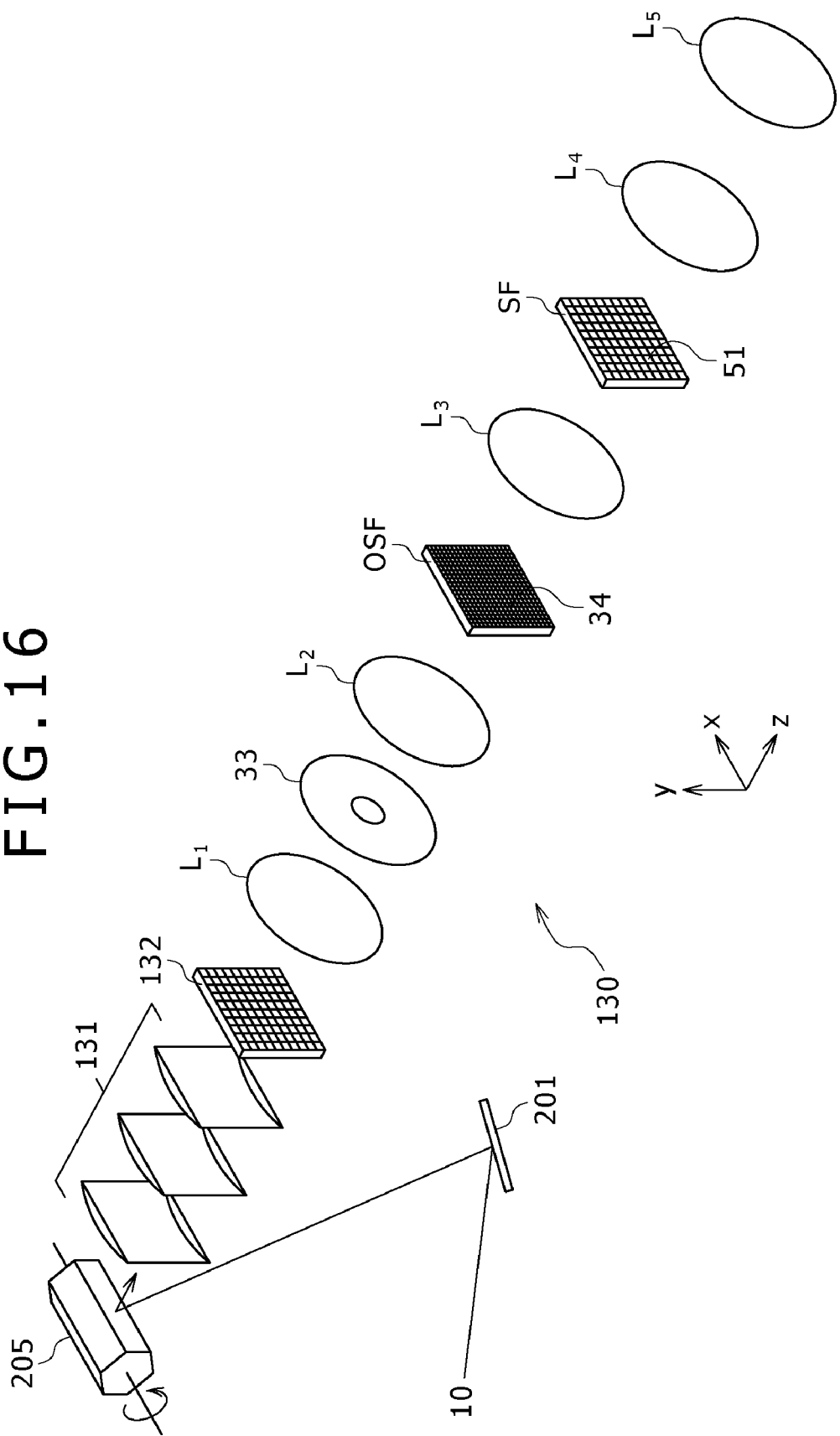
FIG. 16 is a schematic view of an image display apparatus according to an example 4.
Figure 22:
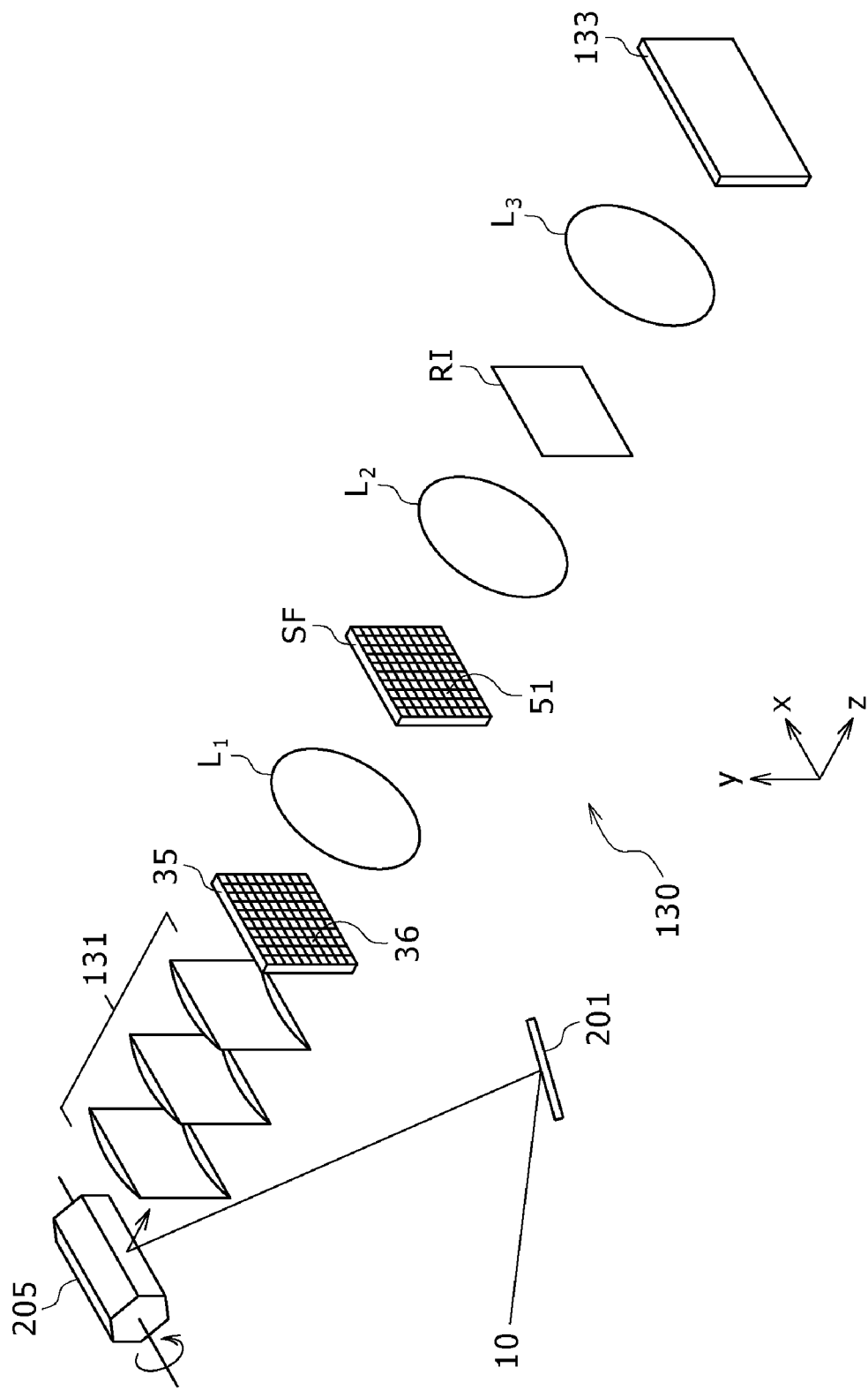
FIG. 22 is a schematic view of an image display apparatus according to an example 6.
Figure 26:
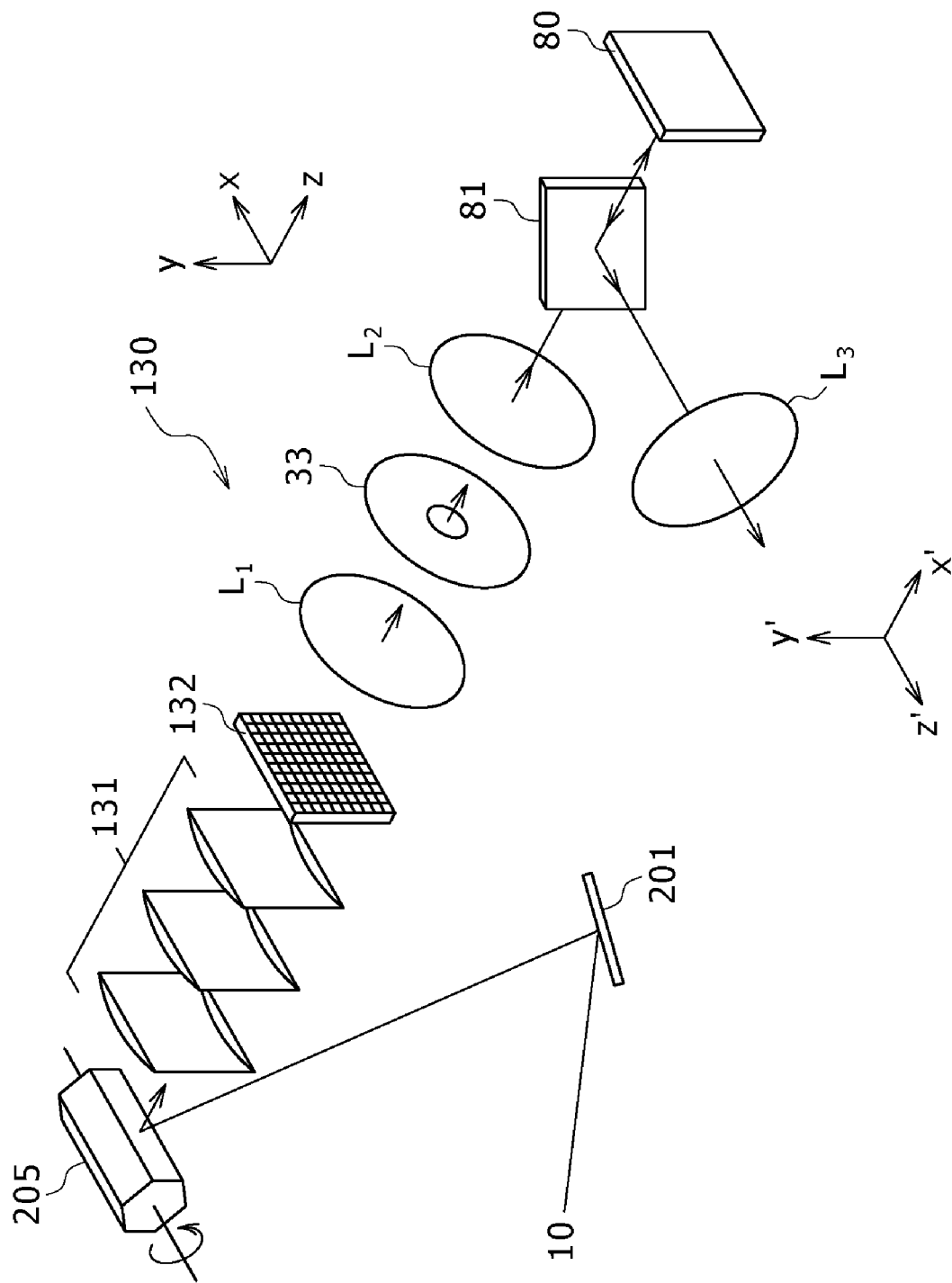
FIG. 26 is a schematic view of an image display apparatus according to an example 8.

Here, it is assumed that the one-dimensional image extends in the X direction. Further, it is assumed that the scanning direction is the Y direction, and a two-dimensional image is produced along the X direction and the Y direction. However, the X direction and the Y direction may alternatively be replaced by each other. This similarly applies to the examples 4, 6 and 8 hereinafter described. Meanwhile, in FIG. 10 and also in FIGS. 16, 22 and 26, illustration of the illuminating optical system 20 is omitted.

Figure 11:
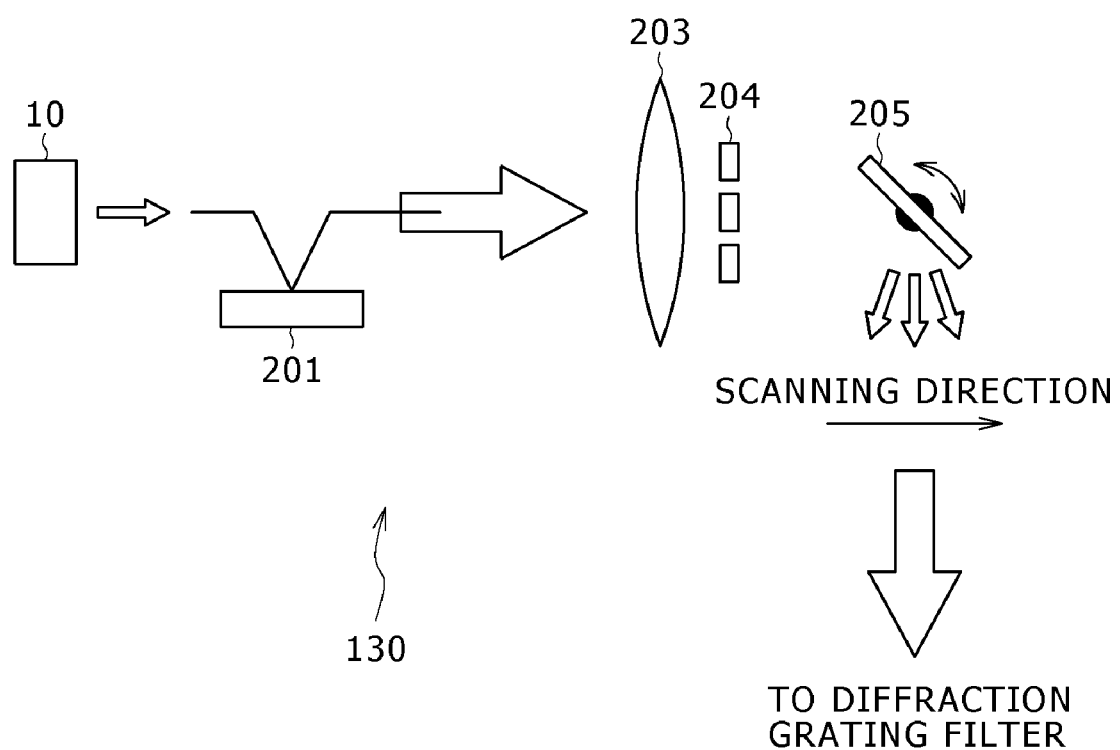
FIG. 11 is a schematic view showing part of an optical modulation section or two-dimensional image forming apparatus of the image display apparatus of the example 2.

The optical modulation section or two-dimensional image forming apparatus 130 including the diffraction grating-optical modulation apparatus is schematically shown in FIG. 11.

Referring to FIG. 11, the optical modulation section 130 in the example 2 includes a light source 10 for emitting a laser beam, a condenser lens (not shown) for condensing the light beam emitted from the light source 10, and a diffraction grating-optical modulation apparatus 201 to which light passing through the condenser lens is introduced. The optical modulation section 130 further includes a lens 203 and a spatial filter 204 through which the light emitted from the diffraction grating-optical modulation apparatus 201, an image forming lens (not shown) for causing the one light beam passing through the spatial filter 204 to form an image, and a scanning mirror 205 for scanning the one light beam passing through the image forming lens.

The one-dimensional spatial optical modulator, one-dimensional image forming apparatus or diffraction grating-optical modulation apparatus 201 diffracts light from the light source 10 to produce a one-dimensional image. More particularly, the diffraction grating-optical modulation apparatus 201 is formed from diffraction grating-optical modulation elements (GLV) 210 formed one-dimensionally in an array. The diffraction grating-optical modulation elements 210 are produced applying a micromachine fabrication technique and formed from a diffraction grating of the reflection type such that it has an optical switching action to electrically control on/off operations of light to display an image. Then, in the optical modulation section or two-dimensional image forming apparatus 130, light beams individually emitted from the diffraction grating-optical modulation elements 210 are scanned by the scanning mirror 205, which is formed from a galvano mirror or a polygon mirror, to obtain a two-dimensional image. Accordingly, in order to display a two-dimensional image formed from P×Q pixels, for example, 1,920×1080 pixels, the diffraction grating-optical modulation apparatus 201 may be formed from P diffraction grating-optical modulation elements 210, that is, 1,920 diffraction grating-optical modulation elements 210.

It is necessary to produce diffraction light beams based on the two-dimensional image obtained by scanning by the scanning mirror 205. To this end, a filter of the amplitude type or the phase type is disposed on a two-dimensionally developed face to produce diffraction light beams. In particular, a two-dimensional image obtained by scanning by the scanning mirror 205 passes through a scanning lens system 131 and enters the grating filter or diffraction grating filter 132 disposed on the two-dimensional image production plane. Consequently, M×N diffraction light waves are produced for each of the image portions of the two-dimensional image, which is formed from the P×Q divisions, by the grating filter 132. In other words, spatial frequencies of the produced two-dimensional image are emitted from the grating filter 132 along a plurality of diffraction angles corresponding to different diffraction orders produced from each portion of the grating filter 132, which corresponds to a pixel. The grating filter 132 is disposed on the front side focal plane of the first lens $L_1$ having the focal distance $f_1$.

Where the one-dimensional spatial optical modulator or one-dimensional image forming apparatus is used, since the image to be produced thereby is a one-dimensional image, also diffraction occurs in a one-dimensional space. Accordingly, an optical system for diffusing the obtained diffraction light beams in the Y direction is demanded. In the image display apparatus of the example 2, a member 133 for causing anisotropic light diffusion of diffusing diffraction light beams produced in a one-dimensional direction in a two-dimensional direction is disposed on the downstream side or observer side with respect to the third lens $L_3$ or conjugate image forming section 60. The member 133 is referred to also as anisotropic diffusion film or anisotropic diffusion sheet.

Except the foregoing, the configuration and structure of the image display apparatus of the example 2 can be made similar to those of the image display apparatus described hereinabove in connection with the example 1. Therefore, further detailed description of the image display apparatus of the example 2 is omitted herein to avoid redundancy. The configuration and structure of the diffraction grating-optical modulation elements 210 are hereinafter described.

Example 3

Figure 12:
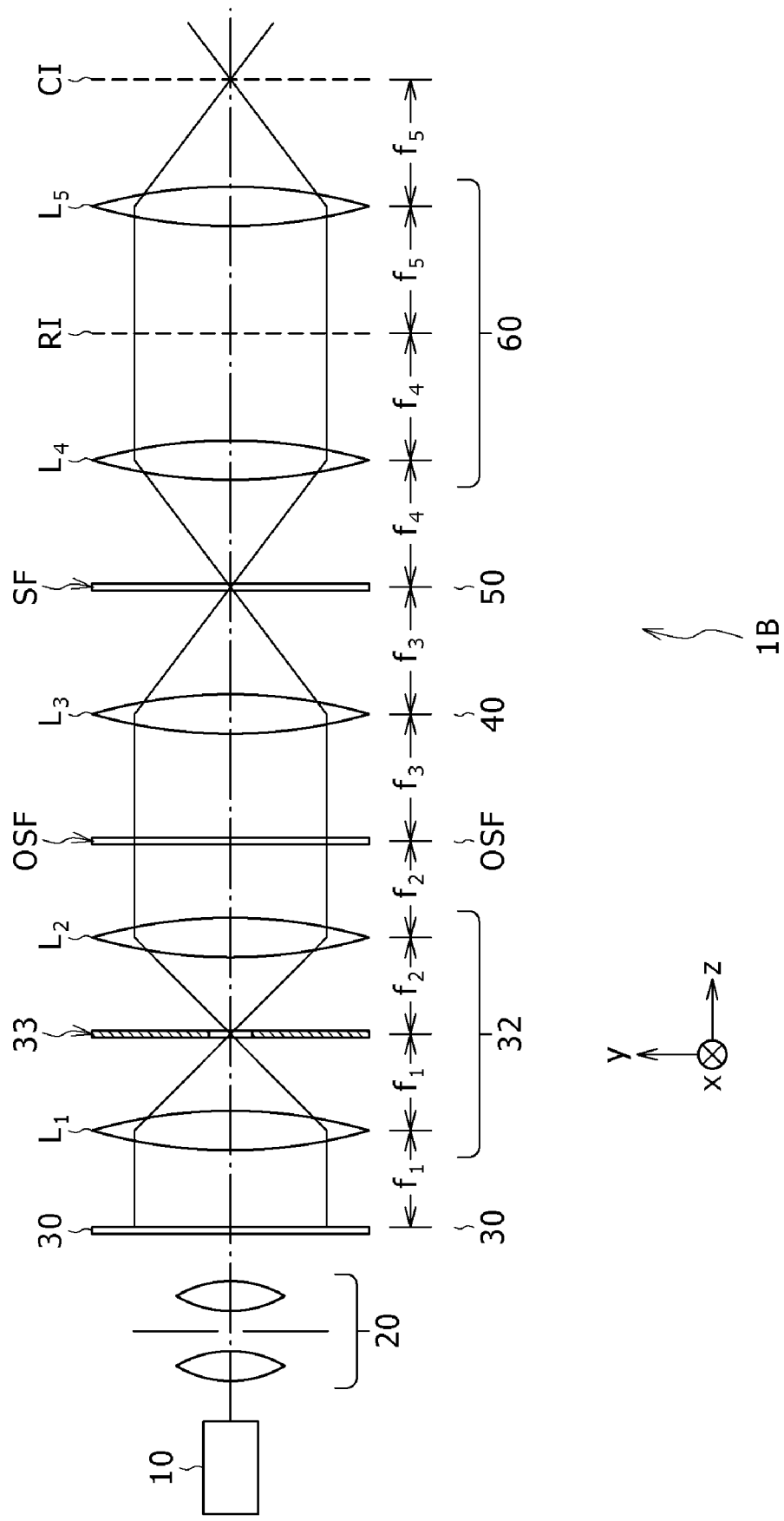
FIG. 12 is a schematic view of an image display apparatus according to an example 3 on a yz plane.
Figure 13:
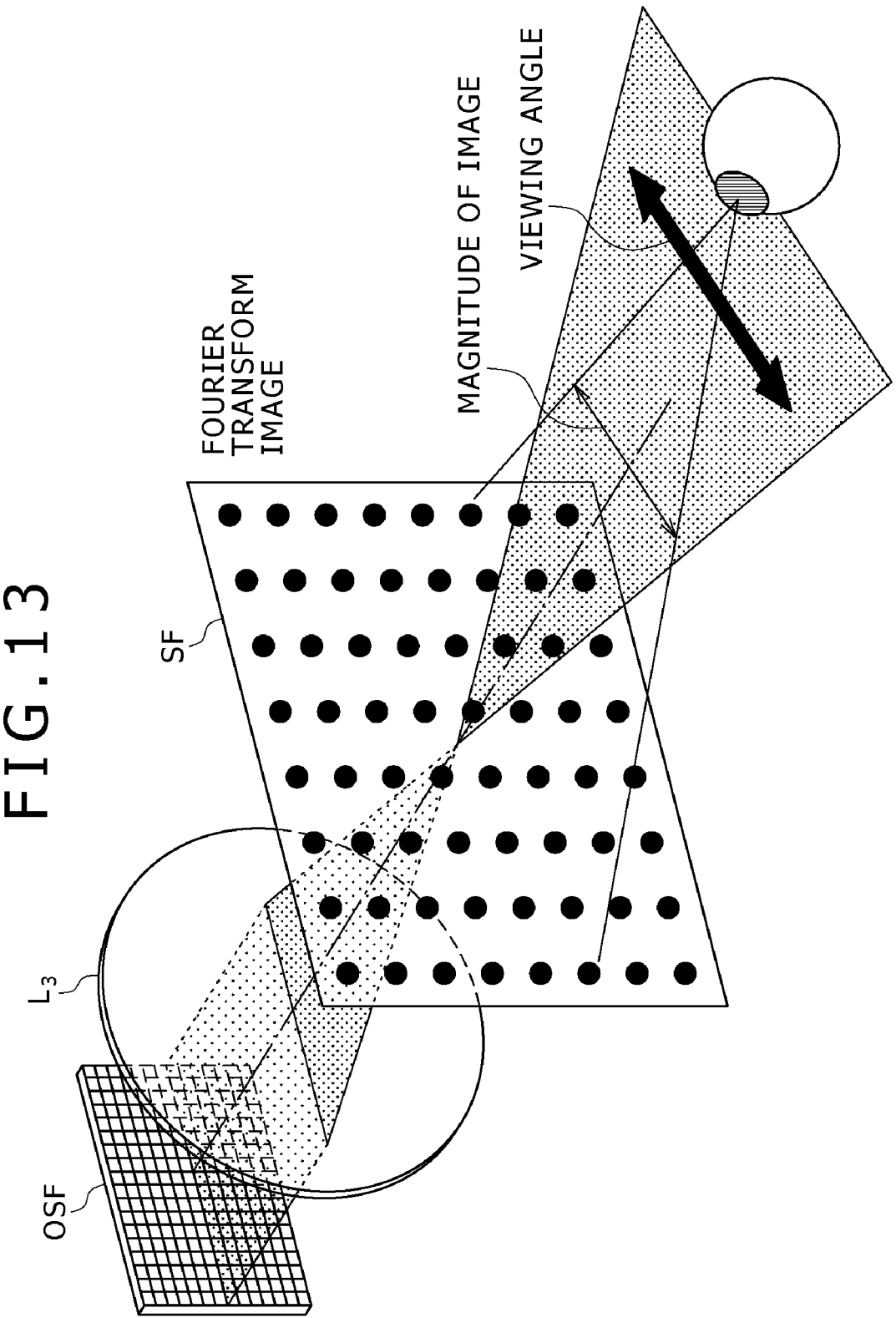
FIG. 13 is a schematic view showing the image display apparatus of the example 3 as viewed in an oblique direction.
Figure 14:
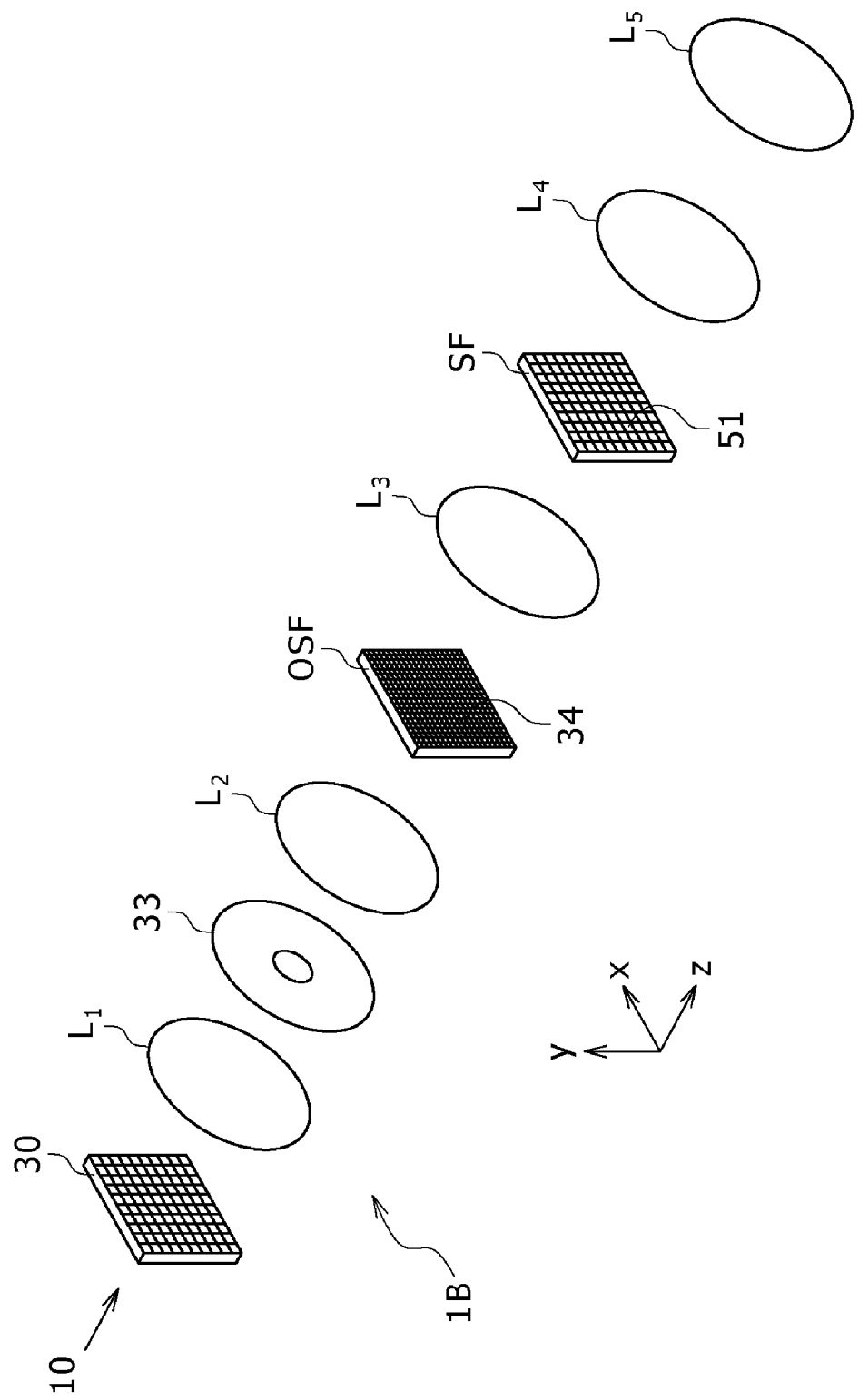
FIG. 14 is a schematic perspective view illustrating arrangement of components of the image display apparatus of the example 3.

The example 3 relates to image display methods according to the fourth and fifth embodiments of the present invention and more particularly to display methods of a three-dimensional image. The example 3 further relates to image display apparatus according to the fourth and fifth embodiments of the present invention and more particularly to three-dimensional image display apparatus. FIGS. 12, 13 and 14 schematically show the image display apparatus according to the example 3 which displays a monochromatic image. It is to be noted that, in FIG. 12, the optical axis is set to a z axis, and Cartesian coordinates in a plane perpendicular to the z axis are taken on an x axis and a y axis. Further, the direction parallel to the x axis is represented as X direction and the direction parallel to the y axis is represented as Y direction. The X direction is taken, for example, as a horizontal direction of the three-dimensional image display apparatus, and the Y direction is taken, for example, as a vertical direction of the three-dimensional image display apparatus. Here, FIG. 12 is a schematic view showing the image display apparatus of the example 3 on the yz plane. Also where the image display apparatus of the example 3 is viewed on the xz plane, it exhibits a schematic view substantially similar to that of FIG. 12. Meanwhile, FIG. 13 schematically shows the image display apparatus of the example 3 as viewed in an oblique direction, and FIG. 14 schematically illustrates an arrangement state of components of the image display apparatus of the example 3.

Meanwhile, also in the image display apparatus 1B of the example 3, the image display apparatus itself which includes such components as seen in FIGS. 12, 13 and 14 can generate and form a greater amount of light beams having a higher spatial density when compared with the existing apparatus. The image display apparatus 1B of the example 3 by itself has functions equivalent to those of the apparatus shown in FIG. 49 which includes a large number of, M×N, projector units 301 disposed parallelly in a horizontal direction and a vertical direction. It is to be noted that, for example, where it is intended to employ a multi-unit system, only it is necessary to dispose a number of three-dimensional image display apparatus 1B of the example 3 equal to the number of divisional three-dimensional images as seen from FIG. 48. In FIG. 48, the image display apparatus shown includes 4×4=16 image display apparatus 1B of the example 1.

Where the image display apparatus 1B of the example 3 of the present embodiment is described in connection with components of the image display apparatus according to the example 4 of the present invention, the image display apparatus 1B includes a light source 10 and an optical system. The optical system includes:

(A) an optical modulation section 30 having a plurality of pixels 31 and configured to modulate light from the light source 10 by means of the pixels 31 to produce a two-dimensional image and emit spatial frequencies of the produced two-dimensional image along a plurality of diffraction angles corresponding to different diffraction orders produced from each of the pixels 31;

(B) an image limiting and production section 32 configured to Fourier transform spatial frequencies of the two-dimensional image emitted from the optical modulation section 30 to produce a number of Fourier transform images corresponding to the number of diffraction orders produced from each of the pixels 31, select only a predetermined Fourier transform image from among the produced Fourier transform images, for example, a Fourier transform image corresponding to the first order diffraction whose carrier frequency is the 0th order diffraction of a plane wave component, and inverse Fourier transform the selected Fourier transform image to form a conjugate image of the two-dimensional image produced by the optical modulation section 30, that is, a rear image of the two-dimensional image;

(C) an oversampling filter OSF having a plurality of aperture regions 34 and configured to emit spatial frequencies of the conjugate image of the two-dimensional image along a plurality of diffraction angles corresponding to different diffraction orders produced from each of the aperture regions;

(D) a Fourier transform image forming apparatus 40 configured to Fourier transform the spatial frequency of the conjugate image of the two-dimensional image emitted from the oversampling filter OSF to produce a number of Fourier transform images corresponding to the number of the diffraction orders produced from each of the aperture regions 34;

(E) a Fourier transform image selection section 50 configured to select a Fourier transform image corresponding to a desired diffraction order from among the number of Fourier transform images corresponding to the number of diffraction orders produced from each of the aperture regions; and (F) a conjugate image forming section 60 configured to form a conjugate image of the Fourier transform image selected by the Fourier transform image selection section 50.

Further, the conjugate image forming section 60 includes an inverse Fourier transform section, particularly a four lens $L_4$ hereinafter described, configured to inverse Fourier transform the Fourier transform image selected by the Fourier transform image selection section 50 to form a real image of the two-dimensional image formed by the image limiting and production section 32. Further, the Fourier transform image forming section 40 is formed from a lens, and the oversampling filter OSF is disposed on the front side focal plane of the lens while the Fourier transform image selection section 50 is disposed on the rear side focal plane of the lens. The Fourier transform image selection section 50 has a number of apertures 51 corresponding to a plurality of diffraction orders produced from each of the aperture regions 34 and controllable between open and closed states.

Here, the spatial frequency of the two-dimensional image corresponds to image information whose carrier frequency is the spatial frequency of the pixel structure. Further, the spatial frequencies of the conjugate image of the two-dimensional image corresponds to the spatial frequencies of the two-dimensional image from which the spatial frequency of the pixel structure is removed.

Where the image display apparatus 1B of the example 3 of the present embodiment is described in connection with components of the image display apparatus according to the fifth embodiment of the present invention, the image display apparatus 1B includes a light source 10 and an optical system. The optical system includes:

(A) a two-dimensional image forming apparatus 30 having a plurality of, P×Q, apertures 51 arrayed in a two-dimensional matrix along an X direction and a Y direction and configured to control, for each of the apertures 51, passage, reflection or diffraction of light from the light source 10 to produce a two-dimensional image and produce, for each of the apertures 51, a plurality of diffraction light beams of different diffraction orders based on the produced two-dimensional image;

(B) a first lens $L_1$ having a front side focal plane on which the two-dimensional image forming apparatus 30 is disposed;

(C) a scattering diffraction limiting aperture section 33 disposed on a rear side focal plane of the first lens $L_1$ and configured to pass only a diffraction light beam of a predetermined diffraction order, for example, a Fourier transform image corresponding to the first order diffraction whose carrier frequency is the 0th diffraction of a plane wave component, therethrough;

(D) a second lens $L_2$ having a front side focal plane on which the scattering diffraction limiting aperture section 33 is disposed;

(E) an oversampling filter or diffraction light production member OSF disposed on a rear side focal plane of the second lens $L_2$ and having $P_{OSF} \times Q_{OSF}$ aperture regions 34 arrayed in a two-dimensional matrix along an X direction and a Y direction, the oversampling filter OSF being configured to produce, based on a conjugate image of the two-dimensional image produced by the second lens $L_2$, for each of the aperture regions 34, totaling M×N diffraction light beams arranged such that M diffraction light beams from the mth to the m'th diffraction orders are arranged along the X direction and N diffraction light beams from the nth to the n'th diffraction orders are disposed along the Y direction, $P_{OSF} \times Q_{OSF}$ being arbitrary positive integers, m and m' being integers, M being a positive integer, n and n' being integers, N being a positive integer;

(F) a third lens $L_3$ having a front side focal plane on which the oversampling filter OSF is disposed;

(G) a spatial filter SF disposed on a rear side focal plane of the third lens $L_3$ and having M×N spatial filters SF arranged such that M apertures 51 are arranged along the X direction and N apertures 51 are arranged along the Y direction and controllable between open and closed states;

(H) a fourth lens $L_4$ having a front side focal plane on which the spatial filter SF is disposed; and (I) a fifth lens $L_5$ having a front side focus positioned at a rear side focus of the fourth lens $L_4$.

It is to be noted that, in the example 3, the first lens $L_1$, second lens $L_2$, third lens $L_3$, fourth lens $L_4$ and fifth lens $L_5$ are each formed particularly from a convex lens. Meanwhile, the image limiting and production section 32 is formed from two of the lenses mentioned, that is, the first lens $L_1$ and the second lens $L_2$, and a scattering diffraction limiting aperture section 33 disposed between the first and second lenses $L_1$ and $L_2$ for passing therethrough only a predetermined Fourier transform image such as, for example, a Fourier transform image corresponding to the first order diffraction whose carrier frequency is the 0th order diffraction of a plane wave component. Further, the oversampling filter or diffraction light production member OSF is formed from a grating filter or diffraction grating filter and particularly has such a structure that $P_{OSF} \times Q_{OSF}$ recesses, which correspond to aperture regions and have a rectangular planar shape, are formed in a two-dimensional matrix on a flat glass plate. In other words, the oversampling filter OSF is formed from a phase grating. This similarly applies alto to the examples 4 and 11 hereinafter described.

Here, in the example 3 or in the example 4 or 11 hereinafter described, $P_{OSF}=2,048$ and $Q_{OSF}=1,536$, $P=1,024$ and $Q=768$, and $m=-5$, $m'=5$, $M=m'-m+1=11$, $n=-5$, $n'=5$, and $N=n'-n+1=11$. It is to be noted, however, that the values of $P_{OSF}$, $Q_{OSF}$, P, Q, m, m', M, n, n' and N are not limited to the specific values given above. If the components of the image display apparatus of the fourth embodiment of the present invention and the components of the image display apparatus according to the fifth or sixth embodiment of the present invention are compared with each other, then the optical modulation section 30 corresponds to the two-dimensional image forming apparatus 30; the image limiting and production section 32 corresponds to the first lens $L_1$, scattering diffraction limiting aperture section 33 and second lens $L_2$; the Fourier transform image forming section 40 corresponds to the third lens $L_3$; the Fourier transform image selection section 50 corresponds to the spatial filter SF; the inverse Fourier transform section corresponds to the fourth lens $L_4$; and the conjugate image forming section 60 corresponds to the fourth lens $L_4$ and the fifth lens $L_5$. Therefore, the following description is given based on the terms of the two-dimensional image forming apparatus 30, first lens $L_1$, scattering diffraction limiting aperture section 33, second lens $L_2$, third lens $L_3$, spatial filter SF, fourth lens $L_4$ and fifth lens $L_5$ for the convenience of description.

Similarly as in the example 1, an illuminating optical system 20 for shaping a light beam emitted from the light source 10 is disposed between the light source 10 and the two-dimensional image forming apparatus 30. Thus, the two-dimensional image forming apparatus 30 is illuminated with light emitted from the light source 10 and passing through the illuminating optical system 20, that is, with illuminating light. The illuminating optical system 20 is hereinafter described.

The two-dimensional image forming apparatus 30 is formed from a two-dimensional spatial optical modulator having a plurality of pixels 31 arrayed two-dimensionally, and each of the pixels 31 has an aperture. In particular, the two-dimensional spatial optical modulator or two-dimensional spatial optical modulator 30 is particularly formed from a liquid crystal display apparatus of the transmission type having P×Q pixels 31 disposed two-dimensionally, that is, disposed in a two-dimensional matrix along the X direction and the Y direction, and each of the pixels 31 has an aperture.

One pixel 31 is formed from a region in which a transparent first electrode and a transparent second electrode overlap with each other and which includes a liquid crystal cell similarly as in the example 1. Then, the liquid crystal cell operates as a kind of optical shutter or light valve, that is, the light transmission factor or numerical aperture of each pixel 31 is controlled, to control the light transmission factor of the light emitted from the light source 10, and as a whole, a two-dimensional image is obtained. A rectangular aperture is provided in the overlapping region of the transparent first and second electrodes, and when the light emitted from the light source 10 passes through the aperture, Fraunhofer diffraction occurs. As a result, $M_0 \times N_0 = 121$ diffraction light beams are generated from each of the pixels 31. In other words, since the number of pixels 31 is P×Q, it is considered that totaling $P \times Q \times M_0 \times N_0$ diffraction light beams are generated. In the two-dimensional image forming apparatus 30, spatial frequencies of a two-dimensional image are emitted along diffraction angles corresponding to a plurality of diffraction orders, totaling $M_0 \times N_0$ orders, generated from each pixel 31. It is to be noted that the diffraction angles differ also depending upon the spatial frequencies of the two-dimensional image.

The two-dimensional image forming apparatus 30 is disposed on the front side focal plane, that is, on the focal plane on the light source side, of the first lens $L_1$ having the focal distance $f_1$, and the scattering diffraction limiting aperture section 33 is disposed on the rear side focal plane, that is, the focal plane on the observer side, of the first lens $L_1$. Then, a number of Fourier transform images corresponding to a plural number of diffraction orders are produced by the first lens $L_1$, and the Fourier transform images are formed on the plane on which the scattering diffraction limiting aperture section 33 is positioned. Then, only a diffraction light beam of a predetermined diffraction order, for example, only a Fourier transform image corresponding to the first order diffraction whose carrier frequency is the 0th order diffraction of a plane wave component, passes through the scattering diffraction limiting aperture section 33. Further, the scattering diffraction limiting aperture section 33 is disposed on the front side focal plane of the second lens $L_2$ having the focal distance $f_2$, and the oversampling filter OSF is disposed on the rear side focal plane of the second lens $L_2$. Furthermore, the oversampling filter OSF is disposed on the front side focal plane of the third lens $L_3$ having the focal distance $f_3$, and the spatial filter SF is disposed on the rear side focal plane of the third lens $L_3$. The third lens $L_3$ produces M×N=121 Fourier transform images corresponding to the number of different diffraction orders produced from each aperture region 34, and the Fourier transform images are formed on the spatial filter SF. It is to be noted that, in FIG. 13, 64 Fourier transform images are indicated as dots for the convenience of illustration.

The spatial filter SF particularly is of the type which can be temporally controlled between open and closed states for spatially and temporally filtering Fourier transform images. More particularly, the spatial filter SF has a number of apertures 51 corresponding to the number of diffraction orders produced from each aperture region 14, particularly M×N=121 apertures 51, which can be controlled between open and closed states. In the spatial filter SF, one Fourier transform image corresponding to a desired diffraction order is selected by placing a desired one aperture 51 into an open state in synchronism with a production timing of a two-dimensional image by the two-dimensional image forming apparatus 30. More particularly, the spatial filter SF can be formed from a liquid crystal display apparatus of the transmission type or the reflection type which uses ferroelectric liquid crystal having, for example, M×N pixels or from a two-dimensional type MEMS including an apparatus wherein movable mirrors are arrayed in a two-dimensional matrix. It is to be noted that a schematic front elevational view of the spatial filter SF formed from a liquid crystal display apparatus is similar to that shown in FIG. 4.

As described above, the conjugate image forming section 60 is particularly formed from the fourth lens $L_4$ and the fifth lens $L_5$. The fourth lens $L_4$ having the focal distance $f_4$ inverse Fourier transforms a Fourier transform image filtered by the spatial filter SF to form a real image RI of the two-dimensional image formed by the second lens $L_2$. Further, the fifth lens $L_5$ having the focal distance $f_5$ forms a conjugate image CI of the Fourier transform image filtered by the spatial filter SF.

The four lens $L_4$ is disposed such that the spatial filter SF is positioned on the front side focal plane thereof and a real image RI of the two-dimensional image produced by the two-dimensional image forming apparatus 30 is disposed on the rear side focal plane thereof. The magnification of the real image RI obtained here with respect to the two-dimensional image forming apparatus 30 can be varied by arbitrarily selecting the focal distance $f_4$ of the fourth lens $L_4$.

On the other hand, the fifth lens $L_5$ is disposed such that the front side focal plane thereof coincides with the rear side focal plane of the fourth lens $L_4$ and a conjugate image CI of the Fourier transform image is formed on the rear side focal plane thereof. Here, since the rear side focal plane of the fifth lens $L_5$ is a conjugate plane of the spatial filter SF, this is equivalent to that the conjugate image of the two-dimensional image is outputted from a portion on the spatial filter SF corresponding to one of the apertures 51. Then, the amount of light beams to be produced finally and outputted corresponds to the number obtained by multiplying the number of light beams, which passes through the scattering diffraction limiting aperture section 33, equal to the number of pixels (P×Q) by the number of diffraction orders, particularly M×N, which pass through the optical system. Further, although the conjugate image CI of the Fourier transform image is formed on the rear side focal plane of the fifth lens $L_5$, it can be regarded that the light beams are disposed regularly two-dimensionally on the rear side focal plane of the fifth lens $L_5$. In other words, this is generally equivalent to a state that a plurality of, particularly M×N, projector units 301 shown in FIG. 49 are disposed on the rear side focal plane of the third lens $L_3$.

Similarly as schematically shown in FIG. 5, totaling $M_0 \times N_0$ diffraction light beams are produced by one pixel 31 of the two-dimensional image forming apparatus 30 along the X and Y directions. It is to be noted that, while FIG. 5 schematically shows only the 0th order diffraction light beam ($n_0=0$), ±1st order diffraction light beams ($n_0=\pm 1$) and ±2nd order diffraction light beams ($n_0=\pm 2$) as representative diffraction light beams, actually higher order diffraction light beams are produced, and a stereoscopic image is finally formed based on part of the diffraction light beams. Here, each of the diffraction light beams or fluxes includes all image information of a two-dimensional image produced by the two-dimensional image forming apparatus 30, that is, information of all pixels. A plurality of light beams produced by diffraction from the same pixel on the two-dimensional image forming apparatus 30 all have the same image information at the same point of time. In other words, in the two-dimensional image forming apparatus 30 formed from a liquid crystal display apparatus of the transmission type having P×Q pixels 31, light from the light source 10 is converted into a two-dimensional image by the pixels 31, and spatial frequencies of the produced two-dimensional image are emitted along a plurality of diffraction angles corresponding to different diffraction orders, totaling $M_0 \times N_0$ diffraction orders, produced from each pixel 31. In particular, $M_0 \times N_0$ copies of a two-dimensional image are emitted along a plurality of diffraction angles corresponding to different diffraction orders, totaling $M_0 \times N_0$ diffraction orders, from the two-dimensional image forming apparatus 30.

Then, the spatial frequencies of the two-dimensional image emitted from the two-dimensional image forming apparatus 30 are Fourier transformed by the first lens $L_1$ to produce a number of Fourier transform images corresponding to the number of diffraction orders produced from each pixel 31. Then, of the Fourier transform images, only a predetermined Fourier transform image, for example, a Fourier transform image corresponding to the first order diffraction whose carrier frequency is the 0th order diffraction of a plane wave component passes through the scattering diffraction limiting aperture section 33. Further, the selected Fourier transform image is inverse Fourier transformed by the second lens $L_2$ to produce a conjugate image of the two-dimensional image produced by the two-dimensional image forming apparatus 30. Then, the conjugate image of the two-dimensional image is formed on the oversampling filter OSF. It is to be noted that, while the spatial frequency of the two-dimensional image corresponds to image information whose carrier frequency is the spatial frequency of the pixel structure, only spatial frequencies in a region of the image information whose carrier frequency is the 0th order plane wave, that is, a region up to a frequency of ½ in the maximum of the spatial frequency of the pixel structure. In other words, spatial frequencies obtained as the first order diffraction whose carrier frequency is the 0th order diffraction of the plane wave component and lower than one half the spatial frequency of the pixel structure or aperture structure of the optical modulation section, pass through the scattering diffraction limiting aperture section 33. The conjugate image of the two-dimensional image formed on the oversampling filter OSF does not include the spatial frequency of the pixel structure of the two-dimensional image forming apparatus 30 but includes all of the spatial frequencies of the two-dimensional image produced by the two-dimensional image forming apparatus 30.

The spatial frequencies of the conjugate image of the two-dimensional image produced by the two-dimensional image forming apparatus 30 which include all pixel information of the two-dimensional image are emitted along a plurality of diffraction angles corresponding to different diffraction orders produced by the aperture regions 34 of the oversampling filter OSF to produce a number of Fourier transform images corresponding to the number of diffraction orders, that is, totaling M×N diffraction orders. The Fourier transform images produced in this manner are formed on the spatial filter SF. Since the third lens $L_3$ produces Fourier transform images of spatial frequencies of the conjugate image of the two-dimensional image emitted along the diffraction angles corresponding to the diffraction orders, the Fourier transform images can be obtained in a spatially high intensity.

Here, where the wavelength of light or illuminating light emitted from the light source 10 is represented by $\lambda$ (mm), the spatial frequency of the conjugate image of the two-dimensional image produced by the second lens $L_2$ by $\nu$ (lp/mm) and the focal distance of the third lens $L_3$ by $f_3$ (mm), light (Fourier transform image) having the spatial frequency $\nu$ appears at a position of a distance $Y_1$ (mm) from the optical axis represented by the expression (1) given hereinbelow on the rear side focal plane of the third lens $L_3$.

Figure 15:
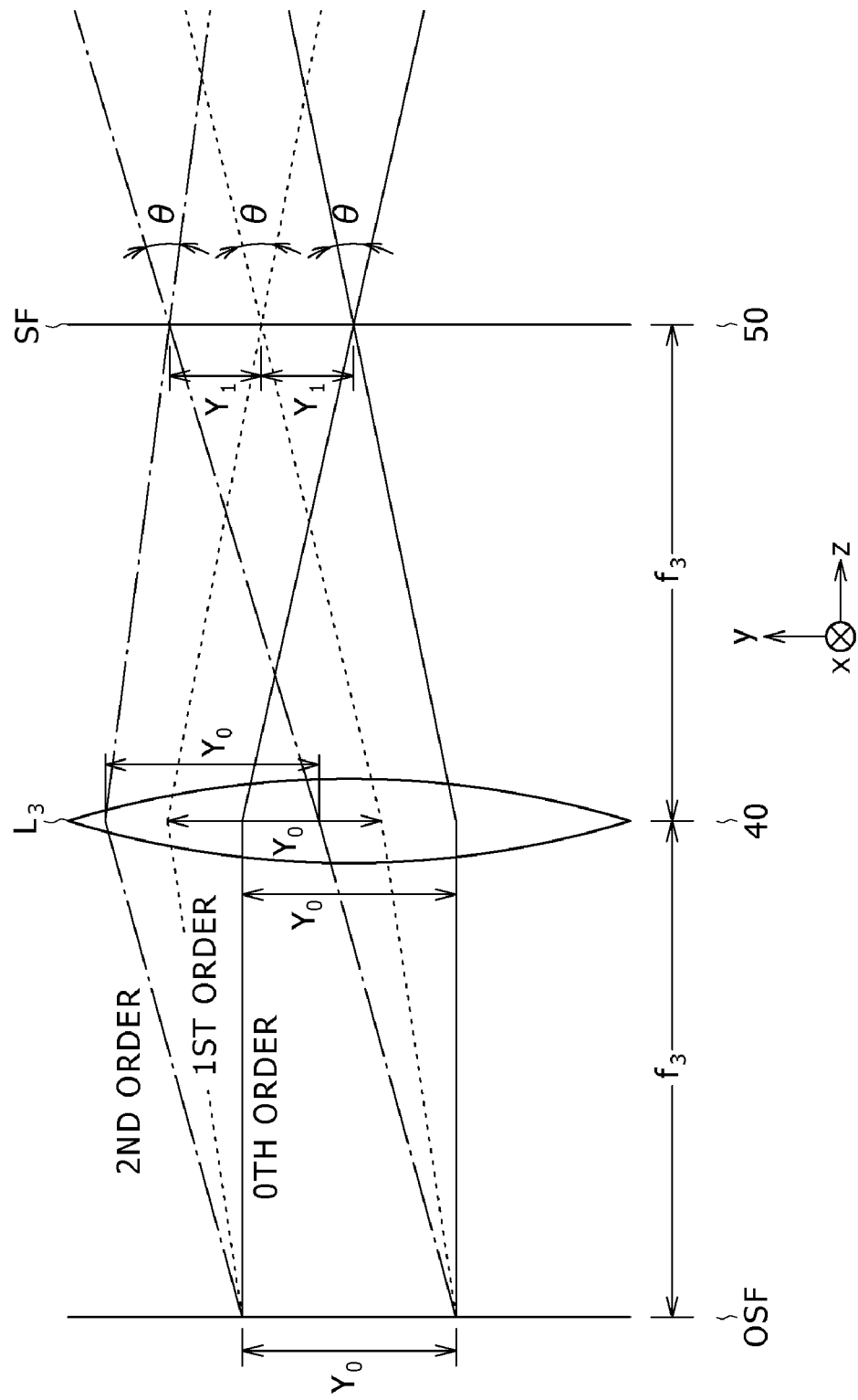
FIG. 15 is a schematic view illustrating condensation of light beams by a Fourier transform image forming section or third lens and image formation by a Fourier transform image selection section or spatial filter in the image display apparatus of the example 3.

The light condensing state of the third lens $L_3$ is schematically illustrated in FIG. 15. It is to be noted that, in FIG. 15, "$Y_0$" denotes the length in the y axis direction of the conjugate image of the two-dimensional image produced by the second lens $L_2$; and "$Y_1$" the distance in the y axis direction of a Fourier transform image on the spatial filter SF based on the conjugate image of the two-dimensional image produced by the second lens $L_2$. Further, the diffraction light beam of the 0th order is indicated by solid lines; the first order diffraction light beam by broken lines; and the second order diffraction light beam by alternate long and short dash lines. The diffraction light beams of the different diffraction orders, or in other words, a number of Fourier transform images corresponding to the number of diffraction orders, are condensed at different apertures 51 on the spatial filter SF by the third lens $L_3$ (refer also to FIG. 13). The number of apertures 51 is M×N=121 as described hereinabove. The condensed light angle $\theta$ on the spatial filter SF, that is, the diversion angle after emitted from the spatial filter SF, is equal among $P_{OSF} \times Q_{OSF}$ aperture regions 34 with regard to a Fourier transform image or diffraction light beam of the same diffraction order. On the spatial filter SF, the distance between Fourier transform images of adjacent diffraction order numbers can be determined from the expression (1) given hereinbelow. From the expression (1), the position of a Fourier transform image, that is, the formation position on the spatial filter SF, can be varied by arbitrarily selecting the focal distance $f_3$ of the third lens $L_3$. It is to be noted that, in an expression (2) given below, "w" represents the length in the Y direction of the conjugate image of the two-dimensional image projected on the oversampling filter OSF, and can be varied by arbitrarily selecting the focal distance $f_2$ of the second lens $L_2$.

$$Y_1 = f_3 \cdot \lambda \cdot \nu \quad (1)$$

$$\theta = 2 \times \arctan(w/2f_3) \quad (2)$$

In order for the third lens $L_3$ to pass spatial frequencies of the conjugate image of the two-dimensional image emitted from each aperture region 34 along a plurality of diffraction angles corresponding to different diffraction orders therethrough, it is necessary to select the numerical aperture NA of the third lens $L_3$ in response to the diffraction order to be utilized, and it is requested for the numerical aperture of all lenses succeeding the third lens $L_3$ to be higher than the numerical aperture NA of the third lens $L_3$ irrespective of the focal distance.

The size of the apertures 51 may have a value equal to that of $Y_1$ in the expression (1). As an example, if the wavelength $\lambda$ of the illuminating light is 532 nm, the focal distance $f_3$ of the third lens $L_3$ is 50 mm, and the size of the aperture regions 34 of the oversampling filter OSF is approximately 13 to 14 μm, then the value of $Y_1$ becomes approximately 2 mm. This signifies that Fourier transform images corresponding to different diffraction orders can be obtained in a high density corresponding to the distance of approximately 2 mm on the spatial filter SF. In other words, 11×11=121 Fourier transform images can be obtained at distances of approximately 2 mm in both of the X and Y directions on the spatial filter SF.

Here, the spatial frequency $\nu$ of the conjugate image of the two-dimensional image is a frequency having a period formed from two successive ones of the aperture regions 34 of the oversampling filter OSF in the maximum because the oversampling filter OSF is formed from $P_{OSF} \times Q_{OSF}$ aperture regions 34.

The two-dimensional image forming apparatus 30 which is in a state wherein the spatial frequency of the conjugate image of the two-dimensional image is lowest has a schematic front elevation similar to that shown in FIG. 7A. In this instance, the light intensity of the Fourier transform image formed by the third lens $L_3$ has a frequency characteristic similar to that shown in FIG. 8A. Meanwhile, the two-dimensional image forming apparatus 30 which is in another state wherein the spatial frequency of the conjugate image of the two-dimensional image is highest has a schematic front elevation similar to that shown in FIG. 7B. In this instance, the light intensity of the Fourier transform image formed by the third lens $L_3$ has a frequency characteristic similar to that shown in FIG. 8B. Further, the Fourier transform image on the spatial filter SF or xy plane exhibits distributions similar to those shown in FIGS. 9A, 9B and 9C. Further, the apertures 51 of the spatial filter SF may have a planar shape similar to that in the example 1.

Incidentally, the state wherein the spatial frequency is highest corresponds to a case wherein all pixels display black and white alternately as seen in FIG. 7B. Meanwhile, the spatial frequency of the aperture region structure of the oversampling filter OSF and the spatial frequency of the conjugate image of the two-dimensional image have such a relationship as described below. In particular, if it is assumed that the numerical aperture of an aperture region 34 is 100%, then the highest spatial frequency of the conjugate image of the two-dimensional image is ½ the spatial frequency of the aperture region structure. On the other hand, if the numerical aperture of an aperture region 34 occupies a certain rate lower than 100%, then the highest spatial frequency of the conjugate image of the two-dimensional image is lower than ½ the spatial frequency of the aperture region structure. Therefore, all spatial frequencies of the two-dimensional image appear within a region up to a position equal to one half the distance between periodical patterns originating from the aperture region structure appearing on the spatial filter SF. From this, all apertures 51 can be disposed without causing spatial interference with each other. In particular, for example, to the (3, 2)th aperture 51, a Fourier transform image having a diffraction order number of $m_0=3$ and $n_0=2$ comes in, but the Fourier transform image having the diffraction order number of $m_0=3$ and $n_0=2$ does not enter the other apertures 51. Consequently, while, on the spatial filter SF which has the apertures 51 which are independent of each other for each Fourier transform image, spatial frequencies of the conjugate image of the two-dimensional image exist in a Fourier transform image positioned in one aperture 51, the spatial frequencies of the conjugate image of the two-dimensional image do not become missing by a spatial restriction of the apertures 51. It is to be noted that the spatial frequency of the aperture region structure can be regarded as a carrier frequency, and the spatial frequencies of the conjugate image of the two-dimensional image correspond to image information whose carrier frequency is the spatial frequency of the aperture region structure.

Then, on the spatial filter SF, opening and closing control of the aperture 51 is carried out in order to control individual passage/interception of M×N Fourier transform images. If the spatial filter SF is formed, for example, from a liquid crystal display apparatus, then by causing each liquid crystal cell to operate as a kind of an optical shutter or light value, opening and closing control of the aperture 51 can be carried out.

Where the brightness of an image obtained differs depending upon the diffraction order produced from an aperture region 34, a light attenuating filter for attenuating a bright image with reference to the darkest image may be disposed on the rear side focal plane of the fifth lens $L_5$.

An apparatus formed by removing the oversampling filter OSF from the image display apparatus of the example 3 is assumed for comparison. It is to be noted that such an image display apparatus as just described is hereinafter referred to as comparison image display apparatus for the convenience of description. The image display apparatus of the example 3 and the comparison image display apparatus are described in contrast below.

It is to be noted that the wavelength of light or illuminating light emitted from the light source 10 is represented by $\lambda$ (mm), and the spatial frequency of the two-dimensional image produced by the two-dimensional image forming apparatus 30 by $v_0$ (lp/mm).

Incidentally, the projection angle or view angle $\theta$ is a significant parameter for determining the region of a stereoscopic image to be observed. Meanwhile, the position and the distance $Y_1$ of Fourier transform images on the spatial filter SF are significant parameters for determining the continuity of the stereoscopic image to be displayed and the motion parallax and the scale or magnitude of the stereoscopic image to be displayed. Preferably, the value of the projection angle or view angle $\theta$ and the value of $Y_1$ corresponding to the position and the distance of the Fourier transform images on the spatial filter SF are as high as possible.

Incidentally, from the expression (1) given hereinabove, the variables which control $Y_1$ are the wavelength $\lambda$ of light or illuminating light and the focal distance $f_3$ of the third lens $L_3$ as well as the spatial frequency $v_0$ of the two-dimensional image produced by the two-dimensional image forming apparatus 30 on which the frequency is based. Here, the wavelength $\lambda$ of light or illuminating light cannot actually assume an arbitrary value because the color tone of the image is varied by the same. Besides, the wavelength of visible light ranges from approximately 400 nm to approximately 700 nm, and the variation amount is 1.75 times to the utmost and the operation region is narrow. Further, while, in order to raise the value of the spatial frequency $v_0$, it is necessary to use a finer pitch of pixels of the two-dimensional image forming apparatus 30, it is actually difficult to make the pitch of pixels of the two-dimensional image forming apparatus 30 finer. Accordingly, in order to raise the value of $Y_1$ in the expression (1), it is most realistic to increase the focal distance $f_3$ of the third lens $L_3$. However, if the focal distance $f_3$ is increased, then where the length w in the Y direction of the conjugate image of the two-dimensional image projected on the oversampling filter OSF is fixed, that is, where the focal distance $f_2$ of the second lens $L_2$ is fixed, from the expression (2), the value of the projection angle or view angle $\theta$ decreases. In other words, the expression (1) and the expression (2) do not have a relationship independent of each other, but the value of $Y_1$ and the value of the projection angle or view angle $\theta$ have a tradeoff relationship to each other.

Incidentally, in the image display apparatus 1B of the example 3, while a two-dimensional image is produced by the optical modulation section or two-dimensional image forming apparatus 30, the spatial frequency $v_0$ of the two-dimensional image has a value which depends upon the aperture structure of apertures which form the two-dimensional image forming apparatus. On the other hand, the spatial frequency $v$ of the conjugate image of the two-dimensional image relies upon the aperture region structure of the aperture regions 34 of the oversampling filter OSF, and since $P_{OSF}>P$ and $Q_{OSF}>Q$, the spatial frequency or carrier frequency of the aperture region structure of the oversampling filter OSF is higher than the spatial frequency or carrier frequency of the pixel structure or the aperture region structure of the two-dimensional image forming apparatus 30 and $v>v_0$. It is to be noted that, since the oversampling filter OSF can be fabricated, for example, by forming a grating pattern directly on a flat glass plate, the carrier frequency can be made higher if the pitch of the grating pattern is set higher, and the value of the spatial frequency $v$ of the conjugate image of the two-dimensional image produced by the oversampling filter OSF can be raised readily. Accordingly, the value of the spatial frequency $v$ can be set higher readily, and the value $Y_1$ to be determined from the expression (1) can be set higher. It is to be noted that, even if the focal distance $f_3$ of the third lens $L_3$ is set shorter, the value of $Y_1$ determined from the expression (1) can be made higher. On the other hand, since the focal distance $f_3$ of the third lens $L_3$ can be set shorter, the value of the view angle determined from the expression (2) can be set higher. Or, by appropriately setting the focal distance $f_2$ of the second lens $L_2$, the value of w can be set higher, and as a result, the value of the view angle $\theta$ to be determined from the expression (2) can be set higher.

In the image display apparatus 1B of the example 3, the value of $Y_1$ and the value of the projection angle or view angle $\theta$ can be controlled independently of each other in this manner. Accordingly, the scale or magnitude of the stereoscopic image to be displayed can be set higher while the region of the stereoscopic image to be observed is expanded. Besides, in this instance, there is no necessity to vary the wavelength of light from the light source and no variation of the color tone is caused by the wavelength variation. Further, essentially there is no necessity to vary the focal distance $f_3$ of the third lens $L_3$.

For example, it is assumed that, in the comparison image display apparatus, the two-dimensional image forming apparatus 30 has a size of 0.7 inches diagonally and has apertures (P×Q=1,024×768) of a square planar shape. Further, where the distance between the apertures is 14 μm and the wavelength λ of light emitted from the light source 10 is 532 nm and besides $f_2=f_3=f_4=f_5=50$ mm is satisfied, the distance between conjugate images on the conjugate plane of the spatial filter SF after the light passes the fifth lens $L_5$ is 1.9 mm; the view angle $\theta_Y$ in the Y direction of the two-dimensional image forming apparatus 30 is 16.1 degrees; and the view angle $\theta_X$ corresponding to the X direction of the two-dimensional image forming apparatus 30 is 12.1 degrees.

Further, in the comparison image display apparatus, if the focal distance $f_2$ of the second lens $L_2$ is set to 100 mm in order to increase the magnitude of the conjugate image of the two-dimensional image to be formed by the second lens $L_2$, then the view angle $\theta_Y$ becomes 31.5 degrees and the view angle $\theta_X$ becomes 23.9 degrees, and consequently, the view angle can be increased. However, since the size of the conjugate image of the two-dimensional image increases to twice, the value of v decreases to one half, and the distance between conjugate images on the conjugate face of the spatial filter SF after the light passes the fifth lens $L_5$ becomes 0.95 mm. In this instance, although a group of light beams having a spatially higher density than in an usual case is produced, since the production area per one of the light beams of the light beam group becomes ¼, the size of the observation image becomes ¼.

Therefore, if the oversampling filter OSF formed from a diffraction filter including square gratings having a distance (=$Y_0$) of 14 μm is disposed, then new spatial sampling of the conjugate image of the two-dimensional image enlarged to twice is carried out with a spatial frequency similar to that of the original pixel distance of the two-dimensional image forming apparatus 30. Consequently, the view angle $\theta_Y$ becomes 31.5 degrees and the view angle $\theta_X$ becomes 23.9 degrees, and consequently, the view angle can be increased. Further, the distance between conjugate images on the conjugate plane of the spatial filter SF after the light passes the fifth lens $L_5$ can be made 1.9 mm. In other words, in this instance, a group of light beams having a higher spatial density than in a normal case is produced, and besides the production area per one of the light beams of the light beam group does not vary and also the size of the observation image does not vary. The oversampling filter OSF can be produced by drawing gratings arrayed in a two-dimensional matrix of the pitch of 14 μm on a flat glass plate.

As described above, with the image display apparatus 1B of the example 3, spatial frequencies of a two-dimensional image produced by the optical modulation section or two-dimensional image forming apparatus 30 are emitted along a plurality of diffraction angles corresponding to different diffraction orders, and only a Fourier transform image corresponding to a predetermined diffraction order is selected by the image limiting and production section 32. Then, a conjugate image of the two-dimensional image produced by the second lens $L_2$ is Fourier transformed by the Fourier transform image forming section 40 or third lens $L_3$ to obtain a Fourier transform image. Then, the Fourier transform image is spatially and temporally filtered by the Fourier transform image selection section 50 or spatial filter SF, and a conjugate image CI of the filtered Fourier transform image is formed. Consequently, a group of beams of light can be produced and scattered in a state wherein they are distributed in a plurality of directions in a spatially high density without increasing the size of the entire image display apparatus. Further, since the two-dimensional image forming apparatus 30 and the oversampling filter OSF are provided, it becomes possible to increase the scale or magnitude of a stereoscopic image to be displayed while the region of the stereoscopic image to be observed is expanded. Besides, the individual light beams which are component of the light beam group can be temporally and spatially controlled independent of each other. Consequently, a stereoscopic image formed from beams of light proximate in quality to those of a physical solid in the real world can be obtained.

Further, with the image display apparatus 1B of the example 3, since the light beam reproduction method is utilized, a stereoscopic image which satisfies such visual sensation functions as focal adjustment, convergence and motion parallax can be provided. Further, with the image display apparatus 1B of the example 3, since high order diffraction light beams are utilized effectively, a number of light beams, which can be controlled by a single image output device, that is, the two-dimensional image forming apparatus 30, and are a kind of copy of two-dimensional image, equal to the number of diffraction orders which is M×N, can be obtained, when compared with the conventional image outputting technique. Besides, with the image display apparatus 1B of the example 3, since filtering is carried out spatially and temporally, a temporal characteristic of the image display apparatus can be converted into a spatial characteristic of the image display apparatus. Further, a stereoscopic image can be obtained without using a diffusion screen or the like. Furthermore, a stereoscopic image which looks appropriately from whichever direction it is observed can be provided. Further, since a group of light beams can be produced and scattered in a spatially high density, a spatial image of a high definition near to a visual confirmation limit can be provided.

Furthermore, with the image display apparatus 1B of the example 3, the size and the projection angle or view angle of the conjugate image on the conjugate plane of the spatial filter SF after the light passes the fifth lens can be controlled independently of each other. Accordingly, it becomes possible to increase the scale or magnitude of a stereoscopic image to be displayed while the region of the stereoscopic image to be observed is expanded.

Example 4

The fourth embodiment relates to image display methods according to the fourth and sixth embodiments of the present invention and more particularly to display methods of a three-dimensional image. The example 4 further relates to image display apparatus according to the fourth and sixth embodiments of the present invention and more particularly to three-dimensional image display apparatus. The image display apparatus of the example 4 is schematically shown in FIG. 16.

The image display apparatus of the example 4 includes an optical modulation section 130 different from the optical modulation section of the liquid crystal display apparatus of the example 3. In particular, the optical modulation section 130 includes a one-dimensional spatial optical modulator, which particularly is a diffraction grating-optical modulation apparatus 201, for producing a one-dimensional image divided into P image portions, for example, into 1,920 image portions. The optical modulation section 130 further includes a scanning optical system, which particularly is a scanning mirror 205, for two-dimensionally developing or scanning the one-dimensional image produced by the one-dimensional spatial optical modulator or diffraction grating-optical modulation apparatus 201 and divided into P image portions to form a two-dimensional image divided into P×Q image portions. The optical modulation section 130 further includes a grating filter or diffraction grating filter 132 disposed on a production plane of the two-dimensional image for emitting spatial frequencies of the produced two-dimensional image along a plurality of diffraction angles corresponding to different diffraction orders, particularly corresponding to totaling $M_0 \times N_0$ diffraction orders. Here, $M_0 \times N_0$ diffraction light beams are produced by the grating filter 132 for each of the image portions of the two-dimensional image produced by the scanning optical system or scanning mirror 205 and formed from P×Q image portions. It is to be noted that the grating filter 132 may be formed from an amplitude grating or a phase grating.

Or where the image display apparatus of the example 4 of the present invention is described in connection with components of the image display apparatus according to the sixth embodiment of the present invention, the image display apparatus includes a light source 10 and an optical system. The optical system includes:

(A) a two-dimensional image forming apparatus 130 including a one-dimensional spatial optical modulator, particularly a diffraction grating-optical modulation apparatus 201, configured to produce a one-dimensional image, a scanning optical system, particularly a scanning mirror 205, configured to two-dimensionally develop the one-dimensional image produced by the one-dimensional spatial optical modulator to produce a two-dimensional image, and a diffraction light production section, particularly a grating filter 132, disposed on a production plane of the two-dimensional image and configured to produce a plurality of diffraction light beams of different diffraction orders for each of the pixels 31;

(B) a first lens $L_1$ having a front side focal plane on which the diffraction light production section, particularly the grating filter 132, is disposed;

(C) a scattering diffraction limiting aperture section 33 disposed on a rear side focal plane of the first lens $L_1$ and configured to pass only a diffraction light beam of a predetermined diffraction order, for example, a Fourier transform image corresponding to the first order diffraction whose carrier frequency is the 0th order diffraction of a plane wave component, therethrough;

(D) a second lens $L_2$ having a front side focal plane on which the scattering diffraction limiting aperture section 33 is disposed;

(E) an oversampling filter OSF disposed on a rear side focal plane of the second lens $L_2$ and having $P_{OSF} \times Q_{OSF}$ aperture regions arrayed in a two-dimensional matrix along an X direction and a Y direction, the oversampling filter OSF being configured to produce, based on a real image of the two-dimensional image produced by the second lens $L_2$, for each of the aperture regions, totaling M×N diffraction light beams arranged such that M diffraction light beams from the mth to the m'th diffraction orders are arranged along the X direction and N diffraction light beams from the nth to the n'th diffraction orders are disposed along the Y direction, $P_{OSF} \times Q_{OSF}$ being arbitrary positive integers having a relationship of $P_{OSF} > Q_{OSF}$, m and m' being integers, M being a positive integer, n and n' being integers, N being a positive integer;

(F) a third lens $L_3$ having a front side focal plane on which the oversampling filter OSF is disposed;

(G) a spatial filter SF disposed on a rear side focal plane of the third lens $L_3$ and having M×N spatial filters SF arranged such that M apertures 51 are arranged along the X direction and N apertures 51 are arranged along the Y direction and controllable between open and closed states;

(H) a fourth lens $L_4$ having a front side focal plane on which the spatial filter SF is disposed; and (I) a fifth lens $L_5$ having a front side focus positioned at a rear side focus of the fourth lens $L_4$.

The optical modulation section or two-dimensional image forming apparatus 130 including the diffraction grating-optical modulation apparatus has a configuration similar to that of the optical modulation section 130 of the example 2 described hereinabove with reference to FIG. 11, and therefore, overlapping description of the same is omitted herein. It is to be noted, however, that the grating filter 132 produces $M_0 \times N_0$ diffraction light beams for each image portion of a two-dimensional image which is formed from P×Q image portions.

The one-dimensional spatial optical modulator or diffraction grating-optical modulation apparatus 201 and the diffraction grating-optical modulation elements 210 are hereinafter described.

Except the foregoing, the configuration and structure of the image display apparatus of the example 4 can be made similar to those of the image display apparatus of the example 3 described hereinabove, and therefore, detailed description of them is omitted herein.

Example 5

Figure 17:
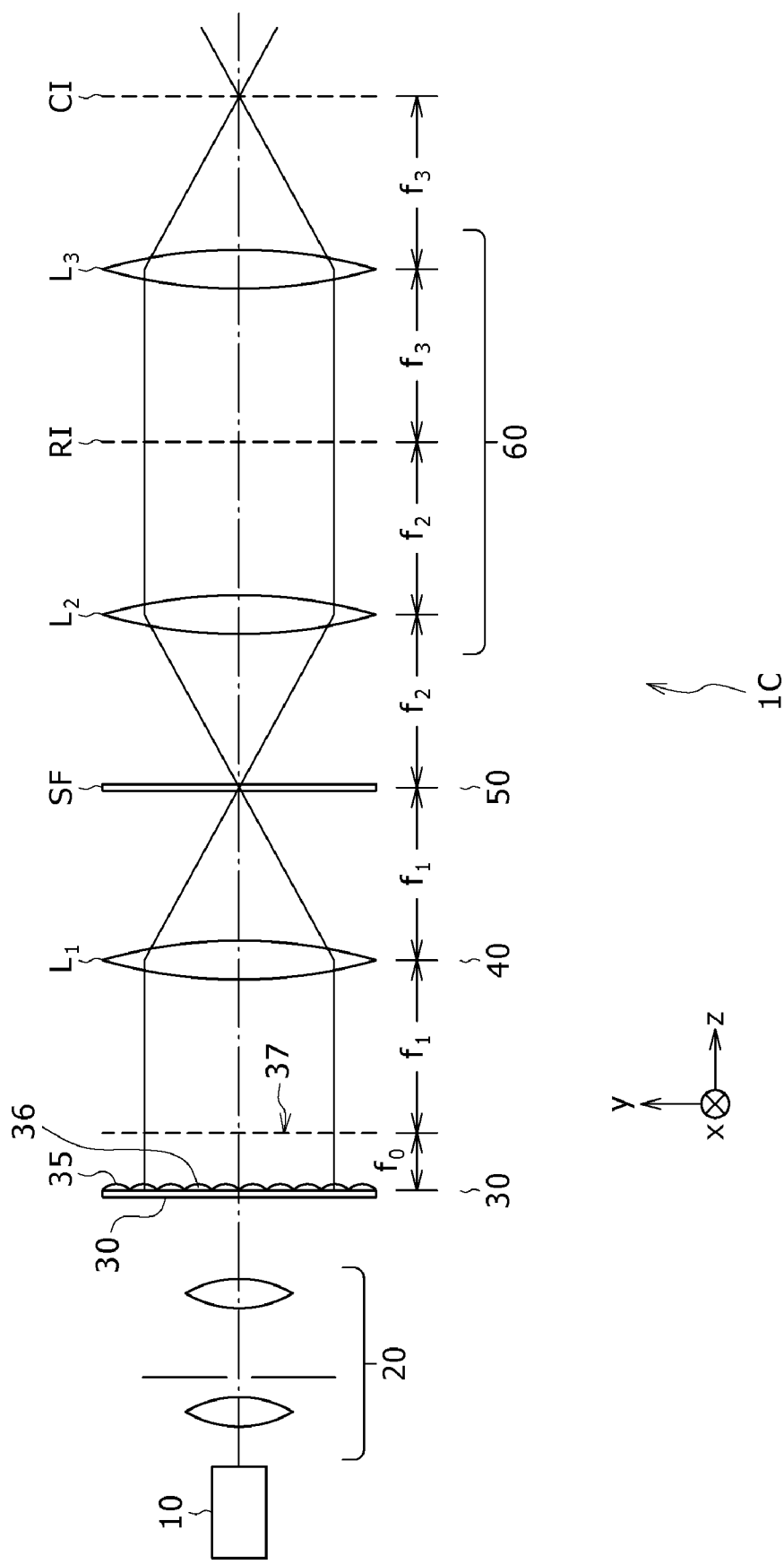
FIG. 17 is a schematic view showing an image display apparatus according to an example 5 on a yz plane.
Figure 18:
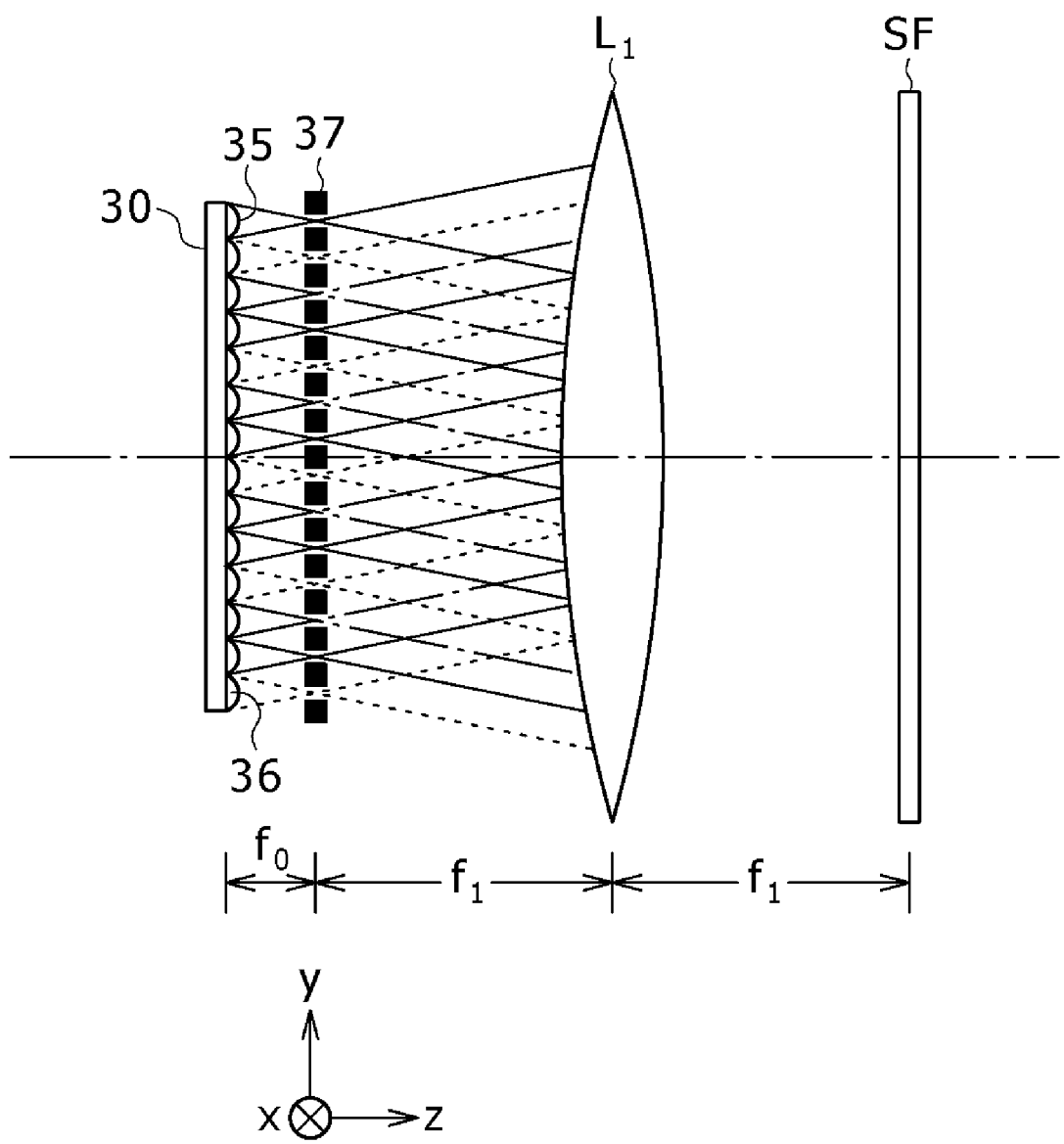
FIG. 18 is a schematic view illustrating operation of an optical apparatus of the image display apparatus of the example 5.
Figure 19:
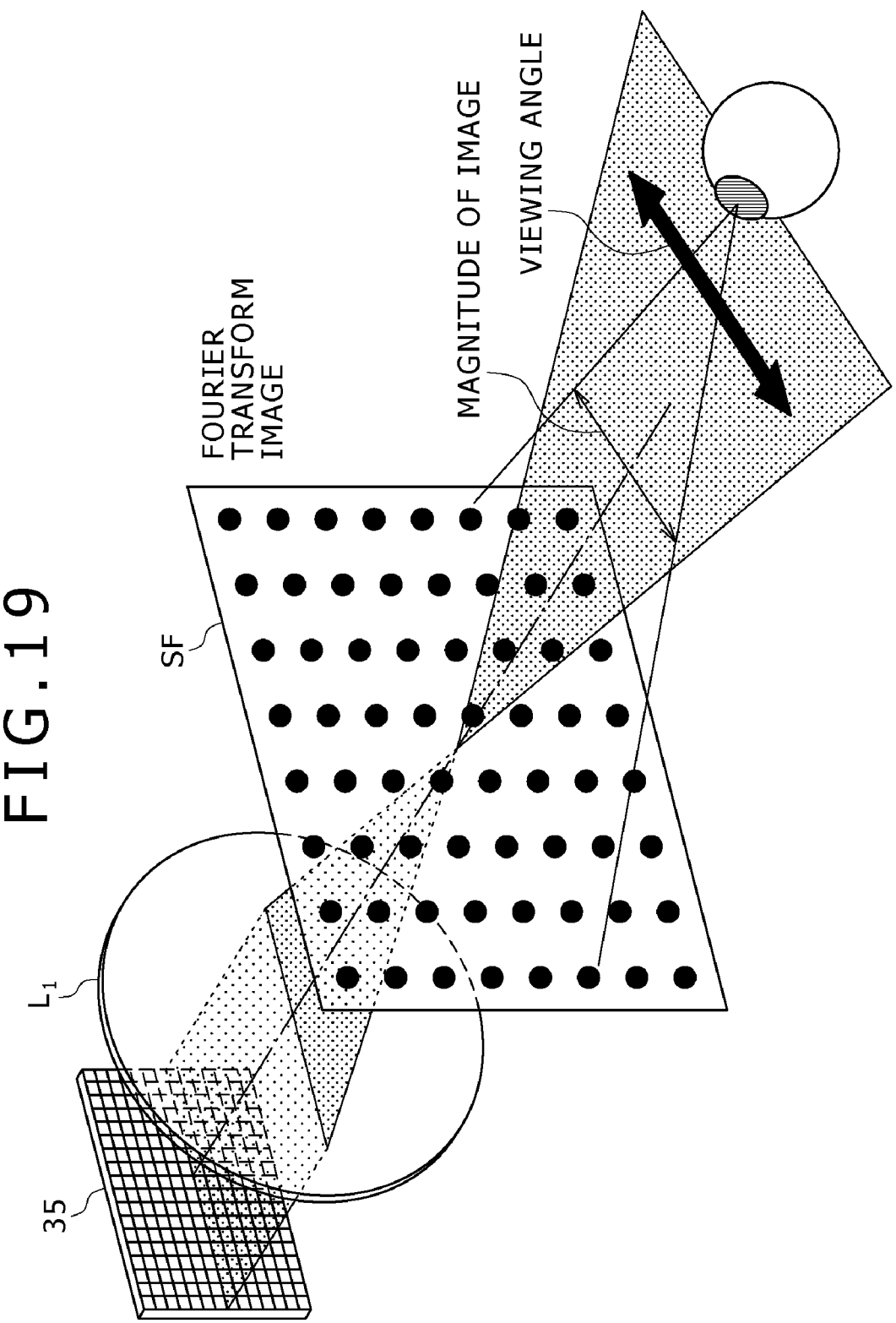
FIG. 19 is a schematic view showing the image display apparatus of the example 5 as viewed in an oblique direction.
Figure 20:
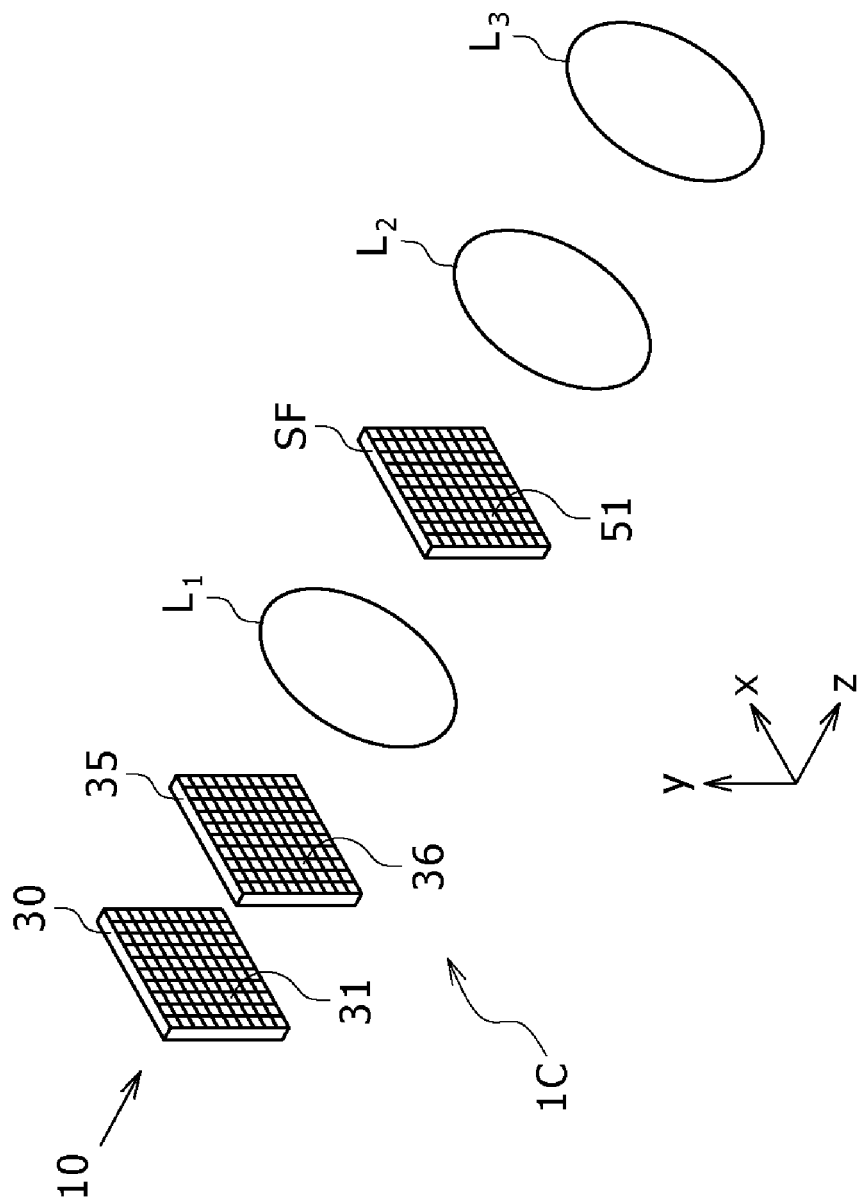
FIG. 20 is a schematic perspective view illustrating arrangement of components of the image display apparatus of the example 5.

The example 5 relates to image display methods according to the seventh and eighth embodiments of the present invention and more particularly to display methods of a three-dimensional image. The example 5 further relates to image display apparatus according to the seventh and eighth embodiments of the present invention and more particularly to three-dimensional image display apparatus. FIGS. 17, 18, 19 and 20 schematically show the image display apparatus according to the example 5 which displays a monochromatic image. It is to be noted that, in FIG. 17, the optical axis is set to a z axis, and Cartesian coordinates in a plane perpendicular to the z axis are taken on an x axis and a y axis. Further, the direction parallel to the x axis is represented as X direction and the direction parallel to the y axis is represented as Y direction. The X direction is taken, for example, as a horizontal direction of the three-dimensional image display apparatus, and the Y direction is taken, for example, as a vertical direction of the three-dimensional image display apparatus. Here, FIG. 17 is a schematic view showing the image display apparatus of the example 5 on the yz plane. Also where the image display apparatus of the example 5 is viewed on the xz plane, it exhibits a schematic view substantially similar to that of FIG. 17. Meanwhile, FIG. 19 schematically shows the image display apparatus of the example 5 as viewed in an oblique direction, and FIG. 20 schematically illustrates an arrangement state of components of the image display apparatus of the example 5.

Meanwhile, also in the image display apparatus 1C of the example 5, the image display apparatus itself which includes such components as seen in FIGS. 17, 18, 19 and 20 can produce and form a greater amount of light beams having a higher spatial density when compared with the conventional apparatus. The image display apparatus 1C of the example 5 by itself has functions equivalent to those of the apparatus shown in FIG. 49 which includes a large number of, M×N, projector units 301 disposed parallelly in a horizontal direction and a vertical direction. It is to be noted that, for example, where it is intended to employ a multi-unit system, only it is necessary to dispose a number of image display apparatus 1C of the example 5 equal to the number of divisional three-dimensional images as seen from FIG. 48. In FIG. 48, the image display apparatus shown includes 4×4=16 image display apparatus 1C of the example 5.

Where the image display apparatus 1C of the example 5 of the present invention is described in connection with components of the image display apparatus according to the seventh embodiment of the present invention, the image display apparatus 1C includes a light source 10 and an optical system. The optical system includes:

(A) a two-dimensional image forming apparatus 30 having a plurality of pixels 31 and configured to produce a two-dimensional image based on light from the light source 10;

(B) an optical apparatus 35 including a plurality of optical elements 36 arrayed in a two-dimensional matrix and having optical power for refracting incoming light to condense the light to a substantially one point and having a function as a phase grating for modulating the phase of light to pass therethrough, the optical apparatus emitting spatial frequencies of the incoming two-dimensional image from the two-dimensional image forming apparatus 30 along a plurality of diffraction angles corresponding to totaling M×N different diffraction orders;

(C) a Fourier transform image forming section 40 configured to Fourier transform spatial frequencies of the two-dimensional image emitted from the optical apparatus 35 to produce a number of Fourier transform images corresponding to the number of, totaling M×N, diffraction orders;

(D) a Fourier transform image selection section 50 configured to select a Fourier transform image corresponding to a desired diffraction order from among the number of, totaling M×N, Fourier transform images corresponding to the number of diffraction orders; and (E) a conjugate image forming section 60 configured to form a conjugate image of the Fourier transform image selected by the Fourier transform image selection section 50.

Further, the conjugate image forming section 60 includes an inverse Fourier transform section, particularly a second lens $L_2$ hereinafter described, configured to inverse Fourier transform the Fourier transform image selected by the Fourier transform image selection section 50 to form a real image of the two-dimensional image produced by the two-dimensional image forming apparatus 30. Further, the Fourier transform image forming section 40 is formed from a lens, and a focus, in the example, the rear side focus, of the optical elements 36 which compose the optical apparatus 35 is disposed on the front side focal plane of the lens while the Fourier transform image selection section 50 is disposed on the rear side focal plane of the lens. The Fourier transform image selection section 50 has a number of apertures 51 corresponding to a plurality of, totaling M×N, diffraction orders.

Here, the spatial frequency of the two-dimensional image corresponds to image information whose carrier frequency is the spatial frequency of the pixel structure of the two-dimensional image forming apparatus 30.

Where the image display apparatus 1C of the example 5 of the present invention is described in connection with components of the image display apparatus according to the eighth embodiment of the present invention, the image display apparatus 1C of the example 5 includes a light source 10 and an optical system. The optical system includes:

(A) a two-dimensional image forming apparatus 30 having a plurality of, P×Q, pixels 31 and configured to produce a two-dimensional image based on light from the light source 10;

(B) an optical apparatus 35 including $P_{OD} \times Q_{OD}$ optical elements 36 arrayed in a two-dimensional matrix along an X direction and a Y direction and having optical power of refracting light incoming thereto to condense the light to a substantially one point and having a function as a phase grating for modulating the phase of light to pass therethrough, the optical apparatus outputting spatial frequencies of the incoming two-dimensional image along a plurality of, totaling M×N, diffraction angles corresponding to totaling M×N different diffraction orders;

(C) a first lens, more particularly, in the example 5, a convex lens, $L_1$ having a front side focal plane on which focuses of the optical elements 36 of the optical apparatus 35 are positioned;

(D) a spatial filter SF disposed on a rear side focal plane of the first lens $L_1$ and having totaling M×N apertures 51 arranged such that M apertures 51 are arranged along the X direction and N apertures 51 are arranged along the Y direction and controllable between open and closed states;

(E) a second lens, more particularly, in the fifth embodiment, a convex lens, $L_2$ having a front side focal plane on which the spatial filter SF is positioned; and (F) a third lens, more particularly, in the example 5, a convex lens, $L_3$ having a front side focus positioned at a rear side focus of the second lens $L_2$.

Here, in the example 5 and the examples 6 and 11 hereinafter described, the optical apparatus 35 produces totaling M×N diffraction light beams including M diffraction light beams from the mth to m'th orders along the X direction and N diffraction light beams from the nth to n'th orders along the Y direction. Here, m and m' are integers and M is a positive integer, and n and n' are integers and N is a positive integer. Further, $P_{OD}=P=1,024$, $Q_{OD}=Q=768$, m=−5, m'=5, M=m'−m+1=11, n=−5, n'=5, and N=n'−n+1=11. However, the values of m, m', M, n, n' and N are not limited to the specific values given above. If the components of the image display apparatus of the seventh embodiment of the present invention and the components of the image display apparatus according to the eighth embodiment of the present invention are compared with each other, then the Fourier transform image forming section 40 corresponds to the first lens $L_1$; the Fourier transform image selection section 50 corresponds to the spatial filter SF; the inverse Fourier transform section corresponds to the first lens $L_1$; and the conjugate image forming section 60 corresponds to the second lens $L_2$ and the third lens $L_3$. Therefore, the following description is given based on the terms of the two-dimensional image forming apparatus 30, first lens $L_1$, spatial filter SF, second lens $L_2$ and third lens $L_3$ for the convenience of description.

An illuminating optical system 20 for shaping a beam of light emitted from the light source 10 is disposed between the light source 10 and the two-dimensional image forming apparatus 30 similarly as in the example 1. The two-dimensional image forming apparatus 30 is illuminated with the light emitted from the light source 10 and passing through the illuminating optical system 20, that is, with illuminating light. The illuminating optical system 20 is hereinafter described.

The two-dimensional image forming apparatus 30 has a plurality of pixels 31 arrayed two-dimensionally, and each of the pixels 31 has an aperture. In particular, the two-dimensional optical image forming apparatus 30 is particularly formed from a liquid crystal display apparatus of the transmission type having P×Q pixels 31 arrayed two-dimensionally, that is, arrayed in a two-dimensional matrix along the X direction and the Y direction, and each of the pixels 31 has an aperture.

One pixel 31 is formed from a region in which a transparent first electrode and a transparent second electrode overlap with each other and which includes a liquid crystal cell similarly as in the example 1. Then, the liquid crystal cell operates as a kind of optical shutter or light valve, that is, the light transmission factor of each pixel 31 is controlled, to control the light transmission factor of the light emitted from the light source 10, and as a whole, a two-dimensional image is obtained. A rectangular aperture is provided in the overlapping region of the transparent first and second electrodes, and the light emitted from the light source 10 passes through such apertures to produce a two-dimensional image.

The optical apparatus 35 is disposed rearwardly adjacent the two-dimensional image forming apparatus 30, for example, in close contact with or with some gap left from the two-dimensional image forming apparatus 30. It is to be noted that, where the optical apparatus 35 is disposed adjacent the two-dimensional image forming apparatus 30, the influence of a diffraction phenomenon arising from light passing through the apertures of the pixels 31 which form the two-dimensional image forming apparatus 30 can be ignored. Here, in the example 5, the planar shape of optical elements 36 which form the optical apparatus 35 is a rectangular shape similar to that of the apertures of the corresponding pixels 31, and each of the optical elements 36 is formed from a grating element of the refraction type having positive optical power, particularly, a convex lens having a focal length $f_0$. Further, the optical apparatus 35 is formed from a kind of microlens array and made of glass by a publicly known method of producing a microlens array.

The optical apparatus 35 functions as a phase grating. In particular, in the case of a two-dimensional image produced by the two-dimensional image forming apparatus 30, light beams emitted from the pixels 31 (which can be regarded as parallel light beams) enter corresponding ones of the optical elements 36 of the optical apparatus 35 disposed adjacent the two-dimensional image forming apparatus 30. Then, the light beams entering the optical elements 36 are refracted and condensed each to a substantially one point at the distance $f_0$ and further advance rearwardly from the points. If such a state as illustrated in FIG. 17 is viewed from another point of view, then it is possible to consider that rectangular aperture areas which are a kind of pinhole corresponding to the optical elements 36 and light beams emitted from the optical elements 36 pass through such virtual aperture regions 37 as just mentioned. As a result, a phenomenon equivalent to occurrence of Fraunhofer diffraction occurs, and M×N=121 diffraction light beams are produced by the optical elements 36 corresponding to the pixels 31, or more particularly by the virtual aperture regions 37 corresponding to the optical elements 36. In other words, since the number of the pixels 31 and the optical elements 36 is P×Q=$P_{OD}$×$Q_{OD}$, also it is considered that totaling $P_{OD}$×$Q_{OD}$×M×N diffraction light beams are produced by the optical apparatus 35. Then, spatial frequencies of the two-dimensional image are emitted from the optical apparatus 35 along a plurality of diffraction angles corresponding to different diffraction orders, totaling M×N diffraction orders, produced from the optical elements 36. It is to be noted that the diffraction angle differs also depending upon the spatial frequency of the two-dimensional image. While the value of the focal distance $f_0$ can be basically set to an arbitrary value, the large number of optical elements 36 which form the optical apparatus 35 have the same focal distance $f_0$. While light beams emitted from the optical elements 36 propagate at an angle which depends upon the numerical aperture of the optical elements 36 as seen in FIG. 18, a situation that the propagating light beams spread and besides substantially no loss occurs with the light amount can be obtained. Here, where the array pitch or magnitude of the optical elements 36 is represented by $d_0$, the width D of light condensed by an optical element 36 of the size $d_0$ and the focal distance $f_0$ can be represented by $$D=2.44\lambda/(\sin(\arctan(d_0/2f_0)))$$

From this, although the optical numeral aperture can be represented by $D^2/d_0^2$ by using the optical elements 36, light amount loss by the decrease of the numerical aperture does not occur.

Further, the rear side focus of the optical elements 36 which form the optical apparatus 35 and has the focal distance $f_0$ is positioned on the front side focal plane, that is, the focal plane on the light source side, of the first lens $L_1$ having the focal distance $f_1$. The spatial filter SF is disposed on the rear side focal plane, that is, the focal plane on the observer side, of the first lens $L_1$. The first lens $L_1$ produces M×N=121 Fourier transform images the number of which corresponds to the number of diffraction orders. The Fourier transform images are formed on the spatial filter SF. It is to be noted that, in FIG. 19, 64 Fourier transform images are indicated in the form of a dot for the convenience of illustration.

The spatial filter SF particularly is of the type which can be temporally controlled between open and closed states for spatially and temporally filtering Fourier transform images similarly as described hereinabove in connection with the first embodiment with reference to FIG. 4. More particularly, the spatial filter SF has a number of apertures 51 corresponding to the number of diffraction orders, particularly M×N=121 apertures 51, which can be controlled between open and closed states. In the spatial filter SF, one Fourier transform image corresponding to a desired diffraction order is selected by placing a desired one aperture 51 into an open state in synchronism with a production timing of a two-dimensional image by the two-dimensional image forming apparatus 30. More particularly, the spatial filter SF can be formed from a liquid crystal display apparatus of the transmission type or the reflection type which uses ferroelectric liquid crystal having, for example, M×N pixels or from a two-dimensional type MEMS including an apparatus wherein movable mirrors are arrayed in a two-dimensional matrix.

As described above, the conjugate image forming section 60 is particularly formed from the second lens $L_2$ and the third lens $L_3$. The second lens $L_2$ having the focal distance $f_2$ inverse Fourier transforms a Fourier transform image filtered by the spatial filter SF to form a real image RI of the two-dimensional image formed by the two-dimensional image forming apparatus 30. Further, the third lens $L_3$ having the focal distance $f_3$ forms a conjugate image CI of the Fourier transform image filtered by the spatial filter SF.

The second lens $L_2$ is disposed such that the spatial filter SF is positioned on the front side focal plane thereof and a real image RI of the two-dimensional image produced by the two-dimensional image forming apparatus 30 is disposed on the rear side focal plane thereof. The magnification of the real image RI obtained here with respect to the two-dimensional image forming apparatus 30 can be varied by arbitrarily selecting the focal distance $f_2$ of the second lens $L_2$.

On the other hand, the third lens $L_3$ is disposed such that the front side focal plane thereof coincides with the rear side focal plane of the second lens $L_2$ and a conjugate image CI of the Fourier transform image is formed on the rear side focal plane thereof. Here, since the rear side focal plane of the third lens $L_3$ is a conjugate plane of the spatial filter SF, this is equivalent to that the two-dimensional image produced by the two-dimensional image forming apparatus 30 is outputted from a portion on the spatial filter SF corresponding to one of the apertures 51. Then, the amount of light beams to be produced finally and outputted corresponds to the number obtained by multiplying the number of light beams equal to the number of pixels (P×Q) by the number of diffraction orders, particularly M×N, which pass through the optical system. Further, although the conjugate image CI of the Fourier transform image is formed on the rear side focal plane of the third lens $L_3$, it can be regarded that the light beams are disposed regularly two-dimensionally on the rear side focal plane of the third lens $L_3$. In other words, this is generally equivalent to a state that a plurality of, particularly M×N, projector units 301 shown in FIG. 49 are disposed on the rear side focal plane of the third lens $L_3$.

Figure 21:
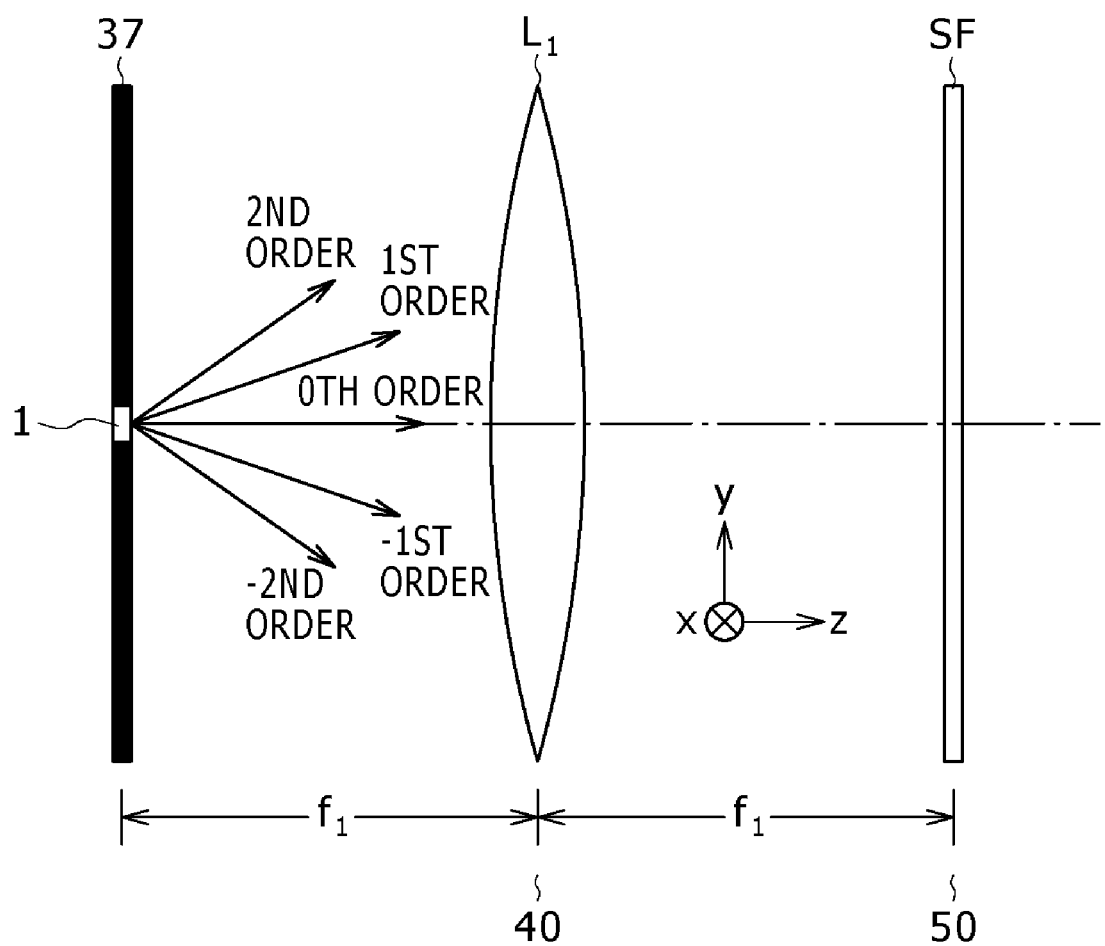
FIG. 21 is a schematic view illustrating a plurality of diffraction light beams of different diffraction orders produced by a two-dimensional image forming apparatus in the image display apparatus of the example 5.

As schematically shown in FIGS. 19 and 21, eleven diffraction light beams of the −5th to +5th orders along the X direction and eleven diffraction light beams of the −5th to +5th orders along the Y direction, totaling M×N=121 diffraction light beams, are produced by one optical element 36 of the optical device 35. It is to be noted that, while FIG. 21 schematically shows only the 0th order diffraction light beam ($n_O$=0), ±1st order diffraction light beams ($n_O$=±1) and ±2nd order diffraction light beams ($n_O$=±2) as representative diffraction light beams, actually higher order diffraction light beams are produced, and a stereoscopic image is finally formed based on the diffraction light beams. Here, each of the diffraction light beams or fluxes includes all image information of a two-dimensional image produced by the two-dimensional image forming apparatus 30, that is, information of all pixels. A plurality of light beams produced by diffraction from the same pixel on the two-dimensional image forming apparatus 30, that is, 11×11=121 light beams, all have the same image information at the same point of time. In other words, in the two-dimensional image forming apparatus 30 formed from a liquid crystal display apparatus of the transmission type having P×Q pixels 31, a two-dimensional image is produced based on the light beams from the light source 10, and spatial frequencies of the produced two-dimensional image are emitted from the optical apparatus 35 along a plurality of diffraction angles corresponding to different diffraction orders, totaling M×N diffraction orders, produced from each optical element 36. In particular, M×N=121 copies of a two-dimensional image are emitted along a plurality of diffraction angles corresponding to different diffraction orders, totaling M×N diffraction orders, from the two-dimensional image forming apparatus 30.

Then, the spatial frequencies of the two-dimensional image produced by the two-dimensional image forming apparatus 30 which include all pixel information of the two-dimensional image are Fourier transformed by the first lens $L_1$ to produce a number of Fourier transform images corresponding to the number of diffraction orders, that is, totaling M×N diffraction orders. The Fourier transform images produced in this manner are formed on the spatial filter SF. Since the first lens $L_1$ produces Fourier transform images of spatial frequencies of the two-dimensional image emitted along the diffraction angles corresponding to the diffraction orders, the Fourier transform images can be obtained in a spatially high intensity.

Here, where the wavelength of light or illuminating light emitted from the light source 10 is represented by λ (mm), the spatial frequency of the two-dimensional image produced by the two-dimensional image forming apparatus 30 by ν (lp/mm) and the focal distance of the first lens $L_1$ by $f_1$ (mm), light (Fourier transform image) having the spatial frequency ν appears at a position of a distance $Y_1$ (mm) from the optical axis on the rear side focal plane of the first lens $L_1$ based on the expression (1) given hereinabove.

The light condensing state of the first lens $L_1$ is similar to that described hereinabove with reference to a schematic view of FIG. 6, and therefore, overlapping detailed description of the same is omitted herein to avoid redundancy.

In order for the first lens $L_1$ to pass spatial frequencies of a two-dimensional image emitted along a plurality of diffraction angles corresponding to different diffraction orders therethrough, it is necessary to select the numerical aperture NA of the first lens $L_1$ in response to the diffraction order to be utilized, and it is requested for the numerical aperture of all lenses succeeding the first lens $L_1$ to be higher than the numerical aperture NA of the first lens $L_1$ irrespective of the focal distance.

The size of the apertures 51 may have a value equal to that of $Y_1$ in the expression (1). As an example, if the wavelength λ of the illuminating light is 532 nm, the focal distance $f_1$ of the first lens $L_1$ is 50 mm, and the size of one pixel 31 of the two-dimensional image forming apparatus 30 is approximately 13 to 14 μm, then the value of $Y_1$ becomes approximately 2 mm. This signifies that Fourier transform images corresponding to different diffraction orders can be obtained in a high density corresponding to the distance of approximately 2 mm on the spatial filter SF. In other words, 11×11=121 Fourier transform images can be obtained at distances of approximately 2 mm in both of the X and Y directions on the spatial filter SF.

Here, a spatial frequency ν of the two-dimensional image produced by the two-dimensional image forming apparatus 30 is a frequency having a period of two successive pixels 31 of the two-dimensional image forming apparatus 30 in the maximum because the two-dimensional image is formed by the two-dimensional image forming apparatus 30 which includes P×Q pixels 31.

The two-dimensional image forming apparatus 30 which is in a state wherein the spatial frequency of the two-dimensional image produced by the two-dimensional image forming apparatus 30 is lowest has a schematic front elevation similar to that shown in FIG. 7A. In this instance, the light intensity of the Fourier transform image formed by the first lens $L_1$ has a frequency characteristic similar to that shown in FIG. 8A. Meanwhile, the two-dimensional image forming apparatus 30 which is in another state wherein the spatial frequency of the conjugate image of the two-dimensional image is highest has a schematic front elevation similar to that shown in FIG. 7B. In this instance, the light intensity of the Fourier transform image formed by the first lens $L_1$ has a frequency characteristic similar to that shown in FIG. 8B. Further, the Fourier transform image on the spatial filter SF or xy plane exhibits distributions similar to those shown in FIGS. 9A, 9B and 9C. Further, the apertures 51 of the spatial filter SF may have a planar shape similar to that in the example 1.

Incidentally, the state wherein the spatial frequency is highest corresponds to a case wherein all pixels display black and white alternately as seen in FIG. 7B. Meanwhile, the spatial frequency of the pixel structure of the two-dimensional image forming apparatus 30 and the spatial frequency of the two-dimensional image have such a relationship as described below. In particular, if it is assumed that an aperture occupies an entire pixel, that is, if it is assumed that the numerical aperture is 100%, then the highest spatial frequency of the two-dimensional image is ½ the spatial frequency of the pixel structure. On the other hand, if an aperture occupies a certain rate of each pixel, that is, if the aperture ratio is lower than 100%, then the highest spatial frequency of the two-dimensional image is lower than ½ the spatial frequency of the pixel structure. Therefore, all spatial frequencies of the two-dimensional image appear within a region up to a position equal to one half the distance between periodical patterns originating from the pixel structure appearing on the spatial filter SF. From this, all apertures 51 can be disposed without causing spatial interference with each other. In particular, for example, to the (3, 2)th aperture 51, a Fourier transform image having a diffraction order number of $m_0=3$ and $n_0=2$ comes in, but the Fourier transform image having the diffraction order number of $m_0=$ and $n_0=2$ does not enter the other apertures 51. Consequently, while, on the spatial filter SF which has the apertures 51 which are independent of each other for each Fourier transform image, spatial frequencies of the two-dimensional image produced by the two-dimensional image forming apparatus 30 exist in a Fourier transform image positioned in one aperture 51, the spatial frequencies of the two-dimensional image produced by the two-dimensional image forming apparatus 30 do not become missing by a spatial restriction of the apertures 51. It is to be noted that the spatial frequency of the pixel structure can be regarded as a carrier frequency, and the spatial frequencies of a two-dimensional image correspond to image information whose carrier frequency is the spatial frequency of the pixel structure.

Then, on the spatial filter SF, opening and closing control of the aperture 51 is carried out in order to control individual passage/interception of M×N Fourier transform images. If the spatial filter SF is formed, for example, from a liquid crystal display apparatus, then by causing each liquid crystal cell to operate as a kind of an optical shutter or light value, opening and closing control of the aperture 51 can be carried out.

It is to be noted that, where the brightness of an image obtained differs depending upon the diffraction order, a light attenuating filter for attenuating a bright image with reference to the darkest image may be disposed on the rear side focal plane of the third lens $L_3$ as described hereinabove. This similarly applies also to the sixth and eleventh embodiments hereinafter described.

As described above, according to the image display apparatus 1C of the example 5, spatial frequencies of a two-dimensional image produced by the two-dimensional image forming apparatus 30 are emitted along a plurality of diffraction angles corresponding to different diffraction orders and are Fourier transformed by the Fourier transform image forming section 40 or first lens $L_1$ to obtain Fourier transform images. Then, the Fourier transform images obtained in this manner are spatially and temporally filtered by the Fourier transform image selection section 50 or spatial filter SF, and a conjugate image CI of the filtered Fourier transform image is formed. Therefore, a group of light beams can be produced and scattered in a spatially high density and in a state distributed in a plurality of directions without increasing the size of the entire image display apparatus. Further, the individual light beams which are components of the light beam group can be spatially and temporally controlled independently of each other. Consequently, a stereoscopic image based on light beams having quality proximate to that of a physical solid in the real world can be obtained.

Further, with the image display apparatus 1C of the example 5, since the light beam reproduction method is utilized, a stereoscopic image which satisfies such visual sensation functions as focal adjustment, convergence and motion parallax can be provided. Further, with the image display apparatus 1C of the example 5, since high order diffraction light beams are utilized effectively, a number of light beams, which can be controlled by a single image output device, that is, the two-dimensional image forming apparatus 30 and optical apparatus 35, and are a kind of copy of two-dimensional image, equal to the number of diffraction orders which is M×N, can be obtained, when compared with the existing image outputting technique. Besides, with the image display apparatus 1C of the example 5, since filtering is carried out spatially and temporally, a temporal characteristic of the image display apparatus can be converted into a spatial characteristic of the image display apparatus. Further, a stereoscopic image can be obtained without using a diffusion screen or the like. Furthermore, a stereoscopic image which looks appropriately from whichever direction it is observed can be provided. Further, since a group of light beams can be produced and scattered in a spatially high density, a spatial image of a high definition near to a visual confirmation limit can be provided.

Example 6

The example 6 is a modification to the example 5. The image display apparatus of the example 6 particularly in the form of a three-dimensional image display apparatus is shown in FIG. 22.

The image display apparatus of the example 6 includes a two-dimensional image forming apparatus 130 different from that of the liquid crystal display apparatus of the example 5. In particular, the two-dimensional image forming apparatus 130 includes a one-dimensional image forming apparatus, which particularly is a diffraction grating-optical modulation apparatus 201, for producing a one-dimensional image divided into P image portions, for example, into 1,920 image portions. The two-dimensional image forming apparatus 130 further includes a scanning optical system, which particularly is a scanning mirror 205, for two-dimensionally developing or scanning the one-dimensional image produced by the one-dimensional image forming apparatus or diffraction grating-optical modulation apparatus 201 and divided into P image portions to form a two-dimensional image divided into P×Q image portions. Further, an optical apparatus 35 is disposed rearwardly of the scanning optical system. Spatial frequencies of the two-dimensional image produced and disposed on a production plane of a two-dimensional image are emitted along a plurality of diffraction angles corresponding to different diffraction orders, particularly totaling $M_0 \times N_0$ diffraction orders, by the optical apparatus 35.

The optical modulation section 130 including the diffraction grating-optical modulation apparatus has a configuration similar to that of the optical modulation section 130 of the example 2 described hereinabove with reference to FIG. 11, and therefore, overlapping description of the same is omitted herein. However, a two-dimensional image obtained by scanning of the scanning mirror 205 passes through the scanning lens system 131 and enters the optical apparatus 35 disposed on the two-dimensional image production plane. The optical apparatus 35 produces M×N diffraction light beams for each section of the two-dimensional image which is formed from the P×Q sections. In particular, spatial frequencies of the produced two-dimensional image are emitted along a plurality of diffraction angles corresponding to different diffraction orders produced from the optical elements 36 of the optical apparatus 35 from the optical apparatus 35. The rear side focus of the optical apparatus 35 is disposed on the front side focal plane of the first lens $L_1$ having the focal distance $f_1$. It is to be noted that the first-order spatial optical modulator or diffraction grating-optical modulation apparatus 201 and the diffraction grating-optical modulation elements 210 are hereinafter described.

Except the foregoing, the configuration and structure of the image display apparatus of the example 6 can be made similar to those of the image display apparatus of the example 5 described hereinabove, and therefore, detailed description of them is omitted herein.

Example 7

Figure 23:
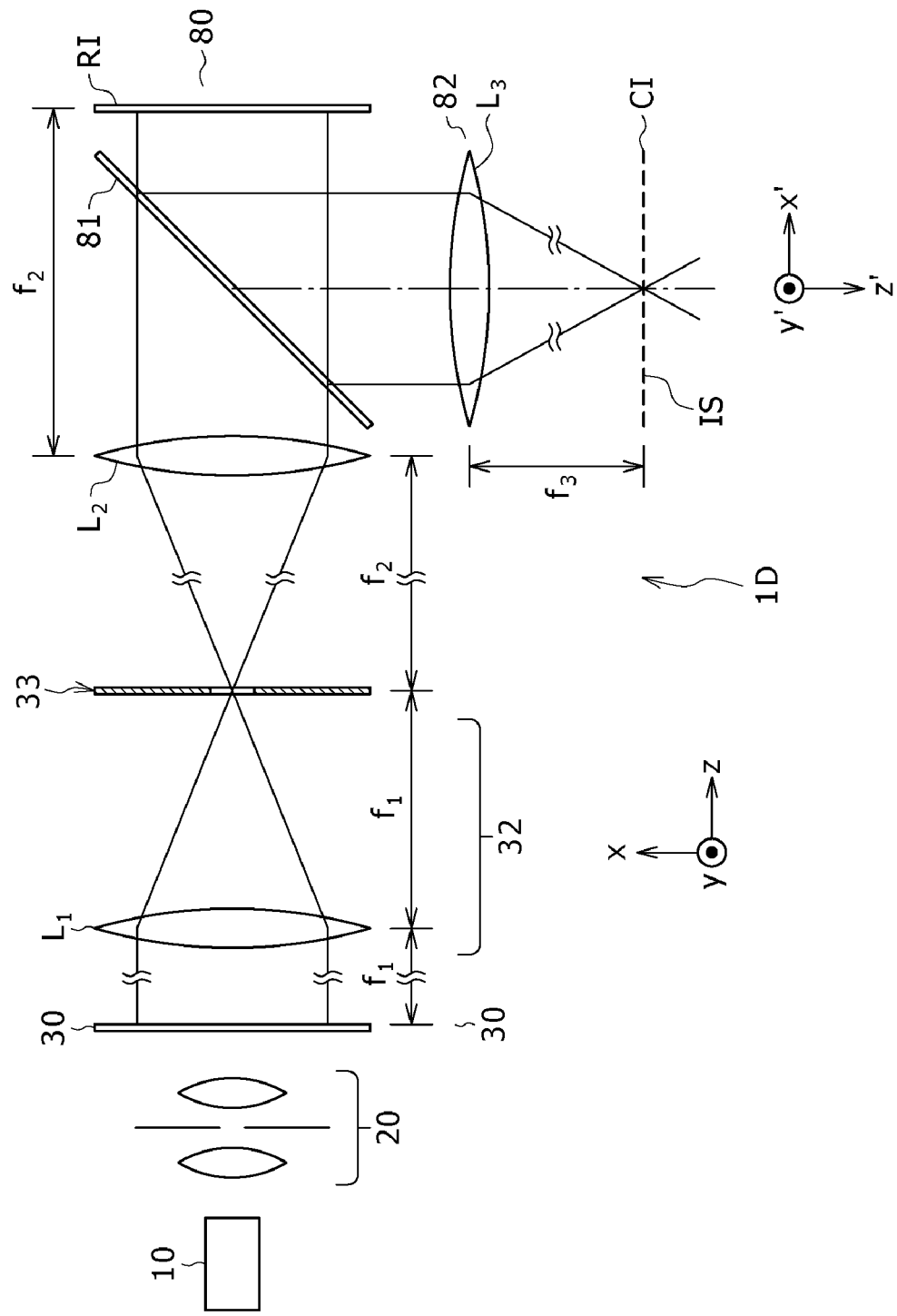
FIG. 23 is a schematic view showing an image display apparatus according to an example 7 on a yz plane.
Figure 24:
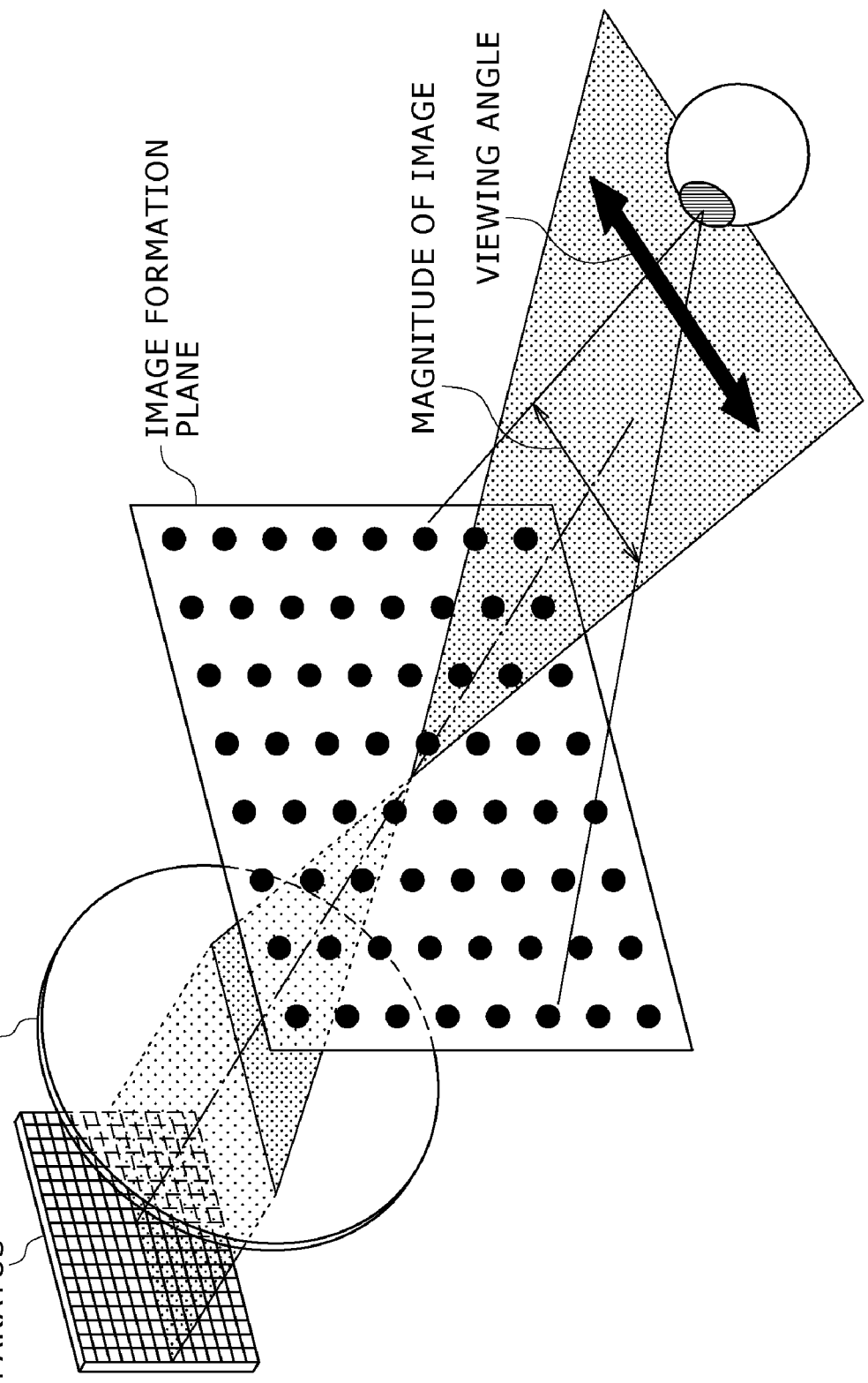
FIG. 24 is a schematic view showing the image display apparatus of the example 7 as viewed in an oblique direction.
Figure 25:
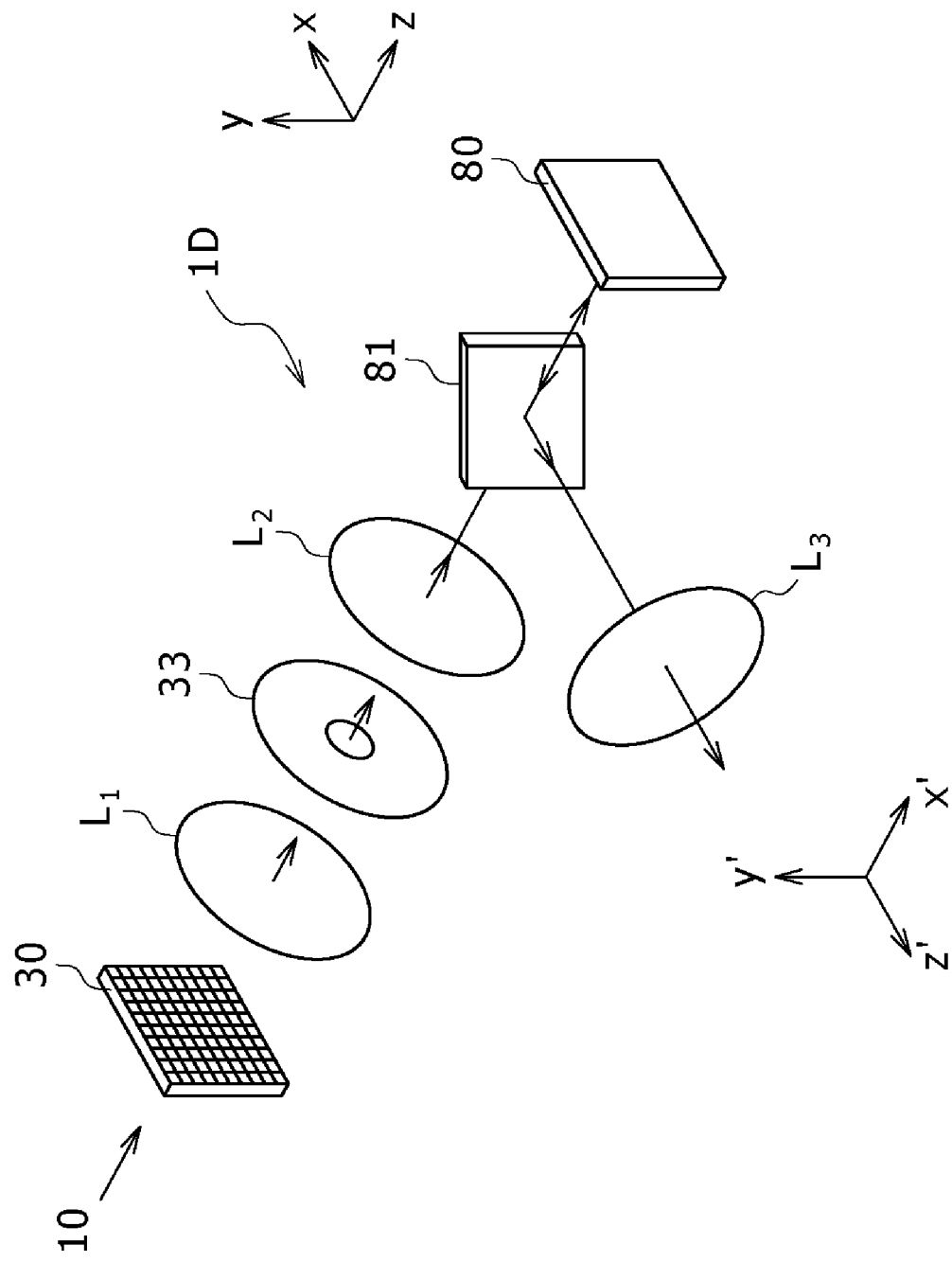
FIG. 25 is a schematic perspective view illustrating arrangement of components of the image display apparatus of the example 7.

The example 7 relates to image display methods according to the ninth and tenth embodiments of the present invention and more particularly to display methods of a three-dimensional image. The example 7 further relates to image display apparatus according to the ninth and tenth embodiments of the present invention and more particularly to three-dimensional image display apparatus. FIGS. 23, 24 and 25 schematically show the image display apparatus according to the example 7 which displays a monochromatic image. In particular, FIG. 23 schematically shows the image display apparatus of the example 7 on an xz plane and an x'z' plane. Where the image display apparatus of the example 7 is taken on a yz plane and a y'z' plane, it exhibits a view substantially similar to FIG. 23 except the arrangement of an image forming section 82, that is, a third lens $L_3$, and a beam splitter 81. Meanwhile, FIG. 24 schematically shows the image display apparatus of the example 7 as viewed in an oblique direction, and FIG. 25 schematically illustrates an arrangement state of components of the image display apparatus of the example 7. It is to be noted that, in FIG. 24, most of the components of the image display apparatus are omitted and also beams of light are shown in a simplified form, different from FIGS. 23 and 25. Further, in FIG. 24, only part of light beams emitted from a two-dimensional image forming apparatus are illustrated.

Meanwhile, also in the image display apparatus 1D of the example 7, the image display apparatus itself which includes such components as seen in FIGS. 23, 24 and 25 can produce and form a greater amount of light beams having a higher spatial density when compared with the conventional apparatus. The image display apparatus 1D of the example 7 by itself has functions equivalent to those of the apparatus shown in FIG. 49 which includes a large number of, $S_0 \times T_0$, projector units 301 disposed parallelly in a horizontal direction and a vertical direction. It is to be noted that, for example, where it is intended to employ a multi-unit system, only it is necessary to dispose a number of image display apparatus 1D of the example 7 equal to the number of divisional three-dimensional images (for example, 4×4=16).

Where the image display apparatus 1D of the example 7 of the present invention is described in connection with components of the image display apparatus according to the ninth embodiment of the present invention, the image display apparatus 1D includes a light source 10 and an optical system. The optical system includes:

(A) an optical modulation section 30 having a plurality of pixels 31 and configured to modulate light from the light source 10 by means of the pixels 31 to produce a two-dimensional image and emit spatial frequencies of the produced two-dimensional image along a plurality of diffraction angles corresponding to different diffraction orders produced from each of the pixels 31;

(B) an image limiting and production section 32 configured to Fourier transform spatial frequencies of the two-dimensional image emitted from the optical modulation section 30 to produce a number of Fourier transform images corresponding to the number of diffraction orders produced from each of the pixels 31, select only a predetermined Fourier transform image, for example, a Fourier transform image corresponding to the first order diffraction whose carrier frequency is the 0th order diffraction of a plane wave component, from among the produced Fourier transform images and inverse Fourier transform the selected Fourier transform image to form a conjugate image of the two-dimensional image produced by the optical modulation section 30;

(C) a light advancing direction changing section 80 configured to change the advancing direction of a beam of light emitted from the image limiting production section; and (D) an image forming section 82 configured to form an image of the beam of light emitted from the light advancing direction changing section 80.

Here, the spatial frequencies of the two-dimensional image correspond to image information whose carrier frequency is the spatial frequency of the pixel structure. It is to be noted that the spatial frequencies of the conjugate image of the two-dimensional image correspond to the spatial frequencies of the two-dimensional image from which the spatial frequency of the pixel structure is removed.

The image limiting and production section 32 includes:

(B-1) a first lens $L_1$ configured to Fourier transform the spatial frequencies of the two-dimensional image emitted from the optical modulation section 30 to produce a number of Fourier transform images corresponding to the number of diffraction orders produced from each of the pixels;

(B-2) a scattering diffraction limiting aperture section or image limiting aperture section 33 disposed on the light advancing direction changing section side with respect to the first lens $L_1$ and configured to select only a predetermined Fourier transform image, for example, a Fourier transform image corresponding to the first order diffraction whose carrier frequency is the 0th order diffraction of a plane wave component, from among the Fourier transform images; and (B-3) a second lens $L_2$ disposed on the light advancing direction changing section side with respect to the scattering diffraction limiting aperture section 33 and configured to inverse Fourier transform the selected Fourier transform image to form a conjugate image of the two-dimensional image produced by the optical modulation section 30.

Further, the scattering diffraction limiting aperture section 33 is disposed on the rear side focal plane of the first lens $L_1$ and besides on the front side focal plane of the second lens $L_2$. This similarly applies also to the examples 8 and 11 hereinafter described.

Further, where the image display apparatus 1D of the example 7 of the present invention is described in connection with components of the image display apparatus according to the tenth embodiment of the present invention, the image display apparatus 1D includes a light source 10 and an optical system. The optical system includes:

(A) a two-dimensional image forming apparatus 30 having a plurality of, $P_0 \times Q_0$, apertures arrayed in a two-dimensional matrix along an X direction and a Y direction and configured to control, for each of the apertures, passage, reflection or diffraction of light from the light source 10 to produce a two-dimensional image and produce, for each of the apertures, a plurality of diffraction light beams of different diffraction orders based on the produced two-dimensional image;

(B) a first lens $L_1$ having a front side focal plane on which the two-dimensional image forming apparatus 30 is disposed;

(C) a scattering diffraction limiting aperture section or image limiting aperture section 33 disposed on a rear side focal plane of the first lens $L_1$ and configured to pass only a diffraction light beam of a predetermined diffraction order, for example, a Fourier transform image corresponding to the first order diffraction whose carrier frequency is the 0th order diffraction of a plane wave component, therethrough;

(D) a second lens $L_2$ having a front side focal plane on which the scattering diffraction limiting aperture section 33 is disposed;

(E) a light advancing direction changing section 80 disposed rearwardly of the second lens $L_2$ and configured to change or vary the advancing direction of a beam of light emitted from the second lens $L_2$; and (F) a third lens $L_3$ configured to form an image of the beam of light emitted from the light advancing direction changing section 80.

It is to be noted that, in the example 7, each of the first lens $L_1$, second lens $L_2$ and third lens $L_3$ is formed from a convex lens.

Here, in the example 7 and the examples 8 and 11 hereinafter described, $P_0=1,024$, $Q_0=768$, $S_0=8$ and $T_0=8$. However, the values of the parameters mentioned are not limited to the specified values. A z axis which coincides with the optical axis up to the light advancing direction changing section 80 passes the center of the components up to the light advancing direction changing section 80 which forms the image display apparatus 1D of the example 7 or the example 8 or 11 hereinafter described and besides extends perpendicularly to the components which compose the image display apparatus 1D. If the components of the image display apparatus of the ninth embodiment of the present invention and the components of the image display apparatus according to the tenth embodiment or the eleventh embodiment of the present invention are compared with each other, then the optical modulation section 30 corresponds to the two-dimensional image forming apparatus 30; the image limiting and production section 32 corresponds to the first lens $L_1$, scattering diffraction limiting aperture section or image limiting aperture section 33 and second lens $L_2$; and the image forming section 82 corresponds to the third lens $L_3$. Therefore, the following description is given based on the terms of the two-dimensional image forming apparatus 30, first lens $L_1$, scattering diffraction limiting aperture section 33, second lens $L_2$ and third lens $L_3$ for the convenience of description.

An illuminating optical system 20 for shaping a beam of light emitted from the light source 10 is disposed between the light source 10 and the two-dimensional image forming apparatus 30 similarly as in the example 1. The two-dimensional image forming apparatus 30 is illuminated with the light emitted from the light source 10 and passing through the illuminating optical system 20, that is, with illuminating light. The illuminating optical system 20 is hereinafter described.

The two-dimensional image forming apparatus 30 is formed from a two-dimensional spatial optical modulator having a plurality of pixels 31 arrayed two-dimensionally, and each of the pixels 31 has an aperture. In particular, the two-dimensional optical image forming apparatus 30 or two-dimensional spatial optical modulator is particularly formed from a liquid crystal display apparatus of the transmission type having $P_0 \times Q_0$ pixels 31 arrayed two-dimensionally, that is, arrayed in a two-dimensional matrix along the X direction and the Y direction, and each of the pixels 31 has an aperture.

One pixel 31 is formed from a region in which a transparent first electrode and a transparent second electrode overlap with each other and which includes a liquid crystal cell similarly as in the example 1. Then, the liquid crystal cell operates as a kind of optical shutter or light valve, that is, the light transmission factor of each pixel 31 is controlled, to control the light transmission factor of the light emitted from the light source 10, and as a whole, a two-dimensional image is obtained. A rectangular aperture is provided in the overlapping region of the transparent first and second electrodes, and when the light emitted from the light source 10 passes through the aperture, Fraunhofer diffraction occurs. As a result, $M_0 \times N_0$ diffraction light beams are generated from each of the pixels 31. In other words, since the number of pixels 31 is $P_0 \times Q_0$, it is considered that totaling $P_0 \times Q_0 \times M_0 \times N_0$ diffraction light beams are generated. In the two-dimensional image forming apparatus 30, spatial frequencies of a two-dimensional image are emitted along diffraction angles corresponding to a plurality of diffraction orders, totaling $M_0 \times N_0$ orders, generated from each pixel 31. It is to be noted that the diffraction angles differ also depending upon the spatial frequencies of the two-dimensional image.

The two-dimensional image forming apparatus 30 is disposed on the front side focal plane, that is, on the focal plane on the light source side, of the first lens $L_1$ having the focal distance $f_1$, and the scattering diffraction limiting aperture section 33 is disposed on the rear side focal plane, that is, the focal plane on the observer side, of the first lens $L_1$. Then, a number of Fourier transform images corresponding to a plural number of diffraction orders are produced by the first lens $L_1$, and the Fourier transform images are formed on the plane on which the scattering diffraction limiting aperture section 33 is positioned. Then, only a diffraction light beam of a predetermined diffraction order, for example, only a Fourier transform image corresponding to the first order diffraction whose carrier frequency is the 0th order diffraction of a plane wave component, passes through the scattering diffraction limiting aperture section 33. Further, the scattering diffraction limiting aperture section 33 is disposed on the front side focal plane of the second lens $L_2$ having the focal distance $f_2$. Furthermore, a light advancing direction changing section 80 is disposed on the rear side focal plane of the second lens $L_2$ and besides on the front side focal plane of the third lens $L_3$ which has the focal distance $f_3$. The rear side focal plane of the third lens $L_3$ corresponds to the image forming plane IS. It is to be noted that a beam splitter 81 is disposed between the second lens $L_2$ and the light advancing direction changing section 80 such that light beams from the second lens $L_2$ enter the light advancing direction changing section 80 after they pass through the beam splitter 81.

The light advancing direction changing section 80 is formed from a reflection type optical section which can change or alter the angle of light beams to be emitted with respect to incoming light beams, such as, for example, a mirror. More particularly, a polygon mirror is used. While the polygon mirror rotates around an axis of rotation thereof, the inclination angle of the axis of rotation of the polygon mirror is controlled to control the position of the image forming plane IS at which an image is to be formed successively to $S_0 \times T_0$ positions disposed in a two-dimensional matrix.

It is to be noted that the light advancing direction changing section 80 may be formed as a reflection type optical section which can change or alter the angle of light beams to be emitted with respect to incoming light beams, such as, for example, a prism. In this instance, for example, a mechanism for turning or moving the prism to a desired direction centering on the z axis.

The third lens $L_3$ is disposed such that the front side focal plane thereof coincides with the rear side focal plane of the second lens $L_2$ and a conjugate image CI of a Fourier transform image is formed on the rear side focal plane or image forming plane IS thereof. Light beams reflected by the light advancing direction changing section 80 are reflected by the beam splitter 81 and enters the third lens $L_3$. Here, since the rear side focal plane of the third lens $L_3$ is a conjugate plane of the scattering diffraction limiting aperture section 33, a conjugate image of the two-dimensional image is equivalently outputted from the scattering diffraction limiting aperture section 33. It is to be noted, however, that the final directional component of the conjugate image of the two-dimensional image is defined by the light advancing direction changing section 80. Then, the amount of light beams to be produced and outputted finally corresponds to the number of pixels, that is, $P_0 \times Q_0$ and correspond to that of the light beams which have passed through the scattering diffraction limiting aperture section 33. In other words, such a situation that the amount of light beams which pass through the scattering diffraction limiting aperture section 33 is decreased by later passage through or reflection by succeeding components of the image display apparatus does not substantially occur. Further, although the conjugate image CI of the Fourier transform image is formed on the rear side focal plane of the second lens $L_2$, since the directional component of the conjugate image of the two-dimensional image is defined by the light advancing direction changing section 80, it can be regarded that light beams are regularly disposed two-dimensionally on the rear side focal plane of the third lens $L_3$. This generally is equivalent to that a plurality of, particularly $S_0 \times T_0$, such projector units 301 as described hereinabove with reference to FIG. 49 are disposed on the rear side focal plane or image forming plane IS of the third lens $L_3$. It is to be noted that, in the following description, where a light beam emitted from the light advancing direction changing section 80 forms an image at the (m, n)th position on the rear side focal plane or image forming plane IS of the third lens $L_3$, the formed image may sometimes be referred to as (m, n)th image. It is to be noted that, in FIG. 24, 64 images are indicated in the form of a dot for the convenience of illustration.

As schematically shown in FIG. 5, totaling $M_0 \times N_0$ diffraction light beams are produced by one pixel 31 of the two-dimensional image forming apparatus 30 along an X and Y directions. It is to be noted that, while FIG. 5 schematically shows only the 0th order diffraction light beam ($n_0=0$), ±1st order diffraction light beams ($n_0=\pm 1$) and ±2nd order diffraction light beams ($n_0=\pm 2$) as representative diffraction light beams, actually higher order diffraction light beams are produced, and a stereoscopic image is finally formed based on the diffraction light beams. Here, each of the diffraction light beams or fluxes of the different diffraction orders includes all image information of a two-dimensional image produced by the two-dimensional image forming apparatus 30, that is, information of all pixels. A plurality of light beams produced by diffraction from the same pixel on the two-dimensional image forming apparatus 30 all have the same image information at the same point of time. In other words, in the two-dimensional image forming apparatus 30 formed from a liquid crystal display apparatus of the transmission type having $P_0 \times Q_0$ pixels 31, light from the light source 10 is modulated by each pixel 31 to produce a two-dimensional image, and spatial frequencies of the produced two-dimensional image are emitted along a plurality of diffraction angles corresponding to different diffraction orders, totaling $M_0 \times N_0$ diffraction orders, produced from each pixel 31. In particular, $M_0 \times N_0$ copies of the two-dimensional image are emitted along a plurality of diffraction angles corresponding to different diffraction orders, totaling $M_0 \times N_0$ diffraction orders, from the two-dimensional image forming apparatus 30.

Then, the spatial frequencies of the two-dimensional image emitted from the two-dimensional image forming apparatus 30 are Fourier transformed by the first lens $L_1$ to produce a number of Fourier transform images corresponding to the number of diffraction orders produced from each pixel 31. Then, of the Fourier transform images, only a predetermined Fourier transform image, for example, a Fourier transform image corresponding to the first order diffraction whose carrier frequency is the 0th order diffraction of a plane wave component, passes through the scattering diffraction limiting aperture section 33. Further, the selected Fourier transform image is inverse Fourier transformed by the second lens $L_2$ to produce a conjugate image of the two-dimensional image produced by the two-dimensional image forming apparatus 30. Then, the conjugate image of the two-dimensional image enters the light advancing direction changing section 80. It is to be noted that, while the spatial frequencies of the two-dimensional image correspond to image information whose carrier frequency is the spatial frequency of the pixel structure, only spatial frequencies in a region of the image information whose carrier frequency is the 0th order plane wave, that is, a region up to a frequency of ½ in the maximum of the spatial frequency of the pixel structure, or in other words, spatial frequencies obtained as the first order diffraction whose carrier frequency is the 0th order diffraction of the plane wave component and lower than one half the spatial frequency of the pixel structure or aperture structure of the optical modulation section, pass through the scattering diffraction limiting aperture section 33. The conjugate image of the two-dimensional image formed on the light advancing direction changing section 80 in this manner does not include the spatial frequency of the pixel structure of the two-dimensional image forming apparatus 30 but includes all of the spatial frequencies of the two-dimensional image produced by the two-dimensional image forming apparatus 30.

The spatial frequencies of the conjugate image of the two-dimensional image produced by the two-dimensional image forming apparatus 30 which include all pixel information of the two-dimensional image are emitted from the light advancing direction changing section 80 while the direction component thereof is changed. Then, the spatial frequencies of the conjugate image are converted into an image on the image forming plane IS by the third lens $L_3$. Since the third lens $L_3$ produces Fourier transform images of spatial frequencies of the conjugate image of the two-dimensional image emitted from the light advancing direction changing section 80, the Fourier transform images can be obtained in a spatially high intensity.

As described above, with the image display apparatus 1D of the example 7, spatial frequencies of a two-dimensional image produced by the optical modulation section or two-dimensional image forming apparatus 30 are emitted from the light advancing direction changing section 80 along a plurality of diffraction angles corresponding to different diffraction orders, and a conjugate image CI is formed on the image forming plane IS. Consequently, a group of beams of light can be produced and scattered in a state wherein they are distributed in a plurality of directions in a spatially high density without increasing the size of the entire image display apparatus. Further, since the light advancing direction changing section 80 is provided, such a situation that the contrast of an image to be obtained drops is eliminated, and a clear-cut stereoscopic image can be observed. Besides, the individual light beams which are component of the light beam group can be temporally and spatially controlled independent of each other. Consequently, a stereoscopic image formed from beams of light proximate in quality to those of a physical solid in the real world can be obtained.

Further, with the image display apparatus 1D of the example 7, since the light beam reproduction method is utilized, a stereoscopic image which satisfies such visual sensation functions as focal adjustment, convergence and motion parallax can be provided. Further, with the image display apparatus 1D of the example 7, since a kind of filtering is carried out spatially and temporally by the light advancing direction changing section 80, a temporal characteristic of the image display apparatus can be converted into a spatial characteristic of the image display apparatus. Further, a stereoscopic image can be obtained without using a diffusion screen or the like. Furthermore, a stereoscopic image which looks appropriately from whichever direction it is observed can be provided. Further, since a group of light beams can be produced and scattered in a spatially high density, a spatial image of a high definition near to a visual confirmation limit can be provided.

Example 8

The example 8 relates to image display methods according to the ninth and eleventh embodiments of the present invention and more particularly to display methods of a three-dimensional image. The example 8 further relates to image display apparatus according to the ninth and eleventh embodiments of the present invention and more particularly to three-dimensional image display apparatus. The image display apparatus of the example 8 is schematically shown in FIG. 26.

The image display apparatus of the example 8 includes an optical modulation section 130 different from the optical modulation section of the liquid crystal display apparatus of the example 7. In particular, the optical modulation section 130 includes a one-dimensional spatial optical modulator, which particularly is a diffraction grating-optical modulation apparatus 201, for producing a one-dimensional image divided into $P_0$ image portions, for example, into 1,920 image portions. The optical modulation section 130 further includes a scanning optical system, which particularly is a scanning mirror 205, for two-dimensionally developing or scanning the one-dimensional image produced by the one-dimensional spatial optical modulator or diffraction grating-optical modulation apparatus 201 and divided into $P_0$ image portions to form a two-dimensional image divided into $P_0 \times Q_0$ image portions. The optical modulation section 130 further includes a grating filter or diffraction grating filter 132 disposed on a production plane of the two-dimensional image for emitting spatial frequencies of the produced two-dimensional image along a plurality of diffraction angles corresponding to different diffraction orders, particularly corresponding to totaling $M_0 \times N_0$ diffraction orders. Here, $M_0 \times N_0$ diffraction light beams are produced by the grating filter 132 for each of the image portions of the two-dimensional image produced by the scanning optical system or scanning mirror 205 and formed from $P_0 \times Q_0$ image portions. It is to be noted that the grating filter 132 may be formed from an amplitude grating or a phase grating.

Alternatively, where the image display apparatus of the example 8 of the present invention is described in connection with components of the image display apparatus according to the eleventh embodiment of the present invention, the image display apparatus of the example 8 includes a light source 10 and an optical system. The optical system includes:

(A) a two-dimensional image forming apparatus 130 including a one-dimensional spatial optical modulator, particularly a diffraction grating-optical modulation apparatus 201, configured to produce a one-dimensional image, a scanning optical system, particularly a scanning mirror 205, configured to two-dimensionally develop the one-dimensional image produced by the one-dimensional spatial optical modulator to produce a two-dimensional image, and a diffraction light production section, particularly a grating filter 132, disposed on a production plane of the two-dimensional image and configured to produce a plurality of diffraction light beams of different diffraction orders for each of the pixels 31;

(B) a first lens $L_1$ having a front side focal plane on which the diffraction light production section or grating filter 132 is disposed;

(C) a scattering diffraction limiting aperture section 33 disposed on a rear side focal plane of the first lens $L_1$ and configured to pass only a diffraction light beam of a predetermined diffraction order, for example, a Fourier transform image corresponding to the first order diffraction whose carrier frequency is the 0th order diffraction of a plane wave component, therethrough;

(D) a second lens $L_2$ having a front side focal plane on which the scattering diffraction limiting aperture section 33 is disposed;

(E) a light advancing direction changing section 80 disposed rearwardly of the second lens $L_2$ and configured to change or alter the advancing direction of a beam of light emitted from the second lens $L_2$; and (F) a third lens $L_3$ configured to form an image of the beam of light emitted from the light advancing direction changing section 80.

The two-dimensional image forming apparatus 130 including the diffraction grating-optical modulation apparatus has a configuration similar to that of the optical modulation section 130 of the example 2 described hereinabove with reference to FIG. 11, and therefore, detailed description of the same is omitted herein. It is to be noted, however, that the grating filter 132 produces $M_0 \times N_0$ diffraction light beams for each image portion of a two-dimensional image which is formed from $P_0 \times Q_0$ image portions.

Except the foregoing, the configuration and structure of the image display apparatus of the example 8 can be made similar to those of the image display apparatus of the example 7 described hereinabove, and therefore, detailed description of them is omitted herein.

Example 9

Figure 27:
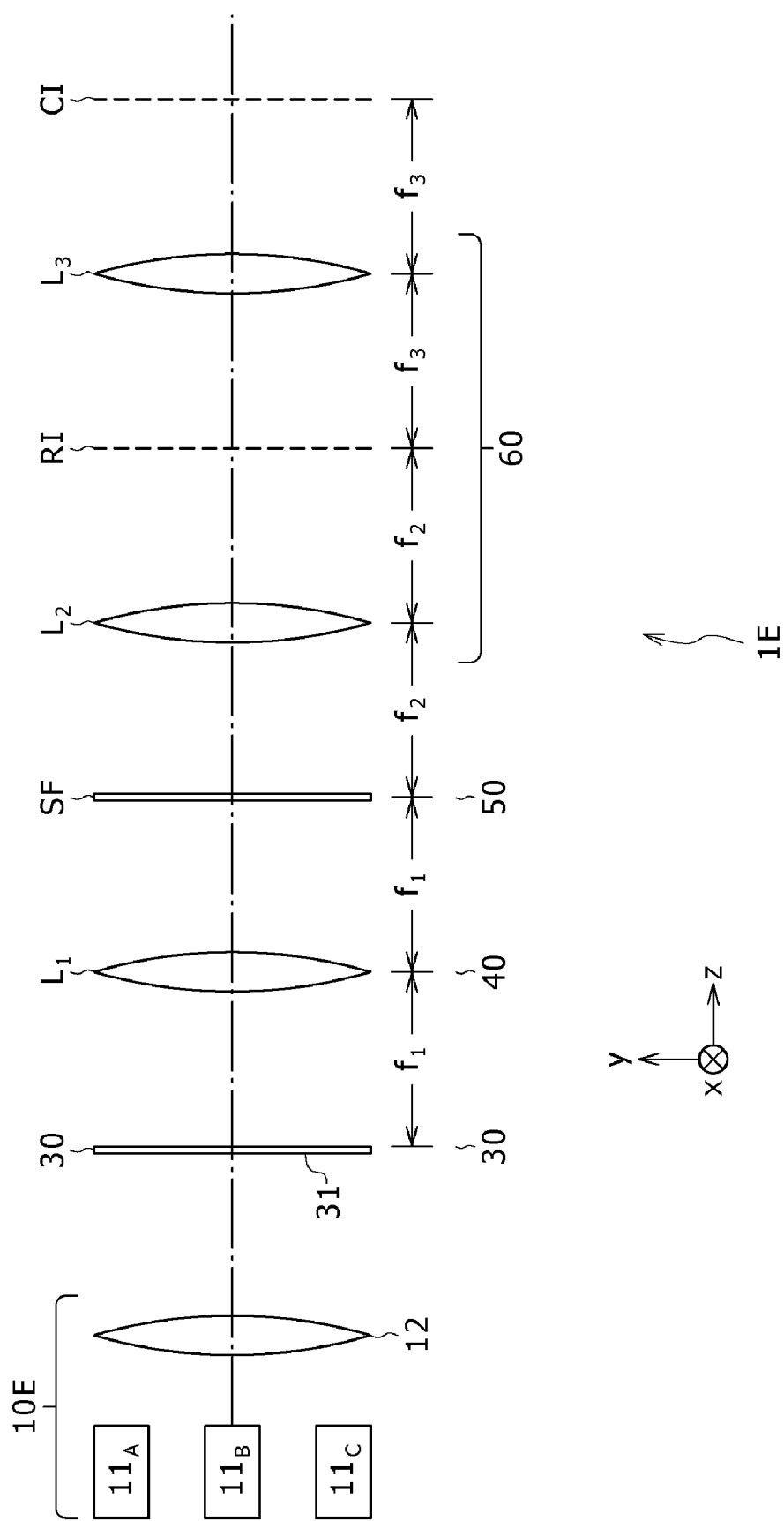
FIG. 27 is a schematic view showing an image display apparatus according to an example 9 on a yz plane.
Figure 28:
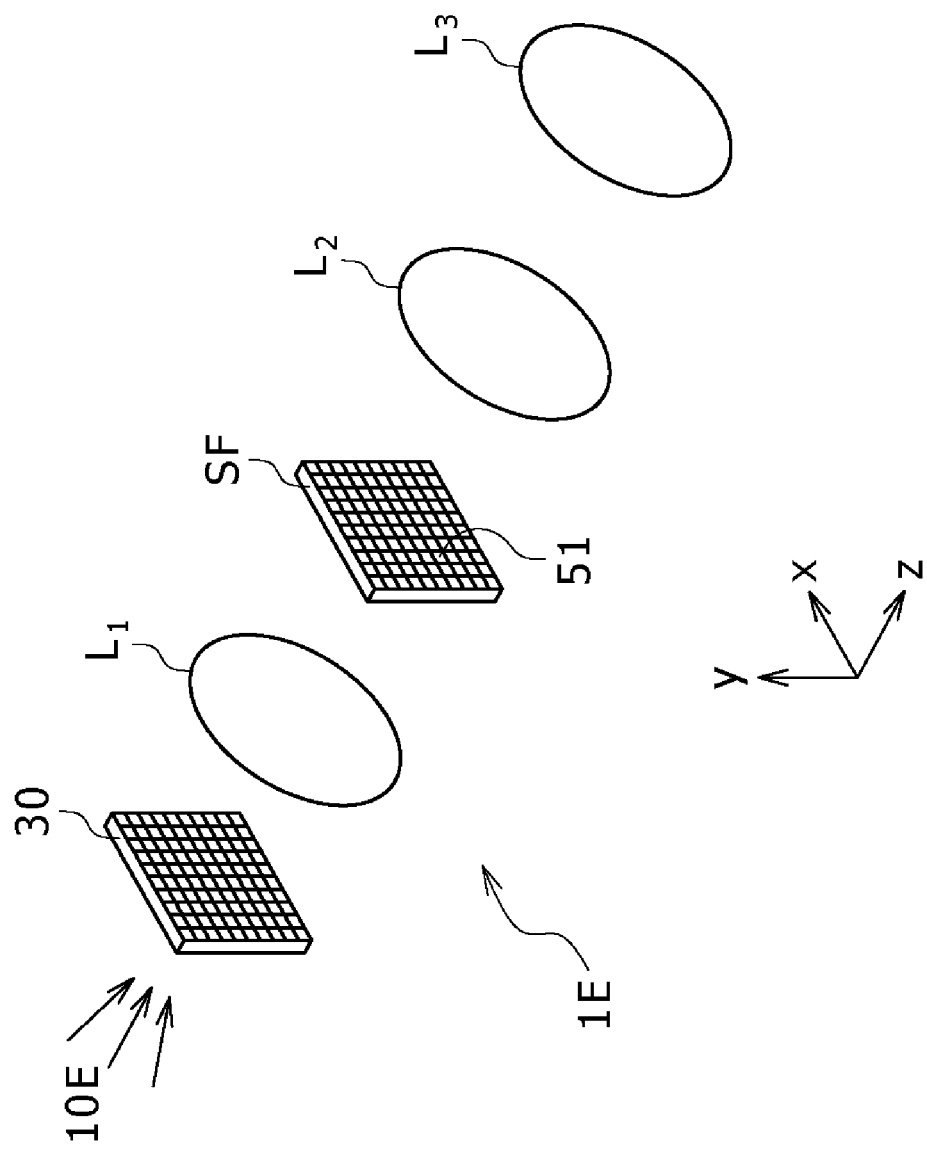
FIG. 28 is a schematic perspective view illustrating arrangement of components of the image display apparatus of the example 9.

The example 9 relates to image display methods according to the twelfth and thirteenth embodiments of the present invention and more particularly to display methods of a three-dimensional image. The example 9 further relates to image display apparatus according to the twelfth and thirteenth embodiments of the present invention and more particularly to three-dimensional image display apparatus. FIG. 27 schematically shows the image display apparatus according to the example 9 which displays a monochromatic image. It is to be noted that, in FIG. 27, the optical axis is set to a z axis, and Cartesian coordinates in a plane perpendicular to the z axis are taken on an x axis and a y axis. Further, the direction parallel to the x axis is represented as X direction and the direction parallel to the y axis is represented as Y direction. The X direction is taken, for example, as a horizontal direction of the three-dimensional image display apparatus, and the Y direction is taken, for example, as a vertical direction of the image display apparatus. Here, FIG. 27 is a schematic view showing the image display apparatus of the example 9 on the yz plane. Also where the image display apparatus of the example 9 is viewed on the xz plane, it exhibits a schematic view substantially similar to that of FIG. 27. Meanwhile, where the image display apparatus of the example 9 is viewed in an oblique direction, it exhibits a view similar to FIG. 2, and FIG. 28 schematically illustrates an arrangement state of components of the image display apparatus of the example 9.

Figure 29:
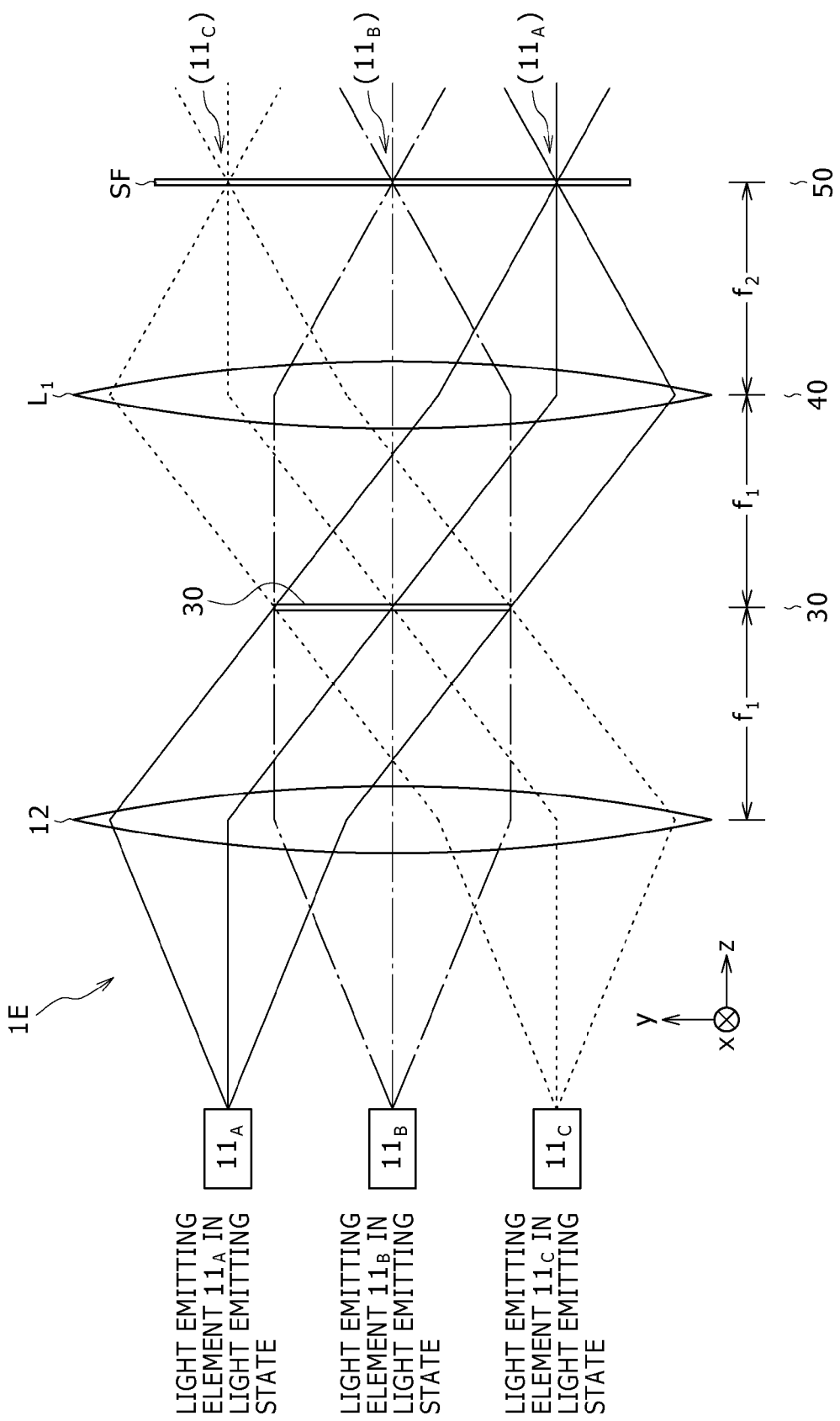
FIG. 29 is a schematic view showing part of the image display apparatus of the example 9 in an enlarged scale.

Further, FIGS. 29, 30A and 30B schematically show an optical modulation section or two-dimensional image forming apparatus, a Fourier transform image forming section or first lens, a Fourier transform image selection section or spatial filter and associated members. Further, FIG. 31 schematically shows a front elevation of a light source, and FIG. 32 schematically shows a front elevation of the spatial filter.

Meanwhile, also in the image display apparatus 1E of the example 9, the image display apparatus itself which includes such components as seen in FIG. 27 and so forth can produce and form a greater amount of light beams having a higher spatial density when compared with the existing apparatus. The image display apparatus 1E of the example 9 by itself has functions equivalent to those of the apparatus shown in FIG. 49 which includes a large number of, $U_0 \times V_0$, projector units 301 disposed parallelly in a horizontal direction and a vertical direction. It is to be noted that, for example, where it is intended to employ a multi-unit system, only it is necessary to dispose a number of image display apparatus 1E of the example 9 equal to the number of divisional three-dimensional images as seen from FIG. 48. In FIG. 48, the image display apparatus shown includes 4×4=16 image display apparatus 1E of the example 9.

Where the image display apparatus 1E of the example 9 of the present invention is described in connection with components of the image display apparatus according to the twelfth embodiment of the present invention, the image display apparatus 1E includes a light source 10E configured to emit light from a plurality of light emitting position disposed discretely and an optical system. The optical system includes:

(A) an optical modulation section 30 having a plurality of, P×Q, pixels 31 and configured to modulate a plurality of light beams or illuminating light beams successively emitted from different ones of the light emitting positions of the light source 10E and having different incoming directions by means of the pixels 31 to produce a two-dimensional image and emit spatial frequencies of the produced two-dimensional image along a plurality of, totaling M×N, diffraction angles corresponding to different diffraction orders individually produced from the pixels 31;

(B) a Fourier transform image forming section 40 configured to Fourier transform the spatial frequencies of the two-dimensional image emitted from the optical modulation section 30 to produce a number of, totaling M×N, Fourier transform images corresponding to the number of diffraction orders and form the Fourier transform images; and (C) a conjugate image forming section 60 configured to form a conjugate image of the Fourier transform image formed by the Fourier transform image forming section 40.

Alternatively, where the image display apparatus 1E of the example 9 of the present invention is described in connection with components of the image display apparatus according to the thirteenth embodiment of the present invention, the image display apparatus 1E of the example 9 includes a light source 10E configured to emit light from a plurality of light emitting positioned disposed discretely and an optical system. The optical system includes:

(A) a two-dimensional image forming apparatus 30 having a plurality of, totaling P×Q, apertures arrayed in a two-dimensional matrix along an X direction and a Y direction and configured to control, for each of the apertures, passage or reflection of one of a plurality of light beams successively emitted from different ones of the light emitting positions of the light source 10E and having different incoming directions to form a two-dimensional image and produce, for each of the apertures, a plurality of, totaling M×N, diffraction light beams of different diffraction orders based on the two-dimensional image;

(B) a first lens $L_1$ having a front side focal plane or a focal plane on the light source side on which the two-dimensional image forming apparatus 30 is disposed;

(C) a second lens $L_2$ having a front side focal plane or focal plane on the light source side positioned on a rear side focal plane or focal plane on the observer side of the first lens $L_1$; and (D) a third lens $L_3$ having a front side focal plane positioned on a rear side focal plane of the second lens $L_2$.

Here, the spatial frequencies of the two-dimensional image correspond to image information whose carrier frequency is the spatial frequency of the pixel structure.

In the image display apparatus 1E of the example 9, the light source 10E includes a plurality of light emitting elements 11, and a light advancing direction changing section for changing the incoming direction of light beams emitted from the light emitting elements 11 so as to enter the optical modulation section or two-dimensional image forming apparatus 30. The light emitting elements 11 are each formed from a light emitting diode and are disposed in a two-dimensional matrix. Particularly, the number of light emitting elements 11 arranged in a two-dimensional matrix is $U_0' \times V_0'$, and the number of light emitting positions disposed discretely on the light source 10E is $U_0 \times V_0$. In this instance, $U_0 = U_0'$ and $V_0 = V_0$. In the example 9, P=1,024 and q=768, and $U_0$=11 and $V_0$=11. It is to be noted that the numbers of the light emitting elements 11 and the light emitting positions are not limited to the values specified as above. Further, the light advancing direction changing section is formed from a refraction type optical section, particularly a lens, more particularly a collimator lens 12. Here, the light emitting elements 11 are disposed in the proximity of the front side focal plane of the collimator lens 12 such that the direction of light beams emitted from the light emitting elements 11 and entering the collimator lens 12 when the light beams go out from the collimator lens 12 can be changed stereoscopically by the collimator lens 12. As a result, the incoming direction of light beams or illuminating light beams when they enter the two-dimensional image forming apparatus 30 can be changed stereoscopically as seen from FIG. 29. It is to be noted that, while the emitting directions of the light beams emitted from the light emitting elements 11 are same in the example 9, particularly are parallel directions to the optical axis, they may otherwise be different from each other. Or in other words, a lens, particularly the collimator lens 12, is disposed between the light emitting elements 11 serving as the light source and the two-dimensional image forming apparatus 30, and the light emitting elements 11 are positioned on or in the proximity of the front side focal plane of the collimator lens 12.

If the components of the image display apparatus according to the twelfth embodiment of the present invention and the components of the image display apparatus according to the thirteenth embodiment of the present invention are compared with each other, then the optical modulation section 30 corresponds to the two-dimensional image forming apparatus 30; the Fourier transform image forming section 40 corresponds to the first lens $L_1$; a Fourier transform image selection section 50 hereinafter described corresponds to the spatial filter SF; the inverse Fourier transform section corresponds to the second lens $L_2$; and the conjugate image forming section 60 corresponds to the second lens $L_2$ and the third lens $L_3$. Therefore, the following description is given based on the terms of the two-dimensional image forming apparatus 30, first lens $L_1$, spatial filter SF, second lens $L_2$ and third lens $L_3$ for the convenience of description.

A state wherein fluxes of light emitted from light emitting elements $11_A$, $11_B$ and $11_C$ which compose the light source 10E pass through the two-dimensional image forming apparatus 30, first lens $L_1$ and spatial filter SF is schematically illustrated in FIG. 29. Referring to FIG. 29, the light flux emitted from the light emitting element $11_A$ of the light source 10E is indicated by solid lines; the light flux emitted from the light emitting element $11_B$ is indicated by alternate long and short dash lines; and the light flux emitted from the light emitting element $11_C$ is indicated by broken lines. Meanwhile, the positions of images on the spatial filter SF formed from the illuminating light beams emitted from the light emitting elements $11_A$, $11_B$ and $11_C$ are denoted by reference characters $11'_A$, $11'_B$ and $11'_C$, respectively. It is to be noted that the position numbers (hereinafter described) of the light emitting elements $11_A$, $11_B$ and $11_C$ of the light source 10E are, for example, (5, 0), (0, 0) and (−5, 0), respectively. Here, if a certain one of the light emitting elements is in a light emitting state, then all of the other light emitting elements are in a turned off state, that is, in a no-light emitting state.

As described hereinabove, the collimator lens 12 is disposed between the light emitting elements 11 and the two-dimensional image forming apparatus 30. The two-dimensional image forming apparatus 30 is illuminated with illuminating light beams emitted from the light emitting elements 11 and passing through the collimator lens 12. However, the incoming direction of the illuminating light beams to the two-dimensional image forming apparatus 30 differs stereoscopically depending upon the two-dimensional positions (light emitting positions) of the light emitting elements 11.

The optical modulation section 30 is formed from a two-dimensional spatial optical modulator having a plurality of pixels 31 arrayed two-dimensionally, and each of the pixels 31 has an aperture. Here, the two-dimensional spatial optical modulator or two-dimensional image forming apparatus 30 is particularly formed from a liquid crystal display apparatus of the transmission type having P×Q pixels 31 disposed two-dimensionally, that is, disposed in a two-dimensional matrix along the X direction and the Y direction, and each of the pixels 31 has an aperture. It is to be noted that the shape of the aperture in plan is a rectangular shape. Where the apertures have a rectangular planar shape, Fraunhofer diffraction occurs and M×N diffraction light beams are produced. In particular, by such apertures, the amplitude or intensity of the incoming light waves is modulated periodically such that amplitude gratings from which a light amount distribution coincident with a light transmission factor distribution of gratings are formed.

One pixel 31 is formed from a region in which a transparent first electrode and a transparent second electrode overlap with each other and which includes a liquid crystal cell similarly as in the example 1. The liquid crystal cell operates as a kind of optical shutter or light valve, that is, the light transmission factor of each pixel 31 is controlled, to control the light transmission factor of the illuminating light emitted from the light source 10E, and as a whole, a two-dimensional image can be obtained. A rectangular aperture is provided in the overlapping region of the transparent first and second electrodes, and when the illuminating light emitted from the light source 10E passes through the aperture, Fraunhofer diffraction occurs. As a result, M×N diffraction light beams are generated from each of the pixels 31. In other words, since the number of pixels 31 is P×Q, it is considered that totaling P×Q×M×N diffraction light beams are generated. In the two-dimensional image forming apparatus 30, spatial frequencies of a two-dimensional image are emitted along diffraction angles corresponding to a plurality of diffraction orders, totaling M×N diffraction orders, generated from each pixel 31. It is to be noted that the diffraction angles differ also depending upon the spatial frequencies of the two-dimensional image.

In the image display apparatus 1E of the example 9, the Fourier transform image forming section 40 is formed from a lens, that is, the first lens $L_1$, and the optical modulation section 30 is disposed on the front side focal plane of this lens, that is, the first lens $L_1$.

The image display apparatus 1E of the example 9 includes a Fourier transform image selection section 50 for selecting a Fourier transform image corresponding to a desired diffraction order from among a number of generated Fourier transform images corresponding to a plural number of diffraction orders. Here, the Fourier transform image selection section 50 is disposed at a position at which Fourier transform images are formed, that is, at a position on an XY plane or an image forming plane on which Fourier transform images are formed by the Fourier transform image forming section 40. In particular, the Fourier transform image selection section 50 is disposed on the rear side focal plane, that is, on the focal plane on the observer side, of the lens which forms the Fourier transform image forming section 40, that is, the first lens $L_1$. Or, in other words, the image display apparatus 1E of the example 9 includes a spatial filter SF having a number of apertures 51, which can be controlled to be opened and closed, corresponding to the number of light emitting positions of the light source 10E and positioned on the rear side focal plane of the first lens $L_1$. In particular, the Fourier transform image selection section 50 or spatial filter SF has a number of ($U_0 \times V_0 = LEP_{Total}$) apertures 51 corresponding to the number ($U_0 \times V_0 = LEP_{Total}$) of light emitting positions of the light source 10E disposed discretely.

Here, the Fourier transform image selection section 50 or spatial filter SF can be formed more particularly from a liquid crystal display apparatus of the transmission type or the reflection type which uses ferroelectric liquid crystal having, for example, $U_0 \times V_0$ pixels or a MEMS of the two-dimensional type including an apparatus wherein movable mirrors are arrayed two-dimensionally. Here, for example, opening and closing control of the apertures 51 can be carried out by causing the liquid crystal cell to operate as a kind of optical shutter or light valve or by movement/non-movement of the movable mirrors. In the Fourier transform image selection section 50 or spatial filter SF, a Fourier transform image corresponding to a desired diffraction order (0th order) can be selected by placing a desired aperture 51 (particularly an aperture 51 through which 0th order diffraction light is to pass) into an open state in synchronism with a production timing of a two-dimensional image by the two-dimensional image forming apparatus 30.

The image display apparatus 1E further includes an inverse Fourier transform section, particularly the second lens $L_2$ hereinafter described, for inverse Fourier transforming a Fourier transform image formed by the Fourier transform image forming section 40 to form a real image RI of a two-dimensional image formed by the optical modulation section 30.

In the example 9, each of the first lens $L_1$, second lens $L_2$ and third lens $L_3$ is particularly formed from a convex lens.

As described hereinabove, the two-dimensional image forming apparatus 30 is disposed on the front side focal plane, that is, the focal plane on the light source side, of the first lens $L_1$ having the focal distance $f_1$, and the spatial filter SF which can be temporally controlled to open and close for spatially and temporally filtering a Fourier transform image is disposed on the rear side focal plane, that is, the focal plane on the observer side, of the first lens $L_1$. Then, a number of Fourier transform images corresponding to a plural number of diffraction orders are produced by the first lens $L_1$, and the Fourier transform images are formed on the spatial filter SF.

A schematic front elevational view of the light source 10E formed from a plurality of light emitting elements arrayed in a two-dimensional matrix is shown in FIG. 31, and a schematic front elevational view of the spatial filter SF formed from a liquid crystal display apparatus is shown in FIG. 32. In FIGS. 31 and 32, numerical values (u, v) represent position numbers of the light emitting elements which compose the light source 10E or of the apertures 51 which compose the spatial filter SF. In particular, for example, to the (3, 2)th aperture 51, only a desired Fourier transform image, for example, a Fourier transform image corresponding to the 0th-order diffraction, of a two-dimensional image formed from a light emitting element positioned at the (3, 2)th position comes in, and it passes through the (3, 2)th aperture 51. Fourier transform images other than the desired Fourier transform images of the two-dimensional image formed from the light emitting element positioned at the (3, 2)th position are intercepted by the spatial filter SF. On the front side focal plane of the second lens $L_2$ having a focal distance $f_2$, the spatial filter SF is disposed. Further, the second lens $L_2$ and the third lens $L_3$ are disposed such that the rear side focal plane of the second lens $L_2$ and the front side focal plane of the third lens $L_3$ having a focal distance $f_3$ coincide with each other. The apertures 51 of the spatial filter SF may have a planar shape similar to that in the example 1.

As described above, the conjugate image forming section 60 is particularly formed from the second lens $L_2$ and the third lens $L_3$. The second lens $L_2$ having the focal distance $f_2$ inverse Fourier transforms a Fourier transform image filtered by the spatial filter SF to form a real image RI of the two-dimensional image formed by the two-dimensional image forming apparatus 30. In particular, the second lens $L_2$ is disposed such that the real image RI of the two-dimensional image formed by the two-dimensional image forming apparatus 30 is formed on the rear side focal plane of the second lens $L_2$. The magnification of the real image RI obtained here with respect to the two-dimensional image of the two-dimensional image forming apparatus 30 can be varied by arbitrarily selecting the focal distance $f_2$ of the second lens $L_2$. Further, the third lens $L_3$ having the focal distance $f_3$ forms a conjugate image CI of the Fourier transform image filtered by the spatial filter SF.

Here, since the rear side focal plane of the third lens $L_3$ is a conjugate plane of the spatial filter SF, this is equivalent to that the two-dimensional image produced by the two-dimensional image forming apparatus 30 is outputted from a portion on the spatial filter SF corresponding to one of the apertures 51. Then, the amount of light beams to be produced and outputted finally corresponds to the number of pixels (P×Q) and to the number of light beams which pass through the spatial filter SF. In particular, the situation that the amount of light beams which pass through the spatial filter SF is decreased by later passage or reflection of the light through or by a component of the two-dimensional image display apparatus does not substantially occur. Further, although the conjugate image CI of the Fourier transform image is formed on the rear side focal plane of the third lens $L_3$, since directional components of the conjugate image of the two-dimensional image are defined by directional components of illuminating light beams emitted from the light source 10E and incoming to the two-dimensional image forming apparatus 30, it can be regarded that the light beams are disposed regularly two-dimensionally on the rear side focal plane of the third lens $L_3$.

In other words, this is generally equivalent to a state that a plurality of, particularly $U_0 \times V_0$, projector units 301 shown in FIG. 49 are disposed on the rear side focal plane of the third lens $L_3$, that is, the plane on which the conjugate image CI is formed.

As schematically shown in FIGS. 30A and 30B, totaling M×N diffraction light beams are produced along the X direction and the Y direction by one pixel 31 of the two-dimensional image forming apparatus 30. It is to be noted that, while only diffraction light beams including the 0th order light beam ($n_0=0$), ± first order light beams ($n_0=\pm1$) and ±second order light beams ($n_0=\pm2$) are illustrated representatively in FIGS. 30A and 30B, actually higher order (for example, ± fifth order) diffraction light beams are formed, and a stereoscopic image is finally formed based on part of such diffraction light beams, particularly, for example, based on the 0th order light beams. It is to be noted that FIG. 30A schematically illustrates diffraction light beams produced from a light beam emitted from the light emitting element $11_B$, and FIG. 30B schematically illustrates diffraction light beams emitted from the light emitting element $11_A$. Here, on diffraction light beams or light fluxes of each diffraction order, all image information, that is, information of all pixels, of the two-dimensional image formed by the two-dimensional image forming apparatus 30 is intensified. A plurality of light beams produced by diffraction from the same pixel of the two-dimensional image forming apparatus 30 all have the same image information. In other words, in the two-dimensional image forming apparatus 30 formed from a liquid crystal display apparatus of the transmission type having P×Q pixels 31, illuminating light beams from the light source 10E is modulated by the pixels 31 to produce a two-dimensional image, and besides spatial frequencies of the produced two-dimensional image are emitted along diffraction angles corresponding to a plurality of, totaling M×N, diffraction orders produced from each pixel 31. In other words, a kind of M×N copies of the two-dimensional image are emitted along diffraction angles corresponding to a plurality of, totaling M×N, diffraction orders from the two-dimensional image forming apparatus 30.

The spatial frequencies of the two-dimensional image on which all image information of the two-dimensional image formed by the two-dimensional image forming apparatus 30 is intensified are Fourier transformed by the first lens $L_1$ to produce a number of Fourier transform images corresponding to a plural number of diffraction orders produced from each pixel 31. Then, only a predetermined Fourier transform image, for example, a Fourier transform image corresponding to the 0th order diffraction, from among the Fourier transform images, is passed through the spatial filter SF. Then, the selected Fourier transform image is inverse Fourier transformed by the second lens $L_2$ to form a conjugate image of the two-dimensional image produced by the two-dimensional image forming apparatus 30. The conjugate image of the two-dimensional image enters the third lens $L_3$, by which a conjugate image CI is formed. It is to be noted that, while the spatial frequencies of the two-dimensional image correspond to image information whose carrier frequency is the spatial frequency of the pixel structure, only a region of the image information whose carrier is a 0th order plane wave, that is, a region up to a spatial frequency equal to ½ the spatial frequency of the pixel structure in the maximum, is obtained as first order diffraction whose carrier frequency is the 0th order diffraction of the pixel structure, and the spatial frequencies lower than one half the spatial frequency of the pixel structure or aperture structure of the optical modulation section pass through the spatial filter SF. In this manner, the conjugate image of the two-dimensional structure formed by the third lens $L_3$ does not include the pixel structure of the two-dimensional image forming apparatus 30, but includes all spatial frequencies of the two-dimensional image produced by the two-dimensional image forming apparatus 30. Then, since a Fourier transform image of the spatial frequency of the conjugate image of the two-dimensional image is produced by the third lens $L_3$, Fourier transform images can be formed in a spatially high density.

As described above, with the image display apparatus 1E of the example 9, while a predetermined one of the light emitting elements 11 is turned on to emit light, a desired one of the apertures 51 of the Fourier transform image selection section 50 or spatial filter SF is opened. Accordingly, spatial frequencies of a two-dimensional image produced by the optical modulation section or two-dimensional image forming apparatus 30 are emitted along a plurality of diffraction angles corresponding to different diffraction orders and Fourier transformed by the Fourier transform image forming section 40 or first lens $L_1$. Then, Fourier transform images obtained by such Fourier transform are filtered spatially and temporally by the Fourier transform image selection section 50 or spatial filter SF, and a conjugate image CI of the filtered Fourier transform image is formed. Consequently, a group of beams of light can be produced and scattered in a state wherein they are distributed in a plurality of directions in a spatially high density without increasing the size of the entire image display apparatus. Further, the individual beams of light which are components of the group of light beams can be temporally and spatially controlled independently of each other. Consequently, a stereoscopic image formed from beams of light proximate in quality to those of a physical solid in the real world can be obtained.

Further, with the image display apparatus 1E of the example 9, since the light beam reproduction method is utilized, a stereoscopic image which satisfies such visual sensation functions as focal adjustment, convergence and motion parallax can be provided. Further, with the image display apparatus 1E of the example 9, since illuminating light beams whose incoming directions to the two-dimensional image forming apparatus 30 differ depending upon a plurality of light emitting positions disposed discretely from each other, when compared with the image outputting technique of the past, the number of light beams which can be controlled by a single image outputting device, that is, the two-dimensional image forming apparatus 30, can be made equal to the number of light emitting positions disposed discretely, that is, to $U_0 \times V_0$. Besides, with the image display apparatus 1E of the example 9, since filtering is carried out spatially and temporally, a temporal characteristic of the image display apparatus can be converted into a spatial characteristic of the three-dimensional image display apparatus. Further, a stereoscopic image can be obtained without using a diffusion screen or the like. Furthermore, a stereoscopic image which looks appropriately from whichever direction it is observed can be provided. Further, since a group of light beams can be produced and scattered in a spatially high density, a spatial image of a high definition near to a visual confirmation limit can be provided.

Example 10

Figure 33:
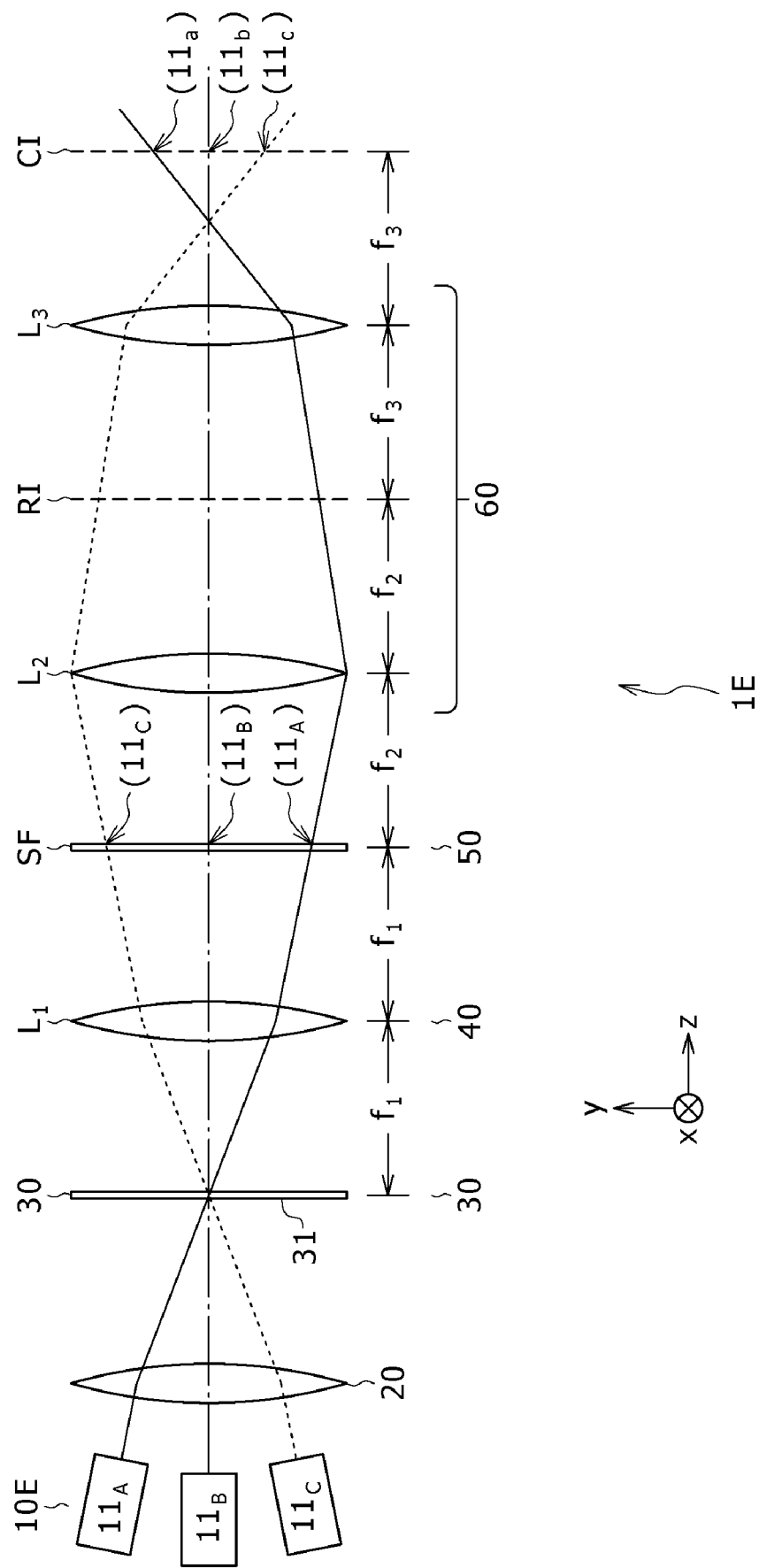
FIG. 33 is a schematic view showing an image display apparatus according to an example 10 on a yz plane.
Figure 34:
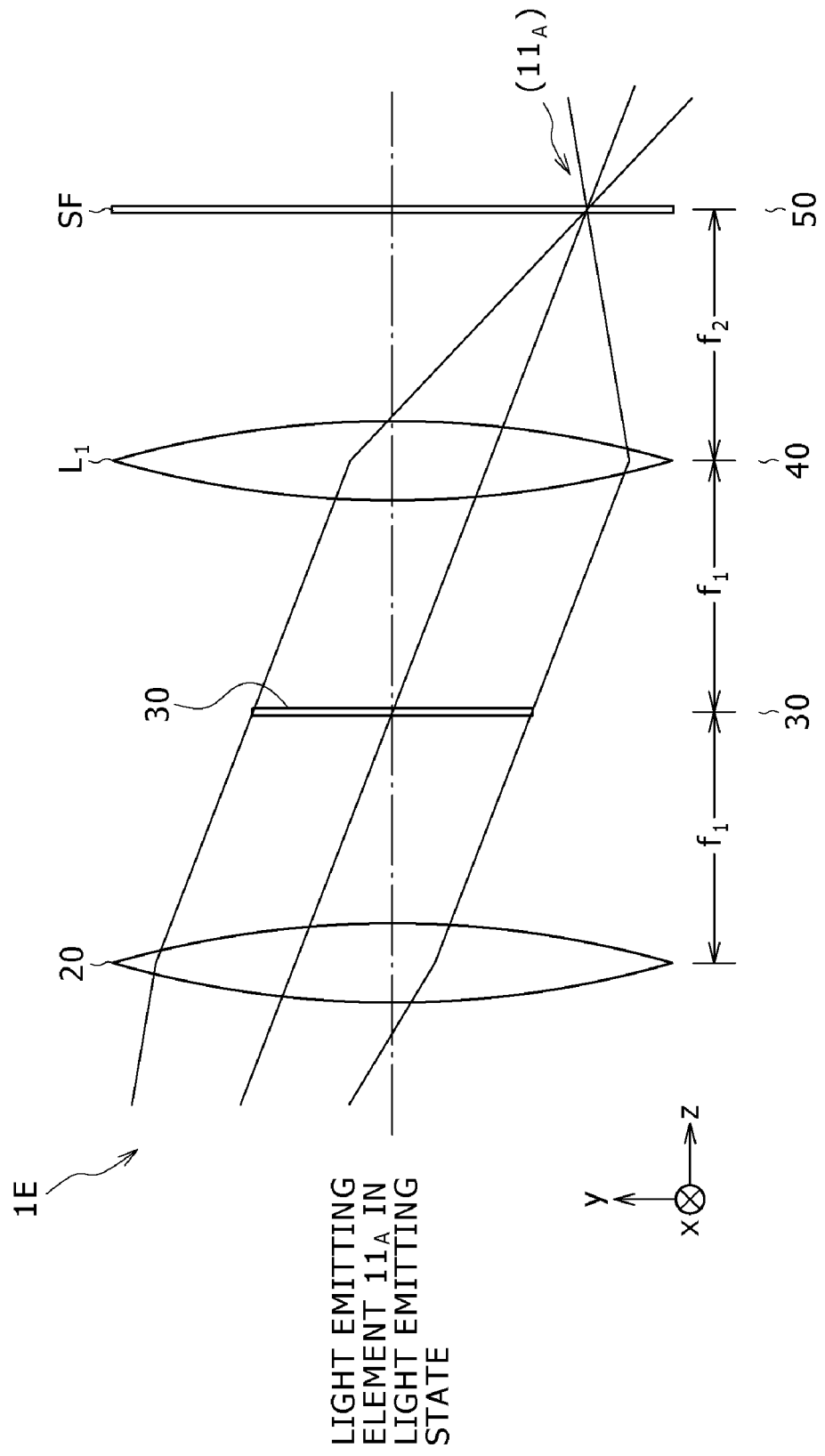
FIG. 34 is a schematic view showing part of the image display apparatus of the example 10 in an enlarged scale where a certain light emitting element is in a light emitting state.
Figure 35:
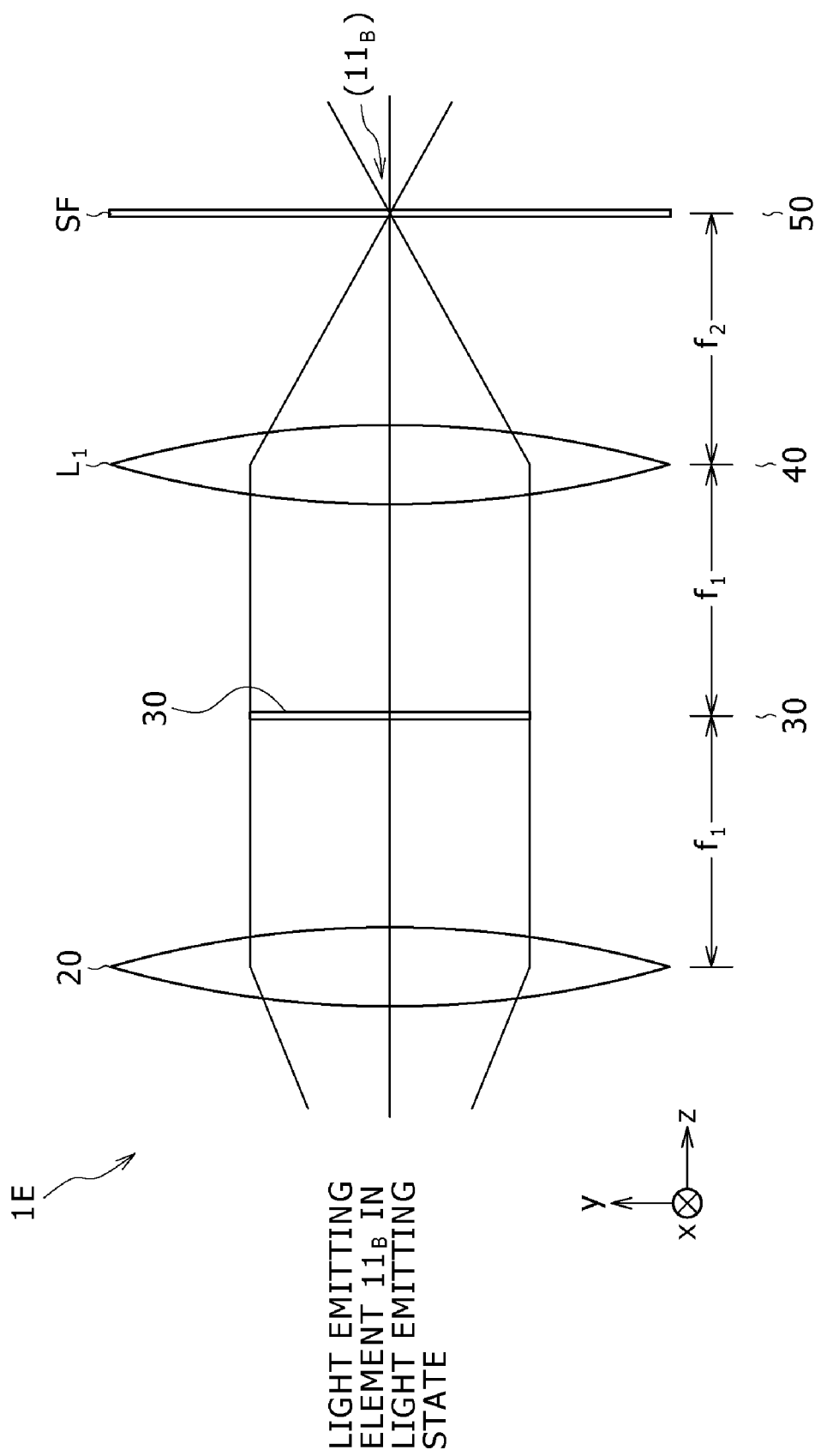
FIG. 35 is a similar view but showing part of the image display apparatus of the example 10 where another light emitting element is in a light emitting state.
Figure 36:
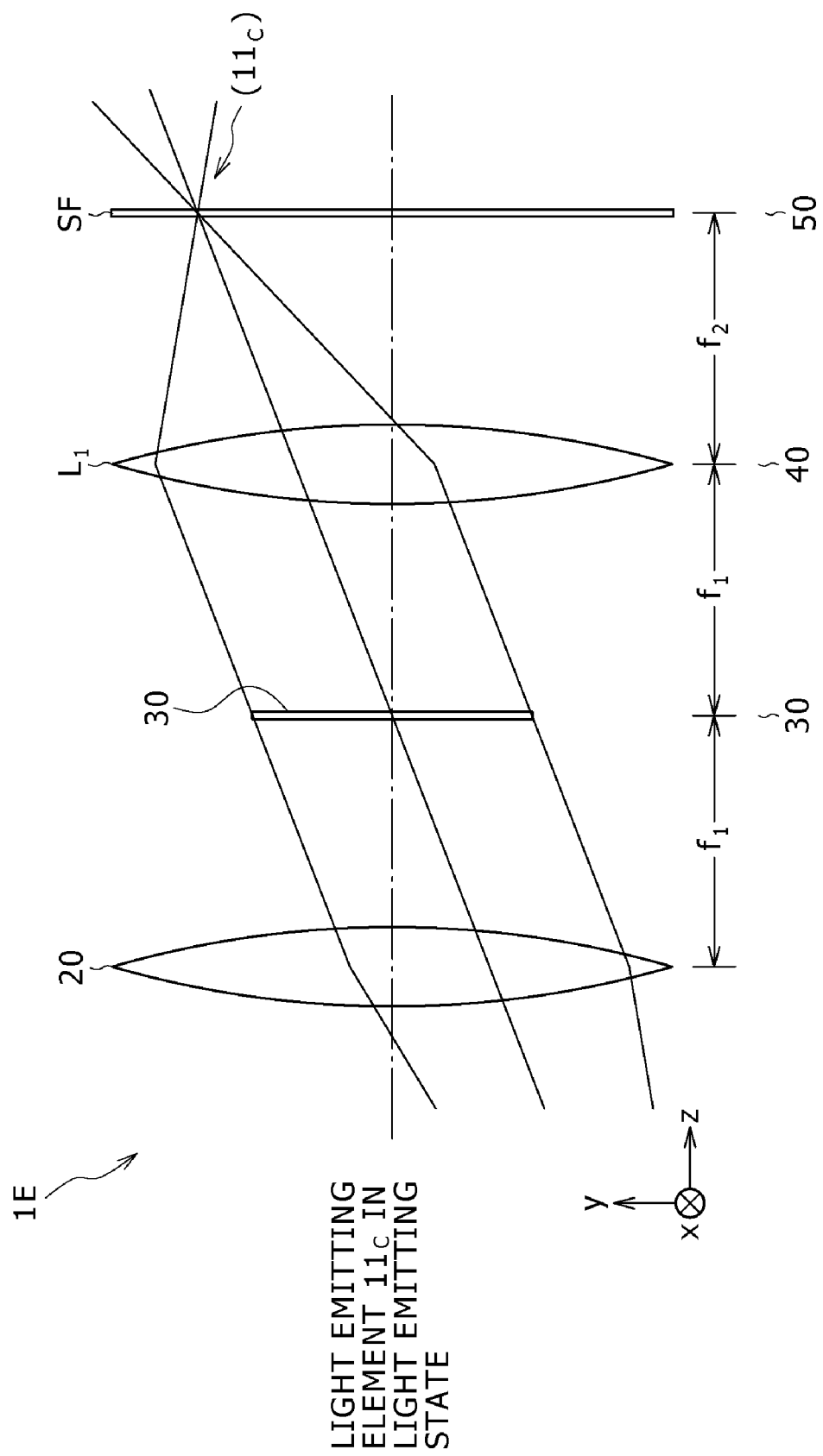
FIG. 36 is a similar view but showing part of the image display apparatus of the example 10 where a further light emitting element is in a light emitting state.

The example 10 is a modification to the example 9. In the example 10, the light source 10E includes a plurality of light emitting elements 11 arrayed in a two-dimensional matrix and disposed such that the emitting directions of light beams emitted from the light emitting elements 11 are different from each other. Therefore, an optical modulation section or two-dimensional image forming apparatus is illuminated with illuminating light beams successively emitted from different light emitting positions of the light source and having incoming directions different from each other. An image display apparatus where a light source having such a configuration as just described is adopted in the image display apparatus, more particularly the three-dimensional image display apparatus, of the example 9 is schematically shown in FIG. 33. It is to be noted that, in FIG. 33, one light flux emitted from the light emitting element $11_A$ of the light source 10E is indicated by a solid line; one light flux emitted from the light emitting element $11_B$ is indicated by an alternate long and short dash line; and one light flux emitted from the light emitting element $11_C$ is indicated by a broken line. Meanwhile, the positions of images on the spatial filter SF formed from the illuminating light beams emitted from the light emitting elements $11_A$, $11_B$ and $11_C$ are denoted by reference characters $11_A$, $11_B$ and $11_C$, respectively. Further, the positions of images on the rear side focal plane of the third lens $L_3$ formed from the illuminating light beams emitted from the light emitting elements $11_A$, $11_B$ and $11_C$ are denoted by reference characters $11_a$, $11_b$ and $11_c$, respectively. FIGS. 34, 35 and 36 schematically show, in an enlarged scale, the two-dimensional image forming apparatus 30, Fourier transform image forming section 40, Fourier transform image selection section 50 and associated members and illustrate fluxes of light emitted from the light emitting elements $11_A$, $11_B$ and $11_C$ of the light source 10E and passing through the two-dimensional image forming apparatus 30, first lens $L_1$ and spatial filter SF. It is to be noted that the position numbers of the light emitting elements $11_A$, $11_B$ and $11_C$ of the light source 10E are, for example, (5, 0), (0, 0) and (−5, 0), respectively. Here, if a certain one of the light emitting elements is in a turned on state, that is, in a light emitting state, then all of the other light emitting elements are in a turned off state, that is, in a no-light emitting state. It is to be noted that, in FIG. 33, reference numeral 20 denotes an illuminating optical system formed from a lens for shaping illuminating light.

In the example 9 or 10, the light source may be configured such that it includes light emitting elements, and a light advancing direction changing section for changing the advancing direction of beams of light emitted from the light emitting elements. In particular, for example, a polygon mirror is rotated around an axis of rotation thereof while the inclination angle of the axis of rotation thereof is controlled. Or, the light advancing direction changing section may be formed from a convex mirror having a curved face, a concave mirror having a curved face, a convex mirror formed from a polygon or a concave mirror formed from a polygon such that the position or the like of the mirror is controlled to vary or change the light emitting position of an illuminating light beam when it goes out from the mirror.

In the example 9 or 10, the image display apparatus may include, in place of the spatial filter SF or Fourier transform image selection section 50, a scattering diffraction limiting member having a number of apertures corresponding to the number of light emitting positions and positioned on the rear side focal plane of the first lens $L_1$. This scattering diffraction limiting member may be produced, for example, by forming an aperture such as for example, a pinhole in a plate-like member which does not pass light therethrough. Here, the position of the aperture may be set to a position at which a desired Fourier transform image or diffraction light beam, for example, of the 0th diffraction order, from among Fourier transform images or diffraction light beams obtained by the Fourier transform image selection section or first lens is formed. The position of the aperture may be made correspond to any one of the light emitting positions disposed discretely.

Example 11

Figure 37:
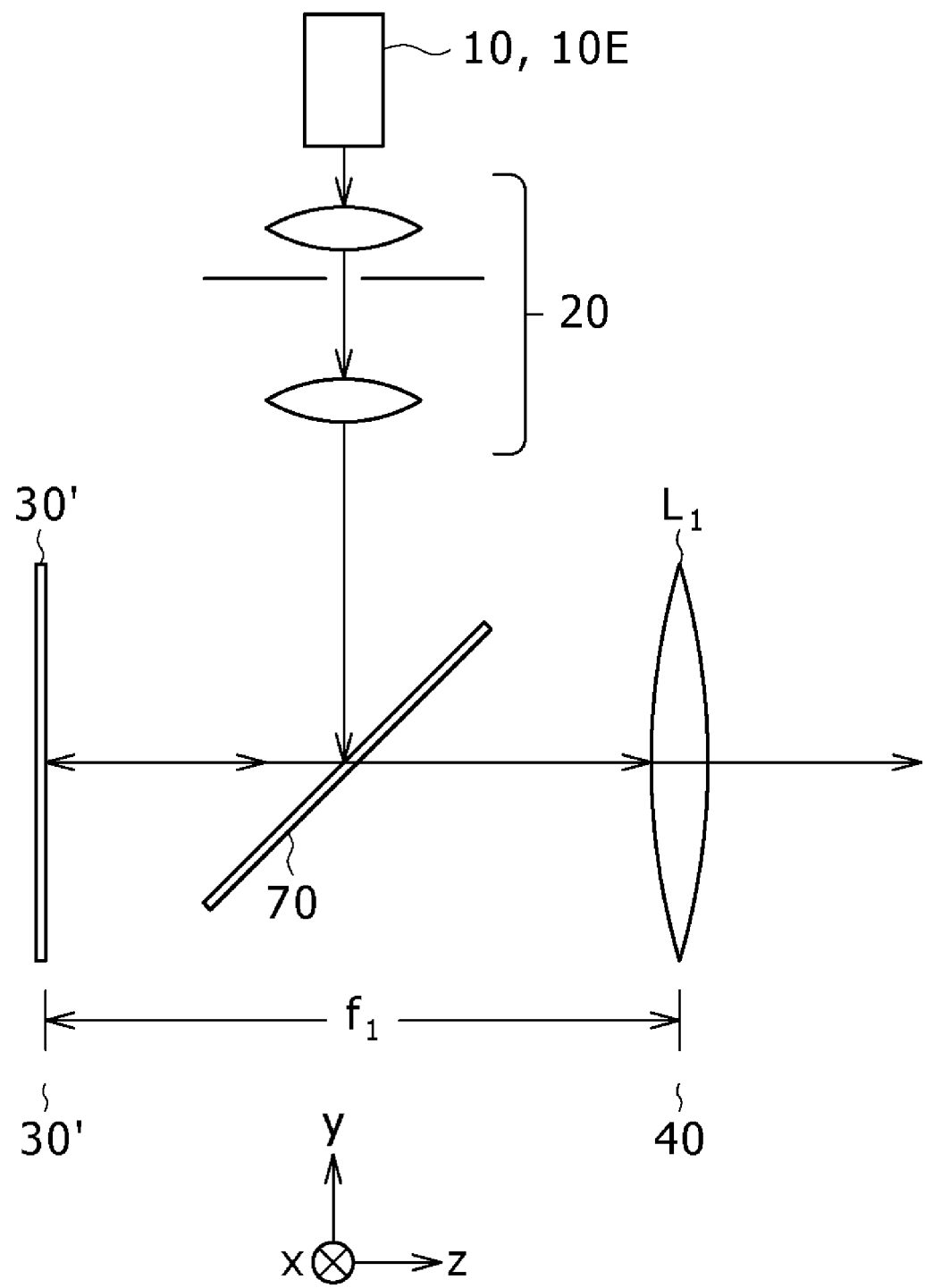
FIG. 37 is a schematic view showing an image display apparatus according to an example 11 on a yz plane.

The example 11 is a modification to the various examples described above. The image display apparatus of the example 11, more particularly, the three-dimensional image display apparatus, is schematically shown in FIG. 37. In the image display apparatus of the examples 1 to 10, the two-dimensional image forming apparatus 30 of the light transmission type is used. Meanwhile, in the image display apparatus of the example 11, an optical modulation section or two-dimensional image forming apparatus 30' of the reflection type is used. The optical modulation section or two-dimensional image forming apparatus 30' of the reflection type may be formed, for example from a liquid crystal display apparatus of the reflection type.

In the image display apparatus of the example 11, a beam splitter 70 is provided on the z axis which is an optical axis. The beam splitter 70 has a function of passing or reflecting light depending upon the polarized light component. The beam splitter 70 reflects a light beam or illuminating light beam emitted from the light source 10 or 10E toward the optical modulation section or two-dimensional image forming apparatus 30' of the reflection type. The beam splitter 70 passes reflected light from the optical modulation section or two-dimensional image forming apparatus 30' therethrough. Except those points, the configuration and structure of the image display apparatus of the example 11 can be made similar to those of the image display apparatus of the examples 1 to 11 described hereinabove, and therefore, detailed description of them is omitted herein.

It is to be noted that the optical modulation section or two-dimensional image forming apparatus of the reflection type may alternatively have, depending upon the form of the example applied, such a configuration that a movable mirror is provided in each aperture, that is, may have a configuration formed from a two-dimensional type MEMS wherein movable mirrors are arrayed in a two-dimensional matrix. In this instance, a two-dimensional image is produced by movement/non-movement of the movable mirrors, and besides, Fraunhofer diffraction is caused by the apertures. It is to be noted that, where the two-dimensional type MEMS is adopted, no beam splitter is required, and illuminating light may be introduced from an oblique direction to the two-dimensional type MEMS.

Now, the timings of opening and closing control of the apertures 51 of the spatial filter SF in the examples 1 to 6 and 9 to 10 are described.

The spatial filter SF carriers out opening and closing control of the apertures 51 in synchronism with image outputting of the two-dimensional image forming apparatus 30 in order to select a Fourier transform image corresponding to a desired diffraction order. This operation is described with reference to FIGS. 38, 39 and 40. It is to be noted that the uppermost stage of FIG. 38 illustrates a timing of outputting of an image from the two-dimensional image forming apparatus 30, and the middle stage of FIG. 38 illustrates opening and closing timings of the (3, 2)th aperture 51 of the spatial filter SF while the lowermost stage of FIG. 38 illustrates opening and closing timings of the (3, 3)th aperture 51.

Figure 38:
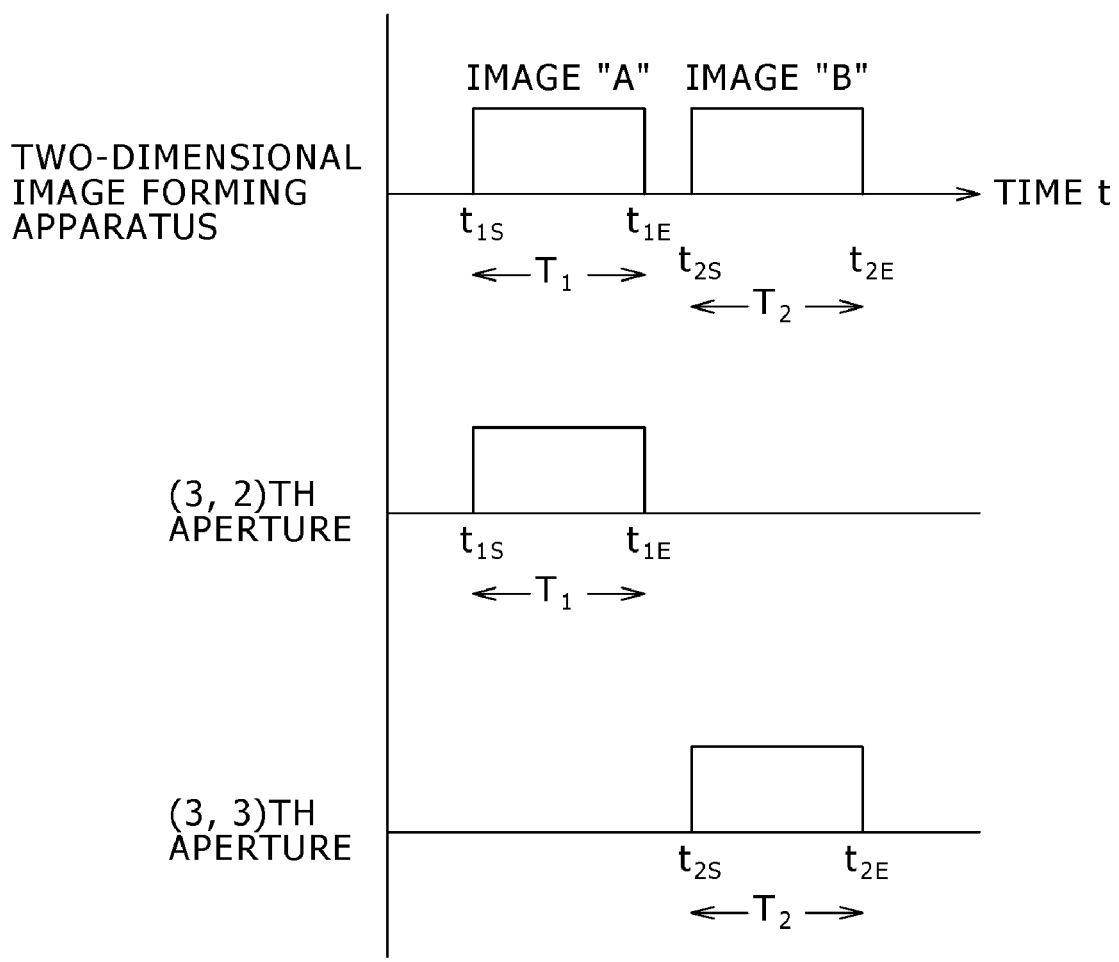
FIG. 38 is a waveform diagram illustrating timings of formation of a two-dimensional image by an optical modulation section or two-dimensional image forming apparatus of the image display apparatus of the example 11 and opening and closing timings of different apertures of a Fourier transform image selection section or spatial filter.

It is assumed that, as seen in FIG. 38, in the two-dimensional image forming apparatus 30, an image "A" is displayed within a period $TM_1$ from time $t_{1S}$ to time $t_{1E}$, and another image "B" is displayed within another period $TM_2$ from time $t_{2S}$ to time $t_{2E}$. In this instance, in the spatial filter SF in the examples 1 to 6, the (3, 2)th aperture 51 is placed into an open state within the period $TM_1$, and the (3, 3)th aperture 51 is placed into an open state within the period $TM_2$. In this manner, different image information can be added to Fourier transform images which are produced in different diffraction orders by the same pixel 31 in the two-dimensional image forming apparatus 30, the same aperture region 34 of the oversampling filter OSF or the same optical element 36 of the optical apparatus 35 and are produced by the first lens $L_1$ or the third lens $L_3$. In other words, within the period $TM_1$, image information regarding the image "A" is included in a Fourier transform image having a diffraction order number of $m_0=3$ and $n_0=2$ obtained from a certain pixel 31 of the two-dimensional image forming apparatus 30, a certain aperture region 34 of the oversampling filter OSF or a certain optical element 36 of the optical apparatus 35. On the other hand, within the period $TM_2$, image information regarding the image "B" is included in a Fourier transform image having another diffraction order number of $m_0=3$ and $n_0=3$ obtained from the same certain pixel 31 of the two-dimensional image forming apparatus 30, the same certain aperture region 34 of the oversampling filter OSF or the same certain optical element 36 of the optical apparatus 35.

It is assumed that, also in the example 9, as seen in FIG. 38, in the two-dimensional image forming apparatus 30, the image "A" is displayed within the period $TM_1$ from time $t_{1S}$ to time $t_{1E}$, and the image "B" is displayed within the period $TM_2$ from time $t_{2S}$ to time $t_{2E}$. In this instance, in the light source 10E, only the (3, 2)th light emitting element is placed into a light emitting state within the period $TM_1$, and only the (3, 3)th light emitting element is placed into a light emitting state within the period $TM_2$. In this manner, different illuminating light beams successively emitted from a plurality of light emitting positions disposed discretely and having different incoming directions to the two-dimensional image forming apparatus 30 are used and besides are modulated individually by the pixels 31. Meanwhile, in the spatial filter SF, the (3, 2)th aperture 51 is placed into an open state within the period $TM_1$, and the (3, 3)th aperture 51 is placed into an open state within the period $TM_2$ as seen in FIG. 38. In this manner, different image information can be added to Fourier transform images which are produced by the first lens $L_1$ as different diffraction order images from the same pixel 31 of the two-dimensional image forming apparatus 30. In other words, within the period $TM_1$, a Fourier transform image having the 0th diffraction order obtained at a certain pixel of the two-dimensional image forming apparatus 30 by placing the (3, 2)th light emitting element into a light emitting state includes image information relating to the image "A" and incoming direction information of the illuminating light to the two-dimensional image forming apparatus 30. On the other hand, within the period $TM_2$, a Fourier transform image having the 0th diffraction order obtained at the same certain pixel of the two-dimensional image forming apparatus 30 by placing the (3, 3)th light emitting element into a light emitting state includes image information relating to the image "B" and incoming direction information of the illuminating light to the two-dimensional image forming apparatus 30.

Figure 39:
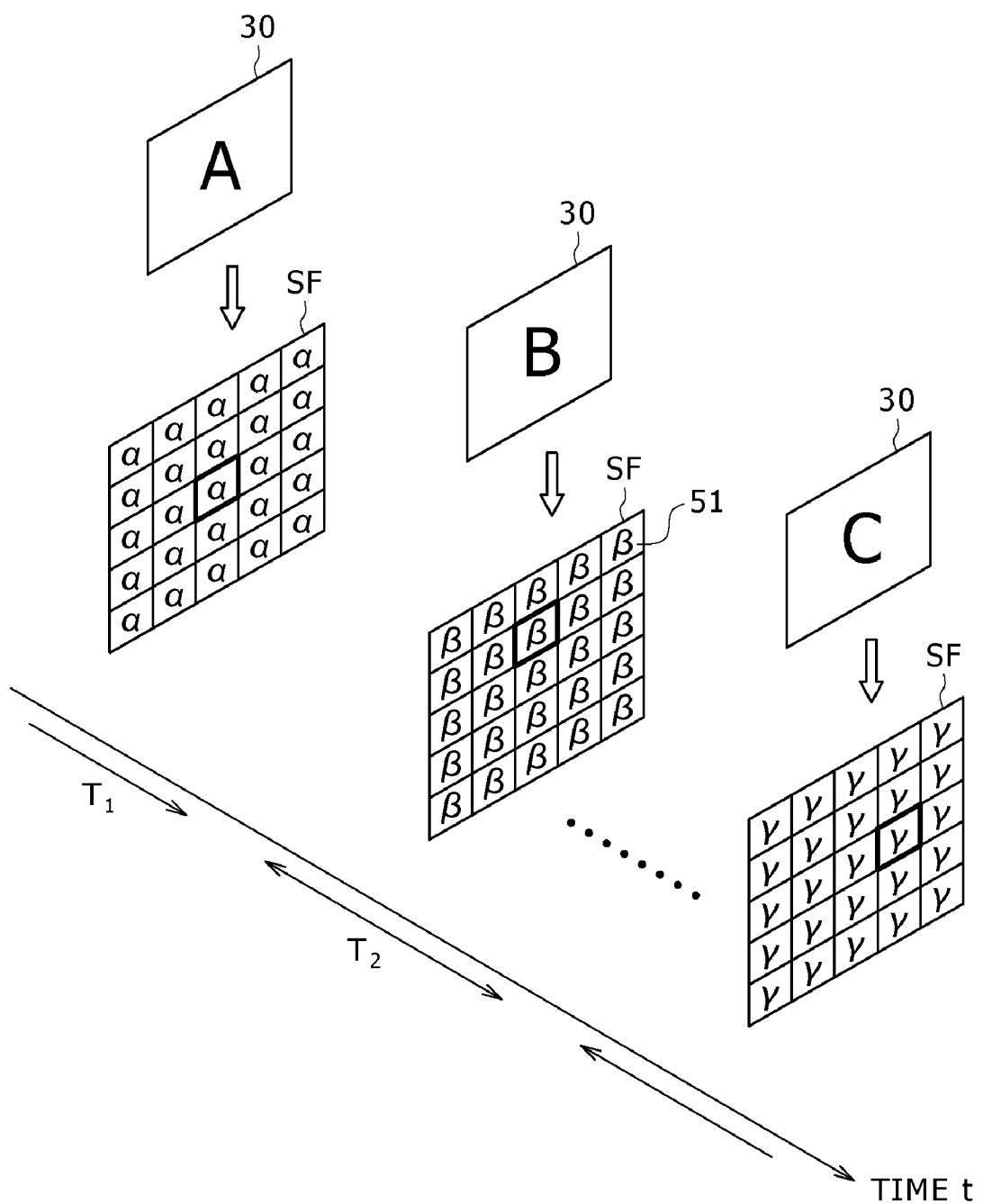
FIG. 39 is a schematic view illustrating spatial filtering by a Fourier transform image selection section or spatial filter in the image display apparatus of the example 11 in a time series.

FIG. 39 schematically illustrates a timing of image formation and a timing of control of the apertures 51 on the two-dimensional image forming apparatus 30. Referring to FIG. 39, within the period $TM_1$, the two-dimensional image forming apparatus 30 displays the image "A", and M×N Fourier transform images are condensed as a Fourier transform image "α" on the corresponding (3, 2)th aperture 51 of the spatial filter SF. Within the period $TM_1$, since only the (3, 2)th aperture 51 is opened, only the Fourier transform image "α"

having the diffraction order of $m_0=3$ and $n_0=2$, in the example 9, only the Fourier transform image "α" having the 0th diffraction order, passes through the spatial filter SF. Within the next period $TM_2$, the two-dimensional image forming apparatus 30 displays the image "B", and M×N Fourier transform images are condensed similarly as a Fourier transform image "β" on the corresponding (3, 3)th aperture 51 of the spatial filter SF. Within the period $TM_2$, since only the (3, 3)th aperture 51 is opened, only the Fourier transform image "β" having the diffraction order of $m_0=3$ and $n_0=3$, in the example 9, only the Fourier transform image "β" having the 0th diffraction order, passes through the spatial filter SF. Thereafter, opening and closing control of the apertures 51 of the spatial filter SF is carried out successively in synchronism with every image forming timing of the two-dimensional image forming apparatus 30. It is to be noted that, in FIG. 39, an aperture 51 in the open state is surrounded by a solid line while the apertures 51 in the closed state are surrounded by a broken line. Here, in the example 9, if the space occupied by the spatial filter SF is watched for a certain period of time, then a state wherein $U_0 \times V_0$ bright spots or Fourier transform images are juxtaposed in a two-dimensional matrix, that is, a state similar to that shown in FIG. 2, would be observed.

Figure 40:
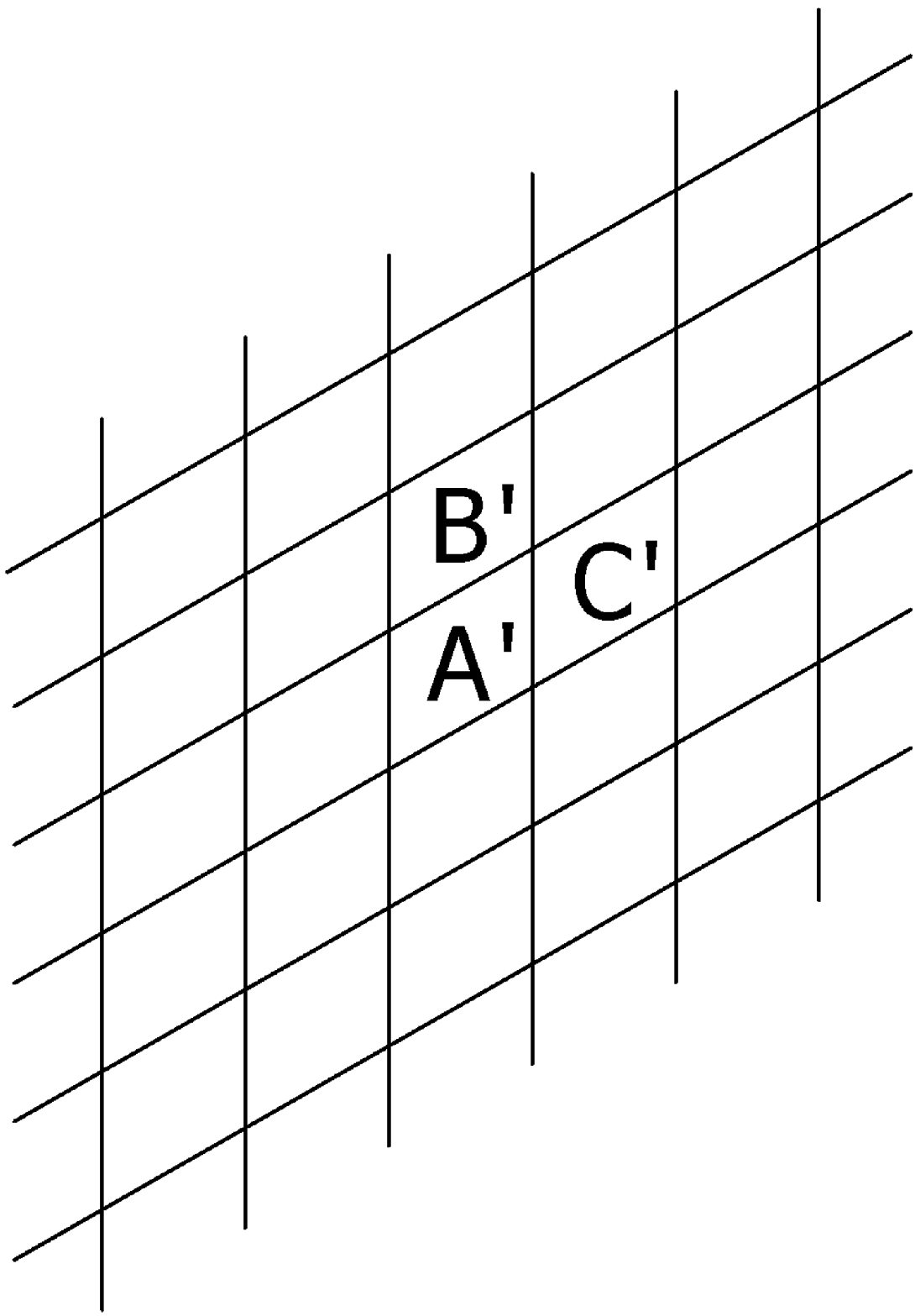
FIG. 40 is a schematic view showing an image obtained as a result of the spatial filtering illustrated in FIG. 39.
Figure 41:
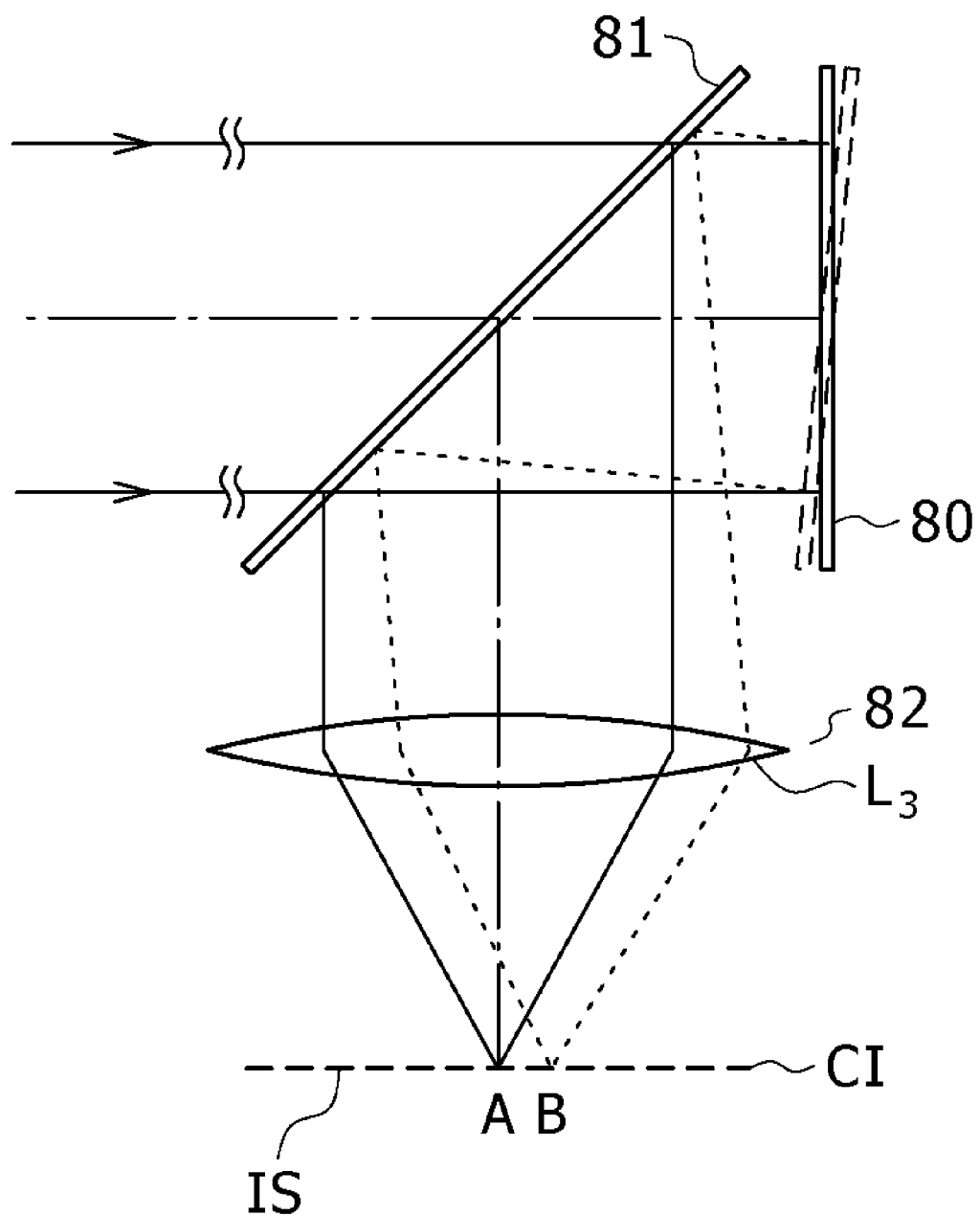
FIG. 41 is a schematic view illustrating a position on an image forming plane at which an image is formed as a result of position control carried out by a light advancing direction changing section of the image display apparatus of the example 11.

Images obtained as a final output of the image display apparatus where image formation and opening and closing control of the apertures 51 of the two-dimensional image forming apparatus 30 are carried out at such timings as described above are schematically shown in FIG. 40. Referring to FIG. 40, an image "A'" is obtained as a result of passage through the spatial filter SF only of a Fourier transform image "α" of the 0th order diffraction when only the Fourier transform image "α" having the diffraction order number of $m_0=3$ and $n_0=2$, in the example 9, only the (3, 2)th light emitting element, is in a light emitting state because only the (3, 2)th aperture 51 is opened. Another image "B'" is obtained as a result of passage through the spatial filter SF only of another Fourier transform image "β" of the 0th order diffraction when only the Fourier transform image "β" having the diffraction order number of $m_0=3$ and $n_0=3$, in the example 9, only the (3, 3)th light emitting element, is in a light emitting state because only the (3, 3)th aperture 51 is opened. A further image "C'" is obtained as a result of passage through the spatial filter SF only of a further Fourier transform image "γ" of the 0th order diffraction when only the Fourier transform image "γ" having the diffraction order number of $m_0=4$ and $n_0=2$, in the example 9, the (4, 2)th light emitting element, is in a light emitting state because only the (4, 2)th aperture 51 is opened. It is to be noted that the image shown in FIG. 40 is an image observed by the observer. While, in FIG. 40, different images are partitioned by solid lines, such solid lines are virtual lines. Further, although actually such images as shown in FIG. 40 are obtained not at the same time, since the changeover time between images is very short, they are observed by the eyes of the observer as if they were displayed simultaneously. For example, formation of images for all orders of the two-dimensional image forming apparatus 30 or oversampling filter OSF, that is, formation of M×N images and selection of one image by the spatial filter SF are carried out within the display period of one frame. Further, in the example 9, selection of $U_0 \times V_0$ images based on all of the light emitting positions disposed discretely is carried out within the display period of one frame. Further, although the images are shown displayed on a plane in FIG. 40, actually a stereoscopic image is observed by the observer.

In particular, in the examples 1 to 6 and 9 to 10, a two-dimensional image produced by the two-dimensional image forming apparatus 30 or conjugate images of the two-dimensional image produced by the second lens $L_2$, for example, images "A'", "B'", ..., "C'", are outputted in a time series from the rear side focal plane of the third lens $L_3$ or the fifth lens $L_5$ as described hereinabove. This is equivalent as a whole to that a number of projector units 301 shown in FIG. 49 corresponding to the number of diffraction orders, particularly M×N projector units 301, or a number of projector units 301 corresponding to the number of light emitting positions disposed discretely, particularly $U_0 \times V_0$ projector units 301, are disposed on the rear side focal plane of the third lens $L_3$ or the fifth lens $L_5$, and an image "A'" is outputted from a certain projector unit 301 and another image "B'" is outputted from another projector unit 301, whereafter an image "C'" is outputted from a further projector unit 301 in a time series. Then, if the two-dimensional image forming apparatus 30 reproduces images in a time series based on data, for example, of a large number of images of a certain physical solid picked up from various positions or angles or of images produced by a computer, then a stereoscopic image can be obtained based on the images.

Now, timings and so forth of position control of the light advancing direction changing section 80 in the example 7 or 8 are described.

In order to cause the third lens $L_3$ to form an image having a directional component, position control of the light advancing direction changing section 80 is carried out in synchronism with image outputting of the two-dimensional image forming apparatus 30. This operation is described with reference to FIGS. 38, 39, 40 and 41. It is to be noted that the uppermost stage of FIG. 38 illustrates a timing of outputting of an image from the two-dimensional image forming apparatus 30, and the middle stage of FIG. 38 illustrates position control timings of the (3, 2)th image formation of the light advancing direction changing section 80 while the lowermost stage of FIG. 38 illustrates position control of the (3, 3)th image formation.

It is assumed that, as seen in FIG. 38, in the two-dimensional image forming apparatus 30, the image "A" is displayed within the period $TM_1$ from time $t_{1S}$ to time $t_{1E}$, and the image "B" is displayed within the period $TM_2$ from time $t_{2S}$ to time $t_{2E}$. In this instance, the light advancing direction changing section 80 carries out such position control that the (3, 2)th image is obtained within the time period $TM_1$ and the (3, 3)th image is obtained within the time period $TM_2$. It is to be noted that, in FIG. 41, the light advancing direction changing section 80 where it carries out position control so that the (3, 2)th image is obtained is indicated by a broken line, and an image obtained on the image forming plane IS is denoted by "A", but the light advancing direction changing section 80 which is in another state wherein it carries out such position control that the (3, 3)th image is obtained is indicated by a solid line and an image obtained on the image forming plane IS is denoted by "B". In this manner, different image information or directional component can be applied to a Fourier transform image produced by the first lens $L_1$. In other words, within the period $TM_1$, the Fourier transform image includes image information relating to the image "A". On the other hand, within the period $TM_2$, the Fourier transform image includes image information relating to the image "B".

FIG. 39 schematically illustrates timings of image formation of the two-dimensional image forming apparatus 30 and timings of position control of the light advancing direction changing section 80. Within the period $TM_1$, the image "A" is displayed on the two-dimensional image forming apparatus 30, and this is condensed as a Fourier transform image "α" by the light advancing direction changing section 80. Then, within the period $TM_1$, the (3, 2)th image is formed. Within the next period TM$_2$, the image "B" is displayed on the two-dimensional image forming apparatus 30, and this is condensed as a Fourier transform image "β" on the light advancing direction changing section 80 similarly. Then, within the period TM$_2$, the (3, 3)th image is formed. Thereafter, position control of the light advancing direction changing section 80 is carried out successively in synchronism with every image formation timing of the two-dimensional image forming apparatus 30. It is to be noted that, in FIG. 39, an image formation position on the image forming plane IS is surrounded by solid lines, and a formation position at any other timing of the position control of the light advancing direction changing section 80 is surrounded by broken lines.

It is to be noted that, while it is necessary to synchronize change of the advancing direction of a light beam by the light advancing direction changing section 80 with production of a two-dimensional image based on the two-dimensional image forming apparatus 30, the operation of the light source 10 is interrupted so that no two-dimensional image is formed by the light advancing direction changing section 80 within a period after a certain image such as, for example, an image "α" is formed on the image forming plane IS by the light advancing direction changing section 80 until the position of the light advancing direction changing section 80 is altered or changed and then a next image such as, for example, an image "β" is formed on the image forming plane IS by the light advancing direction changing section 80.

Where image formation by the two-dimensional image forming apparatus 30 and position control of the light advancing direction changing section 80 are carried out in such timings as described above, such an image as schematically shown in FIG. 40 is obtained as a final output of the image display apparatus. Referring to FIG. 40, an image "A'" is obtained as a result of the (3, 2)th image formation; another image "B'" is obtained as a result of the (3, 3)th image formation; a further image "C'" is obtained as a result of the (4, 2)th image formation. For example, within a display period of one frame, production of a two-dimensional image and position control of the light advancing direction changing section 80 are carried out by a number of times of $S_0 \times T_0$.

In particular, in the example 7 or 8, conjugate images of the two-dimensional image produced by the second lens $L_2$, for example, images "A'", "B'", ..., "C'", are outputted in a time series from the rear side focal plane or image forming plane IS of the third lens $L_3$ as described hereinabove. This is equivalent as a whole to that, a plurality of, particularly $S_0 \times T_0$, projector units 301 shown in FIG. 49 are disposed on the rear side focal plane of the third lens $L_3$, and an image "A'" is outputted from a certain projector unit 301 and another image "B'" is outputted from another projector unit 301, whereafter an image "C'" is outputted from a further projector unit 301 in a time series. Then, if the two-dimensional image forming apparatus 30 reproduces images in a time series based on data, for example, of a large number of images of a certain physical solid picked up from various positions or angles or of images produced by a computer, then a stereoscopic image can be obtained based on the images.

Now, a configuration and a structure of the diffraction grating-optical modulation elements 210 are described.

Figure 42:
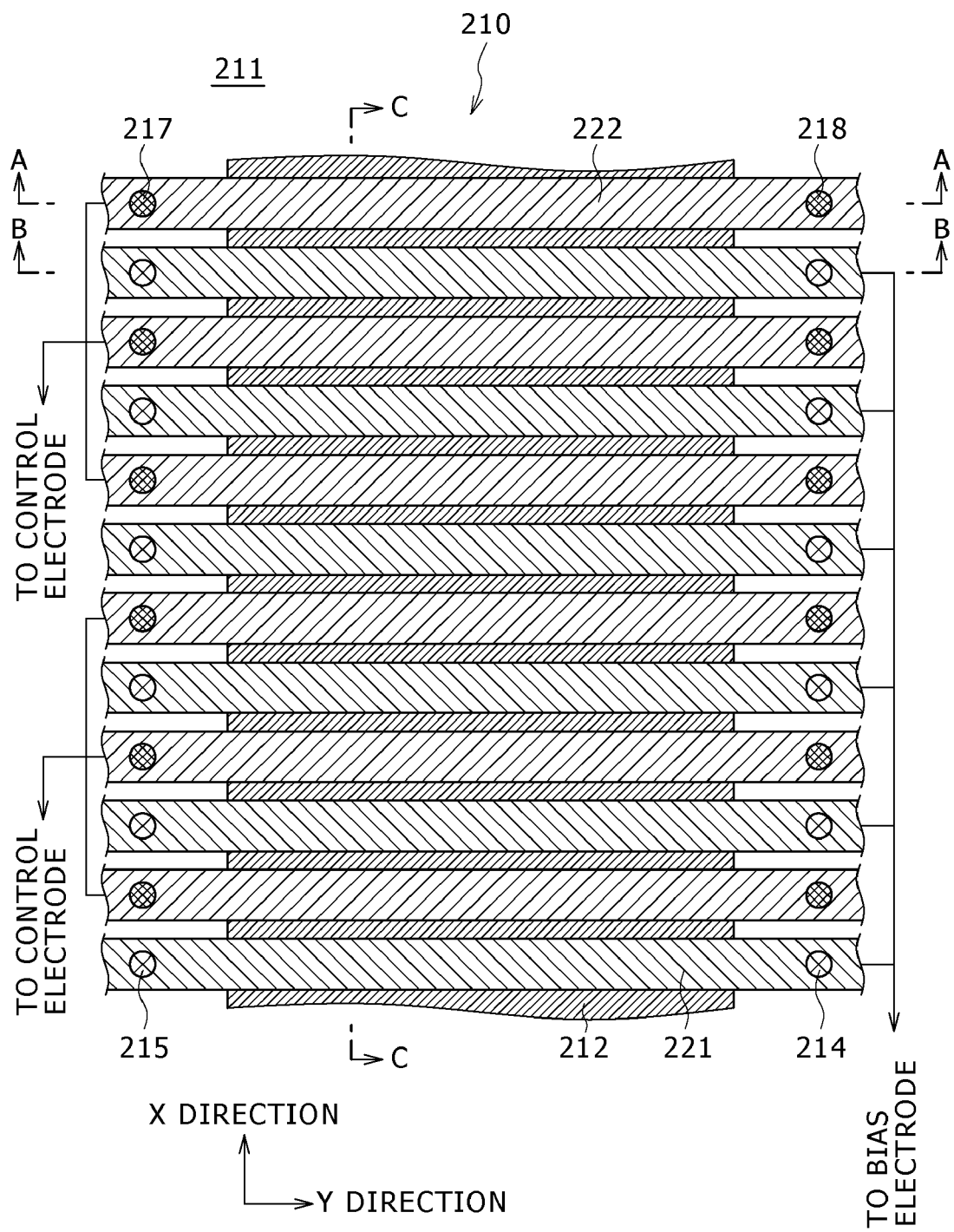
FIG. 42 is a schematic sectional view illustrating arrangement of a lower electrode, fixed electrodes and movable electrodes which compose a diffraction grating-light modulation element.

Arrangement of a lower electrode 212, fixed electrodes 221, movable electrodes 222 and so forth which compose a diffraction grating-optical modulation element 210 is schematically shown in FIG. 42. It is to be noted that, in FIG. 42, in order to clearly indicate the lower electrode 212, fixed electrodes 221, movable electrodes 222 and supporting portions 214, 215, 217 and 218, they are indicated by slanting lines.

Referring to FIG. 42, the diffraction grating-light modulation element 210 particularly includes a lower electrode 212, belt- or ribbon-shaped fixed electrodes 221 and belt- or ribbon-shaped movable electrodes 222. The lower electrode 212 is formed on a support member 211. Meanwhile, the fixed electrodes 221 are supported on the supporting portions 214 and 215 and are supported and extend above the lower electrode 212. Further, the movable electrodes 222 are supported on the supporting portions 217 and 218 and are supported and extend above the lower electrode 212 in a juxtaposed relationship with the fixed electrodes 221. In the example shown in FIG. 42, one diffraction grating-light modulation element 210 includes three fixed electrodes 221 and three movable electrodes 222. The three movable electrodes 222 are connected collectively to a control electrode which is connected to a connection terminal section not shown. Meanwhile, the three fixed electrodes 221 are connected collectively to a bias electrode. The bias electrode is provided commonly to the diffraction grating-light modulation elements 210 and is grounded through a bias electrode terminal section not shown. Also the lower electrode 212 is provided commonly to the diffraction grating-light modulation elements 210 and grounded through a lower electrode terminal section not shown.

Figure 43A:
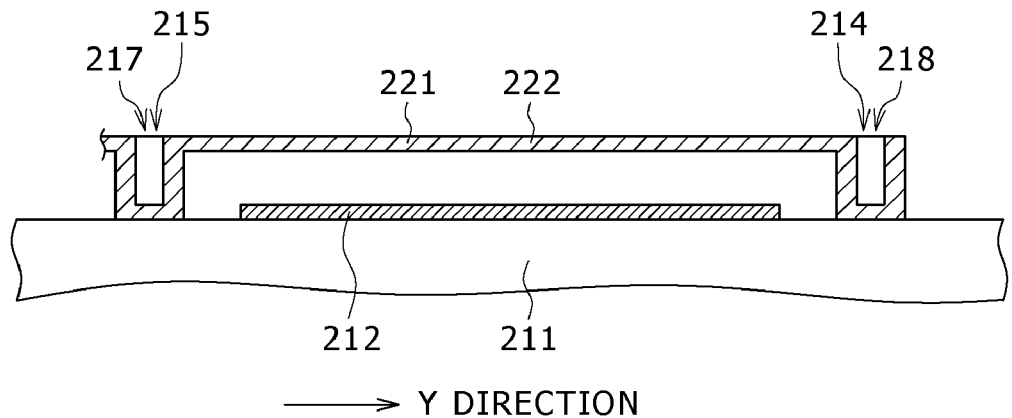
FIG. 43A is a schematic sectional view of a fixed electrode and so forth taken along line B-B of FIG. 42 and is a schematic sectional view of the movable electrode and so forth taken along line A-A of FIG. 42 where the diffraction grating-light modulation element is in an inoperative state.
Figure 43B:
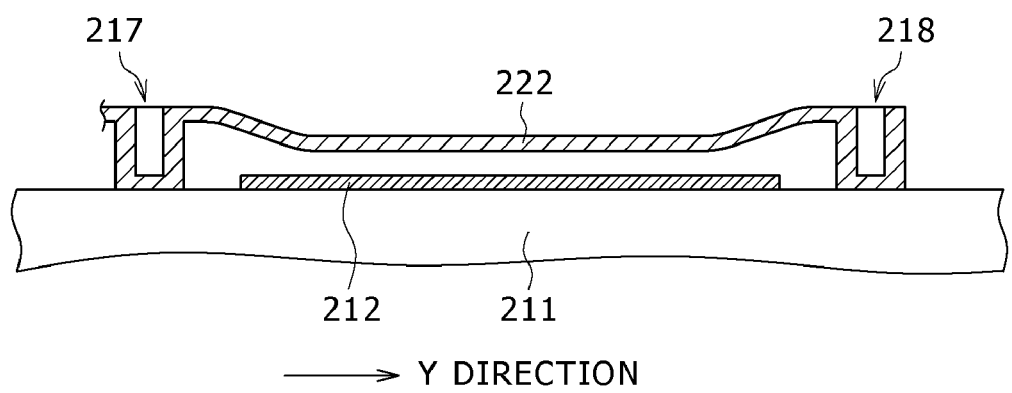
FIG. 43B is a schematic sectional view of the movable electrode and so forth taken along line B-B of FIG. 42 where the diffraction grating-light modulation element is in an operative state.

If a voltage is applied to the movable electrodes 222 through the connection terminal section and the control electrode and another voltage is applied to the lower electrode 212 (actually the lower electrode 212 is in a grounded state), then Coulomb force is generated between the movable electrodes 222 and the lower electrode 212. Then, the movable electrodes 222 are displaced downwardly toward the lower electrode 212 by the Coulomb force. It is to be noted that the movable electrodes 222 in a state before the displacement are shown in FIG. 43A and on the left side in FIG. 43C while the movement electrodes 222 in another state after the displacement are shown in FIG. 43B and on the right side of FIG. 43C. Then, a diffraction grating of the reflection type is formed by the movable electrodes 222 and the fixed electrodes 221 based on such displacement of the movable electrodes 222. Here, FIG. 43A is a schematic sectional view of a fixed electrode and so forth taken along line B-B of FIG. 42 and also is a schematic sectional view of a movable electrode and so forth taken along line A-A of FIG. 42 in a state wherein the diffraction grating-light modulation element is not in an operative state. Meanwhile, FIG. 43B is a schematic view of the movable electrode and so forth taken along line A-A of FIG. 42 but in a state wherein the diffraction grating-light modulation element is in an operative state, and FIG. 42c is a schematic sectional view of the fixed electrode, movable electrodes and so forth taken along line C-C of FIG. 42.

Where the distance between adjacent ones of the fixed electrodes 221 is represented by d (refer to FIG. 43C) and the wavelength of light (incidence angle: $\theta_1$) incident to the movable electrodes 222 and the fixed electrodes 221 is represented by λ and the diffraction angle is represented by $\theta_m$, they have a relationship represented by $$d[\sin(\theta_i) - \sin(\theta_m)] = m_{Dif} \cdot \lambda$$

where $m_{Dif}$ is the order number and assumes the values 0, ±1, ±2, . . . .

The light intensity of the diffracted light exhibits the highest value when the difference $\Delta h_1$ (refer to FIG. 43C) in height between the top face of the movable electrodes 222 and the top face of the fixed electrodes 221 is λ/4.

Figure 43C:
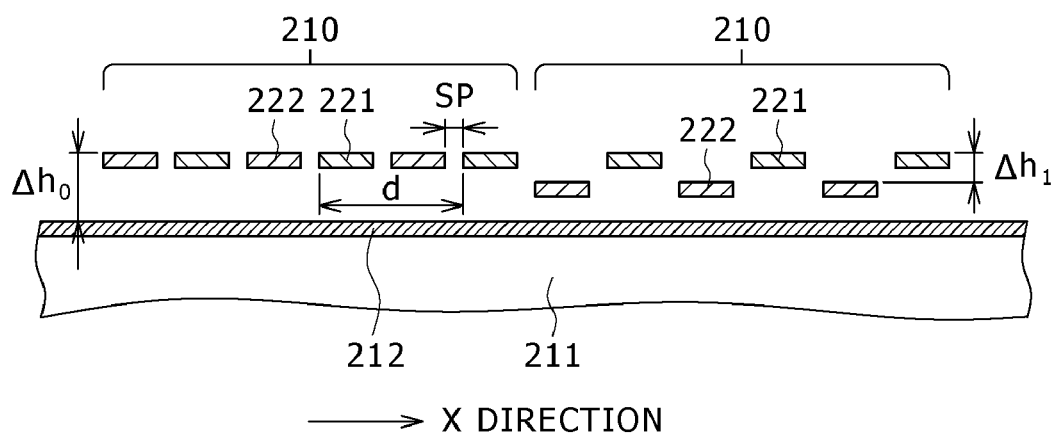
FIG. 43C is a schematic sectional view of fixed electrodes, movable electrodes and so forth taken along line C-C of FIG. 42.

In the optical modulation section, when the diffraction grating-light modulation elements 210 are in an inoperative state in which the movable electrodes 222 are in a state shown in FIG. 43A and on the left side of FIG. 43C, light reflected by the top faces of the movable electrodes 222 and the fixed electrodes 221 is intercepted by the spatial filter 204. On the other hand, when the diffraction grating-light modulation elements 210 are in an operative state in which the movable electrodes 222 are in a state shown in FIG. 43B and on the right side of FIG. 43C, ±1st order ($m_{Dif}=\pm1$) diffracted light beams diffracted by the movable electrodes 222 and the fixed electrodes 221 pass through the spatial filter 204. Such a configuration as just described allows on/off control of light. The difference $\Delta h_t$ in height between the top face of the movable electrodes 222 and the top face of the fixed electrodes 221 can be varied by varying the voltage to be applied to the movable electrodes 222. As a result, the intensity of the diffracted light beams can be varied to achieve gradation control.

Examples of a configuration of the light source and the illuminating optical system in the examples 1 to 8 are shown in FIGS. 44A to 44C and 45A to 45B. Here, a characteristic of light or illuminating light emitted from the light source and shaped by the illuminating optical system to illuminate the two-dimensional image forming apparatus 30 is described using spatial coherence.

The spatial coherence indicates the coherence of light which occurs with a cross section in an arbitrary space, and the degree thereof can be indicated by the contrast of interference fringes produced. In a production process of interference fringes, interference fringes which exhibit the highest contrast are produced by interference of plane waves or spherical waves which can be optically exchanged for plane waves. From this, it can be recognized that light having the highest spatial coherence is a plane wave or a spherical wave. For example, a plane wave having only a component of one advancing direction has the highest spatial coherence, and as the degree of the spatial coherence decreases, the number of components of advancing directions increases. Further, argument of the distribution of advancing direction components of light is equivalent to argument of the spatial magnitude of the light emitting origin or a secondary light emitting point. From the foregoing, the spatial coherence can be argued based on the spatial magnitude of the light emitting origin or the secondary light emitting point. The spatial coherence, that is, the spatial magnitude of the light source, makes a factor of determination of a spatial frequency characteristic of an image in an image display apparatus. If light other than light which has a perfect spatial coherence is used as illuminating light, then drop of the contrast occurs in the descending order from a high frequency component. Here, no particular numerical value is mentioned herein regarding the spatial frequency characteristic of an obtained image because a different demand is received from a particular application. Thus, various configuration methods for coping flexibly with different demands are described.

In the image display apparatus 1A to 1D of the examples 1 to 8, the configuration method of the light source and the illuminating optical system differs between a case wherein light having a high spatial coherence is used as illuminating light and another case wherein no such light is used. Further, the configuration of the illuminating optical system differs depending upon the characteristic of the light source. In the following description, combinations of configuration methods of the light source and the illuminating light source are described. It is to be noted that it is assumed that, in all cases, the light source emits light of a single color or of a color proximate to a single color.

Figure 44A:
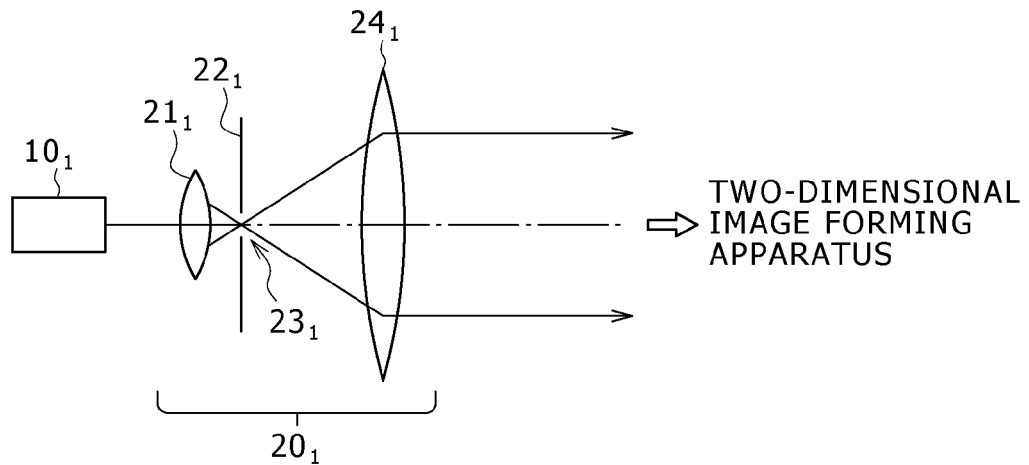
FIGS. 44A, 44B, 44C, 45A, and 45B are schematic views illustrating different examples of a configuration of a light source and an illumination optical system in the examples 1 to 8.

FIG. 44A shows a first configuration example wherein an illuminating optical system 20, generally having a high spatial coherence is configured from a light source $10_1$ of a high spatial coherence. The light source $10_1$ is formed, for example, from a laser. The illuminating optical system $20_1$ includes a lens $21_1$, a circular aperture plate $22_1$ and another lens $24_1$ provided in order from the light source side. A circular aperture $23_1$ is provided at the center of the circular aperture plate $22_1$. The aperture $23_1$ is disposed at a condensed light position by the lens $24_1$. The lens $24_1$ functions as a collimator lens.

Figure 44B:
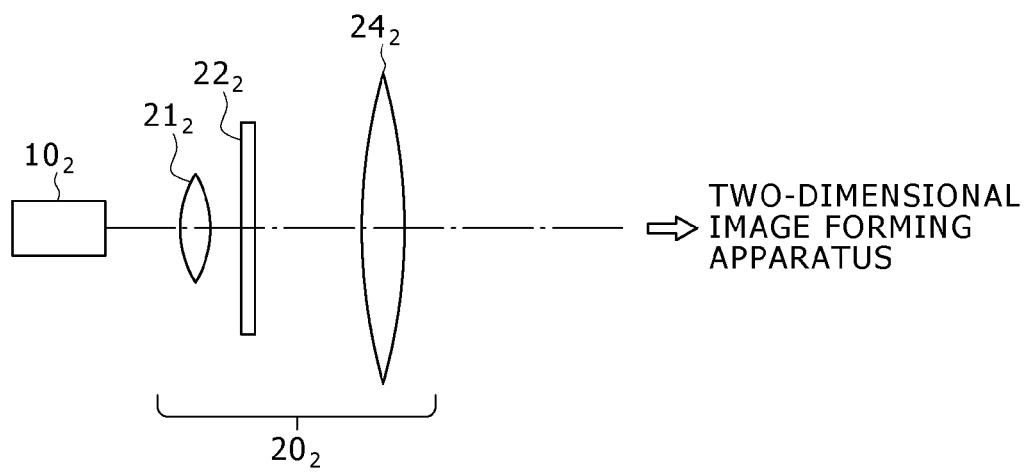

FIG. 44B shows an example wherein a light source $10_2$ having a high spatial coherence is used to configure an illuminating optical system $20_2$ which does not generally have a high spatial coherence. The light source $10_2$ is formed, for example, from a laser. The illuminating optical system $20_2$ includes a lens $21_2$, a diffusion plate $22_2$ and another lens $24_2$ disposed in order from the light source side. The diffusion plate $22_2$ may be, for example, a movable diffusion plate.

Figure 44C:
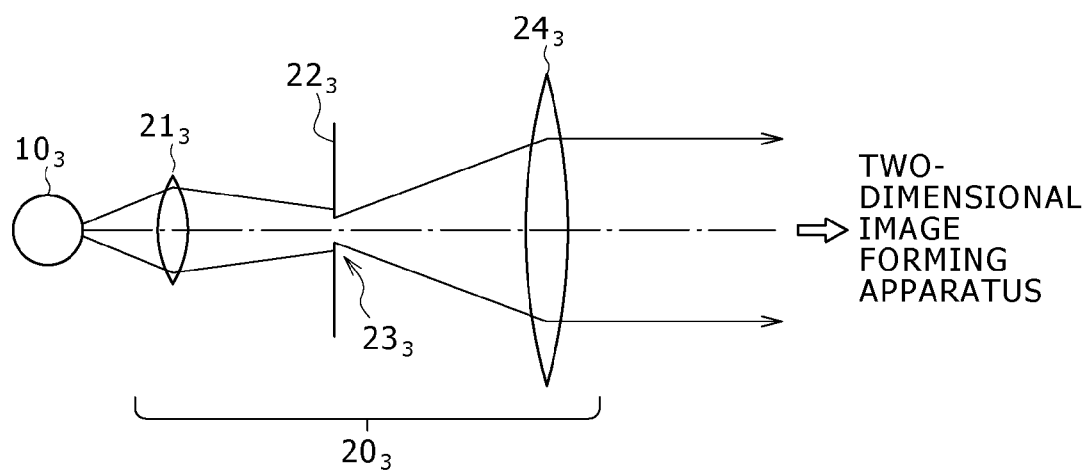
Figure 45A:
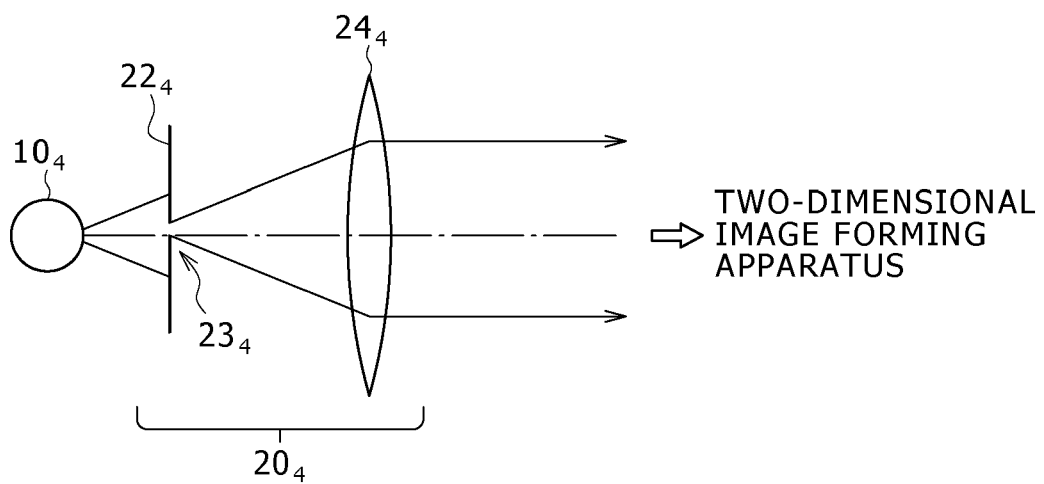

FIGS. 44C and 45A show third and fourth configuration examples wherein light sources $10_3$ and $10_4$ which do not have a high spatial coherence are used to configure illuminating optical systems $20_3$ and $20_4$ which generally have a high spatial coherence, respectively. For the light source $10_3$ or $10_4$, for example, a light emitting diode (LED) or a white light source is used. The illuminating optical system $20_3$ of FIG. 44C is configured from a lens $21_3$, a circular aperture plate $22_3$ and another lens $24_3$. A circular aperture $23_3$ is provided at the center of the aperture plate $22_3$. The aperture $23_3$ is disposed at the condensed light position of the lens $24_3$. The lens $24_3$ functions as a collimator lens. Meanwhile, the illuminating optical system $20_4$ of FIG. 45A does not include the lens $21_3$ when compared with the illuminating optical system $20_3$, and is configured from a circular aperture plate $22_4$ having an aperture $23_4$, and a lens $24_4$ disposed in order from the light source side.

Figure 45B:
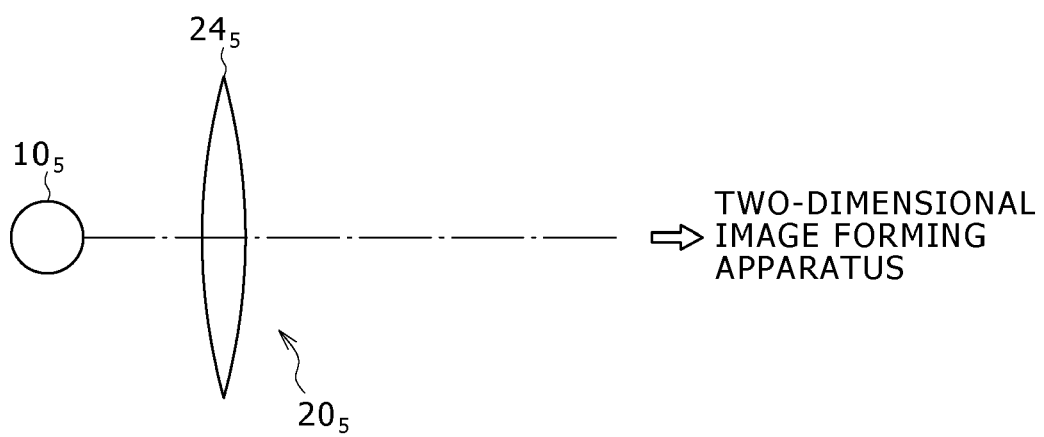

FIG. 45B shows a fifth configuration example wherein a light source $10_5$ which does not generally have a high spatial coherence is used to configure an illuminating optical system $20_5$ which does not generally have a high spatial coherence. Only a lens $24_5$ is provided in addition to the light source $10_5$.

In the configuration examples, where an illuminating optical system which generally has a high spatial coherence is to be constructed, the secondary light emitting point is set to a small size without depending upon the light source. On the other hand, where an illuminating optical system which does not generally have a high spatial coherence, the secondary light emitting point is set to a large size without depending upon the light source.

While the image display apparatus of the present invention has been described above in connection with preferred examples thereof, the present invention is not limited to the examples. Although, in the examples described above, the image display method and the image display apparatus have been described based on display methods and three-dimensional image display apparatus for a three-dimensional image, the image display method of the present invention can be applied not only to a display method of a three-dimensional image but widely to a display method of an image including a two-dimensional image and a three-dimensional image. Further, the image display apparatus described hereinabove in connection with the examples can finally display not only a three-dimensional image but also a two-dimensional image.

In the image display apparatus of the examples 1 to 11, control of operation of the optical modulation section or two-dimensional image forming apparatus is carried out by a personal computer not shown. Accordingly, the image display apparatus of the examples 1 to 11 include a computer including a recording medium such as, for example, a hard disk in addition to the components described hereinabove in connection with the examples 1 to 11. On or in the recording medium, two dimensional image whose various aberrations caused by an optical system which forms the image display apparatus such as, for example, the Seidel's five aberrations and chromatic aberration are corrected are recorded. Or operators which are used for correction of aberrations caused by the optical system which forms the image display apparatus and wherein, for example, the values of (m, n), (P, Q), (M, N), ($S_0$, $T_0$) and ($U_0$, $V_0$) are used as parameters are recorded. Then, production of a two-dimensional image by the optical modulation section or two-dimensional image forming apparatus is controlled by the computer. It is to be noted that the Fourier transform image selection section or spatial filter is disposed on a pupil plane in the optical system. Accordingly, the pupil plane is placed into a divided state by operation of the Fourier transform image selection section which selects a Fourier transform image corresponding to a desired diffraction order or operation of the spatial filter having an aperture whose opening and closing operations can be controlled, and this is equivalent to that the pupil is reduced. Accordingly, by dividing the pupil plane of the optical system, producing a two-dimensional image by the optical modulation section or two-dimensional image forming apparatus and time-sequentially controlling the divisional pupil planes, a desired image can be obtained from a dynamic image output synchronized with the production of a two-dimensional image and the time-sequential control of the divisional pupil planes.

While, in the example 3 or 4, the grating filter which forms the oversampling filter is formed from a phase grating, it may alternatively be formed from an amplitude grating.

Further, in the example 5, such a configuration that, for example, two convex lenses are interposed between the two-dimensional image forming apparatus 30 and the optical apparatus 35 and the two-dimensional image forming apparatus 30 is disposed on the front side focal plane of a first one of the convex lenses and besides the front side focal plane of a second one of the convex lenses is positioned on the front side focal plane of the first convex lens while the optical apparatus 35 is disposed on the rear side focal plane of the second convex lens can be adopted. Or, it is otherwise possible to adopt a configuration wherein the optical element 36 which composes the optical apparatus 35 is formed alternately from a concave lens. In this instance, the virtual aperture regions 37 are positioned forwardly, on the light source side, of the two-dimensional image forming apparatus 30. Further, the optical element 36 may be formed from a Fresnel lens in place of an ordinary lens.

While, in the example 9, the collimator lens 12 is interposed between the light source 10E and the optical modulation section or two-dimensional image forming apparatus 30, it may be replaced by a microlens array wherein microlenses are arrayed in a two-dimensional matrix.

While, in the example 1 or 2, the optical modulation section or two-dimensional image forming apparatus 30 or diffraction light beam production section is disposed on the front side focal plane of a lens, that is, the first lens $L_1$, which composes the Fourier transform image forming section 40, and the Fourier transform image selection section is disposed on the rear side focal plane, as occasion demands, although deterioration occurs with a stereoscopic image obtained finally as a result of crosstalk which occurs with spatial frequencies of a two-dimensional image, if such deterioration is permissible, then the two-dimensional image forming apparatus 30 or diffraction light beam production section may be disposed at a position displaced from the front side focal plane of the lens which composes the Fourier transform image forming section 40, that is, the first lens $L_1$. Or, the Fourier transform image selection section may be disposed at a position displaced from the rear side focal plane of the lens of the Fourier transform image forming section 40. Further, the first lens $L_1$, second lens $L_2$ or third lens $L_3$ is not limited to a convex lens, but an appropriate lens may be selected suitably.

Also in the examples 3 and 4, the oversampling filter OSF is disposed on the front side focal plane of a lens which composes the Fourier transform image forming section 40, that is, the third lens $L_3$, and the Fourier transform image selection section 50 or spatial filter SF is disposed on the rear side focal plane of the lens of the Fourier transform image forming section 40, that is, the third lens $L_3$. However, as occasion demands, although deterioration occurs with a stereoscopic image obtained finally as a result of crosstalk which occurs with spatial frequencies of a conjugate image of a two-dimensional image, if such deterioration is permissible, the oversampling filter OSF may be disposed at a position displaced from the front side focal plane of the lens of the Fourier transform image forming section 40, that is, the third lens $L_3$, or the Fourier transform image selection section may be disposed at a position displaced from the rear side focal plane of the lens of the Fourier transform image forming section 40, that is, the first lens $L_1$. Further, the first lens $L_1$, second lens $L_2$, third lens $L_3$, fourth lens $L_4$ or fifth lens $L_5$ is not limited to a convex lens, but an appropriate lens may be selected suitably.

Further, in the examples 5 and 6, a configuration may be adopted wherein the focus of the optical element 36 which composes the optical apparatus 35 is positioned on the front side focal plane of the lens which composes the Fourier transform image forming section 40, that is, the first lens $L_1$, and the Fourier transform image selection section is disposed on the rear side focal plane of the lens of the Fourier transform image forming section 40, that is, the first lens $L_1$. However, as occasion demands, although deterioration occurs with a stereoscopic image obtained finally as a result of crosstalk which occurs with spatial frequencies of a two-dimensional image, if such deterioration is permissible, the focus of the optical element 36 which composes the optical apparatus 35 may be disposed at a position displaced from the front side focal plane of the lens of the Fourier transform image forming section 40, that is, the first lens $L_1$, or the Fourier transform image selection section may be disposed at a position displaced from the rear side focal plane of the lens of the Fourier transform image forming section 40, that is, the first lens $L_1$. Further, the first lens $L_1$, second lens $L_2$ or third lens $L_3$ is not restricted to a convex lens, but an appropriate lens may be selected suitably.

Further, while the light advancing direction changing section 80 is disposed on the rear side focal plane of the second lens $L_2$ and the front side focal plane of the third lens $L_3$, as occasion demands, the light advancing direction changing section 80 may be disposed at a position displaced from the focal planes mentioned. Further, the first lens $L_1$, second lens $L_2$ or third lens $L_3$ is not restricted to a convex lens, but an appropriate lens may be selected suitably.

Further, in the examples 9 and 10, the two-dimensional image forming apparatus 30 or diffraction light beam production section is disposed on the front side focal plane of the lens which composes the Fourier transform image forming section 40, that is, the first lens $L_1$, and the Fourier transform image selection section is disposed on the rear side focal plane of the lens of the Fourier transform image forming section 40 or first lens $L_1$. However, as occasion demands, although deterioration occurs with a stereoscopic image obtained finally, if such deterioration is permissible, then the optical modulation section or the two-dimensional image forming apparatus 30 or diffraction light beam production section may be disposed at a position displaced from the front side focal plane of the lens of the Fourier transform image forming section 40, that is, the first lens $L_1$. Or the spatial filter SF or Fourier transform image selection section 50 may be disposed at a position displaced from the rear side focal plane of the lens of the Fourier transform image forming section 40, that is, the first lens $L_1$. Further, the first lens $L_1$, second lens $L_2$ or third lens $L_3$ is not restricted to a convex lens, but an appropriate lens may be selected suitably.

Figure 46A:
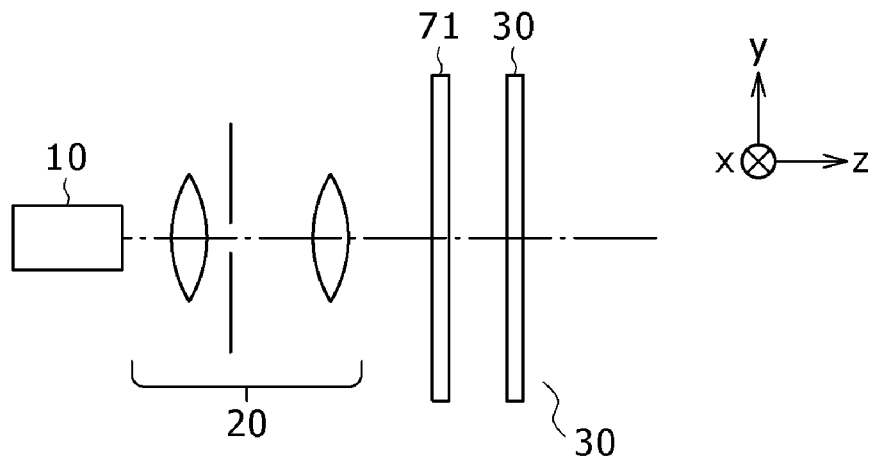
FIGS. 46A and 46B are schematic views showing part of modifications to the image display apparatus of the example 1 on a yz plane.

While, in the examples, it is assumed that the light source in all cases emits light of a single color or of a color proximate to a single color, the light source is not limited to that of such a configuration as just described. The wavelength band of the light source may extend over a plurality of bands. However, in this instance, where the image display apparatus 1A of the example 1 is taken as an example, preferably a narrow-band filter 71 for carrying out wavelength selection is disposed between the illuminating optical system 20 and the optical modulation section or two-dimensional image forming apparatus 30 as seen in FIG. 46A. Or where the image display apparatus 1E of the example 9 is taken as an example, preferably a narrow-band filter 71 for carrying out wavelength selection is disposed between the collimator lens 12 and the optical modulation section or two-dimensional image forming apparatus 30. Where the narrow-band filter 71 is disposed in this manner, it is possible to divide or select a wavelength band to extract single color light.

Figure 46B:
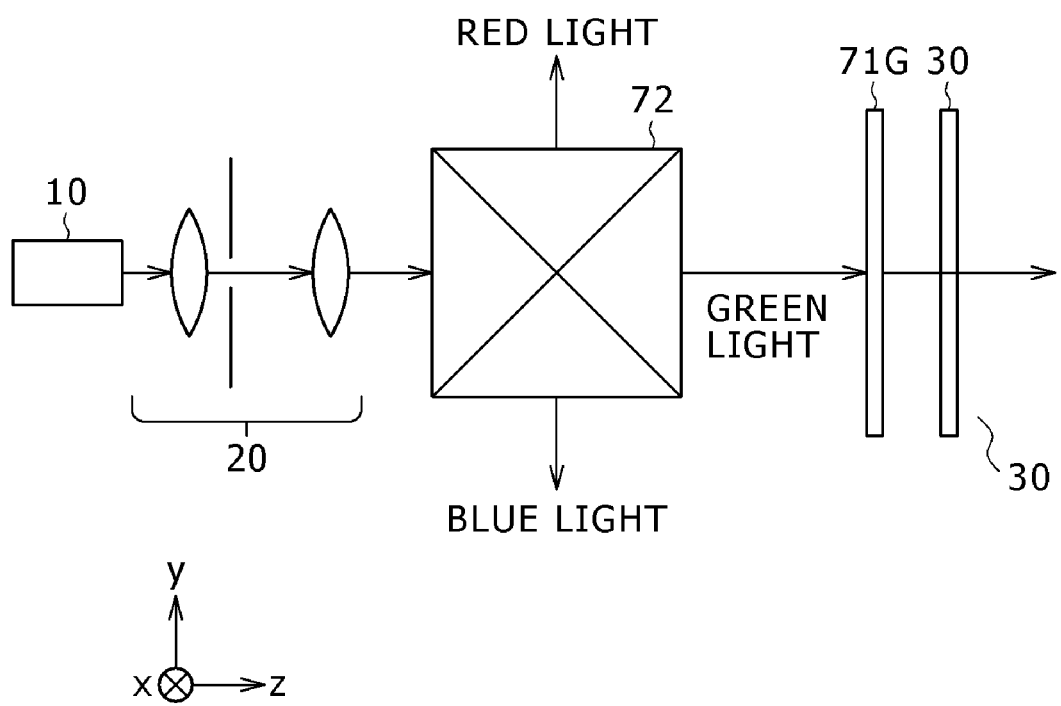

Or, the wavelength band of the light source 10 may extend over a wide band. It is to be noted, however, that, in this instance, preferably a dichroic prism 72 and a narrow-band filter 71G for carrying out wavelength selection are disposed between the illuminating optical system 20 and the optical modulation section or two-dimensional image forming apparatus 30 as seen in FIG. 46B or between the collimator lens 12 and the optical modulation section or two-dimensional image forming apparatus 30. In particular, the dichroic prism 72 reflects, for example, red light and blue light to different directions from each other but passes a light beam including green light therethrough. The narrow-band filter 71G which separates and select green light is disposed on the outgoing side of a light beam including green light from the dichroic prism 72.

Figure 47:
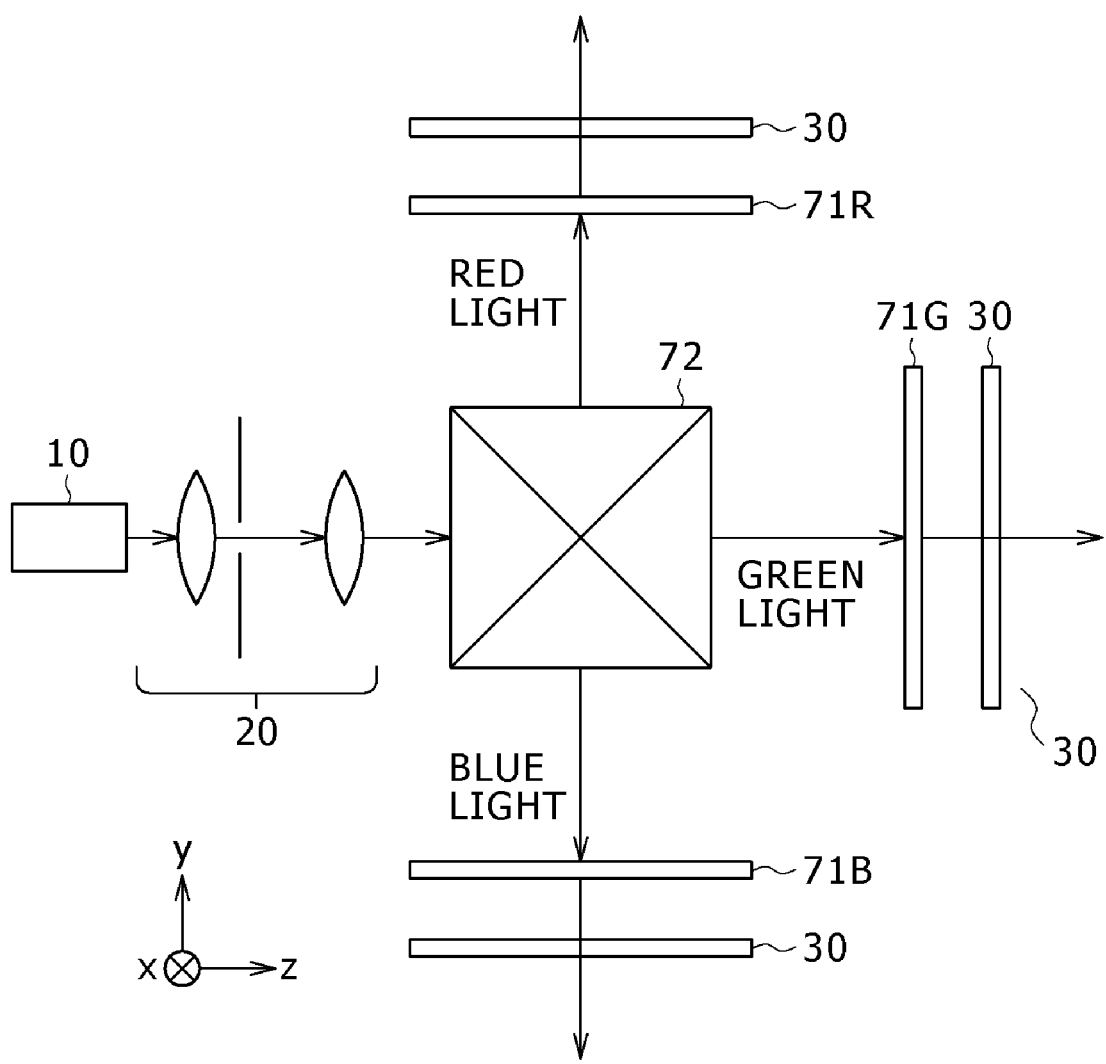
FIG. 47 is a schematic view showing part of a different modification to the image display apparatus of the example 1 on a yz plane.

Or, if, as shown in FIG. 47, a narrow-band filter 71G which separates and selects green light is disposed on the outgoing side of a light beam including green light of the dichroic prism 72 and a narrow-band filter 71R which separates and selects red light is disposed on the outgoing side of a light beam including red light while a narrow-band filter 71B which separates and selects blue light is disposed on the outgoing side of a light beam including blue light, then a light source for three image display apparatus which display three primary colors can be configured. If three image display apparatus having such a configuration as just described are used or a combination of a light source which emits red light and an image display apparatus, another light source which emits green light and another image display apparatus and a further light source which emits blue light and a further image display apparatus is used such that images from those image display apparatus are synthesized, for example, using a light synthesizing prism, then color display can be achieved. Or, if a light source is formed from a red light emitting element, a green light emitting element and a blue light emitting element and the red, green and blue light emitting elements are successively placed into a light emitting state, then color display can be achieved. It is to be noted that such modified image display apparatus described above can naturally be applied also to the other examples of the present invention.

While preferred embodiments of the present invention have been described using specific terms, such description is for illustrative purpose only, and it is to be understood that changes and variations may be made without departing from the spirit or scope of the following claims.

What is claimed is:

1. An image display method wherein an image display apparatus which includes a light source and an optical system is used,
    said optical system including:
        (A) an optical modulation section having a plurality of pixels and configured to modulate light from said light source by means of said pixels to produce a two-dimensional image and emit spatial frequencies of the produced two-dimensional image along a plurality of diffraction angles corresponding to different diffraction orders produced from each of said pixels;
        (B) a Fourier transform image forming section configured to Fourier transform the spatial frequencies of the two-dimensional image emitted from said optical modulation section to produce a number of Fourier transform images corresponding to the number of diffraction orders;
        (C) a Fourier transform image selection section configured to select a Fourier transform image corresponding to a desired diffraction order from among the Fourier transform images produced corresponding to the diffraction orders; and
        (D) a conjugate image forming section configured to form a conjugate image of the Fourier transform image selected by said Fourier transform image selection section; and
    said image forming method comprising:
        determining a fixed relationship for correcting two-dimensional image data based at least on controlling an opening or closing of apertures of a spatial filter to spatially and temporally filter Fourier transform images of the Fourier transform image selection section;
        correcting two-dimensional image data based on the fixed relationship; and
        a step, carried out by said optical modulation section, of producing a two-dimensional image based on two-dimensional image data whose aberrations caused by said optical system are corrected.

* * * * *